United States Patent
Itou

(10) Patent No.: US 7,079,033 B2
(45) Date of Patent: Jul. 18, 2006

(54) ID REGISTRATION METHOD FOR TIRE PRESSURE SENSOR, ID REGISTRATION APPARATUS, ID REGISTRATION TOOL FOR TIRE PRESSURE MONITORING SYSTEM, AND TIRE WITH AIR PRESSURE SENSOR

(75) Inventor: Shintarou Itou, Toyokawa (JP)

(73) Assignee: Denso Corporation, Kariya (JP)

( * ) Notice: Subject to any disclaimer, the term of this patent is extended or adjusted under 35 U.S.C. 154(b) by 19 days.

(21) Appl. No.: 10/453,638

(22) Filed: Jun. 4, 2003

(65) Prior Publication Data

US 2003/0227379 A1    Dec. 11, 2003

(30) Foreign Application Priority Data

Jun. 5, 2002  (JP) .............................. 2002-164985
Jun. 19, 2002  (JP) .............................. 2002-179149

(51) Int. Cl.
   *G08B 13/14*  (2006.01)

(52) U.S. Cl. ............... 340/572.3; 340/442; 340/572.1; 340/10.51; 340/10.52; 340/557; 73/146

(58) Field of Classification Search ............. 340/572.3, 340/572.1, 442, 445, 447, 443, 461, 525, 340/825.69, 825.72, 10.51, 10.52, 572.8, 340/555–557; 73/146.5, 146.2, 146; 116/34 R; 152/510; 301/95.101; 428/195.1

See application file for complete search history.

(56) References Cited

U.S. PATENT DOCUMENTS

| 649,988 | A | * | 5/1900 | Honeck et al. | ................ 417/35 |
| 4,687,942 | A | * | 8/1987 | Takagi et al. | ................ 250/556 |
| 4,734,674 | A | | 3/1988 | Thomas et al. | |
| 4,970,491 | A | | 11/1990 | Saint et al. | |
| 5,274,355 | A | * | 12/1993 | Galan | .......................... 340/445 |
| 5,602,524 | A | | 2/1997 | Mock et al. | |
| 6,149,060 | A | * | 11/2000 | Meadows | ............... 235/462.01 |

(Continued)

FOREIGN PATENT DOCUMENTS

JP    6-68097    3/1994

(Continued)

*Primary Examiner*—Davetta W. Goins
(74) *Attorney, Agent, or Firm*—Posz Law Group, PLC

(57) ABSTRACT

Provided is a tire pressure monitoring system capable of preventing mistaken registration of ID due to radio interference. In the system, a tire pressure monitoring apparatus is switched into an ID registration mode while an ID is read out from a bar code or the like and is transmitted to the tire pressure monitoring apparatus. The tire pressure monitoring apparatus registers the received ID in a memory. After the completion of the registration of a necessary number of IDs, the tire pressure monitoring apparatus is switched into a normal mode, before the ID registration operation comes to an end. On the other hand, in the case of tire replacement, through the use of an ID registration tool, an ID is read out from a bar code adhered onto a tire detached and is transmitted to the tire pressure monitoring apparatus. The tire pressure monitoring apparatus removes an ID corresponding to this ID from the memory, and through the use of the ID registration tool, an ID is read out from a bar code adhered onto a tire to be newly mounted and is transmitted to the tire pressure monitoring apparatus to be registered therein.

40 Claims, 79 Drawing Sheets

U.S. PATENT DOCUMENTS

| | | | |
|---|---|---|---|
| 6,235,376 B1 * | 5/2001 | Miyazaki et al. | 428/203 |
| 6,357,501 B1 * | 3/2002 | Becherer et al. | 152/450 |
| 6,505,507 B1 * | 1/2003 | Imao et al. | 73/146.5 |
| 6,518,876 B1 * | 2/2003 | Marguet et al. | 340/447 |
| 6,710,708 B1 * | 3/2004 | McClelland et al. | 340/442 |
| 6,737,965 B1 * | 5/2004 | Okubo | 340/445 |

FOREIGN PATENT DOCUMENTS

| | | |
|---|---|---|
| JP | 10-126480 | 5/1998 |
| JP | 2000-142044 | 5/2000 |
| JP | 2000-238515 | 9/2000 |
| JP | 3212311 | 7/2001 |

* cited by examiner

FIG. 29A DATA CODE
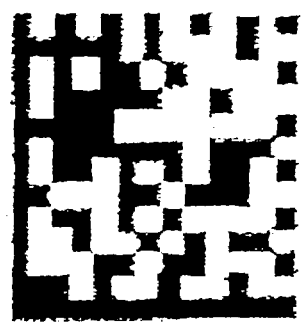
FIG. 29B QR CODE
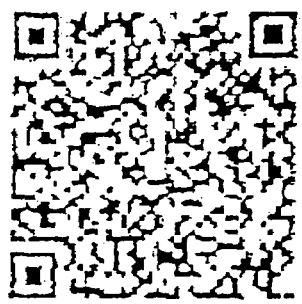
FIG. 29C MAXI CODE
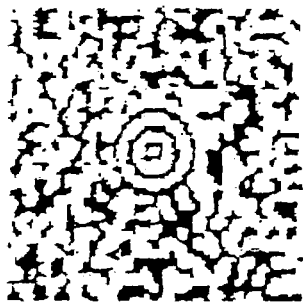
FIG. 29D CP CODE
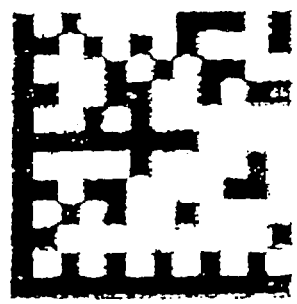

EXAMPLE OF TWO-DIMENSIONAL BAR CODE

EXAMPLE OF TWO-DIMENSIONAL BAR CODE

PDF 417

CODE 49

CODE 16K

CODER BLOCK

EXAMPLE OF ONE-DIMENSIONAL BAR CODE

ID REGISTRATION METHOD FOR TIRE PRESSURE SENSOR, ID REGISTRATION APPARATUS, ID REGISTRATION TOOL FOR TIRE PRESSURE MONITORING SYSTEM, AND TIRE WITH AIR PRESSURE SENSOR

BACKGROUND OF THE INVENTION

1) Field of the Invention

The present invention relates to an ID (identification information or identification means) registration method for a tire pressure sensor, and further to an ID registration apparatus for implementing this method, an ID registration tool for a tire pressure monitoring system, a tire with an air pressure sensor, and a tire pressure monitoring apparatus.

2) Description of the Related Art

So far, as a tire pressure monitoring system, there has been known a system disclosed in Japanese Patent No. 3212311.

In such a type of conventional tire pressure monitoring system, an air pressure sensor with a transmitter is mounted on each tire, and an air pressure detection signal, together with the corresponding sensor ID, is transmitted from the air pressure sensor to be received by a tire pressure monitoring apparatus mounted on a vehicle body side so that, when there is, at least, a tire unusual in air pressure, an indication appears on an indicator to issue an alarm.

In this system, the ID for each sensor is also registered (put) in the tire pressure monitoring apparatus, and checking this ID, a decision can be made as to whether or not the received detection signal belongs to an air pressure sensor of a tire of his/her own vehicle.

In a conventional system, this sensor ID is allocated to each sensor by a sensor maker at the stage of shipping, while in a car maker, a tire pressure monitoring apparatus of a vehicle body is set to an ID registration mode in assembling a vehicle to receive an ID transmitted from each sensor for registering it in the tire pressure monitoring apparatus.

More concretely, as shown in a block diagram of FIG. 78, a conventional tire pressure monitoring system is made up of air pressure sensors 110, 120, 130 and 140 mounted on the corresponding tires and a tire pressure monitoring apparatus 150 mounted on a vehicle body. The air pressure sensor 110 includes a pressure sensor 111 for detecting an air pressure in a tire, an ID memory 112 for storing a sensor ID in advance, and a transmitting circuit 113, a power supply battery 114, a control unit 115 and a transmitting antenna 116. The other air pressure sensors 120, 130 and 140 have the same configuration.

The tire pressure monitoring apparatus 150 includes a receiving circuit 151, a receiving antenna 152, a power supply circuit 153, a control unit 154, a memory 155 and a communication circuit 156 for transmitting indication data to an indicating device 160 such as an indicator or an LED. Moreover, the power supply to this tire pressure monitoring apparatus 150 is from a vehicle-mounted battery 170, and as various types of switches, in particular, to the control unit 154, there is connected a mode switch 180 made to carry out the switching between a normal operating mode and an ID registration mode.

The ID registration in a vehicle manufacturing line is conducted in accordance with a procedure shown in a flow chart of FIG. 79. That is, the control unit 154 registers a sensor ID included in a received signal in the memory 155 when the receive signal level satisfies a predetermined condition (decision level) (P7140, P7150). In this way, in the conventional system, the ID of an air pressure sensor actually mounted on each tire of a vehicle is registered in the monitoring apparatus side, and a decision is made as to whether an ID included in a signal received through the receiving antenna 152 agrees with an ID registered in the memory 155 and, if it agrees therewith, a decision is made on a tire pressure state on the basis of a pressure signal received together with that ID and an indication apparatus on the indicating device 160 on the basis of the decision result. In this case, the ID registration is for preventing an indication from being made in error on the basis of a signal from an air pressure sensor of a tire of a vehicle running nearby.

However, in a vehicle assembling process, since an air pressure sensor ID registration work is done in a state where many vehicles flows on the line, a radio interference problem arises in which one vehicle receives an ID signal from an air pressure sensor of other vehicles to conduct mistaken registration. This problem also applies to a case in which a sensor ID is re-registered in a repair shop or the like.

SUMMARY OF THE INVENTION

It is therefore an object of the present invention to prevent mistaken ID registration in a tire pressure monitoring system.

For this purpose, in accordance with an aspect of the present invention, there is provided a tire pressure sensor ID registration method of reading ID information readable through some device or through human's eye to write the ID information in an ID storage unit of each of air pressure sensors and in an ID storage unit of a tire pressure monitoring apparatus.

More concretely, in the present invention, for example, an ID, being expressed by a bar code, is read to be written in each ID storage unit of each of the air pressure sensors and the tire pressure monitoring system. With this concrete manner, an ID of an air pressure sensor is stored in the tire pressure monitoring apparatus on the basis of the bar code, which eliminates the conventional problem in that mistaken registration occurs due to the radio interference.

As employable optically-readable information other than the bar code, there are data code, QR code, maxi code, CP code, PDF417, code 49, code 16K, coder block, and others. In the case of the employment of optically-readable information (information holding means) such as a bar code, an optical information reader such as a bar-code reader may be used for the readout of the ID.

In addition, in the case of the bar code, since code information is expressed by numerals or figures, it is also appropriate that an operator reads these numerals and manually inputs them in some tool so that the manually inputted data is forwarded through radio transmission or wired transmission to an air pressure sensor and a tire pressure monitoring apparatus to be put in ID storage units thereof. In the case of the employment of a bar-code reader, the bar-code reader and the air pressure sensor/tire pressure monitoring apparatus can be connected to each other through a signal line (wired means) so that an ID read out from the bar code is transmitted from the bar-code read to the air pressure sensor and the tire pressure monitoring apparatus to be put in the ID storage units thereof. In a case in which an ID is written by means of wired transmission, the radio interference problem is completely solvable.

Still additionally, in a conventional method using electric wave, since other electric waves, such as aeronautical radio waves, are stronger, it is considered that there is a case the reception of an electric wave from a sensor for the ID registration becomes difficult to disenable the ID registration. However, the connection between a tool and a sensor/monitoring apparatus through a signal line for the ID registration can solve such a problem at a stroke.

Yet additionally, when an ID read out from a bar code or the like through the use of such a tool is written in any one of tire air pressure sensors connected thereto through a signal line and is further written in the tire pressure monitoring apparatus likewise connected thereto through a signal line, if information on a position of the tire air pressure sensor is also written in the tire pressure monitoring apparatus, in addition to the registration of the ID of the tire pressure sensor, set on the vehicle, in the tire pressure monitoring apparatus, the registration of the position of the tire air pressure sensor is feasible.

Moreover, when the ID read out from the bar code or the like is written in such an air pressure sensor, for example, in the case of a four-wheel vehicle, if it is previously prescribed that the IDs are written in the sensors in the order of a front right wheel, a rear right wheel, a rear left wheel and a front left wheel and the IDs are also written in the tire pressure monitoring apparatus in this order, the registration of the sensor IDs becomes feasible together with the registration of the tire position information.

In this connection, such registration of ID, additionally specifying position, is also possible even if the ID registration is made not only by the wired transmission but also by radio transmission. For example, in a case in which electric waves are used in registering ID from a bar-code reader or the like in each tire pressure sensor, it is sufficiently achievable by means of, for example, the directivity of the electric wave being enhanced. Incidentally, as the information transmission medium in the case of the radio ID registration, in addition to the electric wave, infrared ray, ultrasonic wave or the like is also employable.

In a vehicle which has presently been put into practical use, four receiving antennas are provided in vicinity of the four wheels, respectively, on the monitoring apparatus side to allow the ID registration and the monitoring of the tire air pressure to be done while specifying the tire positions. On the other hand, with the method according to the present invention, as mentioned above, the ID registration is feasible while specifying the one of the four wheels, without increasing the number of receiving antennas in the monitoring apparatus side, and since each of the tire air pressure sensors can be made to have a unique ID, even if only one receiving antenna is provided for the monitoring of the air pressure, a judgment can easily be made as to which of the tires is in what air pressure state. Therefore, the method according to the present invention enables monitoring the air pressures while specifying the tire positions, through the use of a simpler apparatus configuration as compared with a system which has presently been put into practical use.

In addition, the method according to the present invention can exhibit the following effects. For example, let it be assumed that a transmitting unit of an air pressure sensor of any one of tires is broken. In this case, a dealer or a repair shop replaces the air pressure sensor of that tire with new one. At this time, a new bar code is read out by a bar-code reader and a new ID indicated by the read bar code is written in an ID storage unit of an air pressure sensor attached newly. In addition to this, that ID is written in the monitoring apparatus. In this way, through only the registration procedure on the renewed sensor, the ID registration can be completed, thus improving the workability of the ID re-registration incidental to the renewal of a sensor.

In this connection, as a judgment method on a broken sensor, the ID of the sensor from which an air pressure detection signal has not been received within a predetermined period of time when the vehicle is running can be specified through the use of a software or the like on the tire pressure monitoring apparatus side. Accordingly, the specified sensor ID can also be removed from the ID storage unit of the monitoring apparatus in a renewing operation. Incidentally, it is also acceptable that the broken sensor ID is left without removed. This is because the air pressure signal including the ID of the broken sensor is not received eventually and the IDs for the sensors corresponding to the four wheels are correctly registered through the re-registration operation so that any trouble does not occur in the monitoring of the tire air pressure.

As described above, with the method according to the present invention, in a case in which an air pressure sensor breaks down, only the operation for the ID registration in the renewed sensor and the operation for the registration of the ID of the renewed sensor in the monitoring apparatus are required, thus considerably improving the working efficiency. This effect is valuable. That is, in a conventional manner, an requirement exists that, in a case in which an air pressure sensor of any one of tires is replaced with new one, in a state where the monitoring apparatus is placed into an ID registration mode and the ID registration contents of this apparatus are reset, the IDs transmitted from the air pressure sensors of all the tires are again received to be registered in the monitoring apparatus side.

Still additionally, in a case in which any one of sensors breaks down and is replaced with a new one, or when a tire bursts and the entire tire is replaced so that the sensor is replaced with another, the method according to the present invention enables the ID re-registration to be implemented with respect to the air pressure sensors of all the tires and the tire pressure monitoring apparatus through the use of an ID registration tool such as a bar-code reader in a repair shop. In this case, at the re-registration, if the ID registration is done in the form of including information on the implementation of the re-registration, a judgment can thereafter be made easily as to whether or not the sensor or tire replacement has taken place due to the sensor failure or the tire burst, which contributes to the history management on the tires of the vehicle.

Aside from the above-mentioned sensor failure, in the case of the tire burst, for further effectiveness, with respect to a tire to be replaced due to the burst, the ID re-registration in the sensor and monitoring apparatus is implemented on the basis of a bar code or the like including its ID and the information on that fact. This additionally enables the tire history management by reading out the ID registered in the tire pressure monitoring apparatus or the air pressure sensor.

For achieving the above-mentioned purpose, in accordance with a second aspect of the present invention, there is provided a tire air pressure sensor ID registration method in which sensor ID information is placed or indicated as readable information on each tire pressure sensor, each tire, each tire wheel or each tire wheel cover and an ID is read out from the readable information and the readout result is written in an ID storage unit of a tire pressure monitoring apparatus.

More concretely, in the present invention, for example, a bar code indicating the ID registered in a sensor is adhered onto the sensor itself, a tire, a wheel or a wheel cover and this bar code is read through the use of a bar-code reader so that the read information is written in an ID storage unit of a tire pressure monitoring apparatus. According to this concrete method, the ID stored in the air pressure sensor is not transmitted from the air pressure sensor, but the air pressure sensor ID is stored in the tire pressure monitoring apparatus on the basis of the bar code, which eliminates a conventional problem such a mistaken registration due to the radio interference which exists in a conventional technique.

Moreover, with this method, in addition to the ID, information indicative of a sensor manufacturing factory or production time can be placed in the bar code. In a state where this information is included therein, the ID information is stored in the monitoring apparatus. In monitoring the air pressure, the sensor collation is made on the basis of only the ID portion. In the meantime, for example, in a case in which the sensor breaks down, the information is read out from the monitoring apparatus side, thereby deriving information representative of a lot offering broken sensors frequently. As effects, this allows a vehicle maker to attain effective information for the management of the in-house vehicles.

Also in this method, in addition to a bar code, various types of optically-readable information, such as data code, QR code, maxi code, CP code, PDF417, code 49, code 16K, coder block, and others are also employable, and an optical information reading device corresponding to the optically-readable information is employable for reading.

In addition, also in this method, in the case of the bar code, since code information is expressed by numerals or figures, it is also appropriate that an operator reads these numerals and manually inputs them in some tool so that the manually inputted data is forwarded through radio transmission or wired transmission to a tire pressure monitoring apparatus to be put in an ID storage unit thereof. In the case of the employment of a bar-code reader, the bar-code reader and the tire pressure monitoring apparatus can be connected to each other through a signal line so that an ID read out from the bar code is transmitted from the bar-code read to the tire pressure monitoring apparatus to be put in the ID storage unit thereof. In a case in which an ID is written by means of wired transmission, the radio interference problem is completely solvable.

Still additionally, in a conventional method using electric wave, since other electric waves, such as aeronautical radio, are stronger, it is considered that there is a case the reception of an electric wave from a sensor for the ID registration becomes difficult to disenable the ID registration. However, the connection between a tool and a monitoring apparatus through a signal line for the ID registration can solve such a problem at a stroke.

Yet additionally, when an ID read out from a bar code or the like through the use of such a tool is written in the tire pressure monitoring apparatus, if information on a position of a tire air pressure sensor is also written in the tire pressure monitoring apparatus, in addition to the registration of the ID of the tire pressure sensor, set on the vehicle, in the tire pressure monitoring apparatus, the registration of the position of the tire air pressure sensor is also feasible.

Moreover, when the ID is read out from the bar code, for example, in the case of a four-wheel vehicle, if it is previously prescribed that the bar codes are read in the order of a front right wheel, a rear right wheel, a rear left wheel and a front left wheel and the bar codes adhered onto sensors, tires, wheels or wheel covers are read in this order, the sensor IDs, together with tire position information, can be registered in the monitoring apparatus side.

In a vehicle which has presently been put into practical use, four antennas are required for the implementation of the ID registration specifying the tire positions. On the other hand, with the method according to the present invention, the ID registration is feasible while specifying any one of the four wheels, without increasing the number of receiving antennas in the monitoring apparatus side, and since each of the tire air pressure sensors can be made to have a unique ID, even if only one receiving antenna is provided for the monitoring of the air pressures, a judgment can easily be made as to which of the tires is in what air pressure state. Therefore, the method according to the present invention enables monitoring the air pressures while specifying the tire positions, through the use of a simpler apparatus configuration as compared with a system which has presently been put into practical use.

In this method, an ID can be read out from the aforesaid readable information and inputted to the aforesaid tire pressure monitoring apparatus, and the ID inputted this time can be removed from the IDs already written in the ID storage unit of the tire pressure monitoring apparatus.

This is effective in the case of the replacement of a sensor or a tire. That is, if an ID is read out from readable information, such as a bar code, adhered onto a detached sensor or tire and this ID is removed from the ID storage unit of the tire pressure monitoring apparatus, then it is possible to prevent useless information from being left in a state registered in the ID storage unit of the monitoring apparatus.

Furthermore, for achieving the above-mentioned purpose, in accordance with a further aspect of the present invention, there is provided a tire air pressure sensor ID registration apparatus comprising an ID indication unit for indicating readable information including an ID, a reading unit for reading the ID from the readable information indicated on the ID indication unit, and an ID writing unit for writing the ID, read by the reading unit, in an ID storage unit of each of air pressure sensors and an ID storage unit of a tire pressure monitoring apparatus. This ID registration apparatus can easily implement the above-described method according to the present invention.

In this configuration, as the ID indication unit, for example, there may be a manufacturing instruction in which each of bar codes indicating IDs to be registered in sensors of four wheels is produced for each vehicle and then put in order for each vehicle, more preferably for each tire, and adhered thereonto. In this case, a bar-code reader can be used as the reading unit, and a handy type is more effective. Moreover, as the writing unit, a manufacture management computer to be connected to the handy type bar-code reader is acceptable, and it is also possible that the bar-code reader itself is used as the writing unit.

Furthermore, in accordance with a further aspect of the present invention, there is provided an ID registration apparatus comprising a readable information indication label, including a sensor ID, adhered onto each air pressure sensor, each tire, each tire wheel or each tire wheel cover, a reading unit for reading the ID from the readable information indication label, and a writing unit for writing the ID, read by the reading unit, in an ID storage unit of the tire pressure monitoring apparatus.

According to this ID registration apparatus, a readable information indication label, including a sensor ID, is previously adhered onto each air pressure sensor, each tire, each tire wheel or each tire wheel cover, and the ID is read from the readable information indication label by the reading unit and the ID read in this way is written in the ID storage unit of the tire pressure monitoring apparatus by the ID writing unit. This can carry out the above-described method according to the present invention.

This ID registration apparatus can be equipped with an ID deletion unit for, when an ID read by the reading unit is inputted in the tire pressure monitoring apparatus, deleting the ID, inputted this time, from IDs already written in the ID storage unit of the tire pressure monitoring apparatus.

Thus, for example, in the case of the replacement of a tire, the ID deletion unit reads a bar code adhered onto the tire to be detached and inputs the ID indicated by the bar code in the tire pressure monitoring apparatus to delete the ID, inputted this time, of the IDs already written in the ID storage unit of the tire pressure monitoring apparatus, thereby removing the ID of the sensor mounted on the detached tire.

In this connection, as examples of the readable information employable for the ID registration apparatus according to the present invention, there are bar code, data code, QR code, maxi code, CP code, PDF417, code 49, code 16K, coder block, and others. In the case of the employment of these optically-readable information, an optical information reading unit can be used for the readout of the ID.

In addition, in the ID registration apparatus according to the present invention, the ID writing unit can be connected through a signal line to the tire pressure monitoring apparatus so that the ID to be stored in the tire pressure monitoring apparatus is transmitted through the signal line. The effects of the transmission made through a wire are as mentioned above.

Furthermore, for achieving the above-mentioned purpose, in accordance with a further aspect of the present invention, there is provided an ID registration tool for a tire pressure monitoring system, comprising a reading unit for reading an ID from a readable information indication label, including the ID of a sensor, adhered onto each air pressure sensor, each tire, each tire wheel or each tire wheel cover, an ID transmitting unit for transmitting the ID, read by the reading unit, to a tire pressure monitoring apparatus, and a storage state instruction unit for giving instruction on the registration or deletion of the ID transmitted from the ID transmitting unit.

In the ID registration tool according to the present invention, at the ID registration, the reading unit reads an ID from a readable information indication label, including the ID of a sensor, adhered onto each air pressure sensor, each tire, each tire wheel or each tire wheel cover mounted on a vehicle, and the ID transmitting unit transmits the ID, read out by the reading unit, to the tire pressure monitoring apparatus. Moreover, the storage state instruction unit gives instruction about the registration or deletion of the ID transmitted from the ID transmitting unit. Thus, an air pressure sensor ID of each of the tires mounted on a vehicle carrying the monitoring apparatus is correctly written in the monitoring apparatus.

In this case, the reading unit can be constructed as an optical information reading unit made to optically read optically-readable information, such as bar code, data code, QR code, maxi code, CP code, PDF417, code 49, code 16K, coder block, and others.

In addition, the ID registration tool for use in a tire pressure monitoring system can be equipped with a signal line for making a connection with respect to the tire pressure monitoring apparatus or a connector for the connection of the signal line. When the ID transmission is made through a wire in this way, it is possible to solve the radio interference problem completely and further to prevent a registration-impossible state from being incurred due to electric wave troubles.

Still additionally, the ID registration tool for use in a tire pressure monitoring system can be equipped with a trigger signal transmitting unit for transmitting a trigger signal for an ID registration mode to the tire pressure monitoring apparatus. The trigger signal transmitting unit is provided in this way and, at the implementation of the ID registration, the trigger signal is first transmitted so that the tire pressure monitoring apparatus falls into an ID registration mode before the ID read out by the reading unit is transmitted thereto, thereby enabling the smooth ID registration.

Moreover, for achieving the above-mentioned purpose, in accordance with a further aspect of the present invention, there is provided a tire with an air pressure sensor in which an optically-readable information label indicating information including an ID of an air pressure sensor is adhered onto the air pressure sensor, the tire itself, a tire wheel or a tire wheel cover. In this case, as the optically-readable information labels employable, there are listed a bar code label, a data code label, a QR code label, a maxi code label, a CP code label, a PDF417 label, a code 49 label, a code 16K label, and a coder block label.

In addition, for achieving the above-mentioned purpose, in accordance with a further aspect of the present invention, there is provided a tire air pressure sensor ID registration method in which each of air pressure sensors and a tire pressure monitoring apparatus are together placed into an ID registration mode, and an ID is transmitted to each of the sensors to be stored therein and the same ID is also transmitted to the tire pressure monitoring apparatus to be stored therein.

That is, instead of an ID previously stored in the sensor side being stored in the tire pressure monitoring apparatus, when an ID is initially registered or re-registered in each of air pressure sensors, the ID pertaining to the air pressure sensor of each of tires to be mounted on a vehicle is also initial-registered or re-registered in the tire pressure monitoring apparatus. For this operation, an ID registration tool is used in a more concrete method proposed as one example of the present invention.

As will be described later, preferably, a basic configuration of this ID registration tool includes an ID setting unit and an ID transmitting unit. This ID setting unit can be achieved through the use of such a key-manipulated putting manner that a field operator inputs and sets an ID according to an operating instruction each time. As another mode, it is also appropriate that a body number of a vehicle, or the like, is read out through the use of an optical reading unit or the like and an ID of an air pressure sensor to be mounted on each of tires is automatically produced and set on the basis of the read body number, or that production management data (vehicle body number, vehicle production number, or the like) for the manufacture of the vehicle is putted to the ID registration tool and an ID of each of air pressure sensors of tires of the vehicle is automatically input or automatically produced and set on the basis of the production management data. Moreover, it is also acceptable that a code is produced at random in the tool and a sensor ID is set on the basis of the produced code. In any case, a sensor ID set in the ID registration tool is transmitted from the ID registration tool to each of sensors and a tire pressure monitoring apparatus in one vehicle to be stored therein, thus solving the problem that an ID of an air pressure sensor of a tire of a different vehicle is registered in error.

In this connection, in a case in which the ID registration is made according to the method according to the present invention, considering the vehicle production stages, as the tire air pressure sensor, there may be employed a sensor in which nothing is stored in its ID storage unit or a meaningless code is stored therein. For this reason, the problem of the sensor ID mistaken registration, occurring due to radio interference with a signal transmitted periodically from a tire air pressure sensor mounted on a vehicle flowing immediately after the vehicle undergoing the ID registration in a manufacturing line, can naturally be solved.

Although the method according to the present invention may be an easy manner apparently, unlike a conventional technique in which an ID previously registered in the sensor side is transmitted from the sensor by means of the radio transmission and is received in the monitoring apparatus side to be registered therein, since an ID previously set is registered in a sensor and in a monitoring apparatus, it is possible to eliminate the problem incidental to the conventional method at a stroke, thus providing extremely noticeable effects. Moreover, as one example, the employment of a dedicated ID registration tool is proposed for the registration.

In this case, the connections among the ID registration tool, each of the sensors and the monitoring apparatus are made through signal lines so that the ID registration is carried out through these signal lines, thus eliminating the radio interference problem. In addition, in a conventional method using electric wave, since other electric waves, such as aeronautical radio waves, are stronger, it is considered that there is a case the reception of an electric wave from a sensor for the ID registration becomes difficult to disenable the ID registration. However, since the connections among the tool, the sensor and the monitoring apparatus are made through signal lines for the ID registration, such a problem is solvable at a stroke. Still additionally, if the signal lines are correctly connected thereto, for example, in a four-wheel vehicle, in addition to the IDs of the four wheels being registered in the monitoring apparatus side, the ID registration can be done while specifying their positions. This also applies to a case in which the ID registration is carried out through radio transmission instead of the wired transmission and is sufficiently achievable by means of a design, such as enhancing the radio directivity in registering an ID in an air pressure sensor of each tire. Incidentally, as the information transmission medium in the case of the radio ID registration, in addition to the electric wave, infrared ray, ultrasonic wave or the like is also employable. Moreover, as mentioned above, also with the method according to present invention, the ID registration is feasible while recognizing the specified one of the four wheels, without increasing the number of receiving antennas in the monitoring apparatus side, and since each of the tire air pressure sensors has a unique ID, even if only one receiving antenna exists for monitoring the air pressure, a judgment can easily be made as to which of the tires is in what air pressure state. Therefore, likewise, the method according to the present invention enables the use of a simpler apparatus configuration as compared with a system which has presently been put into practical use.

Furthermore, the method according to this aspect of the present invention can exhibit the following effects. For example, as well as the above-described aspect of the invention, let it be assumed that a transmitting unit of an air pressure sensor of any one of tires is broken. In this case, a dealer or a repair shop replaces the air pressure sensor of that tire with new one. At this time, with respect to new air pressure sensor, it is possible that the air pressure sensor ID at the corresponding tire position registered in the tire pressure monitoring apparatus in the vehicle body side is read out through the use of the ID registration tool and is transmitted as a set value to the newly replacing air pressure sensor to be stored therein. In this connection, as a judgment method on a broken sensor, the ID of the sensor from which an air pressure detection signal has not been received within a predetermined period of time when the vehicle is running can be specified through the use of a software or the like on the tire pressure monitoring apparatus side. Accordingly, only the operation for the ID registration in the broken air pressure sensor is required, thus considerably improving the workability. Incidentally, if a rule is made such that the condition of the ID registration at the replacement of a sensor is determined on the basis of some code information, such as a vehicle body number or a production number, peculiar to the vehicle, the ID setting can easily be made by key-inputting the vehicle body number or the like in the ID registration tool or by automatically reading and inputting it through the use of an optical reading unit or the like, without reading out the storage contents on the tire pressure monitoring apparatus side of the vehicle body, thereby further improving the workability.

Still furthermore, as well as the above-described aspect of the invention, in a case in which any one of sensors breaks down and is replaced with a new one, or when a tire bursts and the entire tire is replaced so that the sensor is replaced with another, the method according to the present invention enables the ID re-registration to be implemented with respect to the air pressure sensors of all the tires and the tire pressure monitoring apparatus on the vehicle body side through the use of the ID registration tool in a repair shop. Also in this case, if the ID re-registration is done in the form of including information on the implementation of the re-registration, the history management is feasible with respect to the tires of the vehicle. Moreover, in the case of the tire burst, for further effectiveness, with respect to a tire to be replaced due to the burst, that fact is inputted to the ID registration tool and the ID re-registration is made in the form of including the replacement history information. This additionally enables the tire history management by reading out the registered ID from the tire pressure monitoring apparatus or in the air pressure sensor.

In addition, according to the conventional method, at the ID registration, the tire pressure monitoring apparatus of the vehicle body is set in an ID registration mode and receives an ID signal transmitted periodically (for example, at an interval of 10 minutes) from an air pressure sensor of each of tires to register it as a sensor ID and, hence, the ID registration process takes time. However, with the method according to the present invention, since the ID registration is accomplished by the positive ID transmission from the ID registration tool, it is possible to considerably shorten the time required for the ID registration. That is, the conventional technique waits for the reception of an ID signal-transmitted from a sensor and registers it, whereas, according to the present invention, in the ID registration mode, the ID registration tool positively transmits a sensor ID to register in each sensor and in the monitoring apparatus, thus exhibiting an additional effect of considerably shortening the time needed for the ID registration process.

The above-mentioned various effects also apply not only to the vehicle production process but also to the repair of a vehicle in a dealer or a repair shop.

The above-described method according to the present invention which exhibits the distinguished effects is achievable through the use of the following tire air pressure sensor ID registration apparatus. This tire air pressure sensor ID registration apparatus is made up of a receiver mode switching unit for switching a tire pressure monitoring apparatus, mounted on a vehicle body, into an ID registration mode, a transmitter mode switching unit for switching an air pressure sensor of each of tires, mounted on a vehicle, into an ID registration mode, an ID setting unit for setting a registration ID to be stored in the air pressure sensor, and an ID registration tool including an ID transmitting unit for transmitting the set registration ID to the air pressure sensor switched into the ID registration mode by the transmitter mode switching unit and further to the tire pressure monitoring apparatus switched into the ID registration mode by the receiver mode switching unit. This ID registration apparatus can easily realize the method according to the present invention.

In this case, in the tire air pressure sensor ID registration apparatus according to the present invention, the ID registration tool can be connected through signal lines to the air pressure sensor of each of the tires and the tire pressure monitoring apparatus, and the ID to be stored in the air pressure sensor and the tire pressure monitoring apparatus is transmitted thereto through the signal lines. The effects of the signal transmission/reception using the wires are as mentioned above.

In addition, in the tire air pressure sensor ID registration apparatus according to the present invention, the ID registration tool can be made to be connectable to a production management computer, and the ID setting unit can be made to set an ID on the basis of production management information pertaining to each vehicle, such as a vehicle body number or a vehicle production number, given from the production management computer. This configuration enables the sensor ID registration based on the information on the production management peculiar to each vehicle.

Still additionally, for implementing the method according to the present invention, the following ID registration tool for use in a tire pressure monitoring system is employable. This ID registration tool for the tire pressure monitoring system is composed of an ID setting unit for setting a peculiar ID to be stored in an air pressure sensor of each of tires to be mounted on a vehicle and an ID transmitting unit for transmitting the ID, set in the ID setting unit, to the air pressure sensor of each of the tires and further to the tire pressure monitoring apparatus. The employment of this ID registration tool facilitates the realization of the method according to the present invention.

In this case, the ID registration tool for the tire pressure monitoring system according to the present invention can be equipped with signal lines for making connections with respect to the air pressure sensor of each of the tires and the tire pressure monitoring apparatus and a connector for the connections of the signal lines. The effects of the signal transmission/reception using wires are as mentioned above.

Moreover, the ID registration tool for the tire pressure monitoring system can include a trigger signal transmitting unit for transmitting a trigger signal to the air pressure sensor and the tire pressure monitoring apparatus for setting the air pressure sensor and the tire pressure monitoring apparatus in an ID registration mode. At the ID registration, this configuration can switch the air pressure sensor and the tire pressure monitoring apparatus into the ID registration mode through the use of the trigger signal from the ID registration tool. Accordingly, the IF registration tool with this configuration can eliminate the need for the operations such as switch manipulations of the air pressure sensor and the tire pressure monitoring apparatus at the ID registration, thereby improving the working efficiency.

Still moreover, in the ID registration tool for the tire pressure monitoring system, the ID setting unit can be made to include a sensor-peculiar ID producing unit for producing an ID, peculiar to each sensor, on the basis of peculiar vehicle information on production management, such as a vehicle number or a vehicle production number. Alternatively, in the ID registration tool for the tire pressure monitoring system, the ID setting unit can include a random-number generating unit for generating a random number and a sensor-peculiar ID producing unit for producing an ID, peculiar to each sensor, on the basis of the random number generated by the random-number generating unit. In addition, it is also possible that the ID registration tool for the tire pressure monitoring system is made to be connectable to a production management computer, and the ID setting unit can be made to set an ID including a portion of or all of production management information, peculiar to each vehicle, such as a vehicle body number or a vehicle production number, given by the production management computer.

Furthermore, for implementing the method according to the present invention, the following tire air pressure sensor is employable. This tire air pressure sensor is composed of an air pressure detecting unit, an ID storage unit, a transmitting circuit, and a receiving circuit, and when an ID to be stored in the ID storage unit is received through the receiving circuit, the ID is stored in the ID storage unit. That is, although a conventional tire air pressure sensor is not provided with a receiving circuit because of no requirement, for realizing the method according to the present invention, the receiving circuit is essential and, hence, the inventor of this application further invented a novel tire air pressure sensor with the receiving circuit. In this connection, it is also acceptable that the receiving circuit is constructed as a transmitting/receiving circuit integrated with a transmitting circuit, instead of being constructed as a single circuit.

In this case, in the tire air pressure sensor according to the present invention, the receiving circuit can be made to have a circuit arrangement in which the reception of a signal is made through a wired means. The effects of the signal transmission/reception using wires are as mentioned above.

Still furthermore, in the tire air pressure sensor according to the present invention, the ID storage unit can be constructed using a storage element which allows rewriting through overwriting. Thus, in the case of the implementation of the re-registration of a sensor ID in a repair shop or of the ID registration through radio means on a production line, when a sensor ID of the preceding vehicle is registered in the next vehicle on the production line, the registration of the normal sensor ID can easily be done at the ID registration in this next vehicle.

For realizing the method according to the present invention, an air pressure sensor mounted tire is equipped with the above-mentioned tire air pressure sensor according to the invention.

In addition, a tire pressure monitoring apparatus according to the present invention is made up of a signal line connecting unit for making a connection through a signal line to a predetermined ID registration tool, an ID registration mode activating unit for activating an ID registration mode, a tire position judging unit for making a judgment on a tire position on the basis of registration ID data received through the signal line in a state where the ID registration mode is activated, an ID registration unit for registering an ID of each of air pressure sensors in the form of specifying a tire position on the basis of a result of the judgment in the tire position judging unit, a re-registration judging unit for making a judgment on the basis of a command received from the ID registration tool as to whether or not the present registration is re-registration, and a re-registration unit for, when the judgment in the re-registration judging unit indicates the re-registration, re-registering an air pressure sensor ID in a memory on the basis of a result of the judgment in the tire position judging unit so that an ID already registered with respect to an air pressure sensor existing at the tire position undergoing the tire position judgment is effectively replaced with the air pressure sensor ID.

With this tire pressure monitoring apparatus according to the present invention, the sensor ID is based on a registration ID received from the ID registration tool through the signal line connecting unit and, hence, the mistaken registration due to the radio interference or the like is preventable. Moreover, at the ID registration, the tire position judging means makes a judgment on a tire position on the basis of the registration ID data, and on the basis of the judgment result, the ID registration unit makes the registration of the sensor ID to permit specifying the tire position. Accordingly, it is possible to easily carry out the monitoring of the tire air pressure while specifying the tire position, which offers the effects of eliminating the need for an increase in number of antennas. Moreover, if the re-registration judging unit makes a judgment that it is the re-registration, the ID re-registration unit re-registers an air pressure sensor ID in the memory so as to substitute it effectively for the already registered ID of an air pressure sensor at the subject tire position. Accordingly, for example, in a case in which only a portion of tires or sensors is replaced, the re-registration operation can be done with respect to only the replacing tire. Incidentally, as the employable registration methods for the effective replacement, for example, there are 1) the subject already registered ID being overwritten by a registration ID newly received and 2) the subject already registered ID being made void through the use of a flag so that a registration ID newly received is separately registered. In addition, in the case of the initial registration or the rotation, the tire position judging unit can also make a judgment on the tire position on the basis of the order of the data reception.

BRIEF DESCRIPTION OF THE DRAWINGS

Other objects and features of the present invention will become more readily apparent from the following detailed description of the preferred embodiments taken in conjunction with the accompanying drawings in which:

FIG. 29 is a plan view showing examples of optically-readable information;

DESCRIPTION OF THE PREFERRED EMBODIMENTS

Embodiments of the present invention will be described hereinbelow with reference to the drawings.

First Embodiment

Figure 1:
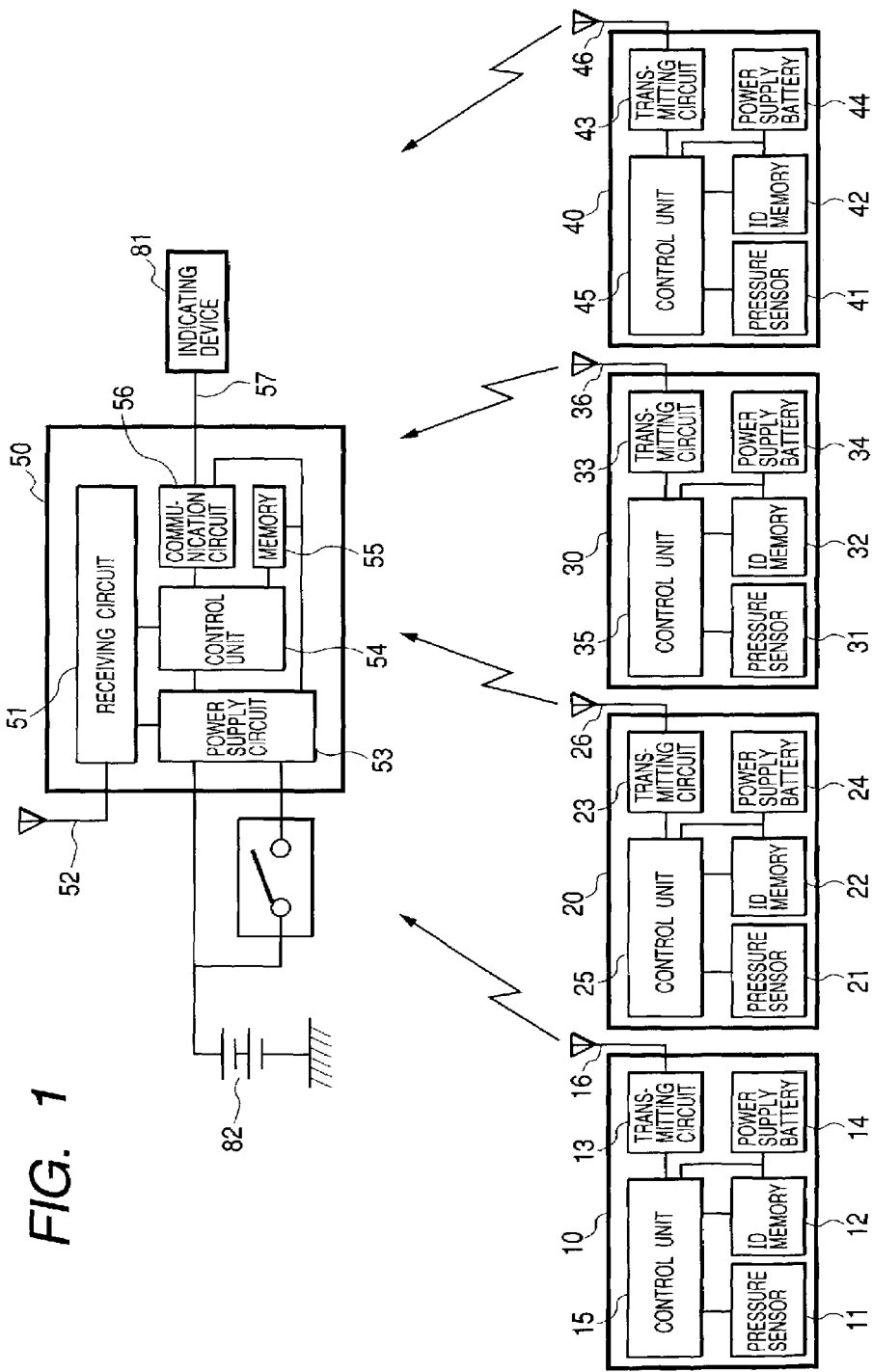
FIG. 1 is a block diagram showing a configuration of a tire pressure monitoring system according to a first embodiment of the present invention.

FIG. 1 is a block diagram schematically showing a configuration of a tire pressure monitoring system according to a first embodiment of the present invention. As FIG. 1 shows, the tire pressure monitoring system according to this embodiment is made up of air pressure sensors 10, 20, 30 and 40 mounted on tires and a tire pressure monitoring apparatus 50 mounted on a body of a vehicle. The air pressure sensor 10 is composed of a pressure sensor 11 for detecting an air pressure in the interior of a tire, an ID memory 12 for storing a sensor ID in advance, a transmitting circuit 13, a power supply battery 14, a control unit 15 and a transmitting antenna 16. The other air pressure sensors 20, 30 and 40 have the same configuration.

On the other hand, the tire pressure monitoring apparatus 50 is composed of a receiving circuit 51, a receiving antenna 52, a power supply circuit 53, a control unit 54, a memory 55, and a communication circuit 56 for transmitting indication data to an indicating device 81 such as an indicator or LED. This communication circuit 56 is also designed to receive a signal representative of an indication state and others from the indicating device 81. The power supply to the tire pressure monitoring apparatus 50 is made from a vehicle-mounted battery 82.

Figure 2:
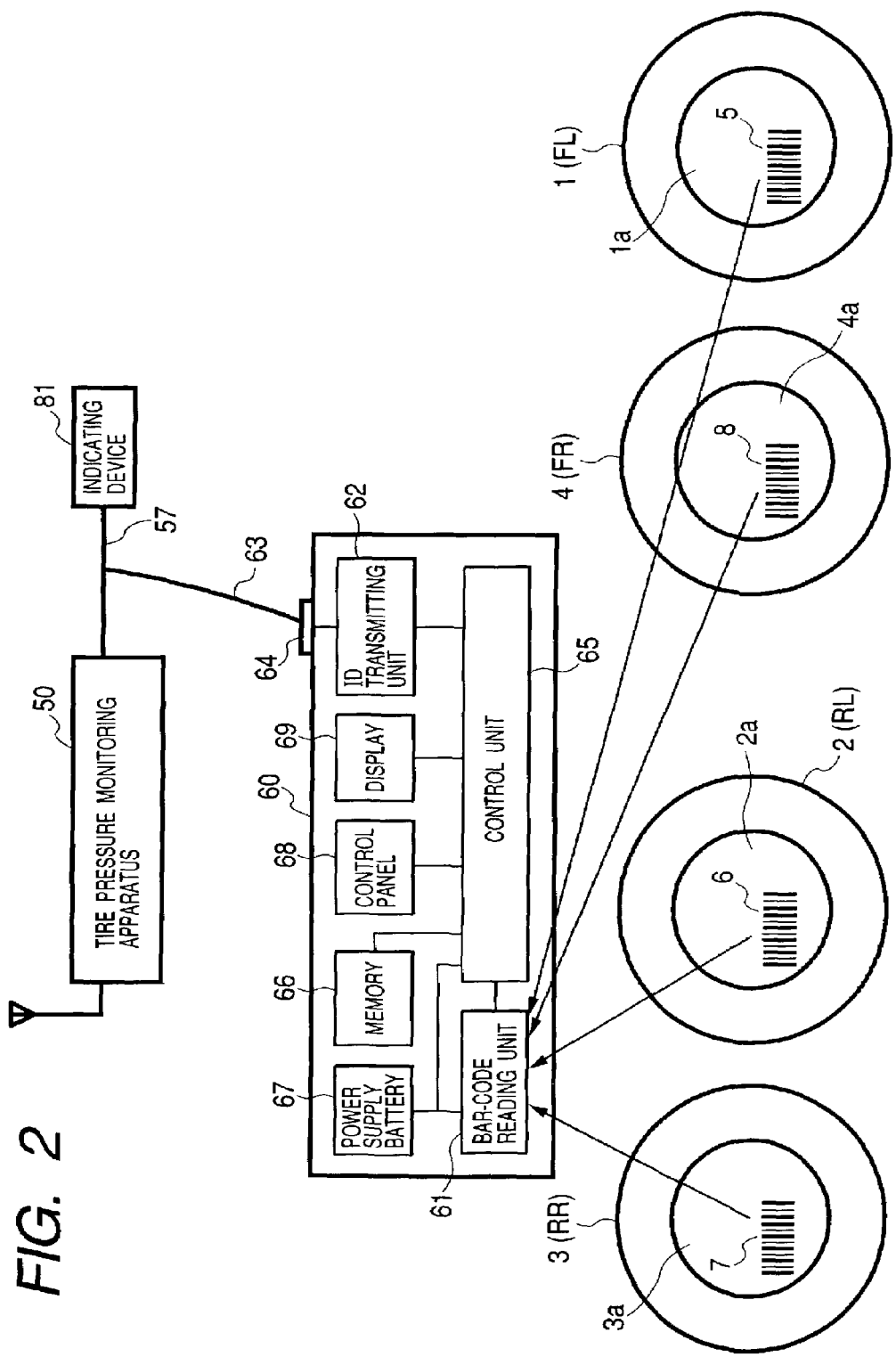
FIG. 2 is an illustrative view showing a configuration of an apparatus for ID registration according to the first embodiment.

The ID memories 12, 22, 32 and 42 of the air pressure sensors 10, 20, 30 and 40 store the corresponding IDs (123456, 234567, 345678, 45678), respectively. In the tire pressure monitoring system according to this embodiment, the ID of each air pressure sensor is required to be registered in the memory 55 of the tire pressure monitoring apparatus 50. Therefore, as shown in FIG. 2, bar codes 5, 6, 7 and 8 representative of the IDs of the air pressure sensors 10, 20, 30 and 40 are adhered onto wheels 1a, 2a, 3a and 4a of tires 1, 2, 3, and 4. In this embodiment, an ID registration tool 60 is used in order to read the IDs from these bar codes 5, 6, 7 and 8 for writing them in the tire pressure monitoring apparatus 50.

The ID registration tool 60 is composed of a bar-code reading unit 61 and an ID transmitting unit 62 for transmitting the IDs, read by the bar-code reading unit 61, to the tire pressure monitoring apparatus 50. Moreover, the ID registration tool 60 is equipped with a connector 64 for the connection of a signal line 63 for making a connection with respect to the tire pressure monitoring apparatus 50. Incidentally, the signal line 63 has a crocodile clip its tip portion which allows the connection of the signal line 63 to a signal line 57 extending from the communication circuit 56 of the tire pressure monitoring apparatus 50 to the indicating device 81.

In addition, the ID registration tool 60 includes a control unit 65, a memory 66, a power supply battery 67, a control panel 68 and a display 69. The control unit 65 is for implementing various processing through the use of the ID registration tool 60, and comprises a microcomputer including a CPU, ROM, a RAM and other components. The memory 66 comprises a rewritable EEPROM, flash memory, DRAM, or the like. As the power supply battery 67, there is used a dry cell, a button-like cell, or the like. The control panel 68 has control keys for indicating the contents of processing to be implemented through the use of the ID registration tool 60. The display 69 is for indicating a numeral of the bar code read by the bar-code reading unit 61, or for displaying a control mode of the ID registration tool 60, and for example, comprises an LCD.

Secondly, a description will be given hereinbelow of a method of registering the IDs of the air pressure sensors 10, 20, 30 and 40 in the tire pressure monitoring apparatus 50. For implementing this method, the signal line 63 of the ID registration tool 60 is connected to the connector 64 and the crocodile clip at the tip portion of the signal line 63 is connected to the signal line 57 extending from the communication circuit 56 of the tire pressure monitoring apparatus 50 to the indicating device 81. The registration operation is made according to a procedure described below.

Figure 3:
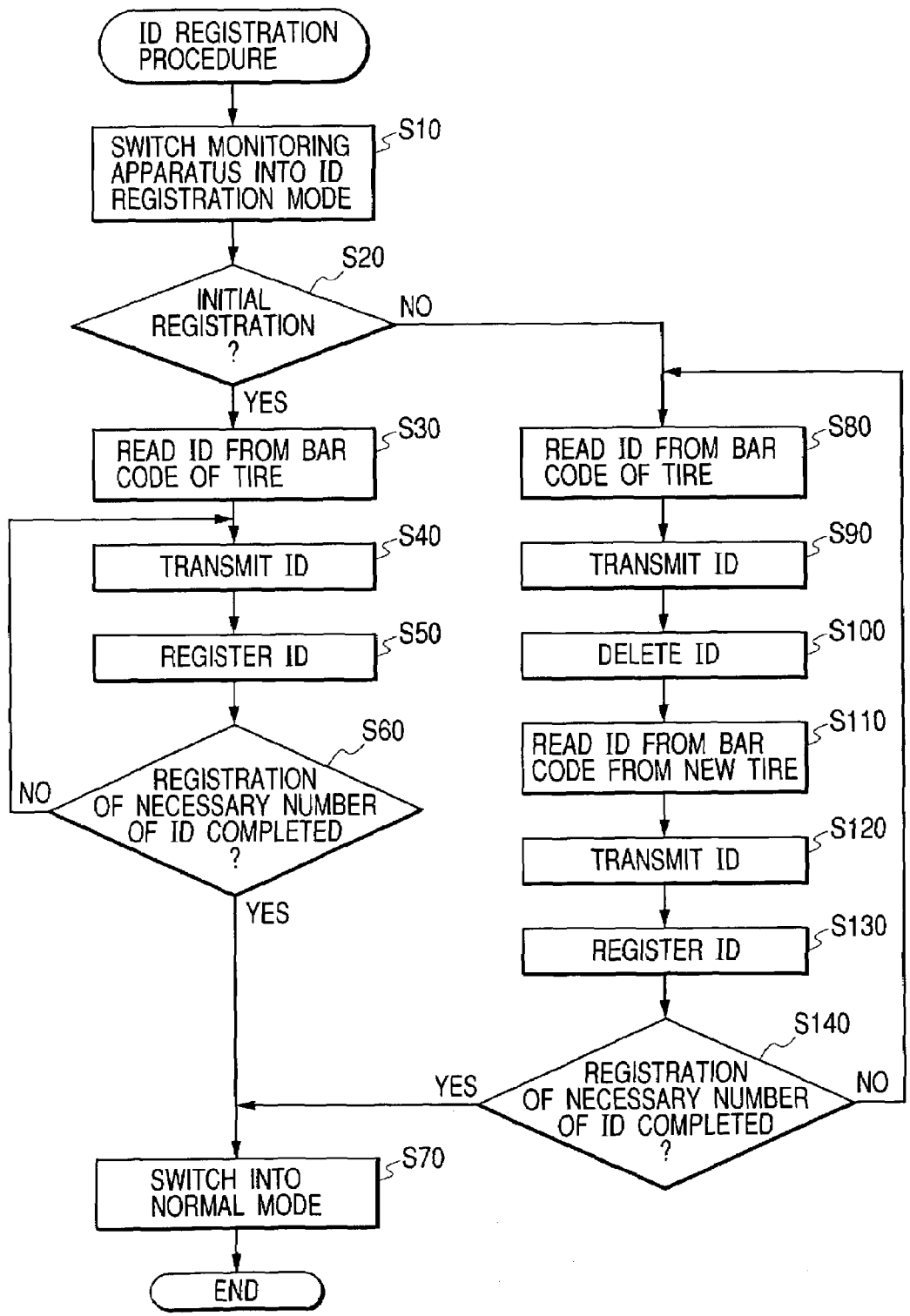
FIG. 3 is a flow chart showing an ID registration procedure according to the first embodiment.

In the registration operation, as shown in a flow chart of FIG. 3, first, the monitoring apparatus 50 is switched into an ID registration mode (S10), and a decision is made as to whether or not it is the initial registration (S20). In the case of the initial registration (S20: YES), the IDs are read from the bar codes 5, 6, 7 and 8 through the use of the ID registration tool 60 (S30), and are transmitted from the ID registration tool 60 to the tire pressure monitoring apparatus 50 (S40). The tire pressure monitoring apparatus 50 registers the received IDs in the memory 55 (S50). Moreover, it makes a decision as to whether or not the necessary number of IDs are put in its memory 55 (S60). If the registration of the necessary number of IDs does not reach completion (S60: NO), the step S40 and subsequent steps are implemented repeatedly. If the registration of the necessary number of IDs has reached completion (S60: YES), the monitoring apparatus 50 is switched into a normal mode, then terminating the ID registration operation (S70).

On the other hand, in the case of no initial registration, that is, for example, in a case in which a tire(s) is replaced in a repair shop or the like (S20: NO), the ID is read out from the bar code adhered onto the detached tire through the use of the ID registration tool 60 (S80), and is transmitted from the ID registration tool 60 to the tire pressure monitoring apparatus 50 (S90). Upon receipt of this ID, the tire pressure monitoring apparatus 50 deletes an ID corresponding to the received ID from the memory 55 (S100). Subsequently, an ID is read out from a bar code adhered onto a tire to be attached newly, through the use of the ID registration tool 60 (S110), and is transmitted from the ID registration tool 60 to the tire pressure monitoring apparatus 50 (S120). The tire pressure monitoring apparatus 50 registers the received ID in the memory 55 (S130). Following this, a decision is made as to whether or not the ID re-registration in the tire pressure monitoring apparatus 50 reaches completion (S140). If the ID re-registration does not come to an end (S140: NO), the step S80 and subsequent steps are executed repeatedly. On the other hand, if the ID registration of the necessary number of IDs reaches completion (S140: YES), the monitoring apparatus 50 is switched into a normal mode (S70), and the ID registration operation comes to an end.

Figure 4:
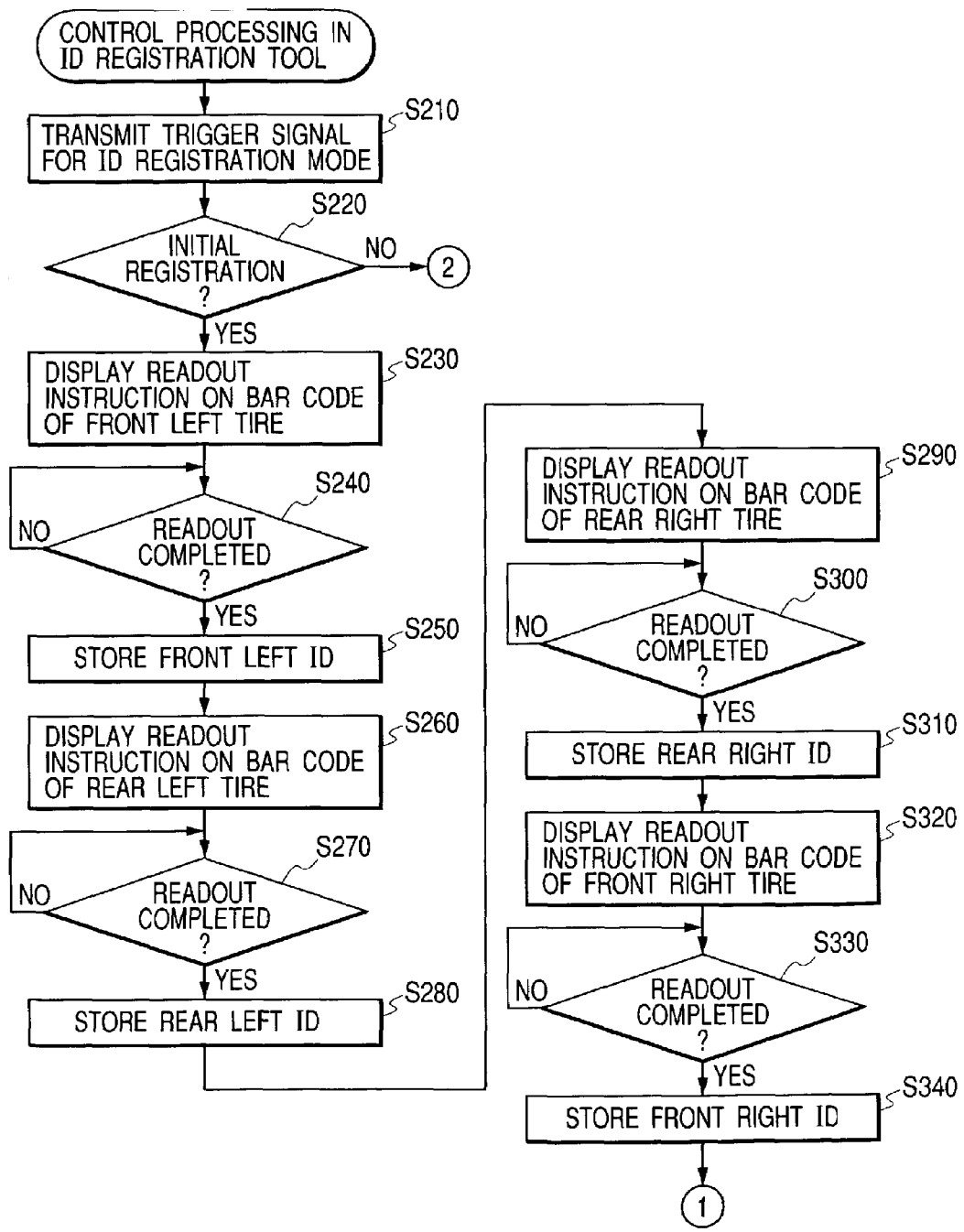
FIG. 4 is a flow chart showing the contents of control processing in an ID registration tool for realizing the ID registration procedure shown in FIG. 3.
Figure 5:
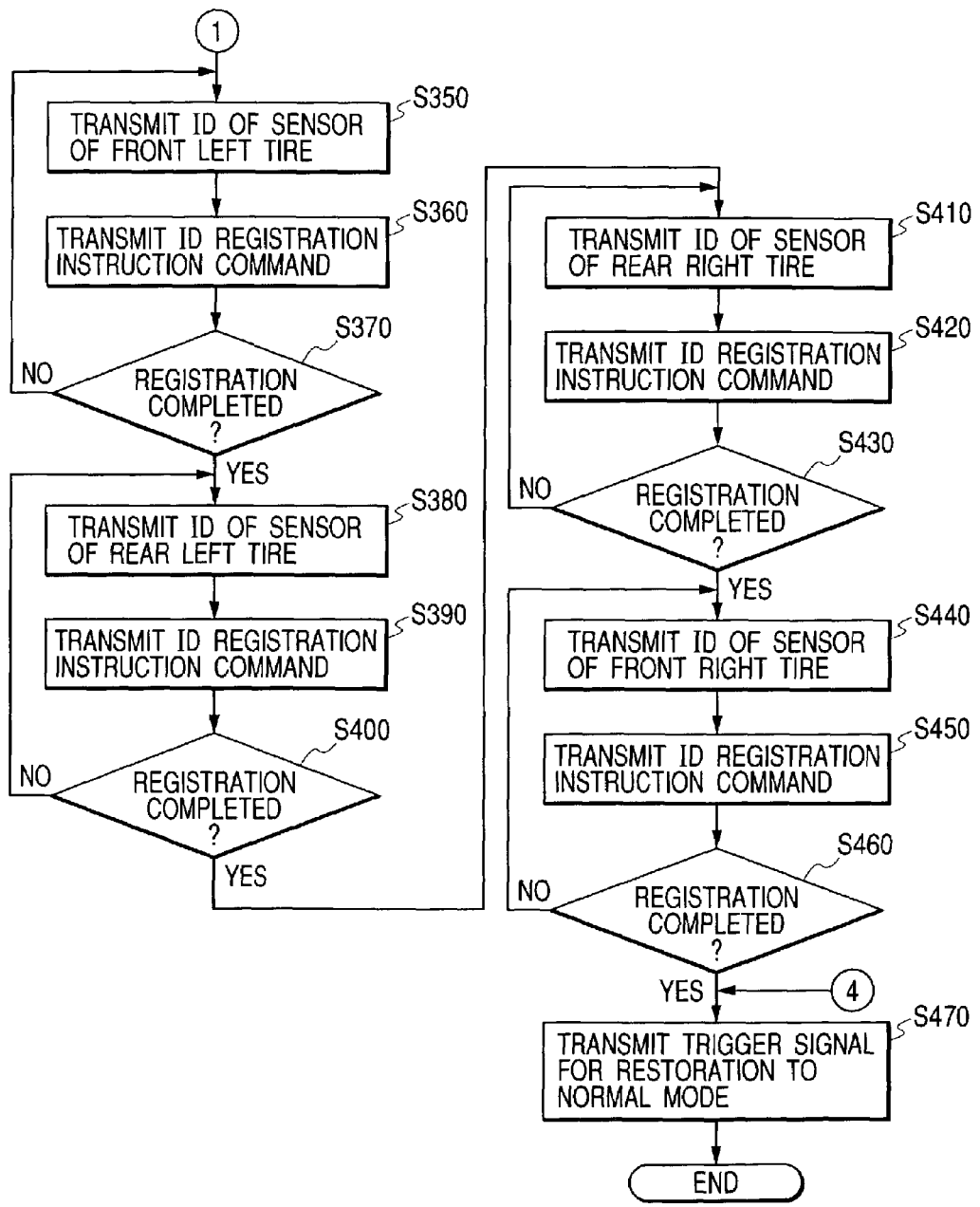
FIG. 5 is a flow chart showing the contents of the control processing in the ID registration tool for realizing the ID registration procedure shown in FIG. 3.
Figure 6:
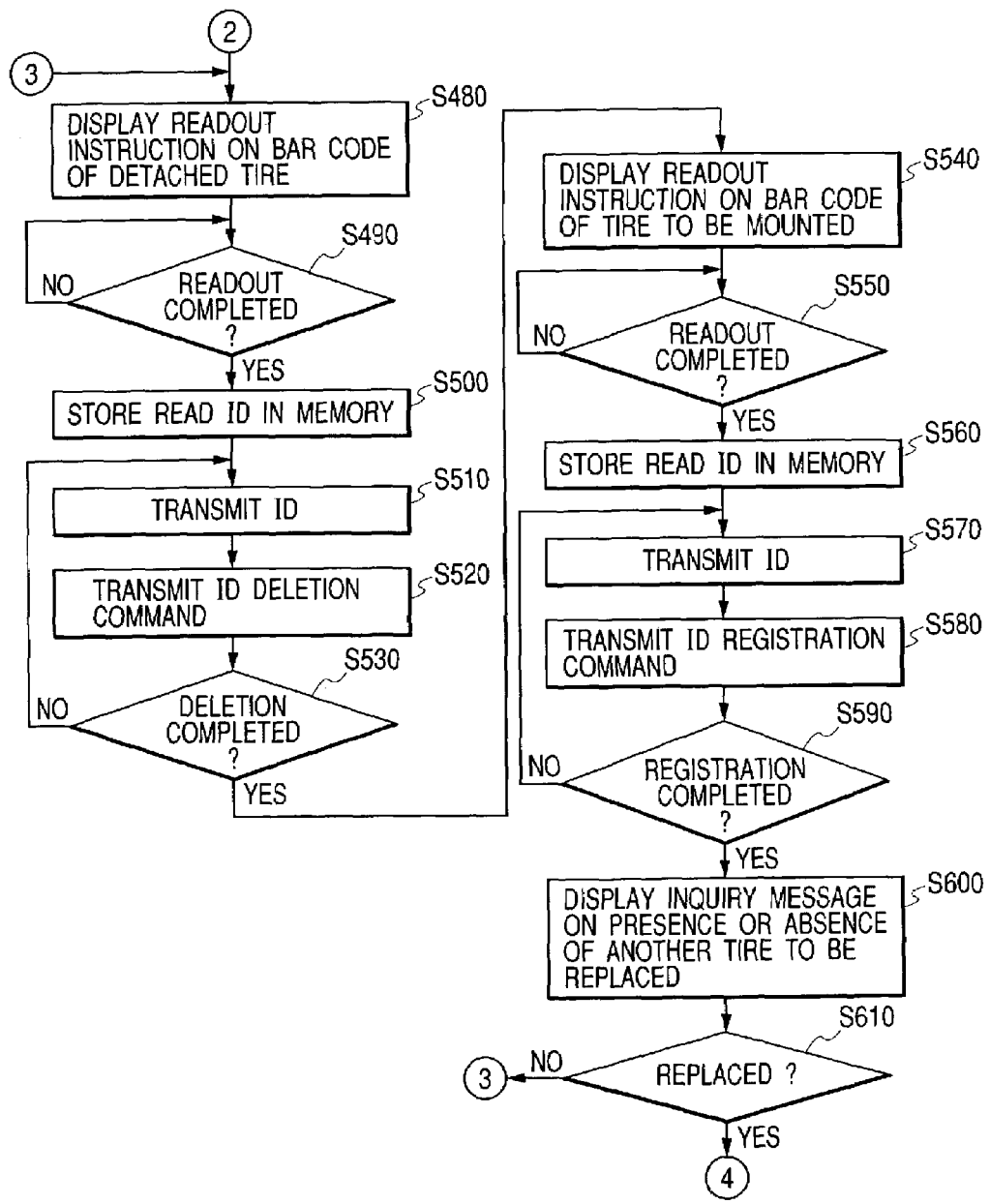
FIG. 6 is a flow chart showing the contents of the control processing in the ID registration tool for realizing the ID registration procedure shown in FIG. 3.

Furthermore, referring to flow charts of FIGS. 4 to 6, a description will be given hereinbelow of the contents of a program installed in the ID registration tool 60 for the implementation of the above-mentioned registration operation. The following program starts by pushing a predetermined button on the control panel 68 of the ID registration tool 60. In this program, first of all, a trigger signal is transmitted to place the tire pressure monitoring apparatus 50 into an ID registration mode (S210), and after a manipulation of the control panel 68, a decision is then made as to whether or not it is the initial registration in the tire pressure monitoring apparatus 50 (S220).

In the case of the initial registration (S220: NO), a readout instruction message on a bar code of a front left tire of a vehicle is displayed on the display 69 (S230), and a decision is made on whether or not the readout reaches completion (S240). If the decision shows the completion of the readout (S240: YES), the readout result in a state associated with the tire position (front left) is stored in the memory 66 (S250). Moreover, a readout instruction message on the bar code of the rear left tire is displayed (S260), and a decision is made as to whether or not the readout reaches completion (S270). If the decision shows that the readout reaches completion (S270: YES), the readout result is stored in the memory 66 in a state associated with the tire position (rear left) (S280). Still moreover, a readout instruction message on the bar code of the rear right tire is displayed (S290), and a decision is made as to whether or not the readout reaches completion (S300). If the decision indicates that the readout reaches completion (S300: YES), the readout result in a state associated with the tire position (rear right) is stored in the memory 66 (S310). Yet moreover, a readout instruction message on the bar code of the front right tire is displayed (S320), and a decision is made as to whether or not the readout reaches completion (S330). If the decision indicates the completion of the readout therefrom (S330: YES), the readout result is put in the memory 66 in a state associated with the tire position (front right) (S340).

Thereafter, the ID corresponding to the air pressure sensor of the front left tire is first read out from the memory 66 and is transmitted to the tire pressure monitoring apparatus 50 (S350), and an instruction command for ID registration is transmitted to the tire pressure monitoring apparatus 50 (S360). Subsequently, a decision is made as to whether or not a reply indicative of the completion of the registration comes from the tire pressure monitoring apparatus 50 (S370). In a case in which the reply does not come within a predetermined period of time (S370: NO), the operational flow returns to the step S350. On the other hand, in the case of the arrival of the reply indicative of the completion of the registration (S370: YES), the ID corresponding to the air pressure sensor of the rear left tire is read out from the memory 66 and is transmitted to the tire pressure monitoring apparatus 50(S380). Moreover, an instruction command for the ID registration is transmitted to the tire pressure monitoring apparatus 50 (S390), and a decision is made as to whether or not a replay indicative of the registration completion comes from the tire pressure monitoring apparatus 50 (S400). If the relay does not come within a predetermined period of time (S400: NO), the operational flow returns to the step S380. On the other hand, in the case of the arrival of the replay indicative of the registration completion (S400: YES), the ID corresponding to the air pressure sensor of the rear right tire is read out from the memory 66 and is transmitted to the tire pressure monitoring apparatus 50 (S410). Still moreover, an instruction command for the ID registration is transmitted to the tire pressure monitoring apparatus 50 (S420), and a decision is made as to whether or not a reply indicative of the registration completion comes from the tire pressure monitoring apparatus 50 (S430). If the reply does not come within a predetermined period of time (S430: NO), the operational flow returns to the step S410. On the other hand, in the case of the arrival of the reply indicative of the registration completion (S430: YES), the ID corresponding to the air pressure sensor of the front right tire is read out from the memory 66 and is transmitted to the tire pressure monitoring apparatus 50 (S440). Yet moreover, an instruction command for the ID registration is transmitted to the tire pressure monitoring apparatus 50 (S450), and a decision is made as to whether or not a reply indicative of the registration completion comes from the tire pressure monitoring apparatus 50 (S460). If the reply does not come within a predetermined period of time (S460: NO), the operational flow returns to the step S440. On the other hand, in the case of the arrival of the reply indicative of the registration completion (S460: YES), a trigger signal calling for the restoration (return) to the normal mode is outputted to the tire pressure monitoring apparatus 50, before terminating the processing (S470).

Meanwhile, in the case other than the initial registration, that is, in the case of the occurrence of re-registration related to the tire replacement (S220: YES), an instruction message on the readout from the bar code of the detached tire is displayed on the display 69 (S480), and a decision is made as to whether or not the readout comes to an end (S490). If the decision indicates the completion of the readout (S490: YES), the readout result is stored in the memory 66 (S500). Moreover, the ID stored in S500 is read out from the memory 66 and is transmitted to the monitoring apparatus 50(S510). Subsequently, an instruction command for ID deletion is transmitted to the tire pressure monitoring apparatus 50 (S520), and a decision is made as to whether or not a reply indicative of the completion of the deletion comes from the tire pressure monitoring apparatus 50 (S530). If the reply does not within a predetermined period of time (S530: NO), the operational flow returns to the step S510. On the other hand, in the case of the arrival of the reply indicative of the deletion completion (S530: YES), an instruction message to the effect of reading a bar code of a tire to be attached newly is put on the display 69 (S540), and a decision is made on whether or not the readout from the bar code reaches completion (S550). If the decision indicates the completion of the readout (S550: YES), the readout result is put in the memory 66 (S560). Subsequently, the ID stored in S540 is read out from the memory 66 and is transmitted to the tire pressure monitoring apparatus 50 (S570). Moreover, an instruction command for the ID registration is transmitted to the tire pressure monitoring apparatus 50 (S580), and a decision is made as to whether or not a reply indicative of the completion of the registration comes from the tire pressure monitoring apparatus 50 (S590). If the relay does not come within a predetermined period of time (S590: NO), the operational flow returns to the step S570. On the other hand, in the case of the arrival of the reply indicative of the registration completion (S590: YES), an inquiry message as to whether or not there is another tire to be subjected to the re-registration is displayed on the display 69, and the control waits for a result of a panel manipulation (S600, S610). If input of an instruction indicative of the presence of another tire to be re-registered takes place through the panel manipulation (S610: YES), the step 480 and subsequent processing are implemented repeatedly. On the other hand, in the case of the occurrence of instruction input indicative of the completion of the re-registration (S610: NO), a trigger signal indicating the restoration to the normal mode is outputted to the tire pressure monitoring apparatus 50, before terminating the processing (S470).

Figure 7:
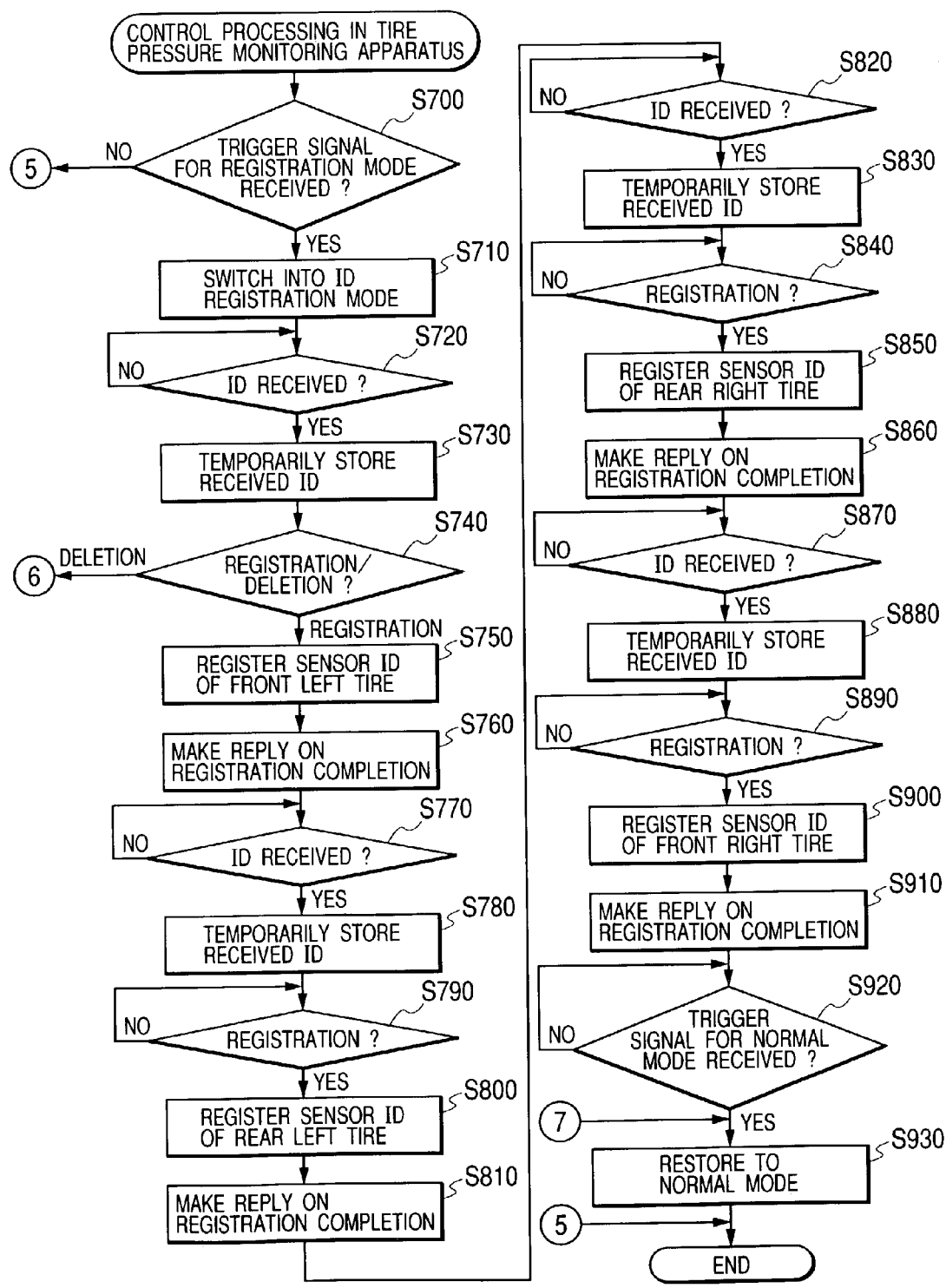
FIG. 7 is a flow chart showing the contents of control processing in an tire pressure monitoring apparatus for realizing the ID registration procedure shown in FIG. 3.
Figure 8:
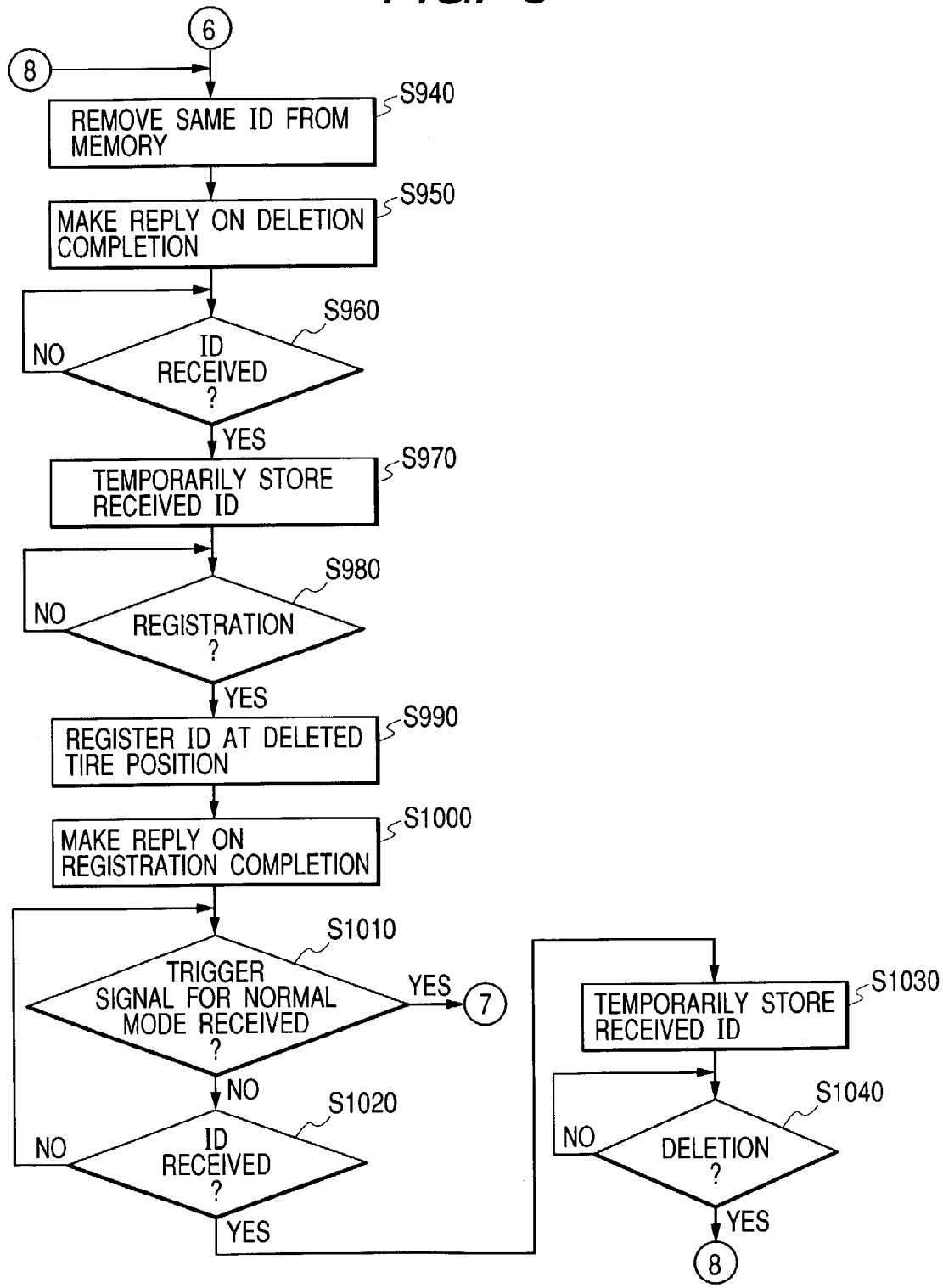
FIG. 8 is a flow chart showing the contents of control processing in an tire pressure monitoring apparatus for realizing the ID registration procedure shown in FIG. 3.

Furthermore, a description will be given hereinbelow of the contents of control processing to be executed in the tire pressure monitoring apparatus 50. In this control processing, as shown in FIGS. 7 and 8, first of all, a decision is made as to whether or not the reception of a trigger signal calling for the switching into an ID registration mode takes place (S700). In the case of the reception of the trigger signal indicating the switching into the ID registration mode (S700: YES), the switching into the ID registration mode is carried out (S710), and a decision is made as to whether or not the reception of the ID takes place (S720). In the case of the ID reception (S720: YES), this ID is temporarily stored in a work area of the RAM (S730). Moreover, a decision is made as to which of the ID registration instruction and the ID deletion instruction is received (S740). In the case of the reception of the ID registration instruction (S740: Registration), the ID temporarily stored in S730 is registered as the ID of the air pressure sensor of the front left tire in the memory 55 (S750), and a reply indicative of the ID registration completion is then made (S760). Subsequently, a decision is made as to whether the reception of an ID takes place or not (S770). In the case of the ID reception (S770: YES), this ID is temporarily stored in a work area of the RAM (S780). Moreover, a decision is made about the reception of an ID registration instruction (S790). In the case of the reception of the ID registration instruction (S790: YES), the ID stored in S780 is registered as the ID of the air pressure sensor of the rear left tire in the memory 55 (S800), and a reply indicative of the ID registration completion is made (S810). Still moreover, a decision is made about the reception of an ID (S820). In the case of the ID reception (S820: YES), this ID is temporarily stored in a work area of the RAM (S830). Yet moreover, a decision is made as to the reception of an ID registration instruction (S840). In the case of the reception of the ID registration instruction (S840: YES), the ID temporarily stored in S830 is registered as the ID of the air pressure sensor of the rear right tire in the memory 55 (S850), and a reply indicative of the ID registration completion is made (S860). In addition, a decision is made on the reception of an ID (S870). For the reception of the ID (S870: YES), this ID is temporarily stored in a work area of the RAM (S880). Subsequently, a decision is made about the reception of an ID registration instruction (S890). For the reception of the ID registration instruction (S890: YES), the ID temporarily stored in S880 is registered as the ID of the air pressure sensor of the front right tire in the memory 55 (S900), and a reply indicative of the ID registration completion is carried out (S910). Following this, a decision is made about the reception of a trigger signal to the effect that the mode is switched into the normal mode (S920). If received is the trigger signal calling for the switching into the normal mode (S920: YES), the switching into the normal mode is made (S930), and then the processing comes to an end.

On the other hand, after the ID is received in S720 and is temporarily stored in the RAM in S730, if the reception of an ID deletion instruction takes place (S740: deletion), the same ID as the ID temporarily stored in S730 is removed from the memory 55 (S940), and a reply is made which is indicative of the ID deletion completion (S950). Subsequently, a decision is made about the reception of an ID (S960). For the reception of the ID (S960: YES), this ID is temporarily stored in a work area of the RAM (S970). Following this, a decision is made about the reception of an ID registration instruction (S980). For the reception of the ID registration instruction (S980: YES), the ID temporarily stored in S970 is registered in the-memory 55 as the ID of the air pressure sensor of the tire at the position corresponding to the ID deleted in S940 (S990), and a reply indicative of the ID registration completion is made (S1000). Thereafter, a decision is made as to whether received is a trigger signal calling for the switching into the normal mode or a new ID (S1010, S1020). In the case of the reception of the new ID (S1010: No, S1020: YES), this ID is temporarily stored in a work area of the RAM (S1030). Moreover, a decision is made on the reception of an ID deletion instruction (S1040). In the case of the reception of the ID deletion instruction (S1040: YES), the operational flow proceeds to the step S940 and subsequent processing. On the other hand, if the decision in S1010 shows the reception of the trigger signal indicting the switching into the normal mode, the operational flow advances to the step S930, where the switching into the normal mode is made, and the processing then comes to an end.

The above-described control processing is conducted in the ID registration tool 60 and the tire pressure monitoring apparatus 50 and, as a result, at the initial registration, the air pressure sensor IDs can be registered in a state associated with the tire positions: front left, rear left, rear right and front right. At this time, mistaken registration due to radio interference or the registration-impossible state due to other electric waves does not occur, unlike the conventional technique. In addition, at the tire replacement or at the tire rotation, through the above-described control processing, the sensor IDs can be registered in a state associated with the tire positions after the replacement. In the case of the tire replacement, the re-registration operation can be conducted with respect to only the replacement tire, thus achieving the reduction of the number of steps. Still additionally, also in the case of rotation, the ID re-registration reflecting a change of position is feasible. Yet additionally, also in this re-registration operation, the problem of the mistaken registration due to the radio interference is solvable.

Second Embodiment

Figure 9:
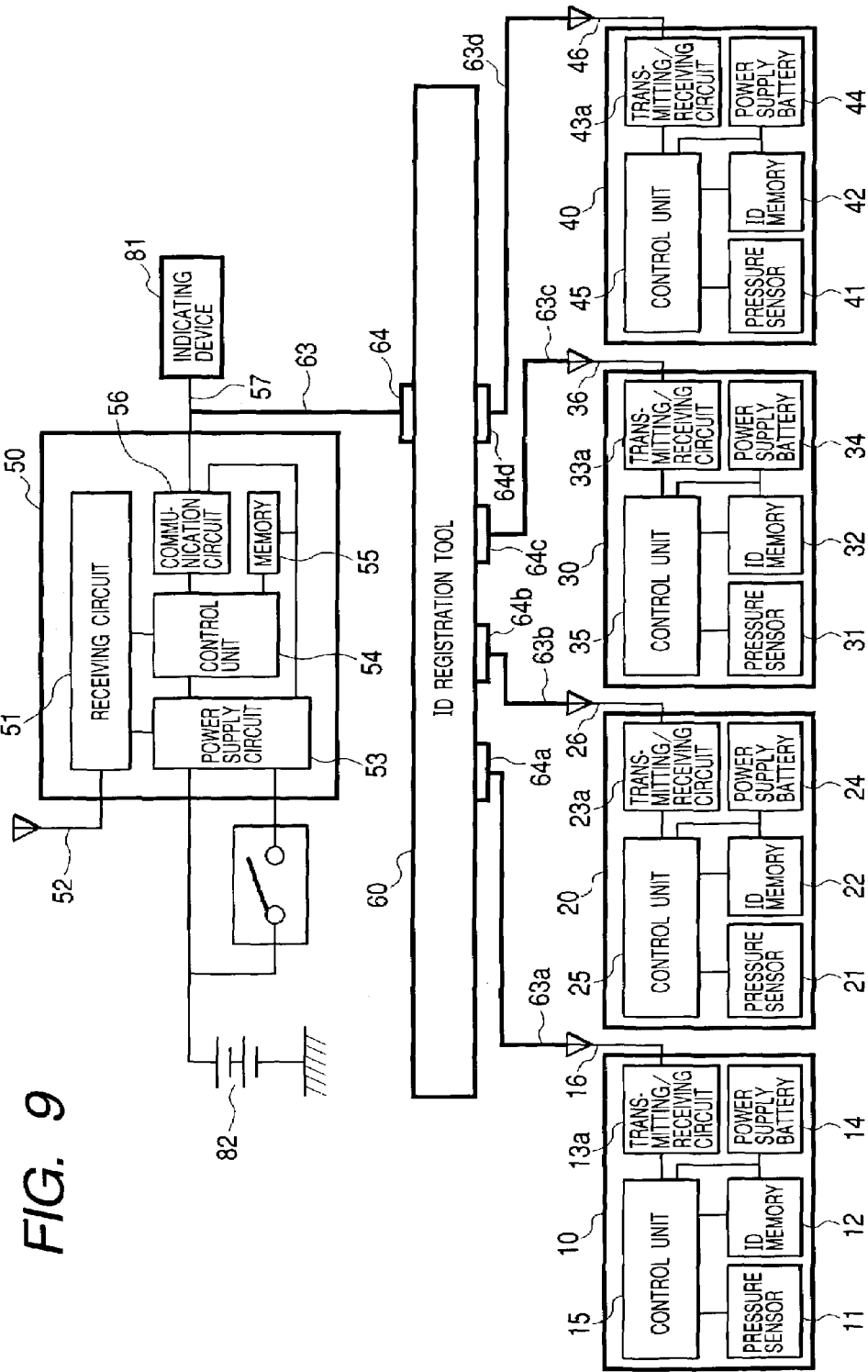
FIG. 9 is an illustrative view showing a configuration of an apparatus for ID registration according to a second embodiment of the present invention.

Secondly, a description will be given hereinbelow of a second embodiment of the present invention. In the second embodiment, as shown in FIG. 9, an ID registration tool 60 is connected to a tire pressure monitoring apparatus 50 and further to tire air pressure sensors 10, 20, 30 and 40 through signal lines 63a, 63b, 63c and 63d, respectively. The ID registration tool 60 is equipped with connectors 64a, 64b, 64c and 64d for connecting these signal lines 63a, 63b, 63c and 63d to the tool body. Moreover, each of these signal lines 63a, 63b, 63c and 63d has a crocodile clip at its tip portion to be connectable to antennas 16, 26, 36 and 46 of the respective sensors 10, 20, 30 and 40. Still moreover, the sensors 10, 20, 30 and 40 respectively include transmitting/receiving circuits 13a, 23a, 33a and 43a made to enable not only the transmission but also the reception. Therefore, the antennas 16, 26, 36 and 46 are also made to perform not only the transmission but also the reception. In addition, the antennas 16, 26, 36 and 46 also act as a connector of a valve for injecting air into tires. Still additionally, ID memories 12, 22, 32 and 42 of the air pressure sensors 10, 20, 30 and 40 may be a non-volatile storage element, such as EEPROM, which allows the rewriting of data by overwriting.

Figure 10:
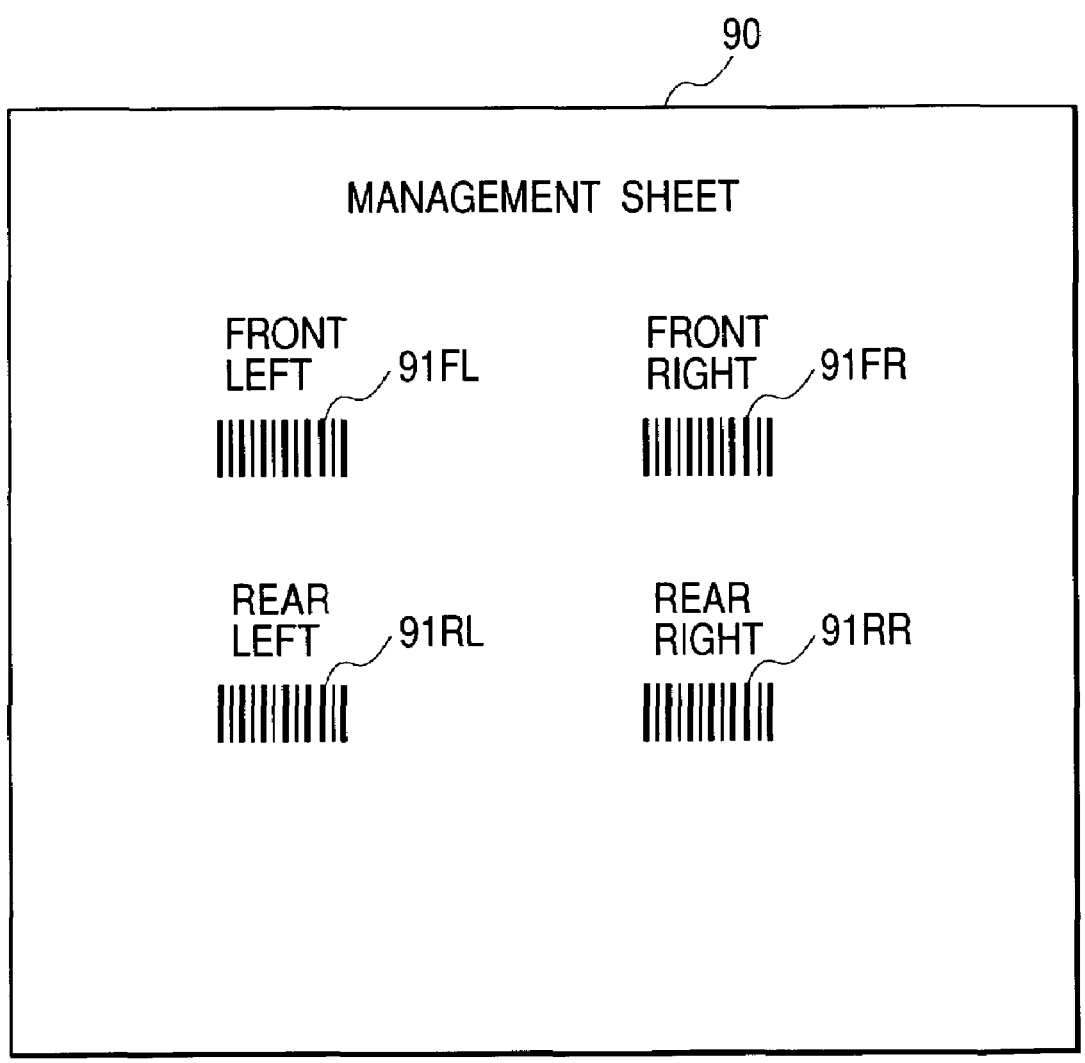
FIG. 10 is a plan view showing a management sheet to be used in the second embodiment.

In the second embodiment, as shown in FIG. 10, registration IDs are given in the form of a management sheet 90 for each vehicle. In this management sheet 90, the registration IDs for each vehicle are indicated by bar codes 91FL, 91RL, 91RR and 91FR. The registration operation is conducted in accordance with the following procedure.

Figure 11:
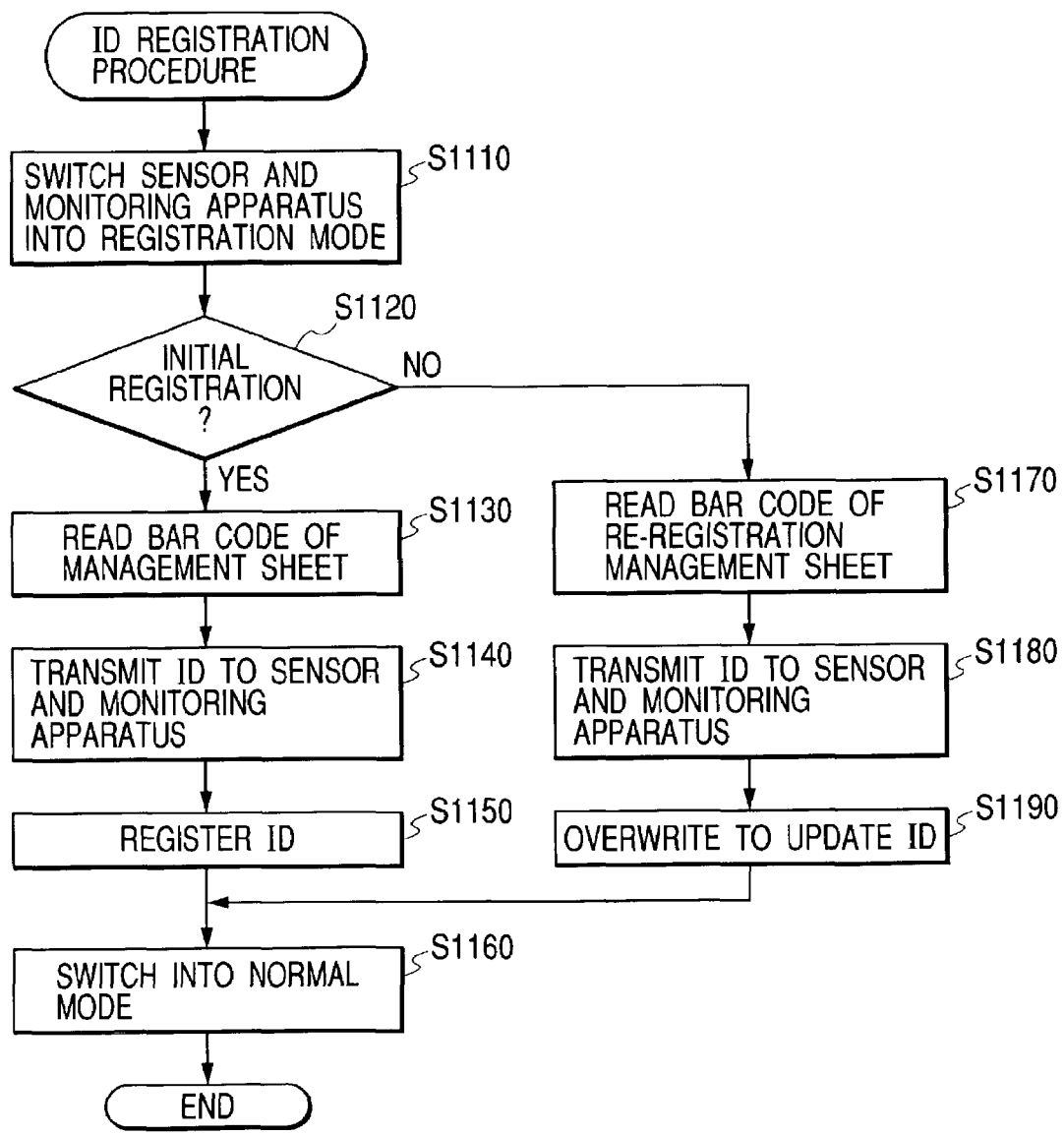
FIG. 11 is a flow chart showing an ID registration procedure according to the second embodiment.

For the registration operation, the signal lines 63, 63a, 63b, 63c and 63d of the ID registration tool 60 are connected to the respective sensors 10, 20, 30, 40 and the monitoring apparatus 50, and the operation is implemented in accordance with a procedure shown in FIG. 11. First of all, the respective sensors 10, 20, 30, 40 and the monitoring apparatus 50 are switched into an ID registration mode (S1110). Subsequently, a decision is made as to whether or not it is the initial registration (S1120). In the case of the initial registration (S1120: YES), the bar codes 91FL, 91RL, 91RR and 91FR on the management sheet 90 are read through the use of the ID registration tool 60 (S1130). The IDs read out from these bar codes 91FL, 91RL, 91RR and 91FR are transmitted from the ID registration tool 60 to the respective air pressure sensors 10, 20, 30, 40 and the tire pressure monitoring apparatus 50 (S1140). The respective air pressure sensors 10, 20, 30, 40 and the tire pressure monitoring apparatus 50 register the received IDs in ID memories 12, 22, 32, 42 and in a memory 55 (S1150).

At this time, the signal lines 63a, 63b, 63c and 63d are correctly connected to the air pressure sensors 10, 20, 30 and 40 and the readout by the ID registration tool 60 is made in the order of the bar code 91FL, the bar code 91RL, the bar code 91RR and the bar code 91FR so that the ID indicated by the bar code 91FL is registered in the air pressure sensor 10, the ID indicated by the bar code 91RL is registered in the air pressure sensor 20, the ID of the bar code 91RR is put in the air pressure sensor 30, and the ID of the bar code 91FR is put in the air pressure sensor 40. Moreover, in the memory 55 of the monitoring apparatus 50, the ID of the bar code 91FL is registered as that of the front left tire, the ID of the bar code 91RL is registered as that of the rear left tire, the ID of the bar code 91RR is placed as that of the rear right tire, and the ID of the bar code 91FR is placed as that of the front right tire.

When the initial ID registrations in the air pressure sensors 10, 20, 30, 40 and the monitoring apparatus 50 reach completion in this way, the air pressure sensors 10, 20, 30, 40 and the monitoring apparatus 50 are switched into a normal mode (S1160), and the ID registration operation comes to an end.

Figure 12:
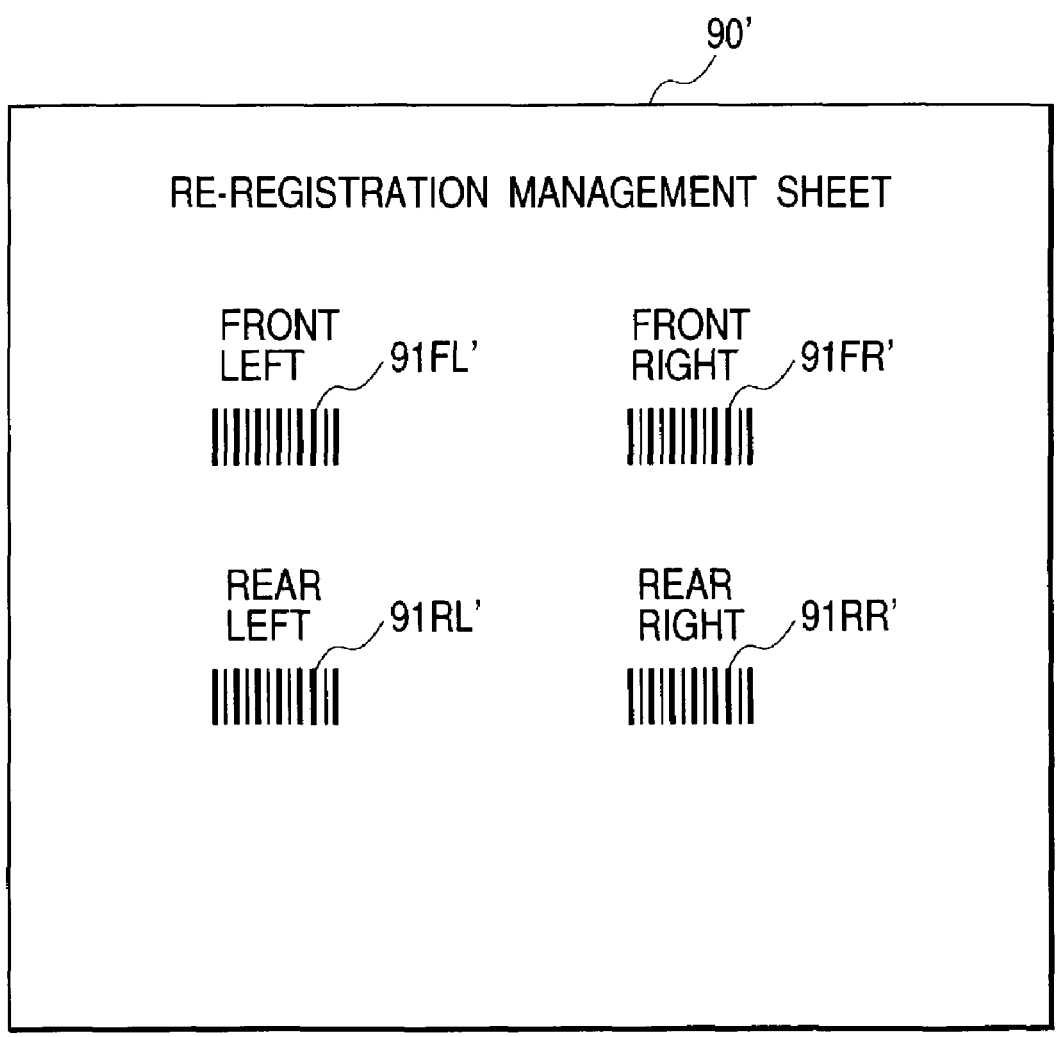
FIG. 12 is a plan view showing a re-registration management sheet to be used in the second embodiment.
Figure 13:
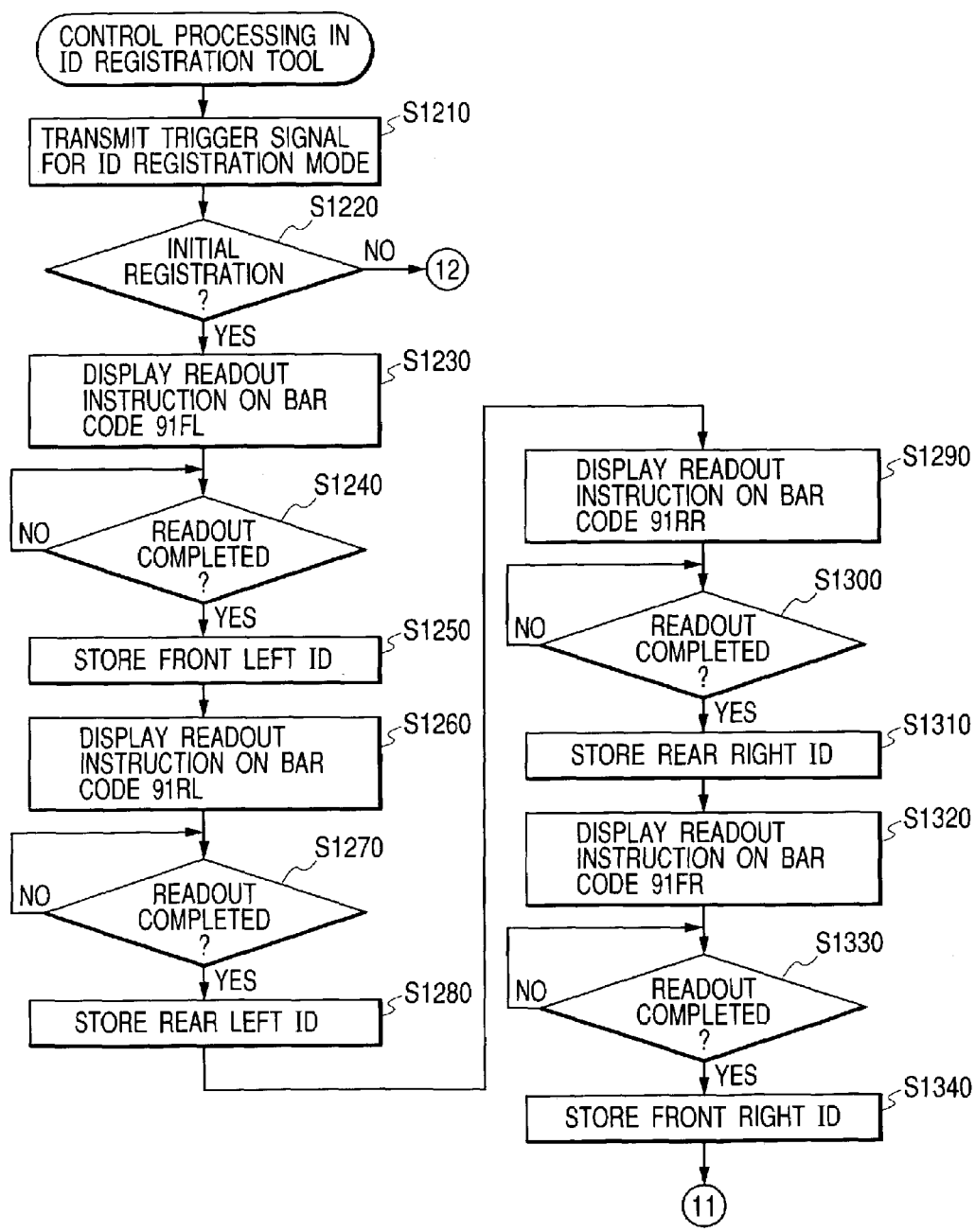
FIG. 13 is a flow chart showing the contents of control processing in an ID registration tool for realizing the ID registration procedure shown in FIG. 11.
Figure 14:
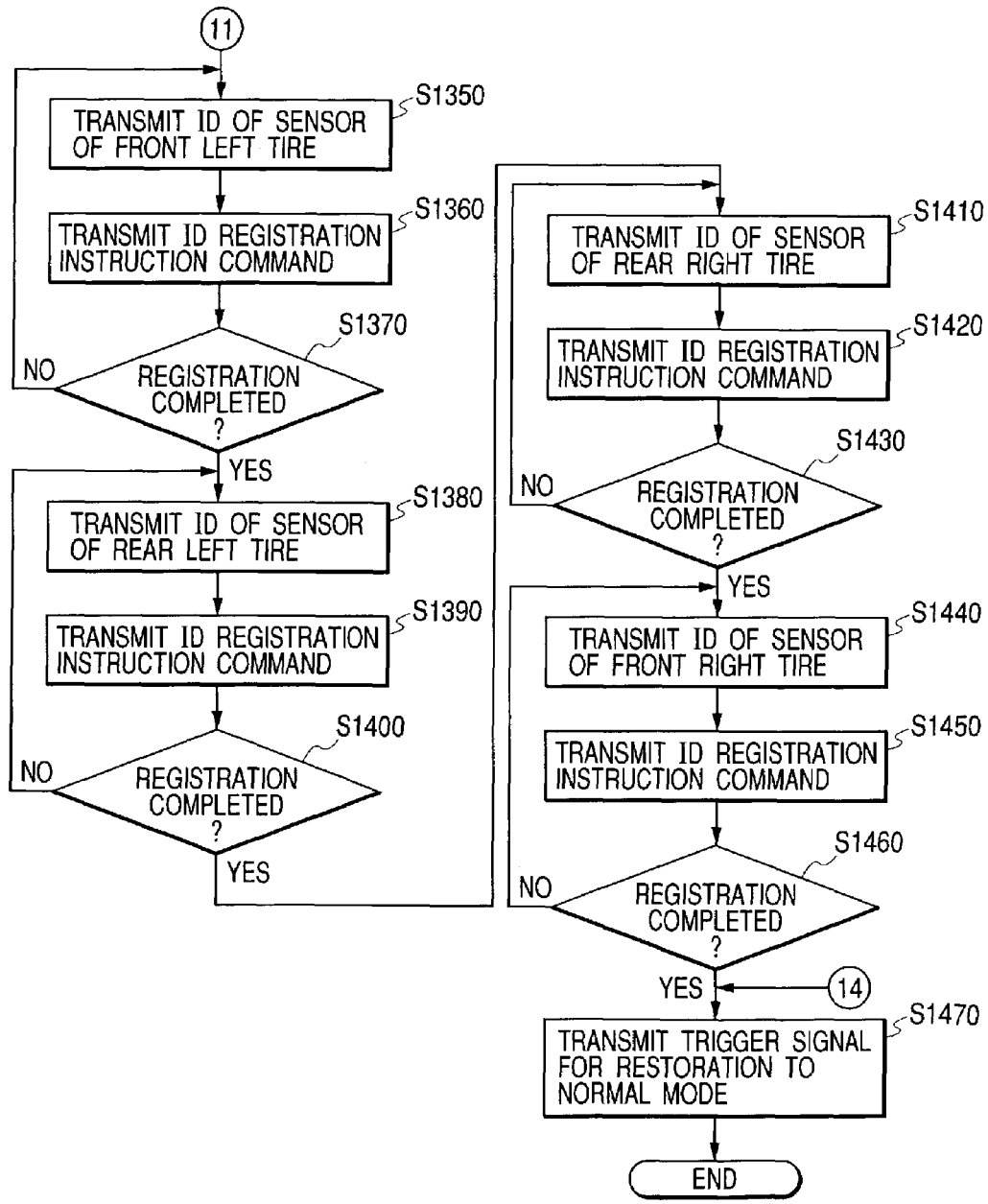
FIG. 14 is a flow chart showing the contents of the control processing in the ID registration tool for realizing the ID registration procedure shown in FIG. 11.
Figure 15:
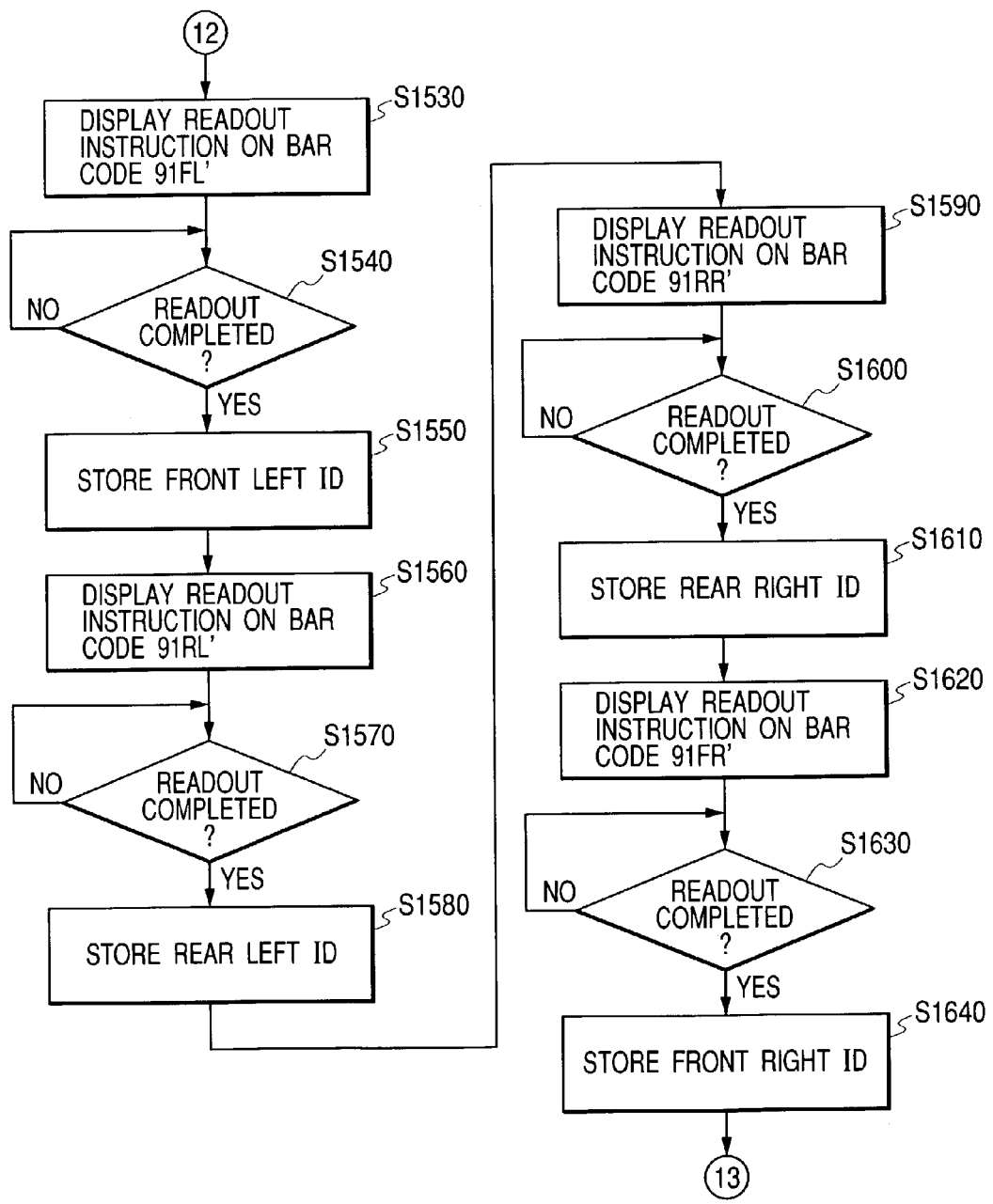
FIG. 15 is a flow chart showing the contents of the control processing in the ID registration tool for realizing the ID registration procedure shown in FIG. 11.
Figure 16:
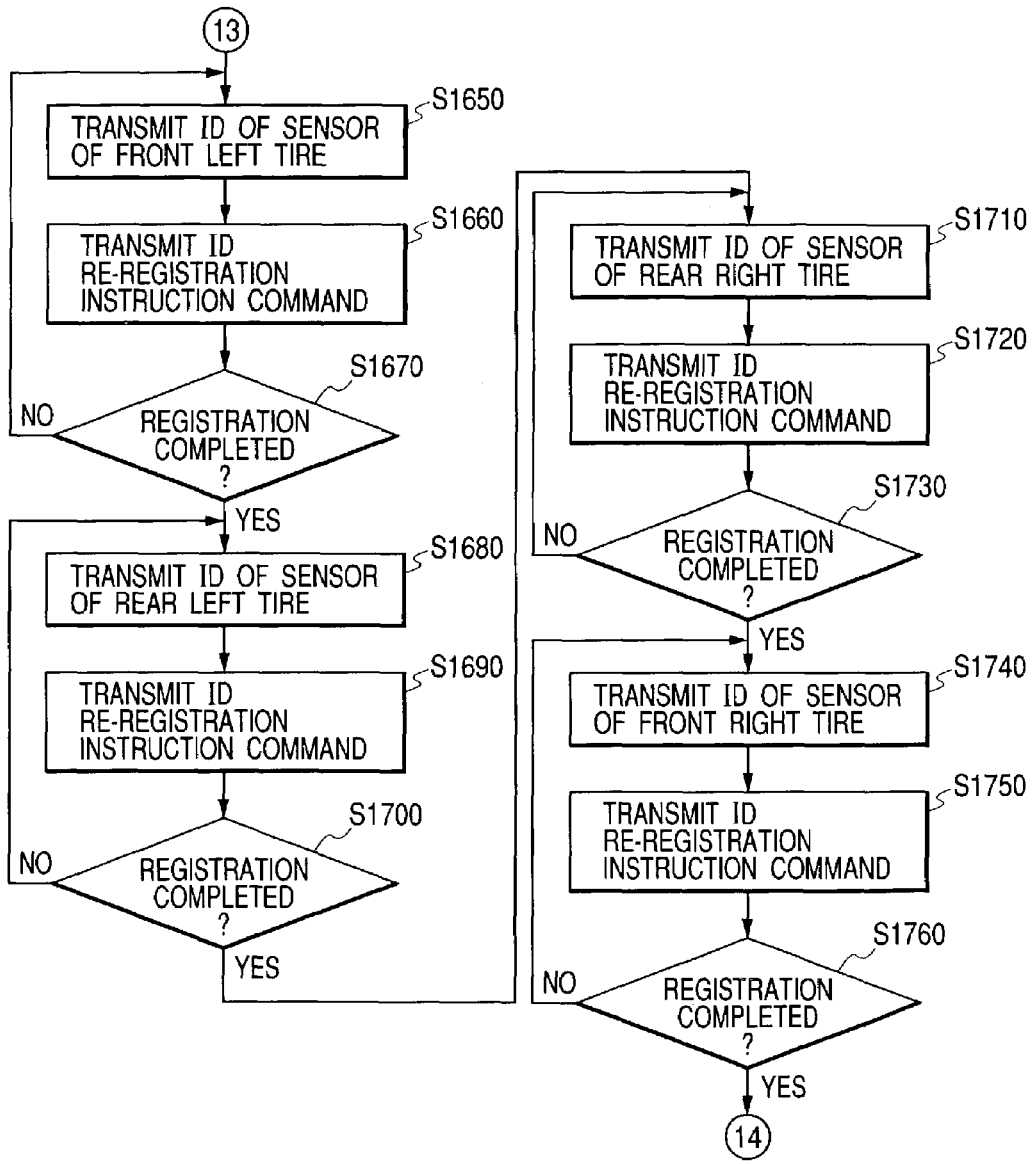
FIG. 16 is a flow chart showing the contents of the control processing in the ID registration tool for realizing the ID registration procedure shown in FIG. 11.

On the other hand, if it is not the initial registration, that is, in the case of the replacement of a tire in a repair shop or the like (S1120: YES), the ID registration tool 60 reads bar codes 91FL', 91RL', 91RR' and 91FR' on a re-registration management sheet 90' shown in FIG. 12 (S1170). The IDs read out from these bar codes 91FL', 91RL', 91RR' and 91FR' are transmitted from the ID registration tool 60 to the respective air pressure sensors 10, 20, 30, 40 and the tire pressure monitoring apparatus 50 (S1180).

In the case of rotation, the signal line 63a is connected to the air pressure sensor of the front left tire after the rotation, the signal line 63b is connected to the air pressure sensor of the rear left tire after the rotation, the signal line 63c is connected to the air pressure sensor of the rear right tire after the rotation, and the signal line 63d is connected to the air pressure sensor of the front right tire after the rotation. Moreover, in the case of the tire replacement, a signal line is connected to an air pressure sensor of a tire, being mounted newly, in accordance with the mounting position. That is, the signal line 63a is connected to the new tire air pressure sensor for the front left position, the signal line 63b is connected thereto for the rear left, the signal line 63c is connected thereto for the rear right, and the signal line 63d is connected thereto for the front right. Likewise, with respect to the air pressure sensors of the tires which do not undergo the replacement, the signal line 63a is connected for the front left, the signal line 63b for the rear left, the signal line 63c for the rear right, and the signal line 63d for the front right.

In the respective air pressure sensors 10, 20, 30, 40 and the tire pressure monitoring apparatus 50, the received ID is overwritten in the ID memories 12, 22, 32, 42 and the memory 55 for the re-registration, thereby implementing the ID updating (S190).

Also in this case, the ID registration tool 60 implements the readout in the order of the bar code 91FL', the bar code 91RL', the bar code 91RR' and the bar code 91FR', after the rotation or the time replacement, the ID of the bar code 91FL' is registered in the front left air pressure sensor 10, the ID of the bar code 91RL' in the rear left air pressure sensor 20, the ID of the bar code 91RR' in the rear right air pressure sensor 30, and the ID of the bar code 91FR' in the front right air pressure sensor 40. Moreover, in the memory 55 of the monitoring apparatus 50, the ID of the bar code 91FL' is registered as that of the front left tire, the ID of the bar code 91RL' as that of the rear left tire, the ID of the bar code 91RR' as that of the rear right tire, and the ID of the bar code 91FR' as that of the front right tire.

In this way, after the completion of the re-registration of the IDs in the air pressure sensors 10, 20, 30, 40 and the monitoring apparatus 50, the air pressure sensors 10, 20, 30, 40 and the monitoring apparatus 50 are switched into a normal mode (S160), and the ID registration operation comes to an end.

Furthermore, referring to flow charts of FIGS. 13 to 16, a description will be given hereinbelow of the contents of a program installed in the ID registration tool 60 for the above-described registration operation. The following program starts by pressing a predetermined button of the control panel 68 of the ID registration tool 60. In this program, first of all, a trigger signal is transmitted for the purpose of placing the air pressure sensors 10, 20, 30, 40 and the tire pressure monitoring apparatus 50 into an ID registration mode (S1210). Then, a decision is made as to whether or not it is the initial registration after a manipulation of the control panel 68 (S1220).

In the case of the initial registration (S1220: YES), an instruction message on the readout of the bar code 91FL of the registration sheet 90 is displayed on the display 69 (S1230), and a decision is made as to the completion of the readout (S1240). If the decision shows the completion of the readout (S1240: YES), the readout result is stored in the memory 66 in a state associated with the tire position (front left) (S1250). Subsequently, an instruction message on the readout of the bar code 91RL of the registration sheet 90 is displayed thereon (S1260), and a decision is made as to the completion of the readout (S1270). If the decision shows the completion of the readout (S1270: YES), the readout result is stored in the memory 66 in a state associated with the tire position (rear left) (S1280). Moreover, an instruction message on the readout of the bar code 91RR thereof is displayed thereon (S1290), and a decision is made as to the completion of the readout (S1300). If the decision shows the completion of the readout (S1300: YES), the readout result is stored in the memory 66 in a state associated with the tire position (rear right) (S1310). Still moreover, an instruction message on the readout of the bar code 91FR thereof is displayed thereon (S1320), and a decision is made as to the completion of the readout (S1330). If the decision shows the completion of the readout (S1330: YES), the readout result is stored in the memory 66 in a state associated with the tire position (front right) (S1340).

Following this, the ID corresponding to the air pressure sensor of the front left tire is first read out from the memory 66 and is transmitted to the air pressure sensor 10 and the tire pressure monitoring apparatus 50 (S1350), and an instruction command for the ID registration is transmitted to the air pressure sensor 10 and the tire pressure monitoring apparatus 50(S1360). A decision is made as to whether or not a reply indicative of the completion of the registration comes from the air pressure sensor 10 and the tire pressure monitoring apparatus 50(S1370). If the reply does not come within a predetermined period of time (S1370:NO), the operational flow returns to the step S1350. On the other hand, if the registration completion reply comes (S1370: YES), the ID corresponding to the air pressure sensor of the rear left tire is read out from the memory 66 and is transmitted to the air pressure sensor 20 and the monitoring apparatus 50 (S1380), and an instruction command for the ID registration is then transmitted to the air pressure sensor 20 and the monitoring apparatus 50(S1390). A decision is made as to whether or not a reply indicative of the completion of the registration comes from the air pressure sensor 20 and the tire pressure monitoring apparatus 50 (S1400). If the reply does not come within a predetermined period of time (S1400:NO), the operational flow returns to the step S1380. On the other hand, if the registration completion reply comes (S1400: YES), the ID corresponding to the air pressure sensor of the rear right tire is read out from the memory 66 and is transmitted to the air pressure sensor 30 and the monitoring apparatus 50 (S1410), and an instruction command for the ID registration is then transmitted to the air pressure sensor 30 and the monitoring apparatus 50 (S1420). A decision is made as to whether or not a reply indicative of the completion of the registration comes from the air pressure sensor 30 and the tire pressure monitoring apparatus 50 (S1430). If the reply does not come within a predetermined period of time (S1430:NO), the operational flow returns to the step S1410. On the other hand, if the registration completion reply comes (S1430: YES), the ID corresponding to the air pressure sensor of the front right tire is read out from the memory 66 and is transmitted to the air pressure sensor 40 and the monitoring apparatus 50 (S1440), and an instruction command for the ID registration is then transmitted to the air pressure sensor 40 and the monitoring apparatus 50(S1450). A decision is made as to whether or not a reply indicative of the completion of the registration comes from the air pressure sensor 40 and the tire pressure monitoring apparatus 50 (S1460). If the reply does not come within a predetermined period of time (S1460: NO), the operational flow returns to the step S1440. On the other hand, if the registration completion reply comes (S1460: YES), a trigger signal calling for the restoration to the normal mode is outputted to the air pressure sensors 10, 20, 30, 40 and the tire pressure monitoring apparatus 50 (S1470), and the processing comes to an end.

Furthermore, if it is not the initial registration, that is, in the case of the re-registration due to the tire replacement (S1220: YES), an instruction message on the readout of the bar code 91FL' indicated on the re-registration sheet 90' is displayed on the display 69 (S1530), and a decision is made as to the completion of the readout (S1540). If the decision shows the completion of the readout (S1540: YES), the readout result is stored in the memory 66 in a state associated with the tire position (front left) (S1550). Subsequently, an instruction message on the readout of the bar code 91RL' thereon is displayed (S1560), and a decision is made as to the completion of the readout (S1570). If the decision shows the completion of the readout (S1570: YES), the readout result is stored in the memory 66 in a state associated with the tire position (rear left) (S1580). Moreover, an instruction message on the readout of the bar code 91RR' thereon is displayed (S1590), and a decision is made as to the completion of the readout (S1600). If the decision shows the completion of the readout (S1600: YES), the readout result is stored in the memory 66 in a state associated with the tire position (rear right) (S1610). Still moreover, an instruction message on the readout of the bar code 91FR' thereon is displayed (S1620), and a decision is made as to the completion of the readout (S1630). If the decision shows the completion of the readout (S1630: YES), the readout result is stored in the memory 66 in a state associated with the tire position (front right) (S1640).

Following this, the ID corresponding to the air pressure sensor of the front left tire is read out from the memory 66 and is transmitted to the air pressure sensor 10 and the tire pressure monitoring apparatus 50 (S1650), and an instruction command for the ID re-registration is then transmitted to the air pressure sensor 10 and the monitoring apparatus 50 (S1660). A decision is made as to whether or not a reply indicative of the registration completion comes from the air pressure sensor 10 and the monitoring apparatus 50 (S1670). If the reply does not come within a predetermined period of time (S1670: NO), the operational flow returns to the step S1650. On the other hand, if the registration completion reply comes (S1670: YES), the ID corresponding to the air pressure sensor of the rear left tire is read out from the memory 66 and is transmitted to the air pressure sensor 20 and the monitoring apparatus 50 (S1680). An instruction command for the ID re-registration is then transmitted to the air pressure sensor 20 and the monitoring apparatus 50 (S1690). A decision is made as to whether or not a reply indicative of the registration completion comes from the air pressure sensor 20 and the monitoring apparatus 50 (S1700). If the reply does not come within a predetermined period of time (S1700: NO), the operational flow returns to the step S1680. On the other hand, if the registration completion reply comes (S1700: YES), the ID corresponding to the air pressure sensor of the rear right tire is read out from the memory 66 and is transmitted to the air pressure sensor 30 and the monitoring apparatus 50 (S1710). An instruction command for the ID re-registration is then transmitted to the air pressure sensor 30 and the monitoring apparatus 50 (S1720). A decision is made as to whether or not a reply indicative of the registration completion comes from the air pressure sensor 30 and the monitoring apparatus 50 (S1730). If the reply does not come within a predetermined period of time (S1730: NO), the operational flow returns to the step S1710. On the other hand, if the registration completion reply comes (S1730: YES), the ID corresponding to the air pressure sensor of the front right tire is read out from the memory 66 and is transmitted to the air pressure sensor 40 and the monitoring apparatus 50 (S1740). An instruction command for the ID re-registration is then transmitted to the air pressure sensor 40 and the monitoring apparatus 50 (S1750). A decision is made as to whether or not a reply indicative of the registration completion comes from the air pressure sensor 40 and the monitoring apparatus 50 (S1760). If the reply does not come within a predetermined period of time (S1760: NO), the operational flow returns to the step S1740. On the other hand, if the registration completion reply comes (S1760: YES), a trigger signal calling for the restoration to the normal mode is outputted to the air pressure sensors 10, 20, 30, 40 and the monitoring apparatus 50 (S1470), and the processing comes to an end.

Figure 17:
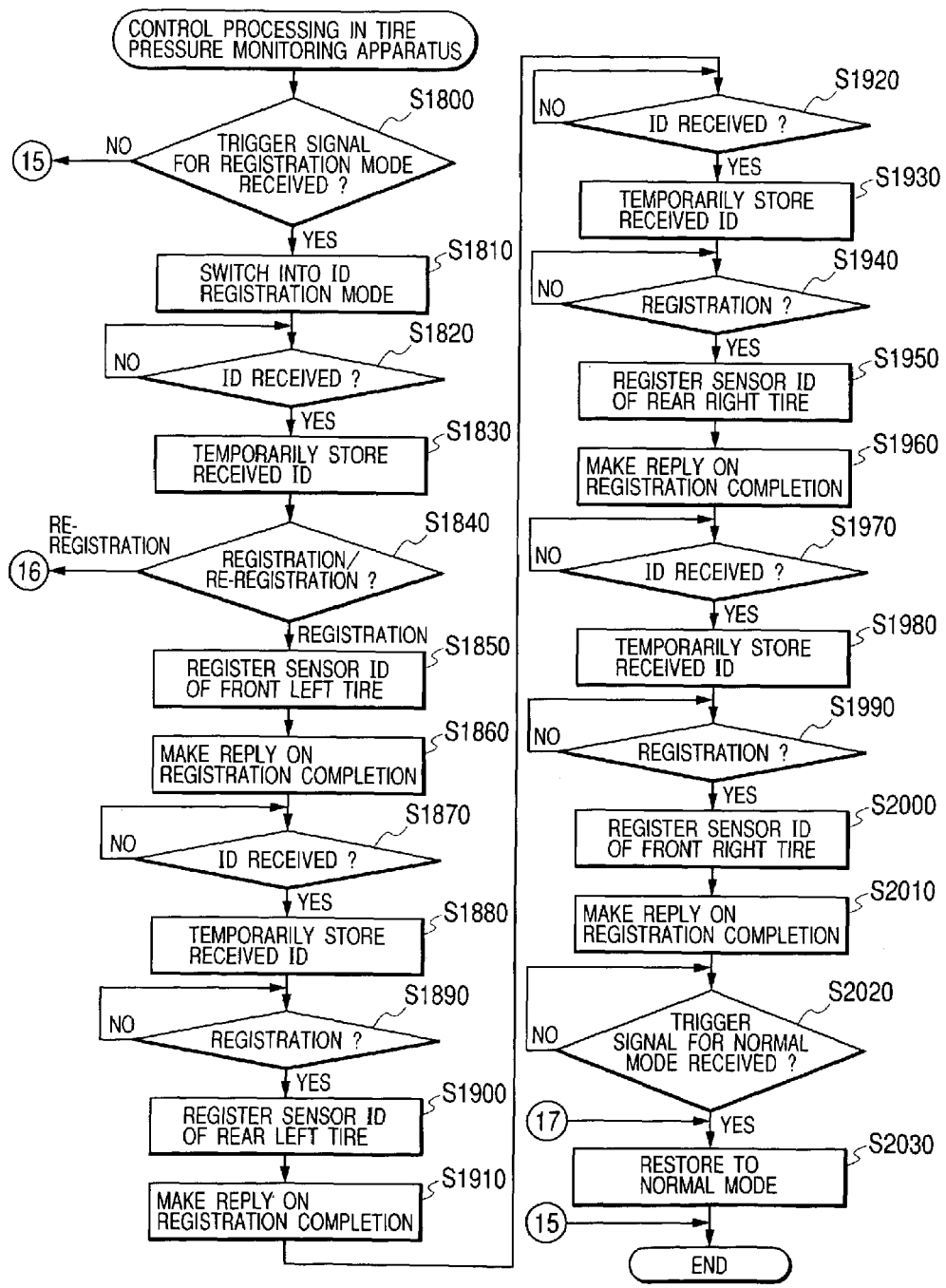
FIG. 17 is a flow chart showing the contents of control processing in a tire pressure monitoring apparatus for realizing the ID registration procedure shown in FIG. 11.
Figure 18:
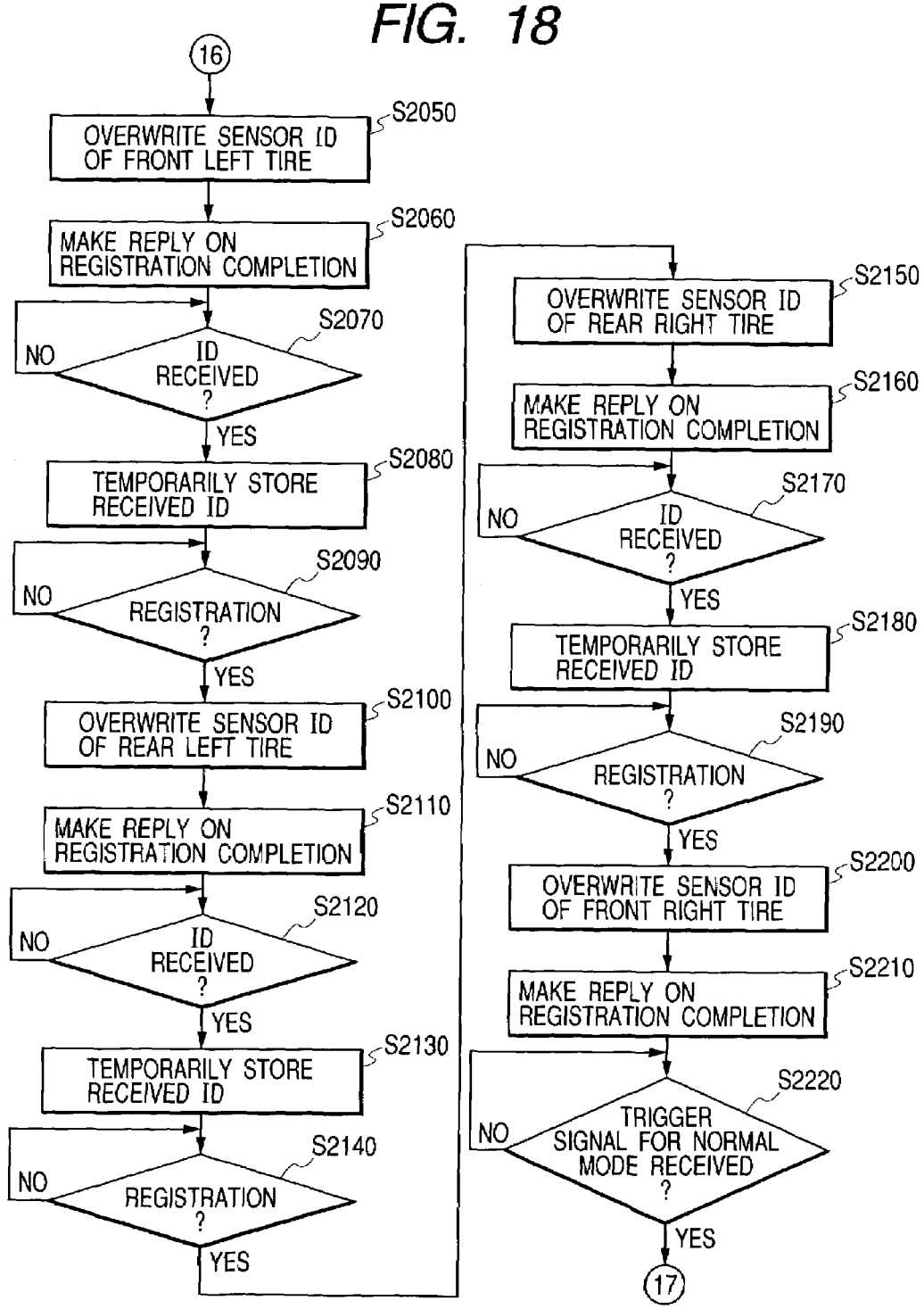
FIG. 18 is a flow chart showing the contents of control processing in the tire pressure monitoring apparatus for realizing the ID registration procedure shown in FIG. 11.

Furthermore, a description will be given hereinbelow of the contents of control processing to be conducted in the tire pressure monitoring apparatus 50. In this control processing, as shown in FIGS. 17 and 18, first of all, a decision is made as to whether or not the reception of a trigger signal calling for the switching into an ID registration mode takes place (S1800). In the case of the reception of the trigger signal indicating the switching into the ID registration mode (S1800: YES), the switching into the ID registration mode is carried out (S1810), and a decision is made as to whether or not the reception of an ID takes place (S1820). In the case of the ID reception (S1820: YES), this ID is temporarily stored in a work area of the RAM (S1830). Moreover, a decision is made as to which of the ID registration instruction and the ID deletion instruction is received (S1840). In the case of the reception of the ID registration instruction (S1840: Registration), the ID temporarily stored in S1830 is registered as the ID of the air pressure sensor of the front left tire in the memory 55 (S1850), and a reply indicative of the ID registration completion is then made (S1860). Subsequently, a decision is made as to whether the reception of an ID takes place or not (S1870). In the case of the ID reception (S1870: YES), this ID is temporarily stored in a work area of the RAM (S1880). Moreover, a decision is made about the reception of an ID registration instruction (S1890). In the case of the reception of the ID registration instruction (S1890: YES), the ID stored in S1880 is registered as the ID of the air pressure sensor of the rear left tire in the memory 55 (S1900), and a reply indicative of the ID registration completion is made (S1910). Still moreover, a decision is made about the reception of an ID (S1920). In the case of the ID reception (S1920: YES), this ID is temporarily stored in a work area of the RAM (S1930). Yet moreover, a decision is made as to the reception of an ID registration instruction (S1940). In the case of the reception of the ID registration instruction (S1940: YES), the ID temporarily stored in S1930 is registered as the ID of the air pressure sensor of the rear right tire in the memory 55 (S1950), and a reply indicative of the ID registration completion is made (S1960). In addition, a decision is made on the reception of an ID (S1970). For the reception of the ID (S1970: YES), this ID is temporarily stored in a work area of the RAM (S1980). Subsequently, a decision is made about the reception of an ID registration instruction (S1990). For the reception of the ID registration instruction (S1990: YES), the ID temporarily stored in S1980 is registered as the ID of the air pressure sensor of the front right tire in the memory 55 (S2000), and a reply indicative of the ID registration completion is carried out (S2010). Following this, a decision is made about the reception of a trigger signal to the effect that the mode is switched into the normal mode (S2020). If received is the trigger signal calling for the switching into the normal mode (S2020: YES), the switching into the normal mode is made (S2030), and then the processing comes to an end.

On the other hand, after the ID is received in S1820 and is temporarily stored in the RAM in S1830, if the reception of an ID re-registration instruction takes place (S2040: re-registration), the ID temporarily stored in S1830 is overwritten as the ID of the air pressure sensor of the front left tire in the memory 55 (S2050). Subsequently, a reply is made which is indicative of the ID registration completion (S2060). Then, a decision is made about the reception of an ID (S2070). For the reception of the ID (S2070: YES); this ID is temporarily stored in a work area of the RAM (S2080). Following this, a decision is made about the reception of an ID re-registration instruction (S2090). For the reception of the ID re-registration instruction (S2090: YES), the ID temporarily stored in S2080 is overwritten and re-registered in the memory 55 as the ID of the air pressure sensor of the rear left tire (S2100), and a reply indicative of the ID registration completion is made (S2110). Thereafter, a decision is made as to the reception of an ID (S2120). In the case of the ID reception (S2120: YES), this ID is temporarily stored in a work area of the RAM (S2130). Moreover, a decision is made on the reception of an ID registration instruction (S2140). In the case of the reception of the ID registration instruction (S2140: YES), the ID temporarily stored in S2130 is overwritten and re-registered in the memory 55 as the ID of the air pressure sensor of the rear right tire (S2150), and a reply indicative of the ID registration completion is made (S2160). In addition, a decision is made as to the reception of an ID (S2170). In the case of the ID reception (S2170: YES), this ID is temporarily stored in a work area of the RAM (S2180). Still additionally, a decision is made as to the reception of an ID re-registration instruction (S2190). In the case of the reception of the ID re-registration instruction (S2190: YES), the ID temporarily stored in S2180 is overwritten and re-registered in the memory 55 as the ID of the air pressure sensor of the front right tire (S2200), and a reply indicative of the ID registration completion is made (S2210). Following this, a decision is made about the reception of a trigger signal to the effect that the mode is switched into the normal mode (S2220). If received is the trigger signal calling for the switching into the normal mode (S2220: YES), the switching into the normal mode is made (S2030), and the processing then comes to an end.

Figure 19:
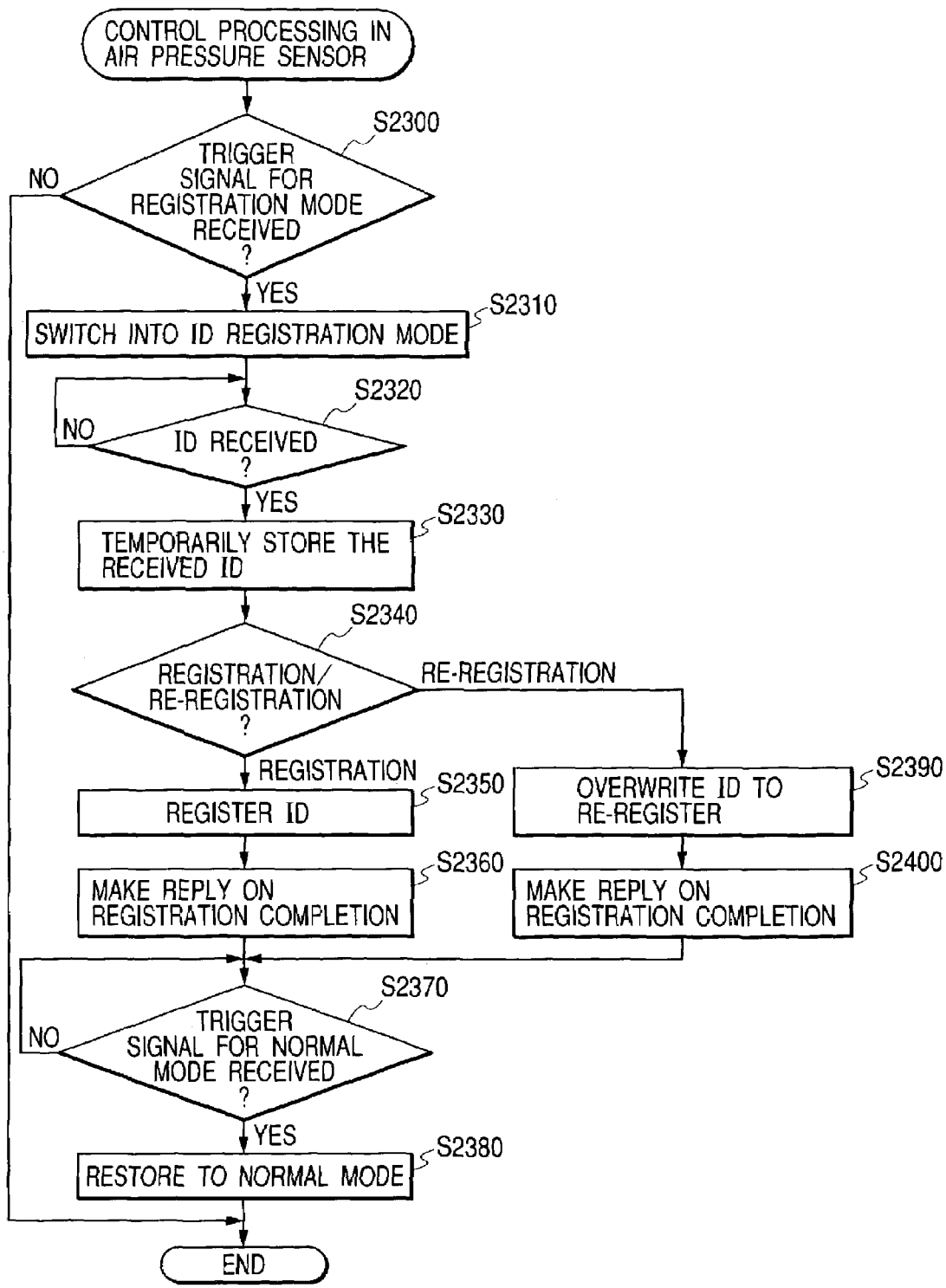
FIG. 19 is a flow chart showing the contents of control processing in an air pressure sensor for realizing the ID registration procedure shown in FIG. 11.

Furthermore, a description will be given hereinbelow of the contents of the control processing to be implemented in the air pressure sensors 10, 20, 30 and 40. In this control processing, as shown in FIG. 19, first of all, a decision is made as to the reception of a trigger signal calling for the switching into the ID registration mode (S2300). If received is the trigger signal calling for the switching into the ID registration mode (S2300: YES), the switching into the ID registration mode is made (S2310), and a decision is made as to whether an ID is received or not (S2320). In the case of the ID reception (S2320: YES), this ID is temporarily stored in a work area of the RAM (S2330). Moreover, a decision is made as to which of the ID registration instruction and the ID re-registration instruction is received (S2340). In the case of the reception of the ID registration instruction (S2340: registration), the ID temporarily stored in S2330 is registered in the ID memories 12, 22, 32 and 42 (S2350), and a reply indicative of the ID registration completion is then made (S2360). Subsequently, a decision is made as to the reception of a trigger signal to the effect that the mode is switched into the normal mode (S2370). If the reception of the trigger signal calling for the switching into the normal mode takes place (S2370: YES), the mode is switched into the normal mode (S2380), and the processing comes to an end. On the other hand, in the case of the reception of the ID re-registration instruction (S2340: re-registration), the ID temporarily stored in S2330 is overwritten to be re-registered in the ID memories 12, 22, 32 and 42 (S2390), and the operational flow shifts to the step S2370 after the implementation of a reply indicative of the ID registration completion (S2400).

When the above-described control processing is conducted in the ID registration tool 60, the tire pressure monitoring apparatus 50 and the respective air pressure sensors 10, 20, 30 and 40, at the initial registration, the air pressure sensor IDs can be registered in a state associated with the tire positions: front left, rear left, rear right and front right. Moreover, at this time, the mistaken registration due to radio interference or the registration-impossible state due to other electric waves does not occur unlike the conventional technique. Still moreover, at the tire replacement or tire rotation, through the above-described control processing, the sensor IDs can be registered in a state associated with the tire positions after the replacement. In the case of the tire replacement, the re-registration operation can be conducted with respect to only the replacement tire, thus achieving the reduction of the number of steps. Still additionally, also in the case of the rotation, the ID re-registration reflecting a change of position is feasible. Yet additionally, also in this re-registration operation, the problem of the mistaken registration due to the radio interference is solvable.

Third Embodiment

Furthermore, a description will be given hereinbelow of a third embodiment of the present invention. In the third embodiment, as well as the second embodiment, IDs are registered in the air pressure sensors 10, 20, 30, 40 and the monitoring apparatus 50 through the use of a management sheet, but the re-registration method is different therefrom. The registration operation is conducted in accordance with the following procedure.

Figure 20:
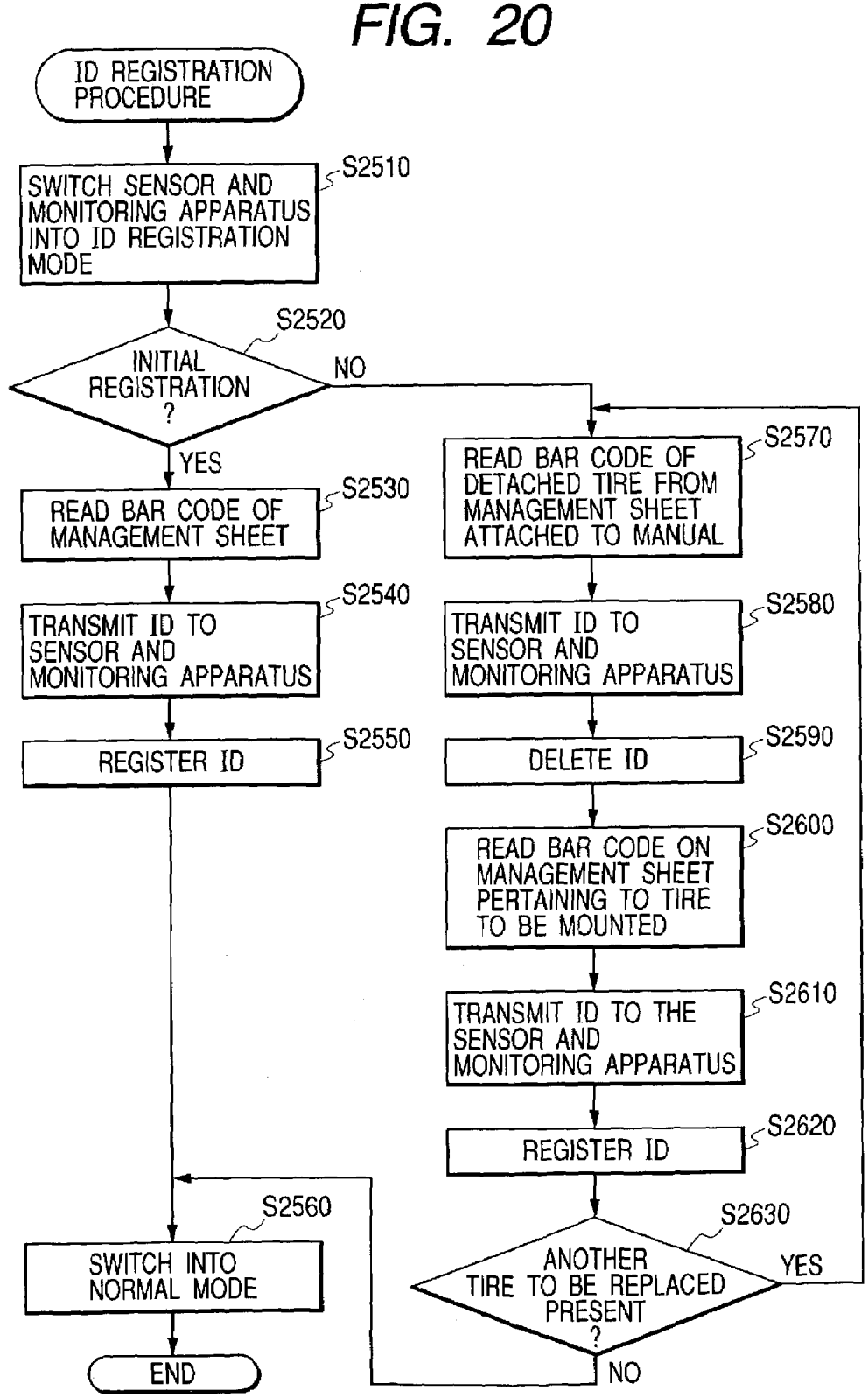
FIG. 20 is a flow chart showing an ID registration procedure according to a third embodiment of the present invention.
Figure 21:
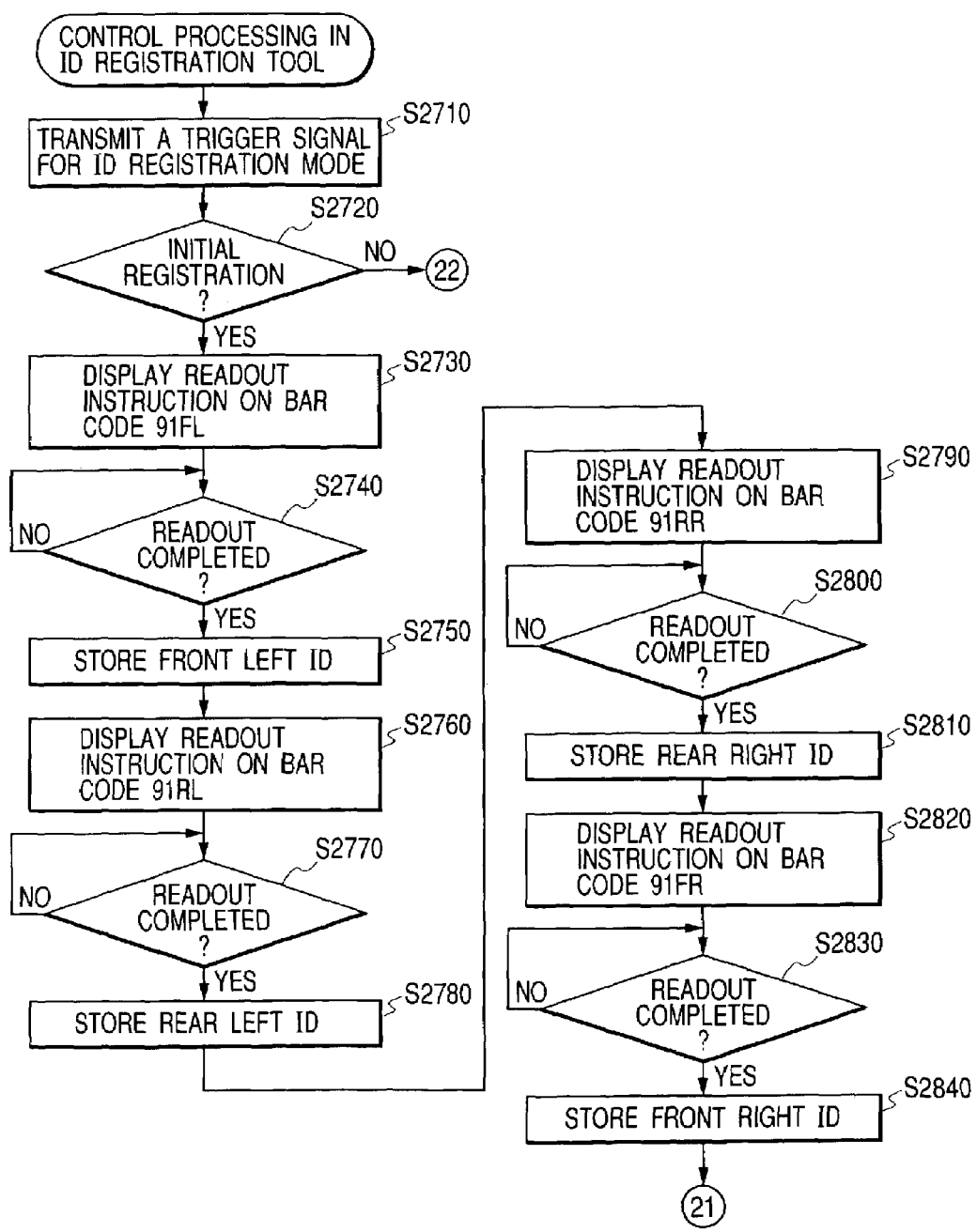
FIG. 21 is a flow chart showing the contents of control processing in an ID registration tool for realizing the ID registration procedure shown in FIG. 20.
Figure 22:
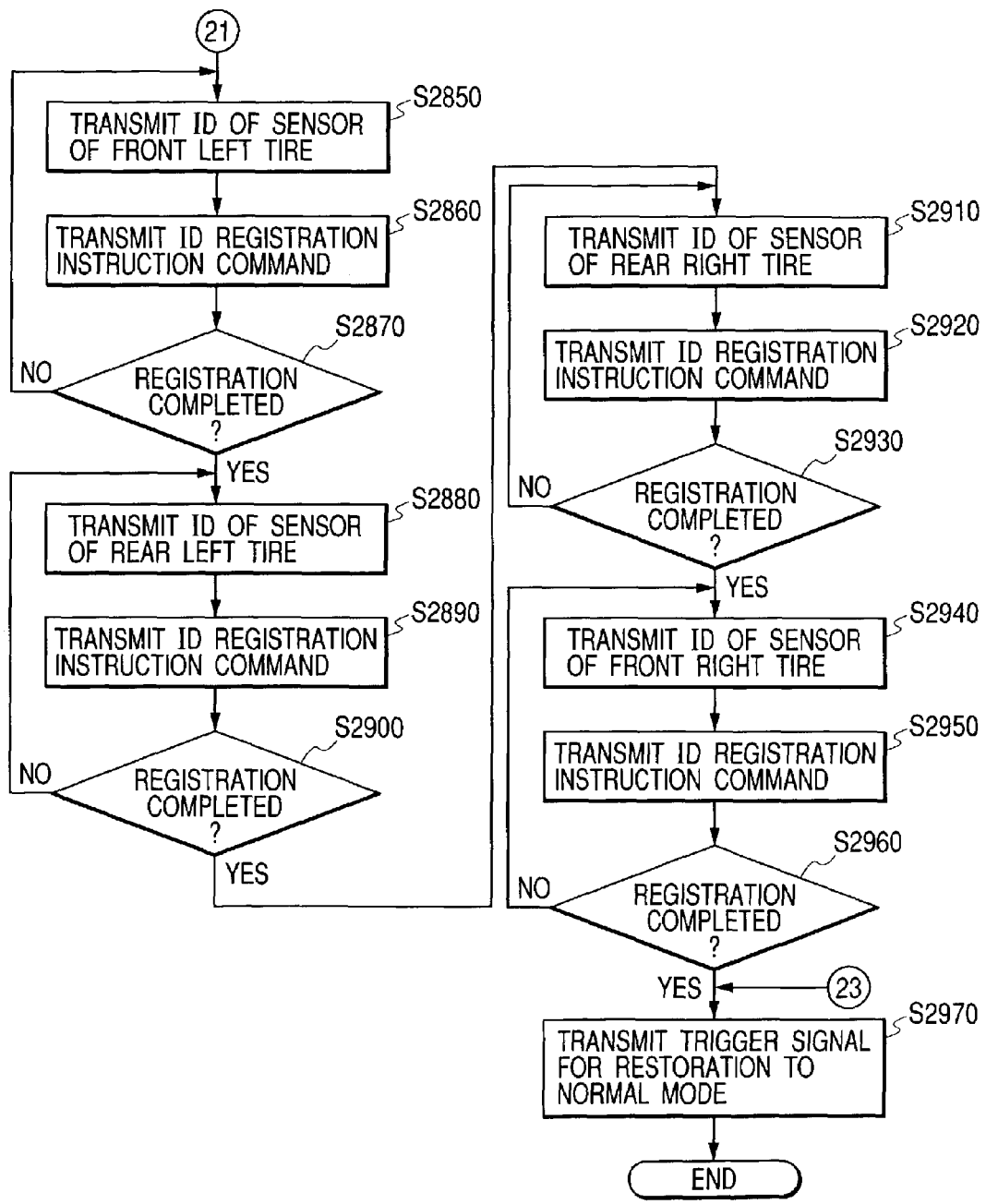
FIG. 22 is a flow chart showing the contents of the control processing in the ID registration tool for realizing the ID registration procedure shown in FIG. 20.
Figure 23:
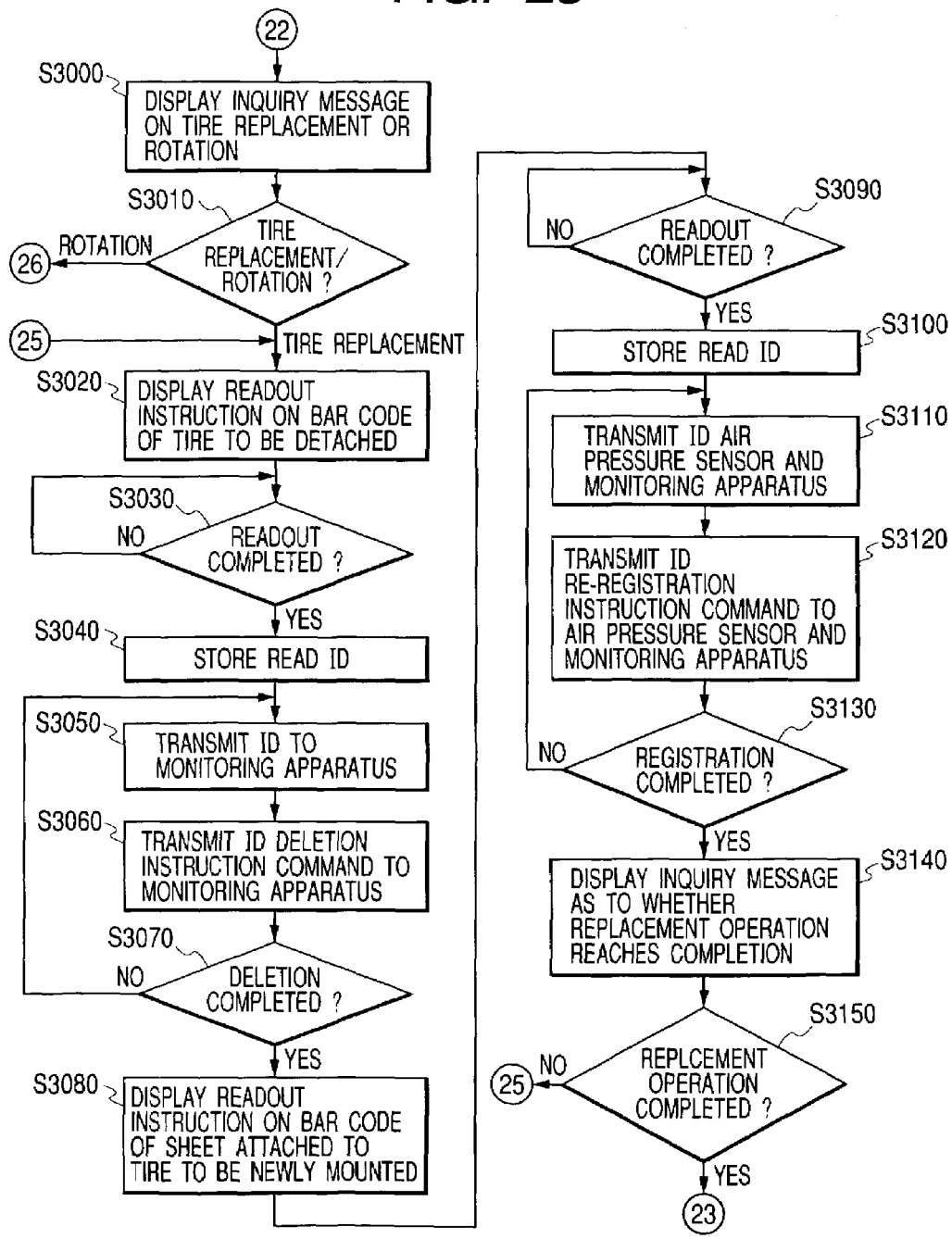
FIG. 23 is a flow chart showing the contents of the control processing in the ID registration tool for realizing the ID registration procedure shown in FIG. 20.
Figure 24:
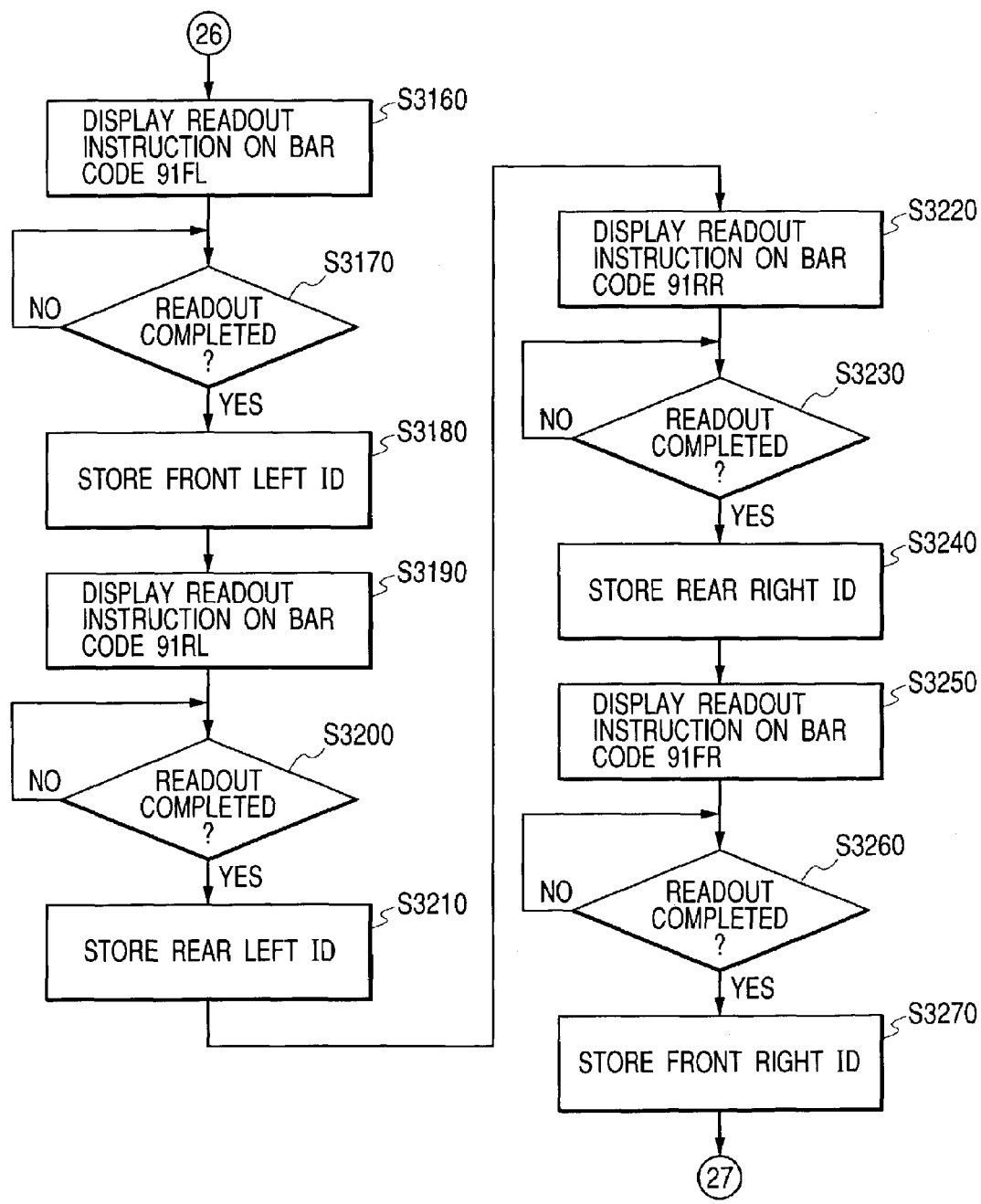
FIG. 24 is a flow chart showing the contents of the control processing in the ID registration tool for realizing the ID registration procedure shown in FIG. 20.
Figure 25:
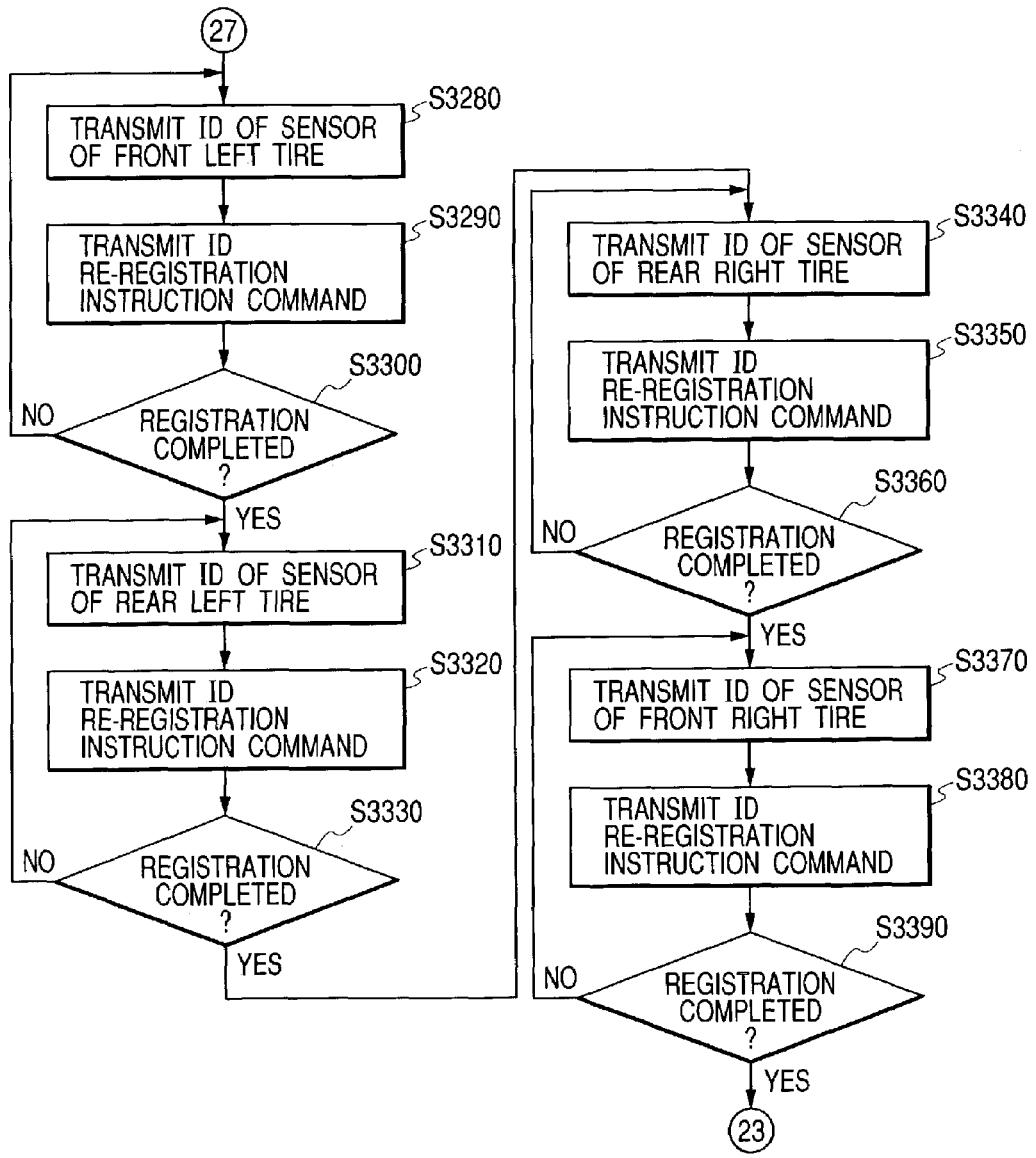
FIG. 25 is a flow chart showing the contents of the control processing in the ID registration tool for realizing the ID registration procedure shown in FIG. 20.

For the registration operation, the signal lines 63, 63a, 63b, 63c and 63d of the ID registration tool 60 are connected to the respective sensors 10, 20, 30, 40 and the monitoring apparatus 50, and the operation is implemented in accordance with a procedure shown in FIG. 20. First of all, the respective sensors 10, 20, 30, 40 and the monitoring apparatus 50 are switched into an ID registration mode (S2510). Subsequently, a decision is made as to whether or not it is the initial registration (S2520). In the case of the initial registration (S2520: YES), the bar codes 91FL, 91RL, 91RR and 91FR on the management sheet 90 are read through the use of the ID registration tool 60 (S2530). The IDs read out from these bar codes 91FL, 91RL, 91RR and 91FR are transmitted from the ID registration tool 60 to the respective air pressure sensors 10, 20, 30, 40 and the monitoring apparatus 50 (S2540). The respective air pressure sensors 10, 20, 30, 40 and the monitoring apparatus 50 register the received IDs in the ID memories 12, 22, 32, 42 and in a memory 55 (S2550).

At this time, the signal lines 63a, 63b, 63c and 63d are correctly connected to the air pressure sensors 10, 20, 30 and 40 and the readout by the ID registration tool 60 is made in the order of the bar code 91FL, the bar code 91RL, the bar code 91RR and the bar code 91FR so that the ID indicated by the bar code 91FL is registered in the air pressure sensor 10, the ID of the bar code 91RL in the air pressure sensor 20, the ID of the bar code 91RR in the air pressure sensor 30, and the ID of the bar code 91FR in the air pressure sensor 40. Moreover, in the memory 55 of the monitoring apparatus 50, the ID of the bar code 91FL is registered as that of the front left tire, the ID of the bar code 91RL as that of the rear left tire, the ID of the bar code 91RR as that of the rear right tire, and the ID of the bar code 91FR as that of the front right tire. The management sheet 90 used at the initial registration is attached to the manual of the vehicle.

When the initial ID registrations in the air pressure sensors 10, 20, 30, 40 and the monitoring apparatus 50 reach completion in this way, the air pressure sensors 10, 20, 30, 40 and the monitoring apparatus 50 are switched into a normal mode (S2560), and the ID registration operation comes to an end.

On the other hand, if it is not the initial registration, that is, in the case of the replacement of a tire in a repair shop or the like (S2520: YES), the ID registration tool 60 reads, of the bar codes on the management sheet 90 at the initial registration, attached to the manual, the bar code corresponding to the tire to be detached this time (S2570). The ID read out in this way is transmitted from the ID registration tool 60 to the tire pressure monitoring apparatus 50 (S2580). The tire pressure monitoring apparatus 50 removes the received ID from the memory 55 (S2590). Then, a bar code expressed on a sheet pertaining to a tire to be mounted newly is read through the use of the ID registration tool 60 (S2600), and the ID thus read out is transmitted from the ID registration tool 60 to the air pressure sensor of the tire to be mounted newly and the tire pressure monitoring apparatus 50 (S2610). The air pressure sensor of the tire to be mounted newly registers the received ID in its ID memory, while the tire pressure monitoring apparatus 50 re-registers the received ID at the tire position, deleted in S2590, in the memory 55 (S2620).

In addition, a decision is made as to whether or not there is another tire to be replaced (S2630). If there is another tire to be replaced (S2630: YES), the step S2570 and subsequent processing are conducted repeatedly. On the other hand, if there exists no tire to be replaced (S2630: NO), the air pressure sensors 10, 20, 30, 40 and the monitoring apparatus 50 are switched into a normal mode (S2560), and the ID registration operation comes to an end.

Furthermore, referring to flow charts of FIGS. 21 to 24, a description will be given hereinbelow of the contents of a program installed in the ID registration tool 60 for the implementation of the above-mentioned registration operation. The following program starts by pushing a predetermined button on the control panel 68 of the ID registration tool 60. In this program, first of all, a trigger signal is transmitted to place the tire air pressure sensors 10, 20, 30, 40 and the tire pressure monitoring apparatus 50 into an ID registration mode (S2710), and after a manipulation of the control panel 68, a decision is then made as to whether or not it is the initial registration (S2720).

In the case of the initial registration (S2720: NO), a readout instruction message on a bar code 91FL of the registration sheet 90 is displayed on the display 69 (S2730), and a decision is made on whether or not the readout reaches completion (S2740). If the decision shows the completion of the readout (S2740: YES), the readout result is stored in the memory 66 in a state associated with the tire position (front left) (S2750). Moreover, a readout instruction message on the bar code 91RL thereof is displayed (S2760), and a decision is made as to whether or not the readout reaches completion (S2770). If the decision shows that the readout reaches completion (S2770: YES), the readout result is stored in the memory 66 in a state associated with the tire position (rear left) (S2780). Still moreover, a readout instruction message on the bar code 91RR thereof is displayed (S2790), and a decision is made as to whether or not the readout reaches completion (S2800). If the decision indicates that the readout reaches completion (S2800: YES), the readout result is stored in the memory 66 in a state associated with the tire position (rear right) (S2810). Yet moreover, a readout instruction message on the bar code 91FR is displayed (S2820), and a decision is made as to whether or not the readout reaches completion (S2830). If the decision indicates the completion of the readout therefrom (S2830: YES), the readout result is put in the memory 66 in a state associated with the tire position (front right) (S2840).

Thereafter, the ID corresponding to the air pressure sensor of the front left tire is first read out from the memory 66 and is transmitted to the air pressure sensor 10 and the tire pressure monitoring apparatus 50 (S2850), and an instruction command for ID registration is transmitted to the air pressure sensor 10 and the tire pressure monitoring apparatus 50 (S2860). Subsequently, a decision is made as to whether or not a reply indicative of the completion of the registration comes from the air pressure sensor 10 and the tire pressure monitoring apparatus 50 (S2870). In a case in which the reply does not come within a predetermined period of time (S2870: NO), the operational flow returns to the step S2850. On the other hand, in the case of the arrival of the reply indicative of the completion of the registration (S2870: YES), the ID corresponding to the air pressure sensor of the rear left tire is read out from the memory 66 and is transmitted to the air pressure sensor 20 and the tire pressure monitoring apparatus 50 (S2880). Moreover, an instruction command for the ID registration is transmitted to the air pressure sensor 20 and the tire pressure monitoring apparatus 50 (S2890), and a decision is made as to whether or not a replay indicative of the registration completion comes from the air pressure sensor 20 and the tire pressure monitoring apparatus 50 (S2900). If the relay does not come within a predetermined period of time (S2900: NO), the operational flow returns to the step S2880. On the other hand, in the case of the arrival of the replay indicative of the registration completion (S2900: YES), the ID corresponding to the air pressure sensor of the rear right tire is read out from the memory 66 and is transmitted to the air pressure sensor 30 and the tire pressure monitoring apparatus 50(S2910). Still moreover, an instruction command for the ID registration is transmitted to the air pressure sensor 30 and the tire pressure monitoring apparatus 50 (S2920), and a decision is made as to whether or not a reply indicative of the registration completion comes from the air pressure sensor 30 and the tire pressure monitoring apparatus 50 (S2930). If the reply does not come within a predetermined period of time (S2930: NO), the operational flow returns to the step S2910. On the other hand, in the case of the arrival of the reply indicative of the registration completion (S2930: YES), the ID corresponding to the air pressure sensor of the front right tire is read out from the memory 66 and is transmitted to the air pressure sensor 40 and the tire pressure monitoring apparatus 50 (S2940). Yet moreover, an instruction command for the ID registration is transmitted to the air pressure sensor 40 and the tire pressure monitoring apparatus 50 (S2950), and a decision is made as to whether or not a reply indicative of the registration completion comes from the air pressure sensor 40 and the tire pressure monitoring apparatus 50 (S2960). If the reply does not come within a predetermined period of time (S2960: NO), the operational flow returns to the step S2940. On the other hand, in the case of the arrival of the reply indicative of the registration completion (S2960: YES), a trigger signal calling for the restoration to the normal mode is outputted to the air pressure sensors 10, 20, 30, 40 and the tire pressure monitoring apparatus 50 (S2970), and the processing comes to an end.

Meanwhile, in the case of no initial registration, an message on inquiry about tire replacement or rotation is displayed on the display 69 (S3000), and the control waits for the corresponding panel manipulation (S3010). In the case of the tire replacement (S3010: tire replacement), a message to the effect that the ID of the air pressure sensor of the tire to be detached is read out from the bar codes 91FL, 91RL, 91RR and 91FR shown on the management sheet 90 attached to the manual is displayed on the display 69 (S3020), and a decision is made as to whether or not the readout comes to an end (S3030). If the decision indicates the completion of the readout (S3030: YES), the readout result is stored in the memory 66 (S3040).

Moreover, the ID stored in S3040 is read out from the memory 66 and is transmitted to the tire pressure monitoring apparatus 50 (S3050). Subsequently, an instruction command for ID deletion is transmitted to the tire pressure monitoring apparatus 50 (S3060), and a decision is made as to whether or not a reply indicative of the completion of the deletion comes from the tire pressure monitoring apparatus 50 (S3070). If the reply does not within a predetermined period of time (S3070: NO), the operational flow returns to the step S3050. On the other hand, in the case of the arrival of the reply indicative of the deletion completion (S3070: YES), a message to the effect of reading a bar code 91" shown on a re-registration sheet 90" attached to the tire to be mounted newly is displayed on the display 69 (S3080), and a decision is made on whether or not the readout reaches completion (S3090). If the decision indicates the completion of the readout (S3090: YES), the readout result is put in the memory 66 (S3100). Subsequently, the ID of the air pressure sensor of the tire to be mounted newly is read out from the memory 66 and is transmitted to the corresponding air pressure sensor and the monitoring apparatus 50(S3110). Moreover, an instruction command for the ID re-registration is transmitted to this air pressure sensor and the tire pressure monitoring apparatus 50 (S3120), and a decision is made as to whether or not a reply indicative of the registration completion comes from this air pressure sensor and the tire pressure monitoring apparatus 50 (S3130). If the relay does not come within a predetermined period of time (S3130: NO), the operational flow returns to the step S3110. On the other hand, in the case of the arrival of the reply indicative of the registration completion (S3130: YES), an inquiry message as to whether or not all the replacement operations are completed is displayed on the display 69 (S3140), and the control waits for a result of a panel manipulation (S3150). If the panel manipulation is done which is for indicating the completion of all the replacement operations (S3150: YES), a trigger signal calling for the restoration to the normal mode is outputted to the air pressure sensor connected thereto and the tire pressure monitoring apparatus 50 (S2970, and the processing comes to an end. On the other hand, in the case of the panel manipulation indicating that the replacement does not reach completion yet (S3150: NO), the operational flow returns to the step S3020.

Moreover, in the case of the rotation (S3010: rotation), an instruction message on the readout of the bar code 91FL of the registration sheet 90 attached to the manual is displayed on the display 69 (S3160), and a decision is made as to the completion of the readout (S3170). If the decision shows the completion of the readout (S3170: YES), the readout result is stored in the memory 66 in a state associated with the tire position (front left) (S3180). Subsequently, an instruction message on the readout of the bar code 91RL thereof is displayed thereon (S3190), and a decision is made as to the completion of the readout (S3200). If the decision shows the completion of the readout (S3200: YES), the readout result is stored in the memory 66 in a state associated with the tire position (rear left) (S3210). Moreover, an instruction message on the readout of the bar code 91RR thereof is displayed thereon (S13220), and a decision is made as to the completion of the readout (S3230). If the decision shows the completion of the readout (S3230: YES), the readout result is stored in the memory 66 in a state associated with the tire position (rear right) (S3240). Still moreover, an instruction message on the readout of the bar code 91FR thereof is displayed thereon (S3250), and a decision is made as to the completion of the readout (S3260). If the decision shows the completion of the readout (S3260: YES), the readout result is stored in the memory 66 in a state associated with the tire position (front right) (S3270).

Following this, the ID corresponding to the air pressure sensor of the front left tire is first read out from the memory 66 and is transmitted to the air pressure sensor of a tire to be mounted at the front left position after the rotation (S3280), and an instruction command for the ID re-registration is transmitted to this air pressure sensor (S3290). A decision is made as to whether or not a reply indicative of the completion of the registration comes from this air pressure sensor (S3300). If the reply does not come within a predetermined period of time (S3300: NO), the operational flow returns to the step S3280. On the other hand, if the registration completion reply comes (S3300: YES), the ID corresponding to the air pressure sensor of the rear left tire is read out from the memory 66 and is transmitted to an air pressure sensor of a tire to be mounted at the rear left position after the rotation (S3310), and an instruction command for the ID re-registration is then transmitted to this air pressure sensor (S3320). A decision is made as to whether or not a reply indicative of the completion of the registration comes from this air pressure sensor (S3330). If the reply does not come within a predetermined period of time (S3330: NO), the operational flow returns to the step S3310. On the other hand, if the registration completion reply comes (S3330: YES), the ID corresponding to the air pressure sensor of the rear right tire is read out from the memory 66 and is transmitted to the air pressure sensor of a tire to be mounted at the rear right position after the rotation (S3340), and an instruction command for the ID re-registration is then transmitted to this air pressure sensor (S3350). A decision is made as to whether or not a reply indicative of the completion of the registration comes from this air pressure sensor (S3360). If the reply does not come within a predetermined period of time (S3360: NO), the operational flow returns to the step S3340. On the other hand, if the registration completion reply comes (S3360: YES), the ID corresponding to the air pressure sensor of the front right tire is read out from the memory 66 and is transmitted to the air pressure sensor of a tire to be mounted at the front right position after the rotation (S3370), and an instruction command for the ID re-registration is then transmitted to this air pressure sensor (S3380). A decision is made as to whether or not a reply indicative of the completion of the registration comes from this air pressure sensor (S3390). If the reply does not come within a predetermined period of time (S3390: NO), the operational flow returns to the step S3370. On the other hand, if the registration completion reply comes (S3390: YES), a trigger signal calling for the restoration to the normal mode is outputted to the air pressure sensors connected thereto and the tire pressure monitoring apparatus 50 (S2970), and the processing comes to an end.

Figure 26:
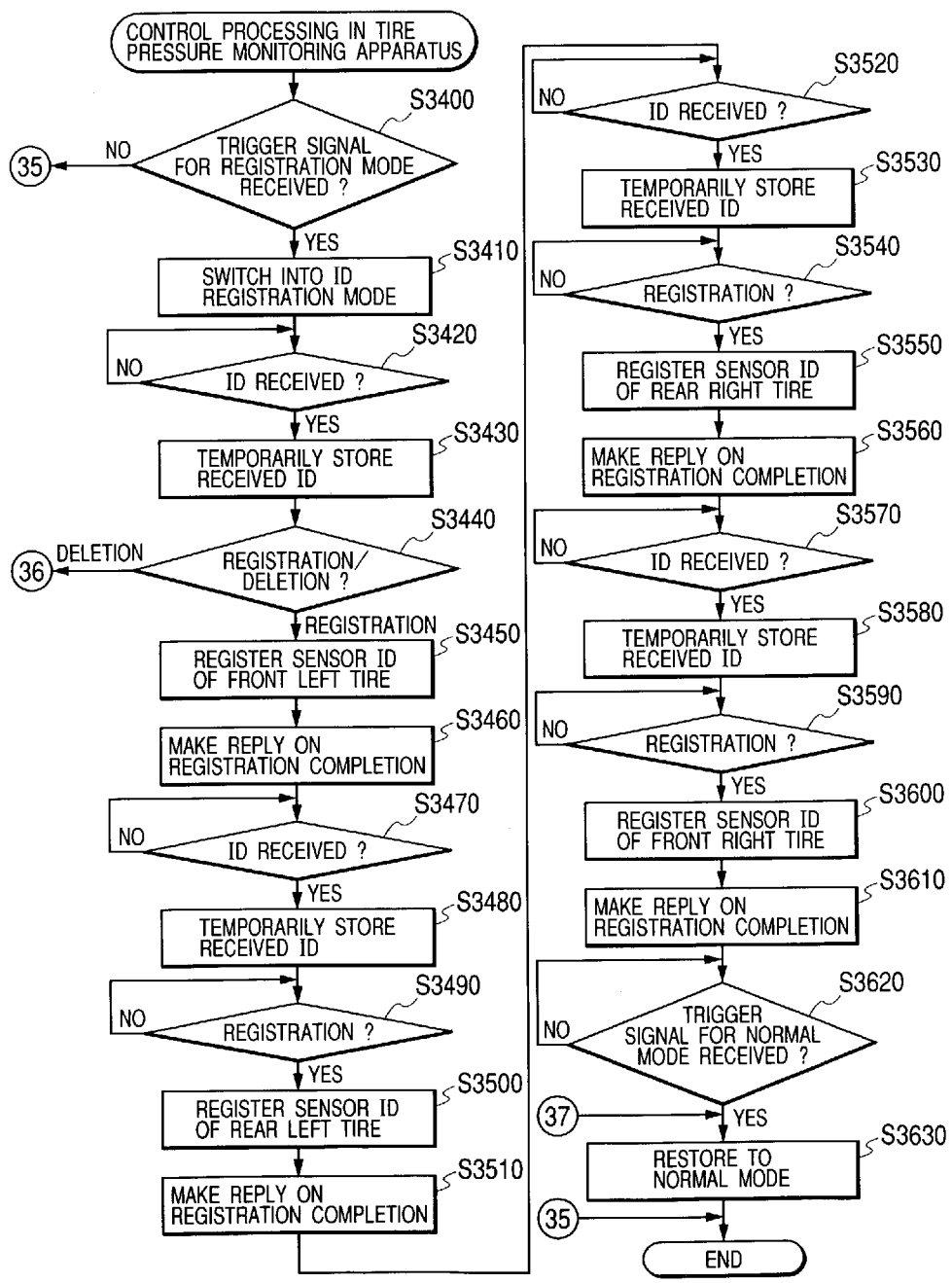
FIG. 26 is a flow chart showing the contents of control processing in a tire pressure monitoring apparatus for realizing the ID registration procedure shown in FIG. 20.
Figure 27:
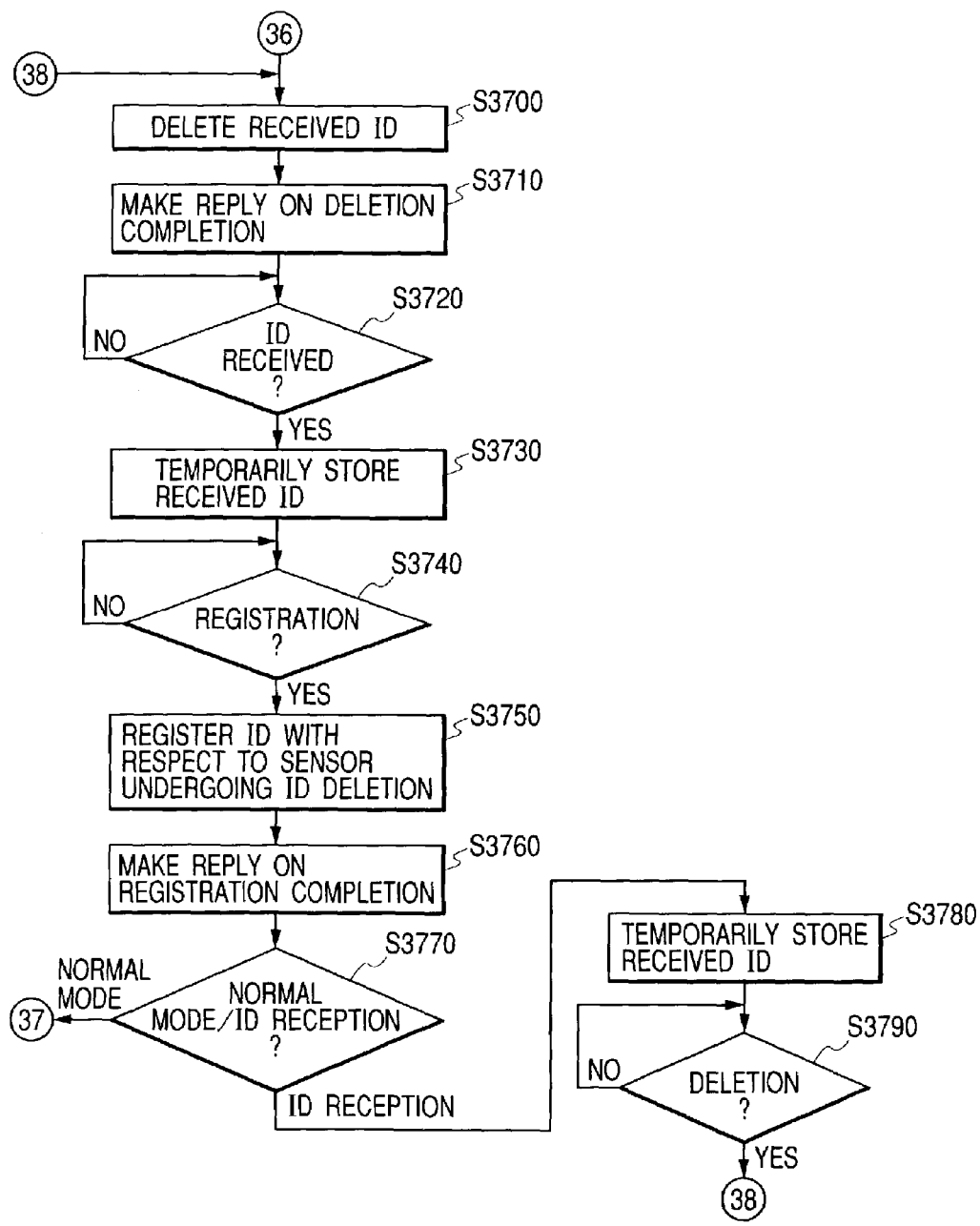
FIG. 27 is a flow chart showing the contents of the control processing in the tire pressure monitoring apparatus for realizing the ID registration procedure shown in FIG. 20.

Furthermore, a description will be given hereinbelow of the contents of control processing to be conducted in the tire pressure monitoring apparatus 50. In this control processing, as shown in FIGS. 26 and 27, first of all, a decision is made as to whether or not the reception of a trigger signal calling for the switching into an ID registration mode takes place (S3400). In the case of the reception of the trigger signal indicating the switching into the ID registration mode (S3400: YES), the switching into the ID registration mode is carried out (S3410), and a decision is made as to the reception of an ID (S3420). In the case of the ID reception (S3420: YES), this ID is temporarily stored in a work area of the RAM (S3430). Moreover, a decision is made as to which of the ID registration instruction and the ID deletion instruction is received (S3440). In the case of the reception of the ID registration instruction (S3440: registration), the ID temporarily stored in S3430 is registered as the ID of the air pressure sensor of the front left tire in the memory 55 (S3450), and a reply is then made which is indicative of the ID registration completion (S3460). Subsequently, a decision is made as to whether the reception of an ID takes place or not (S3470). In the case of the ID reception (S3470: YES), this ID is temporarily stored in a work area of the RAM (S3480). Moreover, a decision is made about the reception of an ID registration instruction (S3490). In the case of the reception of the ID registration instruction (S3490: YES), the ID temporarily stored in S3480 is registered as the ID of the air pressure sensor of the rear left tire in the memory 55 (S3500), and a reply is made which is indicative of the ID registration completion (S3510). Still moreover, a decision is made about the reception of an ID (S3520). In the case of the ID reception (S3520: YES), this ID is temporarily stored in a work area of the RAM (S3530). Yet moreover, a decision is made as to the reception of an ID registration instruction (S3540). In the case of the reception of the ID registration instruction (S3540: YES), the ID temporarily stored in S3530 is registered as the ID of the air pressure sensor of the rear right tire in the memory 55 (S3550), and a reply is made which is indicative of the ID registration completion (S3560). In addition, a decision is made on the reception of an ID (S3570). For the reception of the ID (S3570: YES), this ID is temporarily stored in a work area of the RAM (S3580). Subsequently, a decision is made about the reception of an ID registration instruction (S3590). For the reception of the ID registration instruction (S3590: YES), the ID temporarily stored in S3580 is registered as the ID of the air pressure sensor of the front right tire in the memory 55 (S3600), and a reply is made which is indicative of the ID registration completion (S3610). Following this, a decision is made about the reception of a trigger signal to the effect that the mode is switched into the normal mode (S3620). If received is the trigger signal calling for the switching into the normal mode (S3620: YES), the switching into the normal mode is made (S3630), and then the processing comes to an end.

On the other hand, after the ID is received in S3420 and is temporarily stored in the RAM in S3430, if the reception of an ID deletion instruction takes place (S3440: deletion), the same ID as the ID temporarily stored in S3430 is removed from the memory 55 (S3700). Subsequently, a reply is made which is indicative of the ID-deletion completion (S3710). Then, a decision is made about the reception of an ID (S3720). For the reception of the ID (S3720: YES), this ID is temporarily stored in a work area of the RAM (S3730). Following this, a decision is made about the reception of an ID registration instruction (S3740). For the reception of the ID registration instruction (S3740: YES), the ID temporarily stored in S3730 is registered as the ID of the air pressure sensor of the tire existing at the position corresponding to the ID, deleted in S3710, in the memory 55 (S3750). Then, a reply is made which is indicative of the ID registration completion (S3760). Thereafter, a decision is made as to which of a switching instruction command to the normal mode and a new ID is received (S3770). In the case of the reception of the new ID (S3770: YES), this ID is temporarily stored in a work area of the RAM (S3780). Moreover, a decision is made on the reception of an ID deletion instruction (S3790). In the case of the reception of the ID deletion instruction (S3790: YES), the operational flow advances to the step S3700 and subsequent processing. On the other hand, if the decision in S3770 shows the reception of the switching instruction command for the normal mode, the operational flow proceeds to the step S3630 to carry out the switching into the normal mode, and the processing comes to an end.

Figure 28:
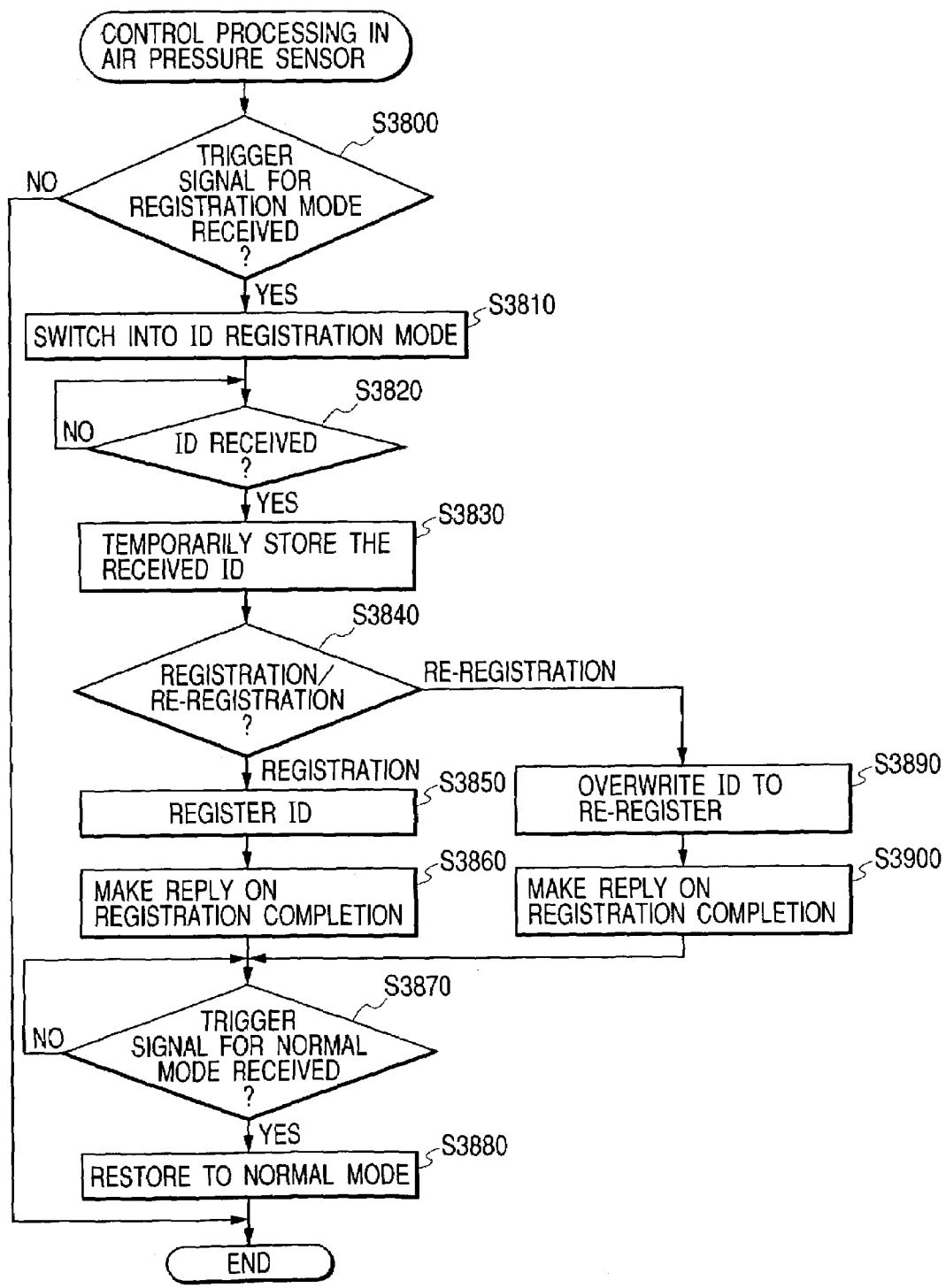
FIG. 28 is a flow chart showing the contents of control processing in an air pressure sensor for realizing the ID registration procedure shown in FIG. 20.

Furthermore, a description will be given hereinbelow of the contents of the control processing to be implemented in the air pressure sensors 10, 20, 30 and 40. In this control processing, as shown in FIG. 28, first of all, a decision is made as to the reception of a trigger signal calling for the switching into the ID registration mode (S3800). If received is the trigger signal calling for the switching into the ID registration mode (S3800: YES), the switching into the ID registration mode is carried out (S3810), and a decision is made as to the reception of an ID (S3820). In the case of the ID reception (S3820: YES), this ID is temporarily stored in a work area of the RAM (S3830). Moreover, a decision is made as to which of the ID registration instruction and the ID re-registration instruction is received (S3840). In the case of the reception of the ID registration instruction (S3840: registration), the ID temporarily stored in S3830 is registered in the ID memories 12, 22, 32 and 42 (S3850), and a reply is then made which is indicative of the ID registration completion (S3860). On the other hand, in the case of the reception of the ID re-registration instruction (S3840: re-registration), the ID temporarily stored in S3830 is overwritten to be re-registered in the ID memories 12, 22, 32 and 42 (S3890), and a reply is made which is indicative of the ID registration completion (S3880). Thereafter, a decision is made about the reception of a trigger signal to the effect of switching the mode into the normal mode (S3890). In response to the reception of the trigger signal calling for the switching into the normal mode (S3890: YES), the switching into the normal mode is made (S3900), and the processing comes to an end.

When the above-described control processing is conducted in the ID registration tool 60, the tire pressure monitoring apparatus 50 and the respective air pressure sensors 10, 20, 30 and 40, at the initial registration, the air pressure sensor IDs can be registered in a state associated with the tire positions: front left, rear left, rear right and front right. Moreover, at this time, the mistaken registration due to radio interference or the registration-impossible state due to other electric waves does not occur unlike the conventional technique. Still moreover, at the tire replacement or tire rotation, through the above-described control processing, the sensor IDs can be registered in a state associated with the tire positions after the replacement. In the case of the tire replacement, the re-registration operation can be conducted with respect to only the replacement tire, thus achieving the reduction of the number of steps. Still additionally, also in the case of the rotation, the ID re-registration reflecting a change of position is feasible. Yet additionally, also in this re-registration operation, the problem of the mistaken registration due to the radio interference is solvable.

Figure 30A:
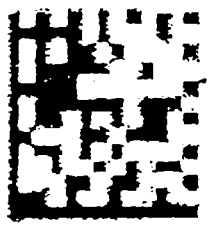
FIG. 30 is a plan view showing examples of optically-readable information.
Figure 30B:
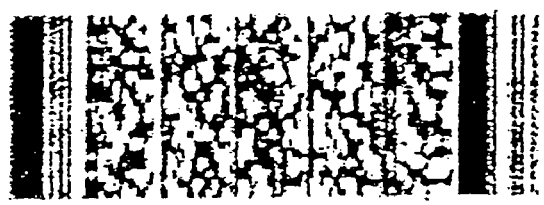
Figure 31A:
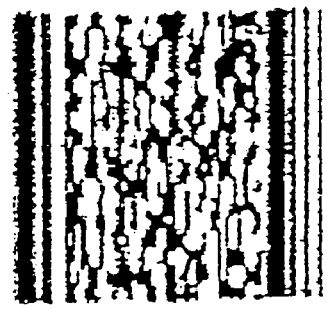
FIG. 31 is a plan view showing examples of optically-readable information.
Figure 31B:
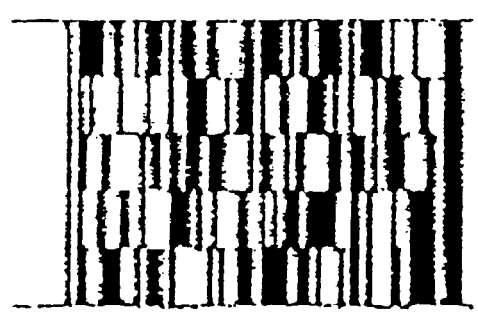
Figure 31C:
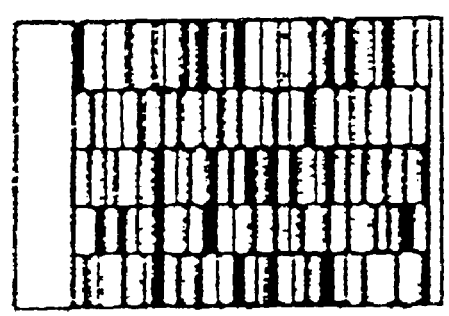
Figure 31D:
Figure 32:
FIG. 32 is a plan view showing examples of optically-readable information.

In the above-described embodiments, as the optically-readable information employable, there are various types of information, such as matrix type bar codes including data code, QR code, maxi code and CP code shown in FIGS. 29A to 29D, two-dimensional bar codes shown in FIGS. 30A and 30B, stack type bar codes including PDF417, code 49, code 16K and coder block shown in FIGS. 31A to 31D, one-dimensional bar codes shown in FIG. 32, and others.

In addition, the bar code can also be adhered onto a sensor itself instead of a tire wheel. Alternatively, it is also appropriate that a bar-code label corresponding to an ID registered in a sensor and the sensor are made to be supplied in a state paired and, in mounting the sensor on a tire in a vehicle manufacturing line, this label is adhered onto a tire wheel or a wheel cover.

Fourth Embodiment

Figure 33:
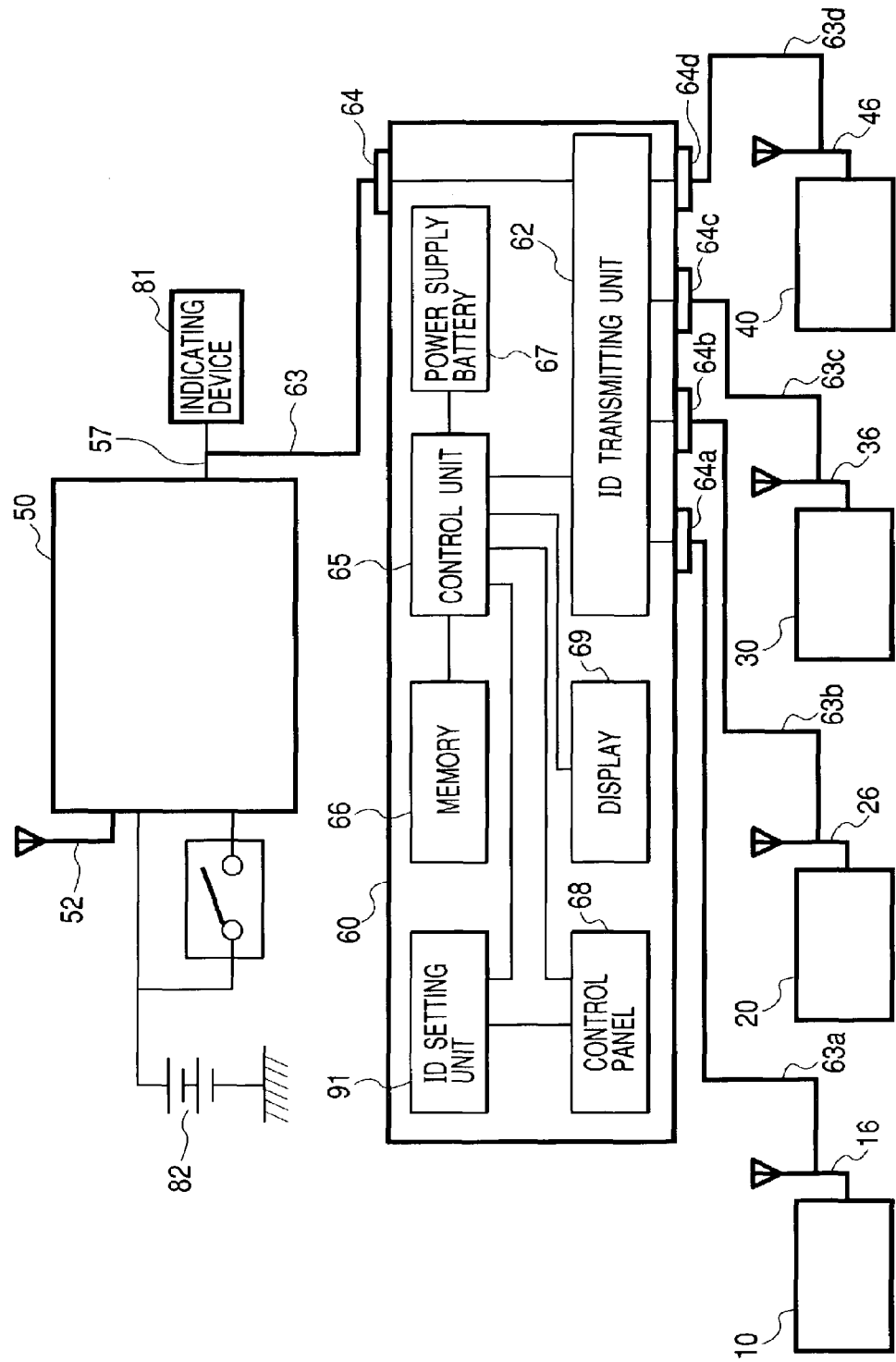
FIG. 33 is an illustrative view showing an apparatus configuration for ID registration according to a fourth embodiment of the present invention.

Referring to FIGS. 9 and 33, a description will be given hereinbelow of a fourth embodiment of the present invention. FIG. 33 is an illustrative view showing an apparatus configuration for ID registration according to the fourth embodiment.

In FIG. 33, an ID registration tool 60 is composed of an ID setting unit 91 for setting a registration ID to be stored in each of air pressure sensors 10, 20, 30 and 40 to be mounted on a vehicle, and an ID transmitting unit 62 for transmitting the registration ID, set in the ID setting unit 91, to each of the air pressure sensors 10, 20, 30 and 40 and further for transmitting it to an air pressure monitoring apparatus 50. Moreover, the ID registration tool 60 is equipped with connectors 64 and 64a to 64d for making connections of signal lines 63 and 63a to 63d for making connections with respect to the air pressure sensors 10, 20, 30, 40 and the tire pressure monitoring apparatus 50. Incidentally, the signal lines 63 and 63a to 63d have crocodile clips at their tip portions, respectively. These crocodile clips enable the connection to the antennas 16, 26, 36 and 46 of the air pressure sensors 10, 20, 30 and 40, and further to a signal line 57 extending from a communication circuit 56 of the tire pressure monitoring apparatus 50 to an indicating device 81.

Furthermore, the ID registration tool 60 includes a control unit 65, a memory 66, a power supply battery 67, a control panel 68 and a display 69. The control unit 65 is for controlling various types of processing to be executed through the use of the ID registration tool 60, and comprises a microcomputer composed of a CPU, a ROM, a RAM and others. The memory 66 comprises an EEPROM, a flash memory, a DRAM or the like, which is of a rewritable type. As the power supply battery 67, there is used a dry cell, a button-like cell, or the like. The control panel 68 has control keys for indicating the contents of processing to be implemented through the use of the ID registration tool 60. The display 69 is for displaying an ID set in the ID setting unit 91 or for indicating a control mode in the ID registration tool 60, and for example, comprises an LCD.

Secondly, a description will be given hereinbelow of a method of registering the IDs of the air pressure sensors 10, 20, 30 and 40 in the tire pressure monitoring apparatus 50. For implementing this method, the signal lines 63, 63a, 63b, 63c and 63d of the ID registration tool 60 is connected to the connectors 64, 64a, 64b, 64c and 64d and the crocodile clips at the tip portions of the signal lines 63, 63a, 63b, 63c and 63d are connected to the signal line 57 extending from the communication circuit 56 of the tire pressure monitoring apparatus 50 to the indicating device 81 and further to the antennas 16, 26, 36 and 46 of the air pressure sensors 10, 20, 30 and 40. The registration operation is made according to a procedure described below.

Figure 34:
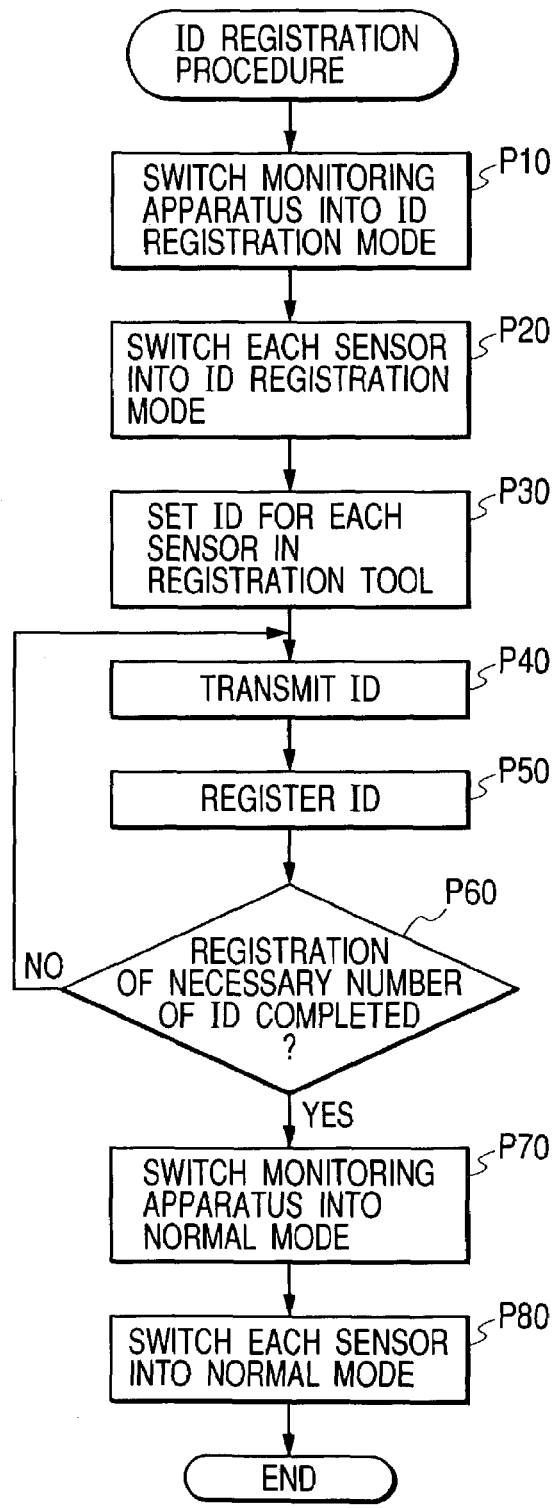
FIG. 34 is a flow chart showing an ID registration procedure according to the fourth embodiment.

In the registration operation, as shown in a flow chart of FIG. 34, first, the monitoring apparatus 50 is switched into an ID registration mode (step P10), and each of the sensors 10, 20, 30 and 40 is also switched into an ID registration mode (P20). Moreover, an ID is set in the registration tool 60 for each sensor (P30), and the IDs are transmitted to the monitoring apparatus 50 and the sensors 10, 20, 30 and 40 (P40). In this case, all the IDs of the four sensors are transmitted to the monitoring apparatus 50, while the corresponding ID is transmitted to each of the sensors 10, 20, 30 and 40 to be stored therein. Upon receipt of the IDs, the monitoring apparatus 50 and the respective sensors 10, 20, 30 and 40 carry out the ID registration (P50). A decision is made as to the completion of the ID registration in the monitoring apparatus 50 and the sensors 10, 20, 30 and 40 (P60). In the case of no completion of the ID registration (P60: NO), the step P40 and subsequent processing are implemented repeatedly. In the case of the completion of the ID registration (P60: YES), the monitoring apparatus 50 is switched into a normal mode (P70), and each of the sensors 10, 20, 30 and 40 is also switched into a normal mode (P80), and the ID registration operation then comes to an end.

Figure 35:
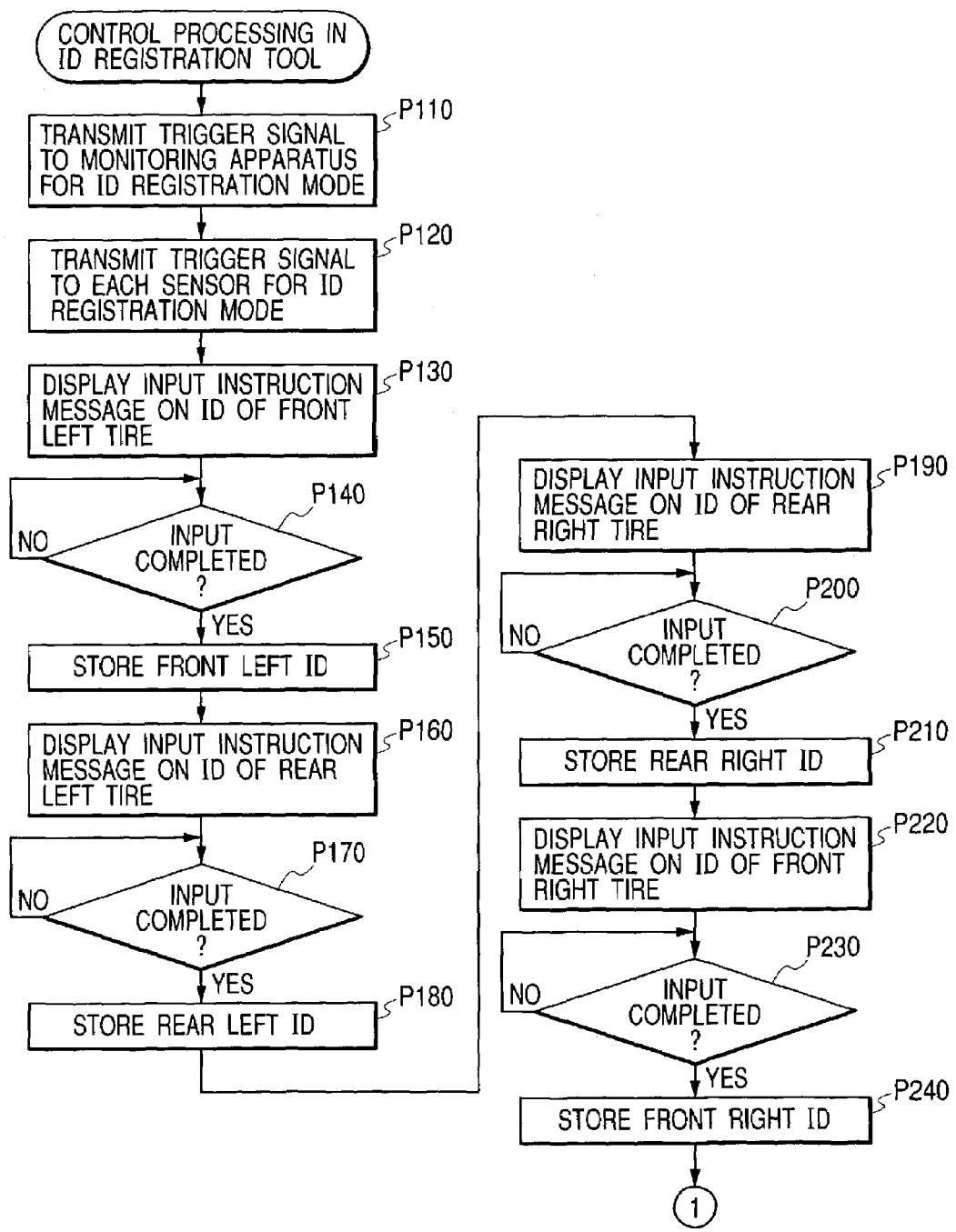
FIG. 35 is a flow chart showing the contents of control processing in an ID registration tool for realizing the ID registration procedure shown in FIG. 34.

Referring to flow charts of FIGS. 35 to 37, a description will be given hereinbelow of the contents of a program to be installed in the ID registration tool 60 for implementing the above-mentioned registration operation. The following program starts in response to the depression of a predetermined button on the control panel 68 of the ID registration tool 60. According to this program, first of all, as shown in FIG. 35, trigger signals are transmitted in order to place the tire pressure monitoring apparatus 50 and each of the sensors 10, 20, 30 and 40 into an ID registration mode (P110, P120).

Subsequently, an instruction message to the effect of inputting an ID of the front left tire of the vehicle is displayed on the display 69 (P130), and a decision is made as to whether or not the input from the control panel 68 reaches completion (P140). If the decision shows the completion of the input (P140: YES), the input result is put in the memory 66 in a state associated with the tire position (front left) (P150). Then, an instruction message on the input of the ID of the rear left tire is displayed thereon (P160). A decision is made as to the completion of the input (P170). If the decision shows the completion of the input (P170: YES), the input result is put in the memory 66 in a state associated with the tire position (rear left) (P180). Moreover, an ID input instruction message on the rear right tire is displayed thereon (P190). A decision is made on the completion of the input (P200). If the decision shows the completion of the input (P200: YES), the input result is put in the memory 66 in a state associated with the tire position (rear right) (P210). Still moreover, an ID input instruction message on the front right tire is displayed thereon (P220). A decision is made on the completion of the input (P230). If the decision shows the completion of the input (P230: YES), the input result is put in the memory 66 in a state associated with the tire position (front right) (P240).

Figure 36:
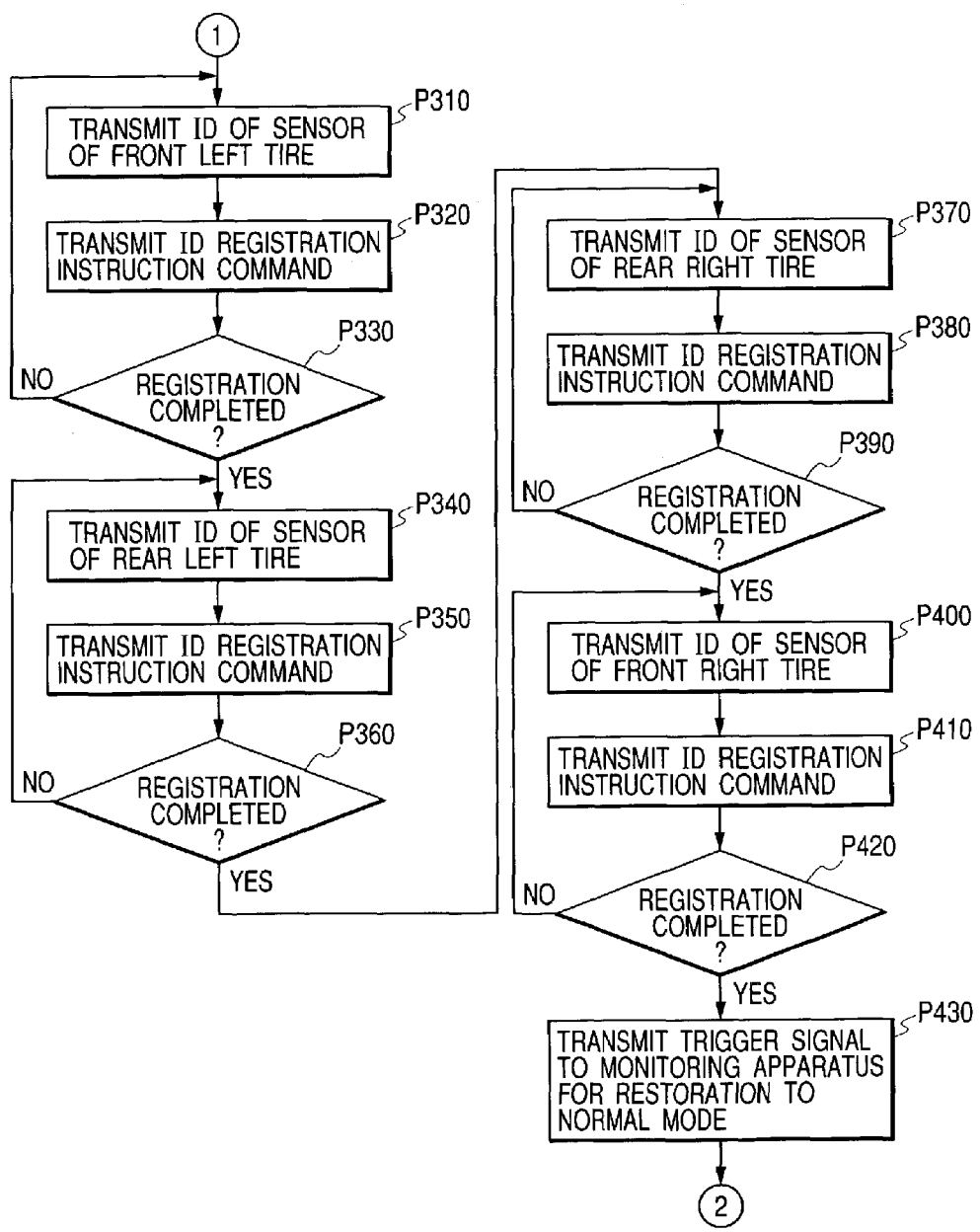
FIG. 36 is a flow chart showing the contents of the control processing in the ID registration tool for realizing the ID registration procedure shown in FIG. 34.

In addition, as shown in FIG. 36, an ID corresponding to the air pressure sensor 10 of the front left tire is read out from the memory 66 and transmitted to the tire pressure monitoring apparatus 50(P310). Subsequently, an instruction command for the ID registration is transmitted to the tire pressure monitoring apparatus 50 (P320). Then, a decision is made as to whether or not a reply indicative of the completion of the registration comes from the tire pressure monitoring apparatus 50 (P330). If the reply does not come within a predetermined period of time (P330: NO), the operational flow returns to the step P310. On the other hand, if the registration completion reply comes therefrom (P330: YES), an ID corresponding to the air pressure sensor 20 of the rear left tire is read out from the memory 66 and is transmitted to the tire pressure monitoring apparatus 50 (P340). Following this, an instruction command for the ID registration is transmitted to the tire pressure monitoring apparatus 50 (P350). A decision is then made whether or not a reply indicative of the completion of the registration comes from the tire pressure monitoring apparatus 50 (P360). If the reply does not come within a predetermined period of time (P360: NO), the operational flow returns to the step P340. On the other hand, if the registration completion reply comes therefrom (P360: YES), an ID corresponding to the air pressure sensor 30 of the rear right tire is read out from the memory 66 and is transmitted to the tire pressure monitoring apparatus 50 (P370). Following this, an instruction command for the ID registration is transmitted to the tire pressure monitoring apparatus (P380). A decision is then made whether or not a reply indicative of the completion of the registration comes from the tire pressure monitoring apparatus 50 (P390). If the reply does not come within a predetermined period of time (P390: NO), the operational flow returns to the step P370. On the other hand, if the registration completion reply comes therefrom (P390: YES), an ID corresponding to the air pressure sensor 40 of the front right tire is read out from the memory 66 and is transmitted to the tire pressure monitoring apparatus 50 (P400). Following this, an instruction command for the ID registration is transmitted to the tire pressure monitoring apparatus (P410). A decision is then made whether or not a reply indicative of the completion of the registration comes from the tire pressure monitoring apparatus 50 (P420). If the reply does not come within a predetermined period of time (P420: NO), the operational flow returns to the step P400. On the other hand, if the registration completion reply comes therefrom (P420: YES), a trigger signal calling for the restoration to the normal mode is outputted to the tire pressure monitoring apparatus 50 (P430).

Figure 37:
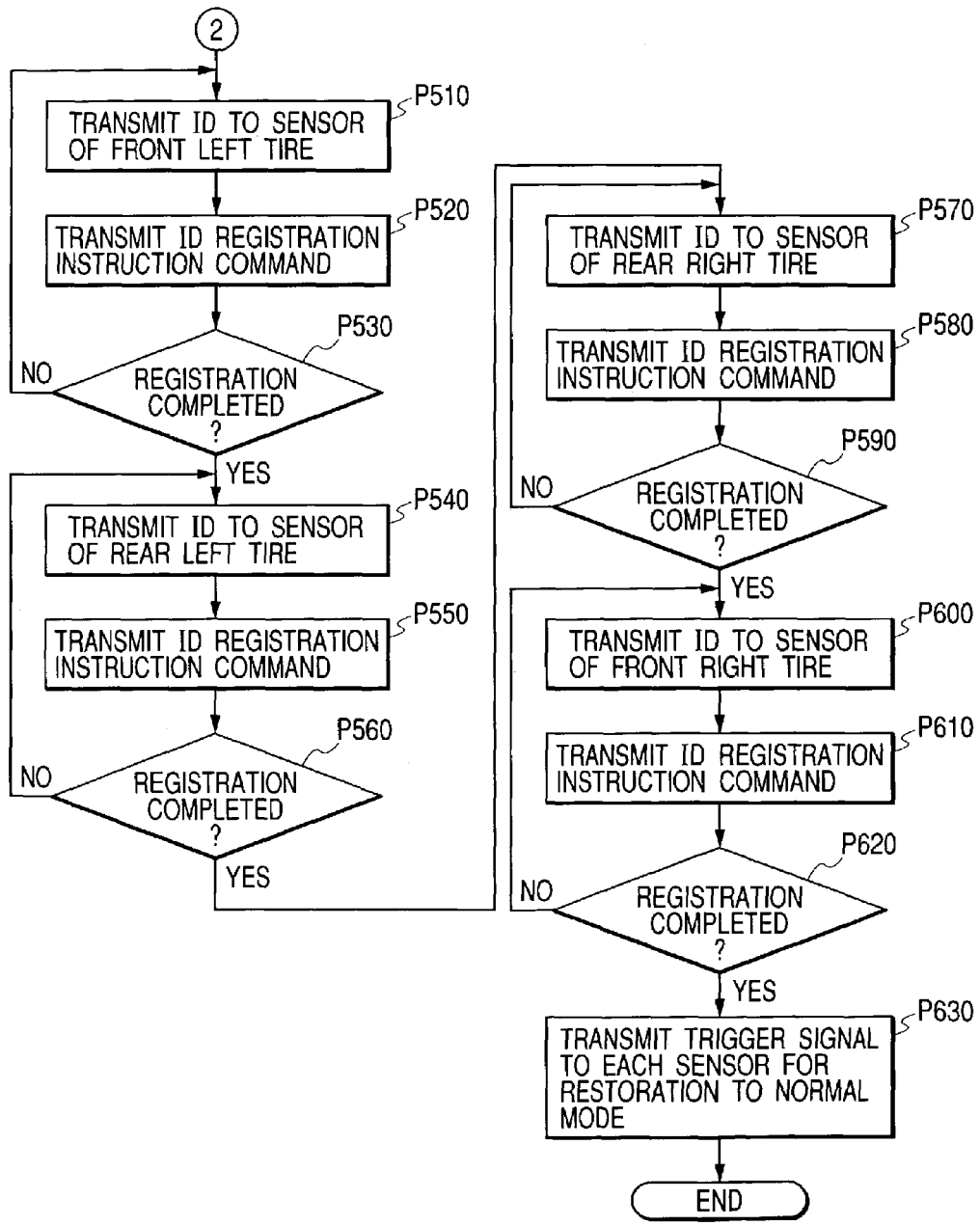
FIG. 37 is a flow chart showing the contents of the control processing in the ID registration tool for realizing the ID registration procedure shown in FIG. 34.

Still additionally, as shown in FIG. 37, an ID corresponding to the air pressure sensor 10 of the front left tire is read out from the memory 66 and is transmitted to the air pressure sensor 10 (P510). Subsequently, an instruction command for the ID registration is transmitted to the air pressure sensor 10 (P520), and a decision is made as to whether or not a reply indicative of the completion of the registration comes from the air pressure sensor 10 (P530). If the reply does not come within a predetermined period of time (P530: NO), the operational flow returns to the step P510. On the other hand, if the registration completion reply comes therefrom (P530: YES), an ID corresponding to the air pressure sensor 20 of the rear left tire is read out from the memory 66 and is transmitted to the air pressure sensor 20 (P540). Subsequently, an instruction command for the ID registration is transmitted to the air pressure sensor 20 (P550), and a decision is made as to whether or not a reply indicative of the completion of the registration comes from the air pressure sensor 20 (P560). If the reply does not come within a predetermined period of time (P560: NO), the operational flow returns to the step P540. On the other hand, if the registration completion reply comes therefrom (P560: YES), an ID corresponding to the air pressure sensor 30 of the rear right tire is read out from the memory 66 and is transmitted to the air pressure sensor 30 (P570). Subsequently, an instruction command for the ID registration is transmitted to the air pressure sensor 30 (P580), and a decision is made as to whether or not a reply indicative of the completion of the registration comes from the air pressure sensor 30 (P590). If the reply does not come within a predetermined period of time (P590: NO), the operational flow returns to the step P570. On the other hand, if the registration completion reply comes therefrom (P590: YES), an ID corresponding to the air pressure sensor 40 of the front right tire is read out from the memory 66 and is transmitted to the air pressure sensor 40 (P600). Subsequently, an instruction command for the ID registration is transmitted to the air pressure sensor 40 (P610), and a decision is made as to whether or not a reply indicative of the completion of the registration comes from the air pressure sensor 40 (P620). If the reply does not come within a predetermined period of time (P620: NO), the operational flow returns to the step P600. On the other hand, if the registration completion reply comes therefrom (P620: YES), a trigger signal calling for the restoration to the normal mode is outputted to each of the air pressure sensors 10, 20, 30 and 40 (P630), and the processing comes to an end.

Figure 38:
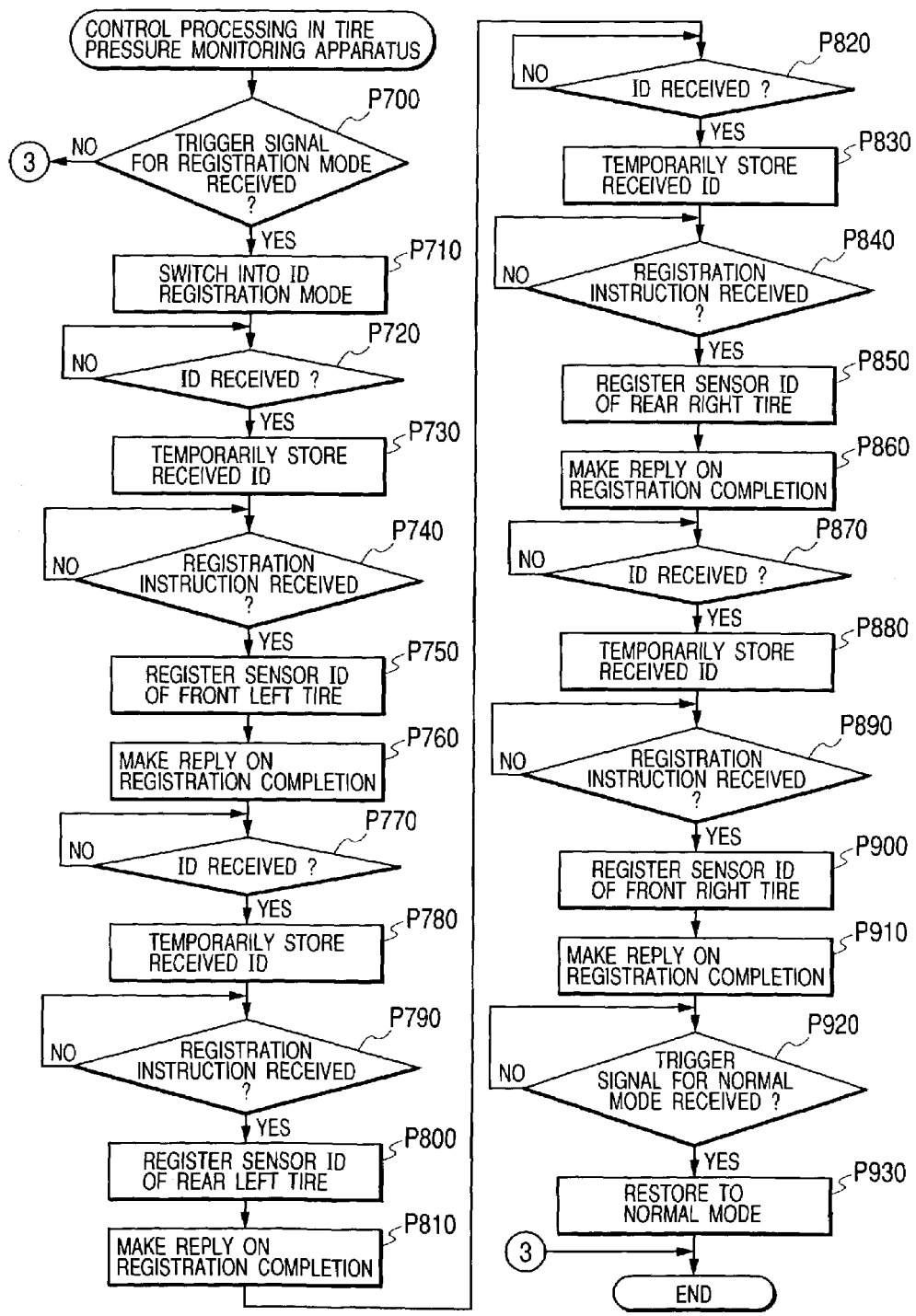
FIG. 38 is a flow chart showing the contents of the control processing in the ID registration tool for realizing the ID registration procedure shown in FIG. 34.

Furthermore, a description will be given hereinbelow of the contents of control processing to be implemented in the tire pressure monitoring apparatus 50. In this control processing, as shown in FIG. 38, a decision is made as to the reception of a trigger signal giving instruction for the switching into the ID registration mode (P700). In the case of the reception of the trigger signal calling for the switching into the ID registration mode (P700: YES), the switching into the ID registration mode is made (P710), and a decision is made on the reception of an ID (P720). In the case of the reception of the ID (S720: YES), this ID is temporarily stored in a work area of the RAM (P730). Then, a decision is made on the reception of an instruction for the ID registration (P740). In the case of the reception of the ID registration instruction (P740: YES), the ID temporarily stored in the step S730 is registered as the ID of the air pressure sensor of the front left tire in the memory 55 (P750), and a reply is made which is indicative of the completion of the ID registration (P760). Subsequently, a decision is made on the reception of an ID (P770). In the case of the reception of the ID (S770: YES), this ID is temporarily stored in a work area of the RAM (P780). Then, a decision is made on the reception of an instruction for the ID registration (P790). In the case of the reception of the ID registration instruction (P790: YES), the ID temporarily stored in S780 is registered as the ID of the air pressure sensor of the rear left tire in the memory 55 (P800), and a reply is made which is indicative of the completion of the ID registration (P820). Following this, a decision is made on the reception of an ID (P820). In the case of the reception of the ID (S820: YES), this ID is temporarily stored in a work area of the RAM (P830). Then, a decision is made on the reception of an instruction for the ID registration (P840). In the case of the reception of the ID registration instruction (P840: YES), the ID temporarily stored in S830 is registered as the ID of the air pressure sensor of the rear right tire in the memory 55 (P850), and a reply is made which is indicative of the completion of the ID registration (P860). Moreover, a decision is made on the reception of an ID (P870). In the case of the reception of the ID (S870: YES), this ID is temporarily stored in a work area of the RAM (P880). Then, a decision is made on the reception of an instruction for the ID registration (P890). In the case of the reception of the ID registration instruction (P890: YES), the ID temporarily stored in S880 is registered as the ID of the air pressure sensor of the front right tire in the memory 55 (P900), and a reply is made which is indicative of the completion of the ID registration (P910). Thereafter, a decision is made as to the reception of a trigger signal to the effect that the mode is switched into the normal mode (P920). In the case of the reception of the trigger signal calling for the switching into the normal mode (P920: YES), the mode is switched into the normal mode (P930), and the processing comes to an end.

Figure 39:
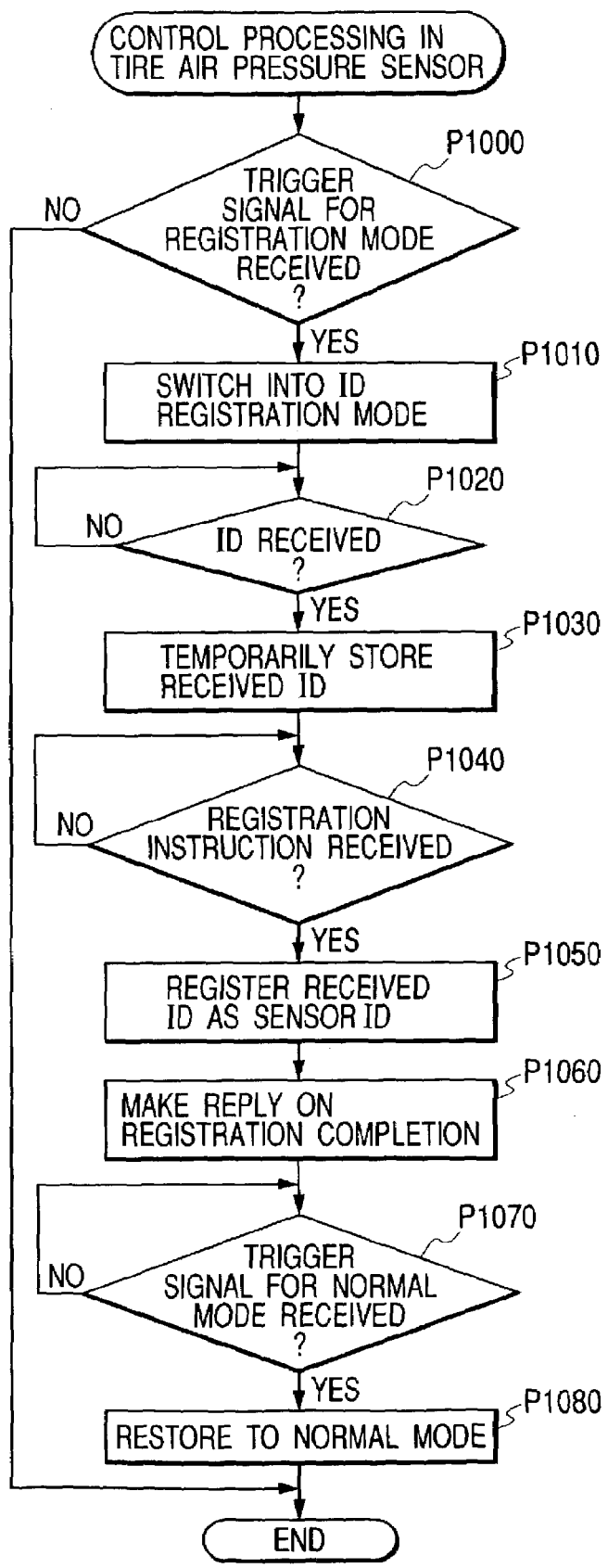
FIG. 39 is a flow chart showing the contents of control processing in a tire air pressure sensor for realizing the ID registration procedure shown in FIG. 34.

In addition, a description will be given hereinbelow of the contents of the control processing to be executed in each of the air pressure sensors 10, 20, 30 and 40. In this control processing, as shown in FIG. 39, a decision is made as to the reception of a trigger signal giving instruction for the switching into the ID registration mode (P1000). In the case of the reception of the trigger signal calling for the switching into the ID registration mode (P1000: YES), the switching into the ID registration mode is made (P1010), and a decision is made on the reception of an ID (P1020). In the case of the reception of the ID (S1020: YES), this ID is temporarily stored in a work area of the RAM (P1030). Then, a decision is made on the reception of an instruction for the ID registration (P1040). In the case of the reception of the ID registration instruction (P1040: YES), the ID temporarily stored in S1030 is registered in the ID memories 12, 22, 32 and 42 (P1050), and a reply is made which is indicative of the completion of the ID registration (P1060). Following this, a decision is made as to the reception of a trigger signal to the effect that the mode is switched into the normal mode (P1070). In the case of the reception of the trigger signal calling for the switching into the normal mode (P1070: YES), the switching into the normal mode is made (P1080), and the processing comes to an end.

In this processing, in the steps P750, P800, P850 and P900, if an ID has already been registered in the memory 55, the ID registration is implemented by overwriting. Moreover, also in the step P1050, if an ID has already been registered in the sensors 10, 20, 30 and 40, the ID registration is implemented by overwriting. Therefore, in the case of tire replacement or tire rotation, an ID newly set in a repair shop or a dealer can be re-registered in each of the sensors 10, 20, 30 and 40 and the monitoring apparatus 50.

When the above-described control processing is executed in the tire pressure monitoring apparatus 50 and each of the air pressure sensors 10, 20, 30 and 40, the air pressure sensor IDs can be registered in a state associated with the tire positions: front left, rear left, rear right and front right positions. Moreover, at this time, mistaken registration due to radio interference or the registration-impossible state due to other electric waves does not occur, unlike the conventional technique. In addition, at the tire replacement or at the tire rotation, through the above-described control processing, the sensor IDs can be registered in a state associated with the tire positions after the replacement. Still additionally, also in the case of the rotation, the ID re-registration reflecting a change of position is feasible. Yet additionally, also in this re-registration operation, the problem of the mistaken registration due to the radio interference is solvable.

Fifth Embodiment

Figure 40:
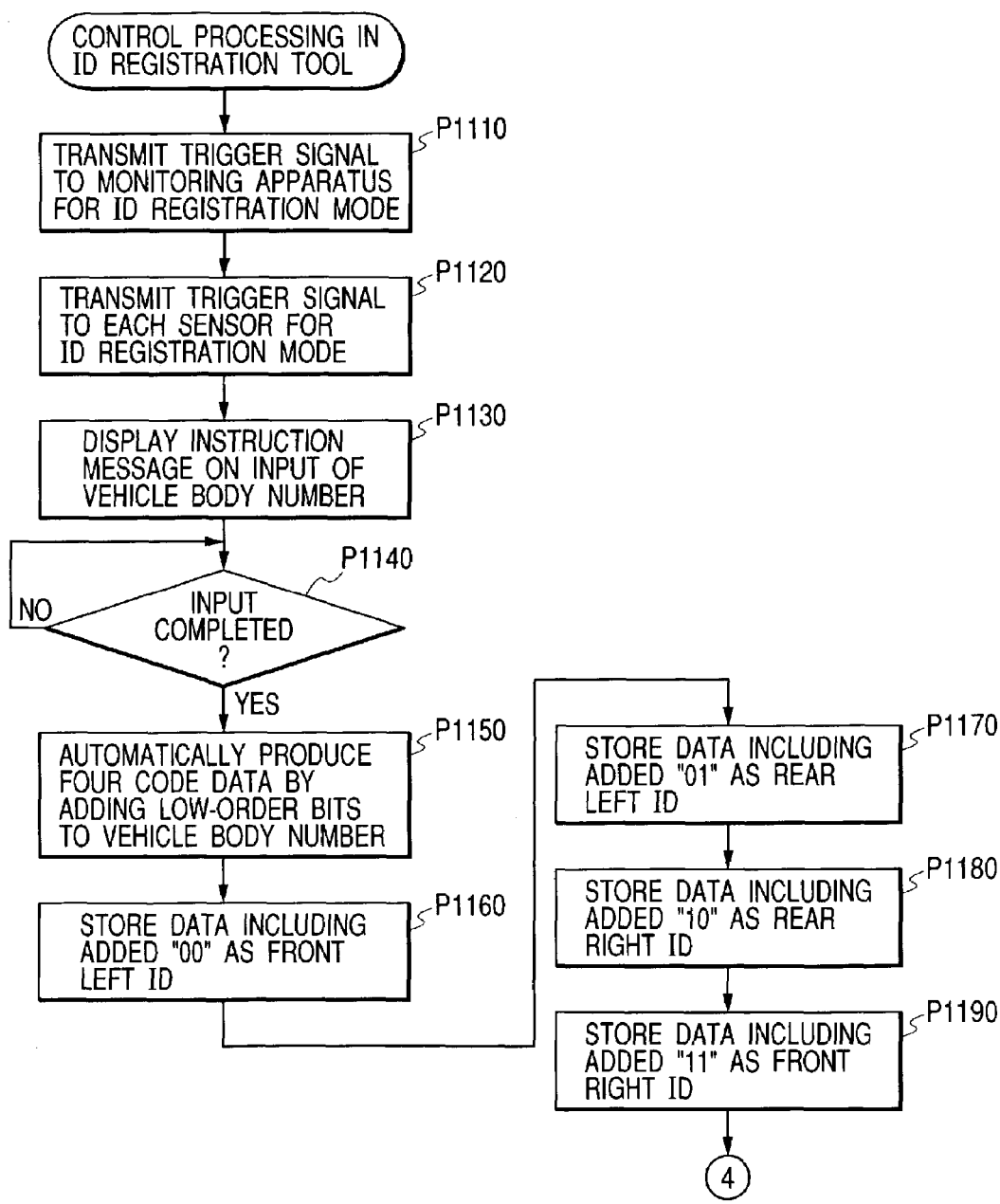
FIG. 40 is a flow chart showing the contents of control processing in an ID registration tool according to a fifth embodiment of the present invention.

Furthermore, a description will be given hereinbelow of a fifth embodiment of the present invention. In the fifth embodiment, the ID registration procedure is similar to that of the above-described fourth embodiment. The contents of a program installed in an ID registration tool 60 according to the fifth embodiment will be described hereinbelow with reference to the flow charts of FIGS. 40 to 42. The following program starts by pushing a predetermined button on a control panel 68 of the ID registration tool 60. In this program, as shown in FIG. 40, first of all, trigger signals are transmitted so that the tire air pressure sensors 10, 20, 30, 40 and the tire pressure monitoring apparatus 50 are set in an ID registration mode (P1110, P1120).

Following this, an instruction message to the effect of inputting a vehicle body number is displayed on the display 69 (P1130), and a decision is made on the input of the vehicle body number (P1140). If the decision shows the input of the vehicle body number (P1140: YES), four code data are automatically produced in a manner such that "00", "01", "10" and "11" are added as low-order bits of the vehicle body number inputted (P1150), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P1160, P1170, P1180, P1190).

Figure 41:
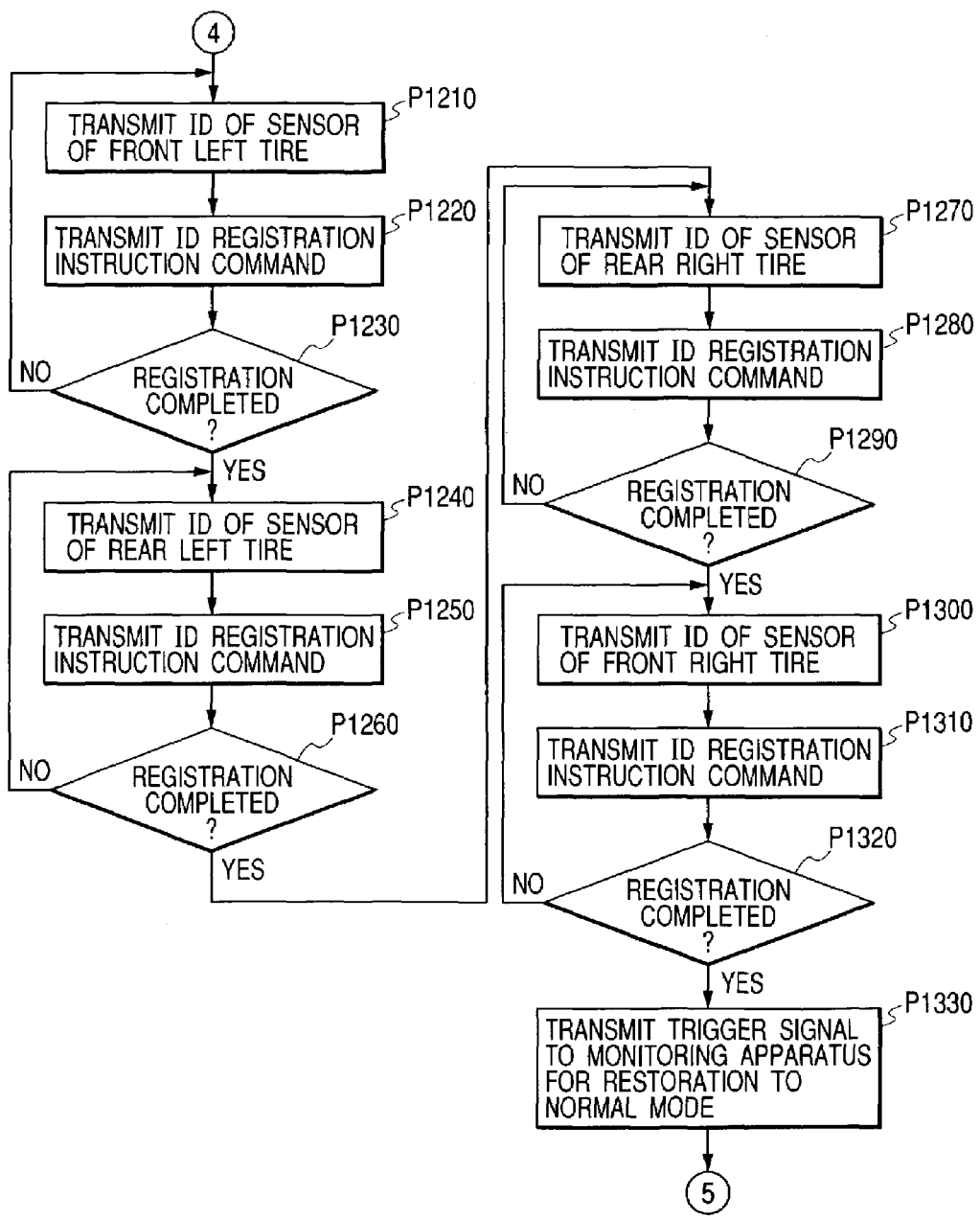
FIG. 41 is a flow chart showing the contents of the control processing in the ID registration tool according to the fifth embodiment.

In addition, as shown in FIG. 41, an ID corresponding to the air pressure sensor of the front left tire is first read out from the memory 66 and is transmitted to the tire pressure monitoring apparatus 50 (P1210), and an instruction command for the ID registration is then transmitted to the tire pressure monitoring apparatus 50 (P1220). Subsequently, a decision is made as to whether or not a reply indicative of the completion of the registration comes from the tire pressure monitoring apparatus 50 (P1230). If the reply does not come within a predetermined period of time (P1230: NO), the operational flow returns to the step P1210. On the other hand, if the registration completion reply comes therefrom (P1230: YES), an ID corresponding to the air pressure sensor of the rear left tire is read out from the memory 66 and is transmitted to the tire pressure monitoring apparatus 50 (P1240), and an instruction command for the ID registration is transmitted to the tire pressure monitoring apparatus 50 (P1250). Subsequently, a decision is made as to whether or not a reply indicative of the completion of the registration comes from the tire pressure monitoring apparatus 50 (P1260). If the reply does not come within a predetermined period of time (P1260: NO), the operational flow returns to the step P1240. On the other hand, if the registration completion reply comes therefrom (P1260: YES), an ID corresponding to the air pressure sensor of the rear right tire is read out from the memory 66 and is transmitted to the tire pressure monitoring apparatus 50 (P1270), and an instruction command for the ID registration is transmitted to the tire pressure monitoring apparatus 50 (P1280). Subsequently, a decision is made as to whether or not a reply indicative of the completion of the registration comes from the tire pressure monitoring apparatus 50 (P1290). If the reply does not come within a predetermined period of time (P1290: NO), the operational flow returns to the step P1270. On the other hand, if the registration completion reply comes therefrom (P1290: YES), an ID corresponding to the air pressure sensor of the front right tire is read out from the memory 66 and is transmitted to the tire pressure monitoring apparatus 50 (P1300), and an instruction command for the ID registration is transmitted to the tire pressure monitoring apparatus 50 (P1310). Subsequently, a decision is made as to whether or not a reply indicative of the completion of the registration comes from the tire pressure monitoring apparatus 50(P1320). If the reply does not come within a predetermined period of time (P1320: NO), the operational flow returns to the step P1300. On the other hand, if the registration completion reply comes therefrom (P1320: YES), a trigger signal for giving instruction for the restoration to the normal mode is outputted to the tire pressure monitoring apparatus 50 (P1330).

Figure 42:
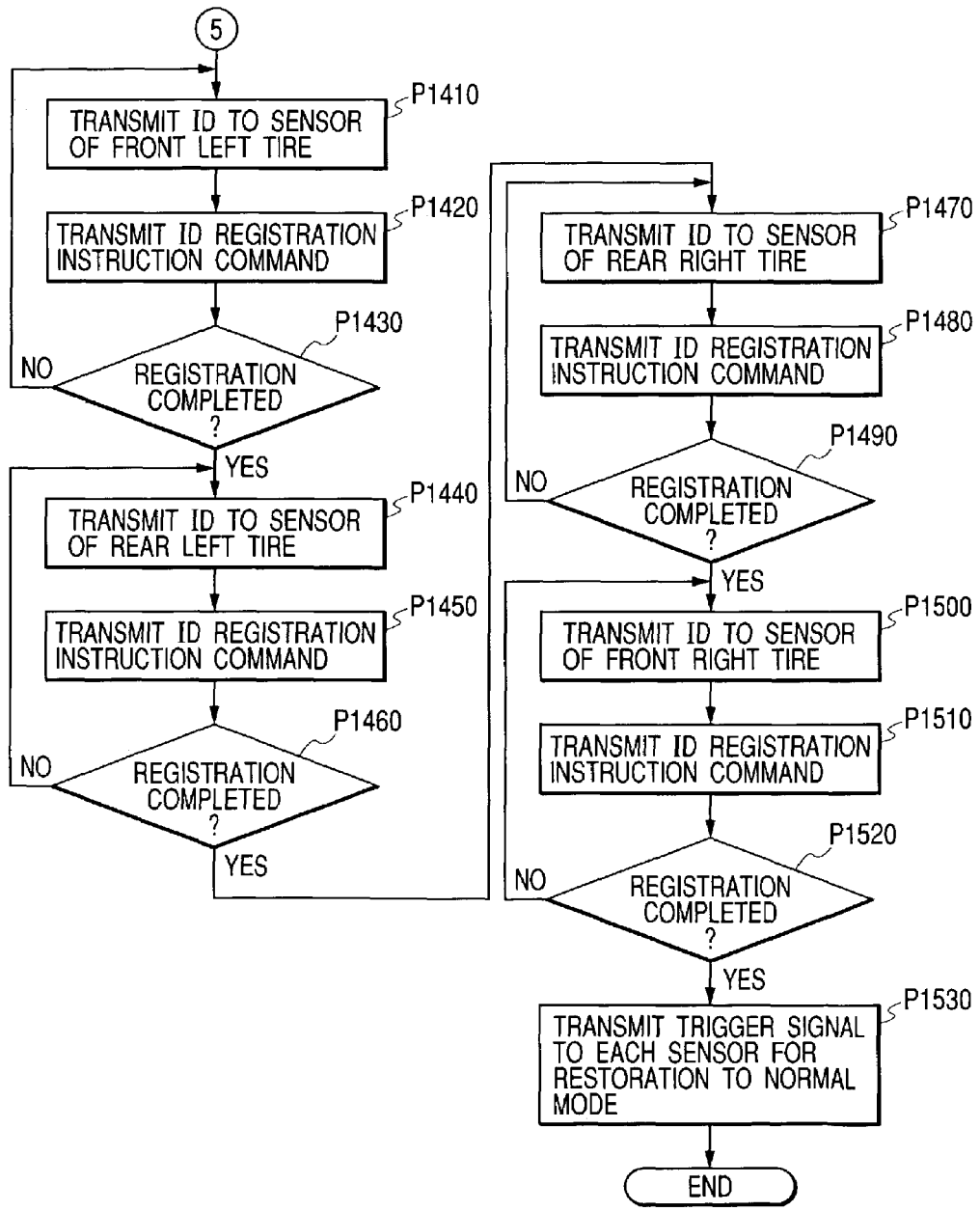
FIG. 42 is a flow chart showing the contents of the control processing in the ID registration tool according to the fifth embodiment.

Still additionally, as shown in FIG. 42, an ID corresponding to the air pressure sensor of the front left tire is read out from the memory 66 and is transmitted to the air pressure sensor 10 of the front left tire (P1410), and an instruction command for the ID registration is then transmitted to the air pressure sensor 10 (P1420). Subsequently, a decision is made as to whether or not a reply indicative of the completion of the registration comes from the air pressure sensor 10(P1430). If the reply does not come within a predetermined period of time (P1430:NO), the operational flow returns to the step P1410. On the other hand, if the registration completion reply comes therefrom (P1430: YES), an ID corresponding to the air pressure sensor of the rear left tire is read out from the memory 66 and is transmitted to the air pressure sensor 20 of the rear left tire (P1440), and an instruction command for the ID registration is transmitted to the air pressure sensor 20 (P1450). Subsequently, a decision is made as to whether or not a reply indicative of the completion of the registration comes from the air pressure sensor 20 (P1460). If the reply does not come within a predetermined period of time (P1460: NO), the operational flow returns to the step P1440. On the other hand, if the registration completion reply comes therefrom (P1460: YES), an ID corresponding to the air pressure sensor of the rear right tire is read out from the memory 66 and is transmitted to the air pressure sensor 30 of the rear right tire (P1470), and an instruction command for the ID registration is transmitted to the air pressure sensor 30 (P1480). Subsequently, a decision is made as to whether or not a reply indicative of the completion of the registration comes from the air pressure sensor 30 (P1490). If the reply does not come within a predetermined period of time (P1490: NO), the operational flow returns to the step P1470. On the other hand, if the registration completion reply comes therefrom (P1490: YES), an ID corresponding to the air pressure sensor of the front right tire is read out from the memory 66 and is transmitted to the air pressure sensor 40 of the front right tire (P1500), and an instruction command for the ID registration is transmitted to the air pressure sensor 40 (P1510). Subsequently, a decision is made as to whether or not a reply indicative of the completion of the registration comes from the air pressure sensor 40 (P1520). If the reply does not come within a predetermined period of time (P1520: NO), the operational flow returns to the step P1500. On the other hand, if the registration completion reply comes therefrom (P1520: YES), a trigger signal for giving instruction for the restoration to the normal mode is outputted to each of the air pressure sensors 10, 20, 30 and 40 (P1530), and the processing comes to an end.

The programs installed in the monitoring apparatus 50 and in the sensors 10, 20, 30 and 40 are similar to those in the above-described fourth embodiment.

According to the fifth embodiment, the ID of an air pressure sensor of each of tires is automatically produced on the basis of a vehicle body number and, hence, a peculiar ID can be registered in each of the sensors without duplicating, and the ID setting operation becomes easy. Moreover, since a different ID for each tire is automatically produced on the basis of a vehicle body number, as well as the fourth embodiment, an air pressure sensor ID can be registered in the monitoring apparatus 50 in a state associated with a tire position. Still moreover, in the case of tire replacement or tire rotation, the ID re-registration can be done with respect to only a sensor.

Sixth Embodiment

Figure 43:
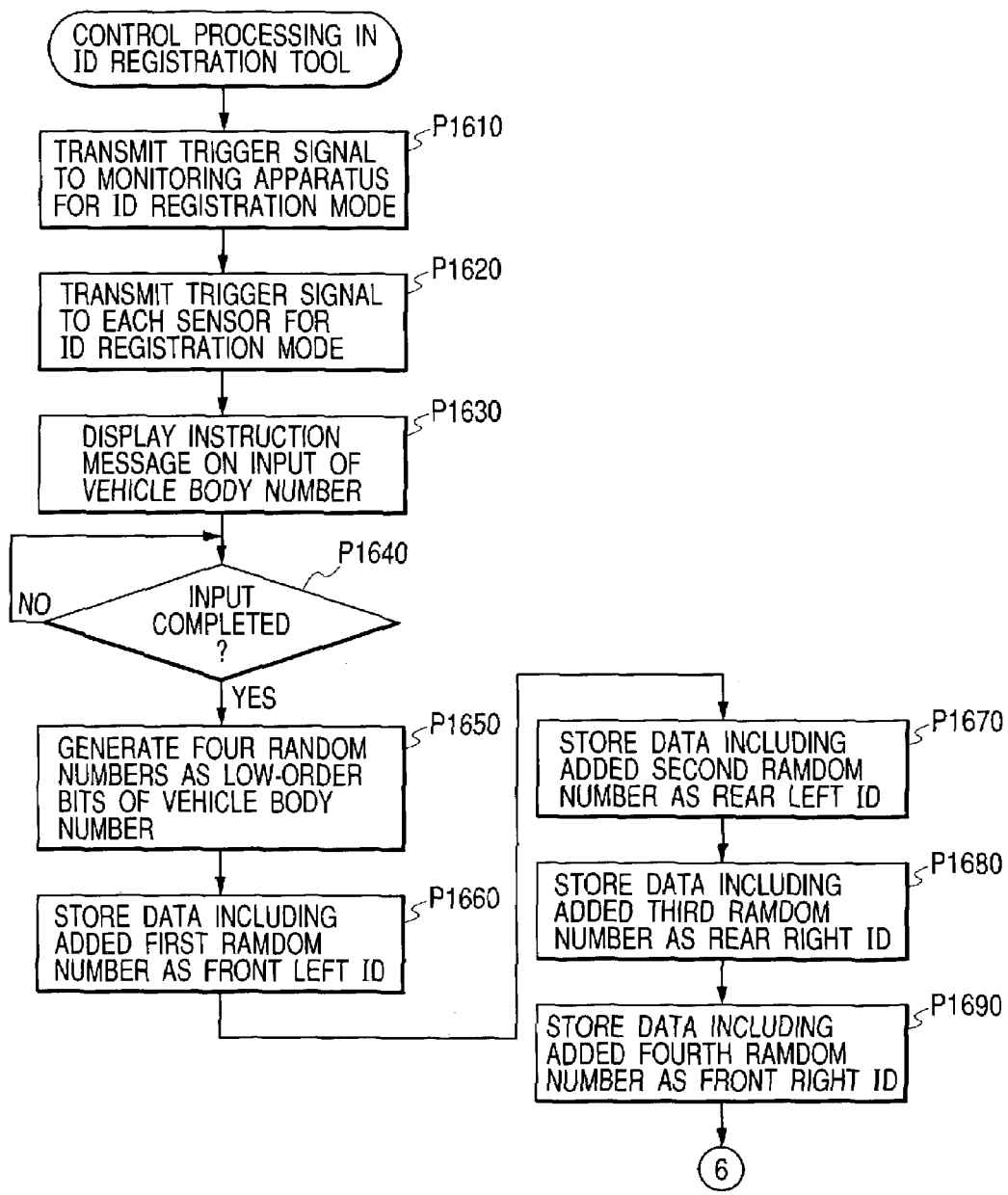
FIG. 43 is a flow chart showing the contents of control processing in an ID registration tool according to a sixth embodiment of the present invention.

Furthermore, a description will be given hereinbelow of a sixth embodiment of the present invention. The ID registration procedure of the sixth embodiment is similar to that in the fourth embodiment. The contents of a program installed in an ID registration tool 60 according to the sixth embodiment will be described hereinbelow with reference to the flow charts of FIGS. 43 to 45. The following program starts by pushing a predetermined button on a control panel 68 of the ID registration tool 60. In this program, as shown in FIG. 43, first of all, trigger signals are transmitted so that the tire air pressure sensors 10, 20, 30, 40 and the tire pressure monitoring apparatus 50 are set in an ID registration mode (P1610, P1620).

Following this, an instruction message to the effect of inputting a vehicle body number is displayed on the display 69 (P1630), and a decision is made as to the input of the vehicle body number (P1640). If the decision indicates the input of the vehicle body number (P1640: YES), a random-number generating unit generates first to fourth random numbers (P1650). Moreover, in the memory 66, data in which the first random number is added as a low-order bit of the vehicle body number is stored as an ID for the front left tire, data including the added second random number as an ID for the rear left tire, data including the added third random number as an ID for the rear right tire, and data including the added fourth random number as an ID for the front right tire (P1660, P1670, P1680, P1690).

Figure 44:
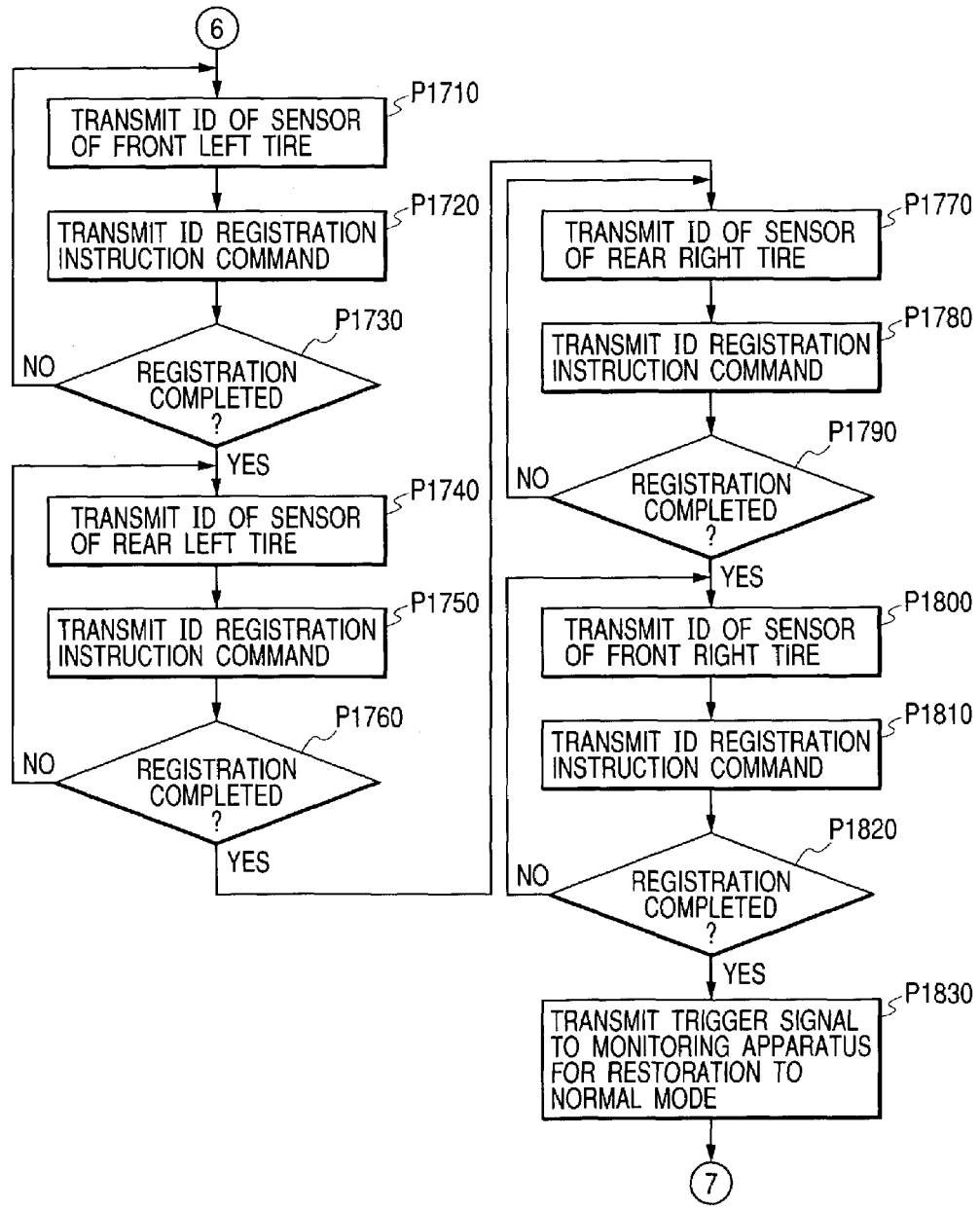
FIG. 44 is a flow chart showing the contents of the control processing in the ID registration tool according to the sixth embodiment.
Figure 45:
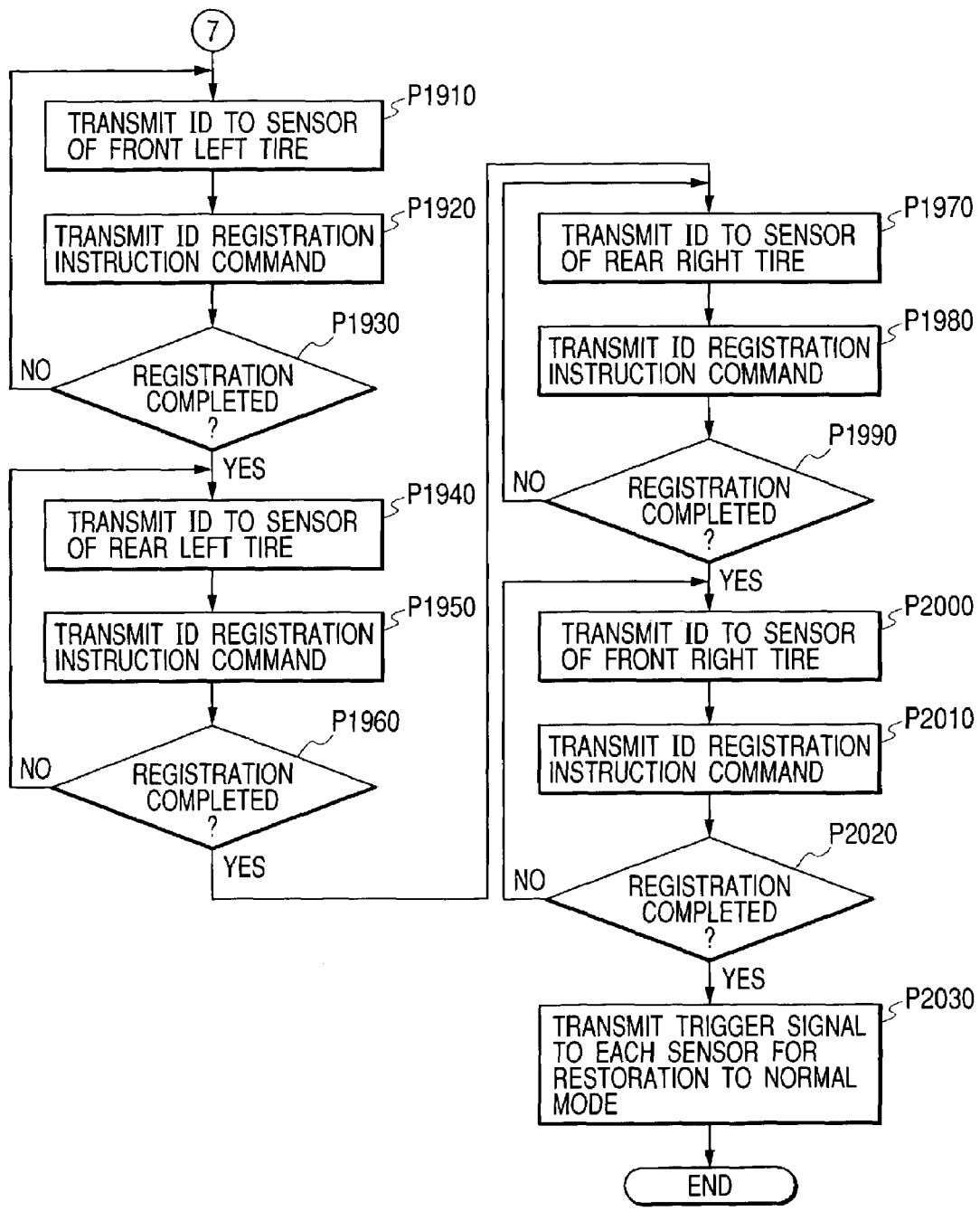
FIG. 45 is a flow chart showing the contents of the control processing in the ID registration tool according to the sixth embodiment.

Thereafter, the processing similar to the step P1210 and subsequent processing in the fifth embodiment is implemented as shown in FIGS. 44 and 45 (P1710 to P1830, P1910 to P2030).

The programs installed in the monitoring apparatus 50 and in the sensors 10, 20, 30 and 40 are similar to those in the above-described fourth embodiment.

Also in the sixth embodiment, the IDs of the air pressure sensors of the tires are automatically produced on the basis of a vehicle body number and four random numbers generated in the random-number generating unit of the tool 60 and, hence, a peculiar ID can be registered in each of the sensors without duplicating, and the ID setting operation becomes easy. Moreover, since a different ID for each tire is automatically produced, as well as the fourth embodiment, an air pressure sensor ID can be registered in the monitoring apparatus 50 in a state associated with a tire position.

Seventh Embodiment

Figure 46:
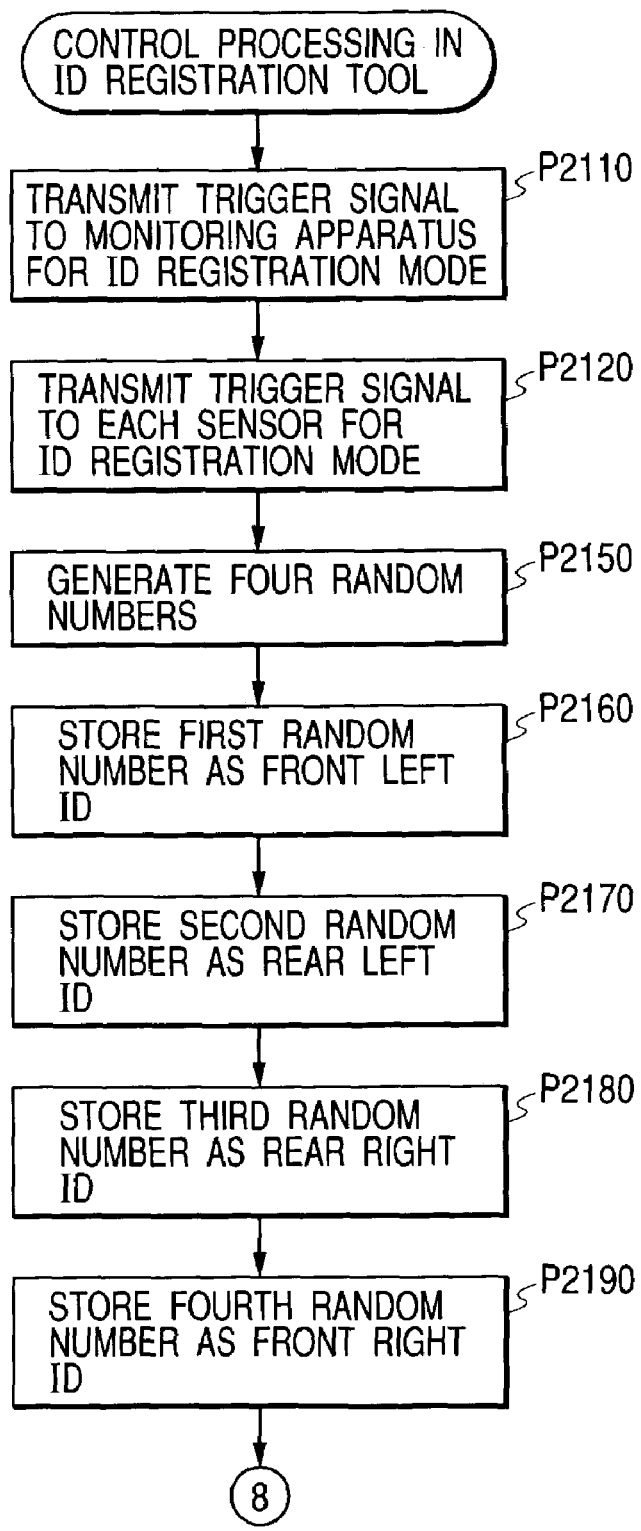
FIG. 46 is a flow chart showing the contents of control processing in an ID registration tool according to a seventh embodiment of the present invention.

Furthermore, a description will be given hereinbelow of a seventh embodiment of the present invention. In the seventh embodiment, the ID registration procedure is similar to that of the above-described fourth embodiment. The contents of a program installed in an ID registration tool 60 according to the seventh embodiment will be described hereinbelow with reference to the flow charts of FIGS. 46 to 48. The following program starts by pushing a predetermined button on a control panel 68 of the ID registration tool 60. In this program, as shown in FIG. 46, first of all, trigger signals are transmitted so that the tire air pressure sensors 10, 20, 30, 40 and the tire pressure monitoring apparatus 50 are set in an ID registration mode (P2110, P2120).

Following this, four, i.e., first to fourth, random numbers are generated through the use of the random-number generating unit (P2150). The first random number is stored as an ID for the front left tire, the second random number as an ID for the rear left tire, the third random number as an ID for the rear right tire, and the fourth random number as an ID for the front right tire (P2160, P2170, P2180, P2190).

Figure 47:
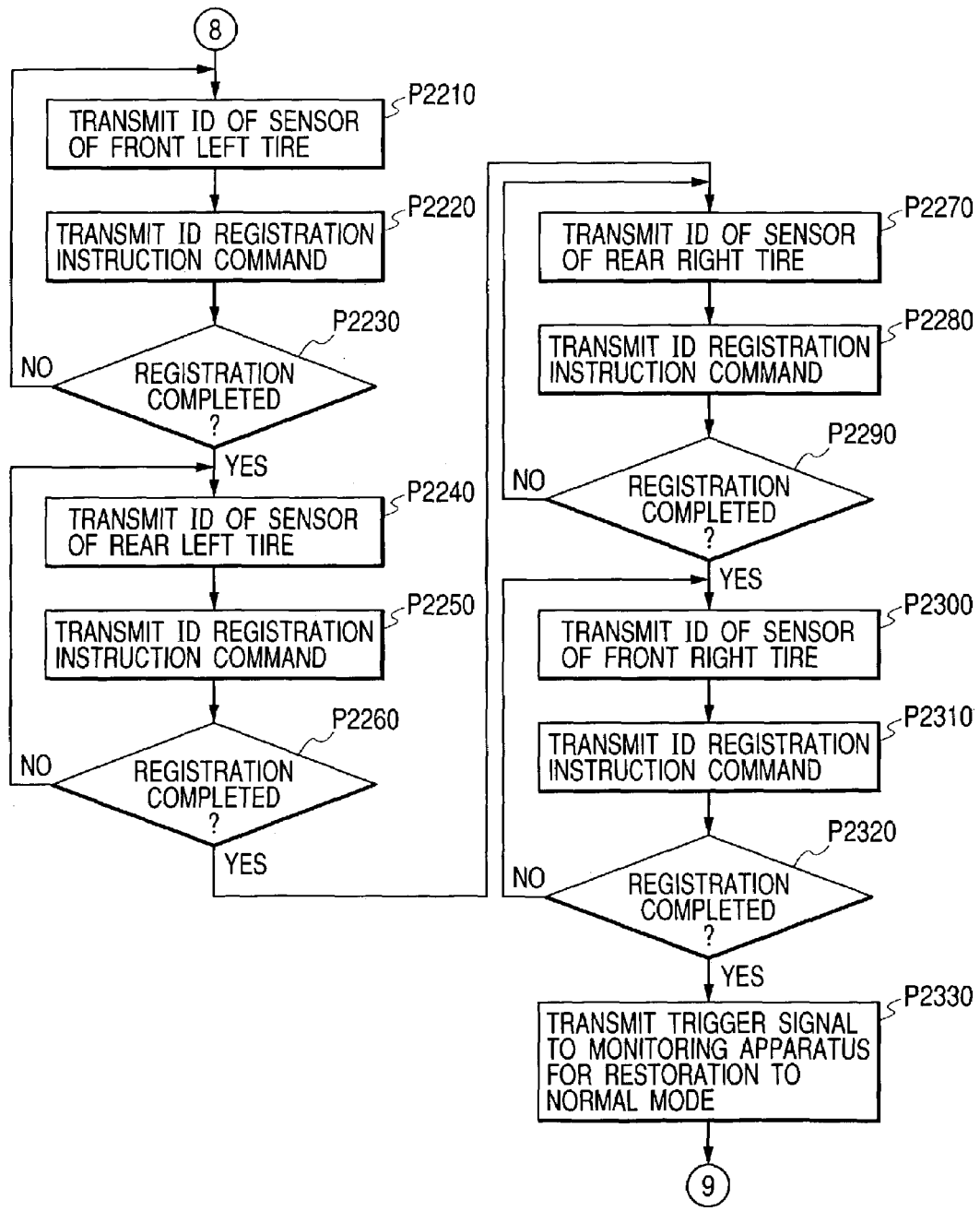
FIG. 47 is a flow chart showing the contents of the control processing in the ID registration tool according to the seventh embodiment.
Figure 48:
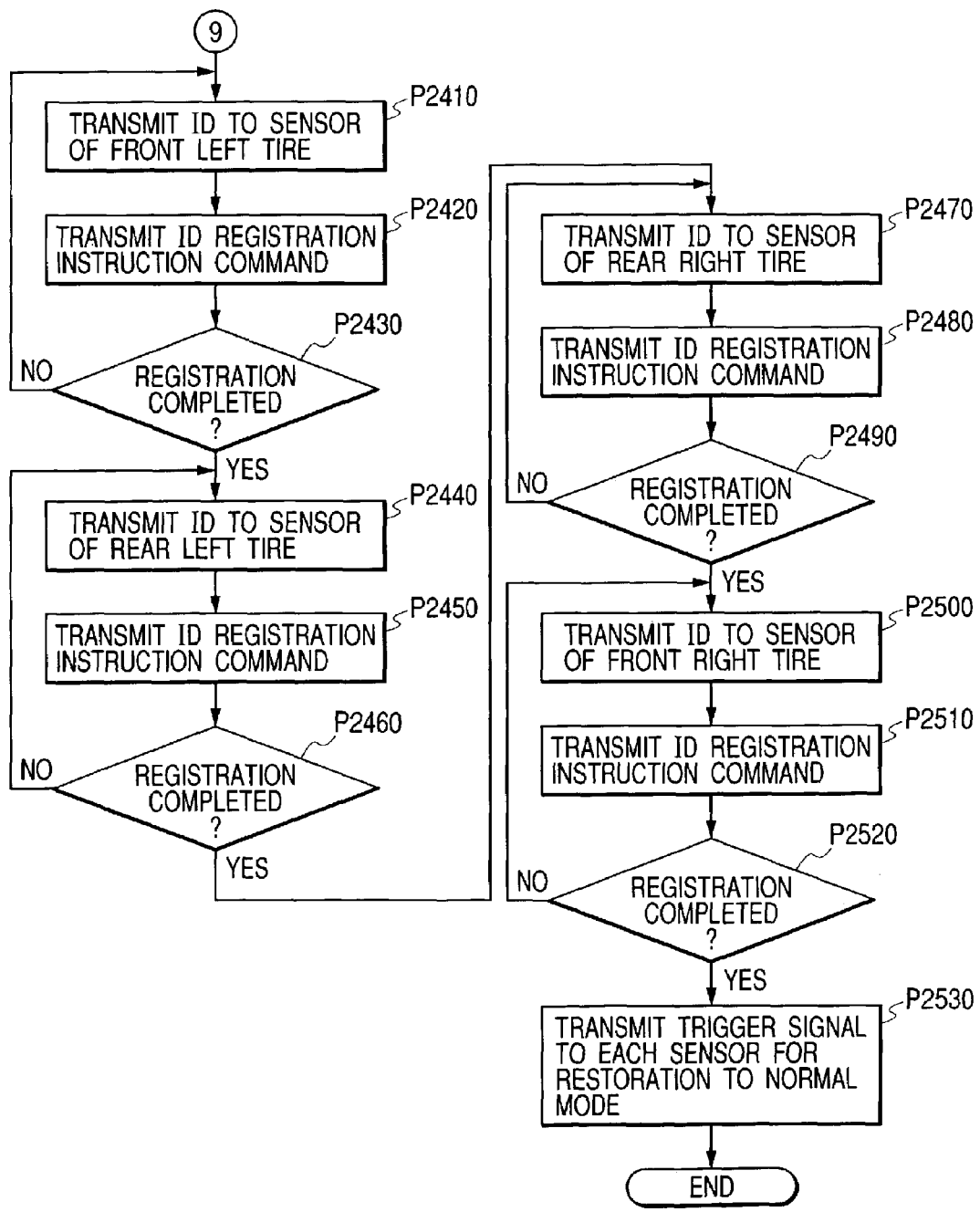
FIG. 48 is a flow chart showing the contents of the control processing in the ID registration tool according to the seventh embodiment.

Thereafter, the processing similar to the step P1210 and subsequent processing in the fifth embodiment is implemented as shown in FIGS. 47 and 48 (P2210 to P2230, P2410 to P2530).

The programs installed in the monitoring apparatus 50 and in the sensors 10, 20, 30 and 40 are similar to those in the above-described fourth embodiment.

Also in the seventh embodiment, the IDs of the air pressure sensors of the tires are automatically produced on the basis of the four random numbers generated in the random-number generating unit of the tool 60 and, hence, a peculiar ID can be registered in each of the sensors without duplicating, and the ID setting operation becomes easy. Moreover, since a different ID for each tire is automatically produced, as well as the fourth embodiment, an air pressure sensor ID can be registered in the monitoring apparatus 50 in a state associated with a tire position.

Eighth Embodiment

Figure 49:
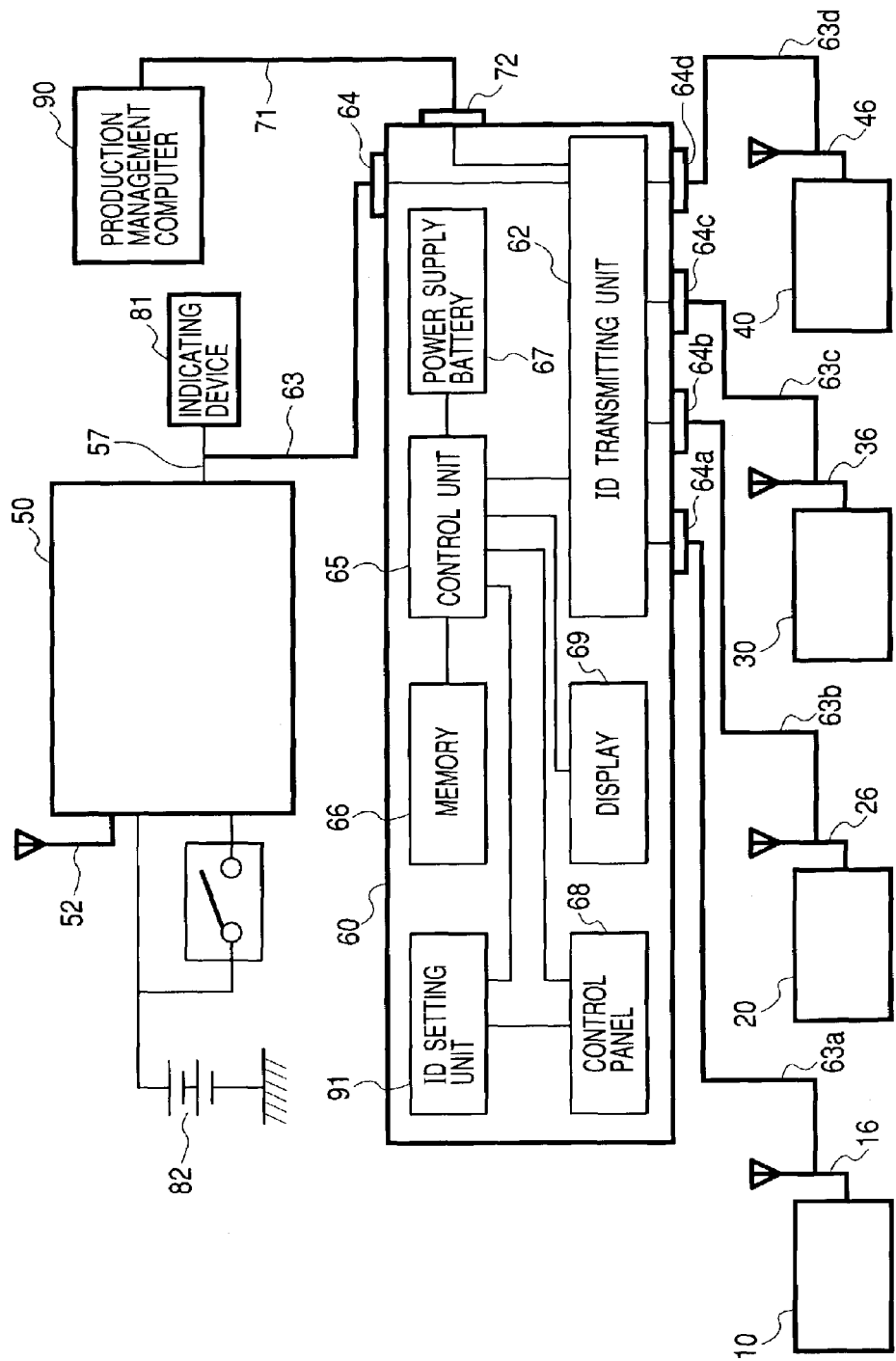
FIG. 49 is an illustrative view showing an apparatus configuration for ID registration according to an eighth embodiment of the present invention.

A description will be given hereinbelow of an eighth embodiment of the present invention. In the eighth embodiment, as shown in FIG. 49, in addition to connectors 64, 64a, 64b, 64c and 64d for making connections through signal lines 63, 63a, 63b, 63c and 63d to the tire pressure monitoring apparatus 50 and the respective air pressure sensors 10, 20, 30 and 40, an ID registration tool 60 is equipped with a connector 72 for a signal line 71 for making a connection to a production management computer 90. This ID registration tool 60 is designed to set an ID on the basis of production management information given from the production management computer 90 through the signal line 71.

Figure 50:
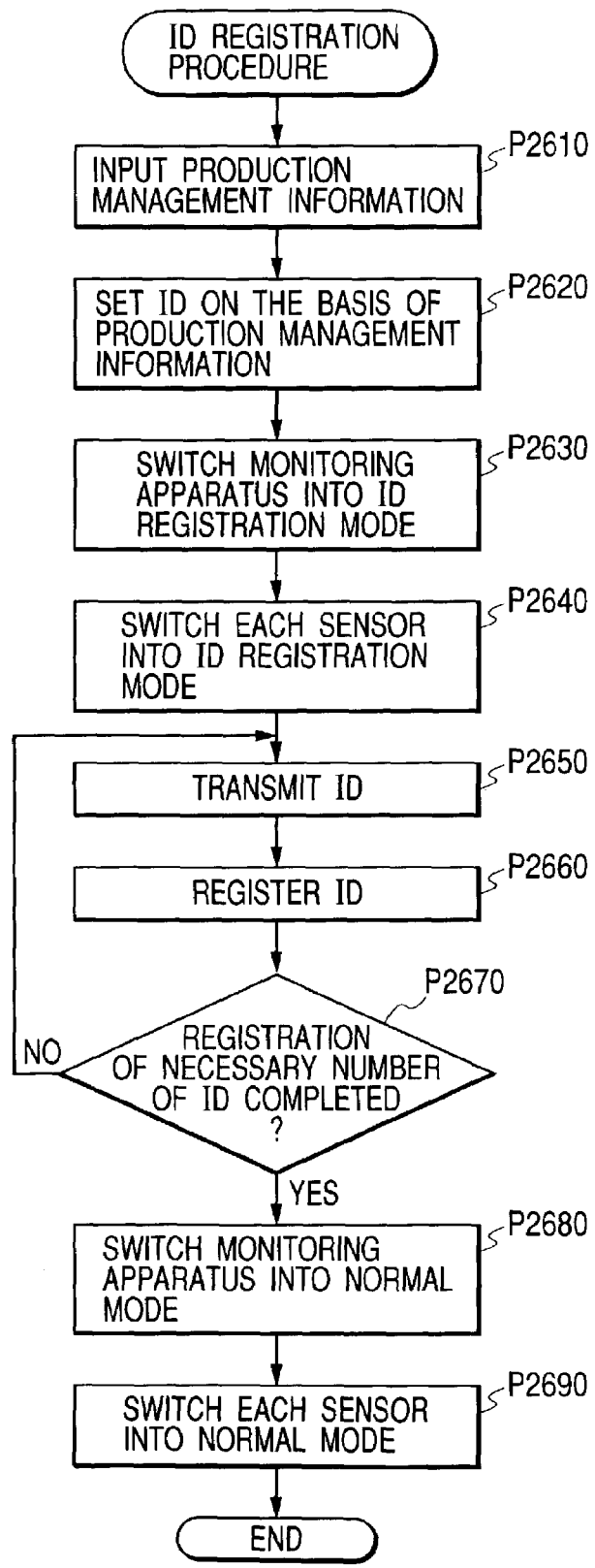
FIG. 50 is a flow chart showing an ID registration procedure according to the eighth embodiment.

In the registration operation, as shown in FIG. 50, first of all, production management information from the production management computer 90 is inputted thereto (P2610), and an ID is set on the basis of this production management information (P2620). Then, the monitoring apparatus 50 is switched into an ID registration mode (P2630), and each of the sensors 10, 20, 30 and 40 are also switched into an ID registration mode (P2640). Moreover, the ID is transmitted to the monitoring apparatus 50 and each of the sensors 10, 20, 30 and 40 (P2650). Upon receipt of this ID, the monitoring apparatus 50 and each of the sensors 10, 20, 30 and 40 implement the ID registration (P2660). Still moreover, a decision is made as to whether or not the ID registration in the monitoring apparatus 50 and the sensors 10, 20, 30 and 40 reach completion (P2670). In the case of the completion of the ID registration (P2670: YES), the monitoring apparatus 50 is switched into the normal mode (P2680) and each of the sensors 10, 20, 30 and 40 is also switched into the normal mode (P2690), and the ID registration operation comes to an end.

Figure 51:
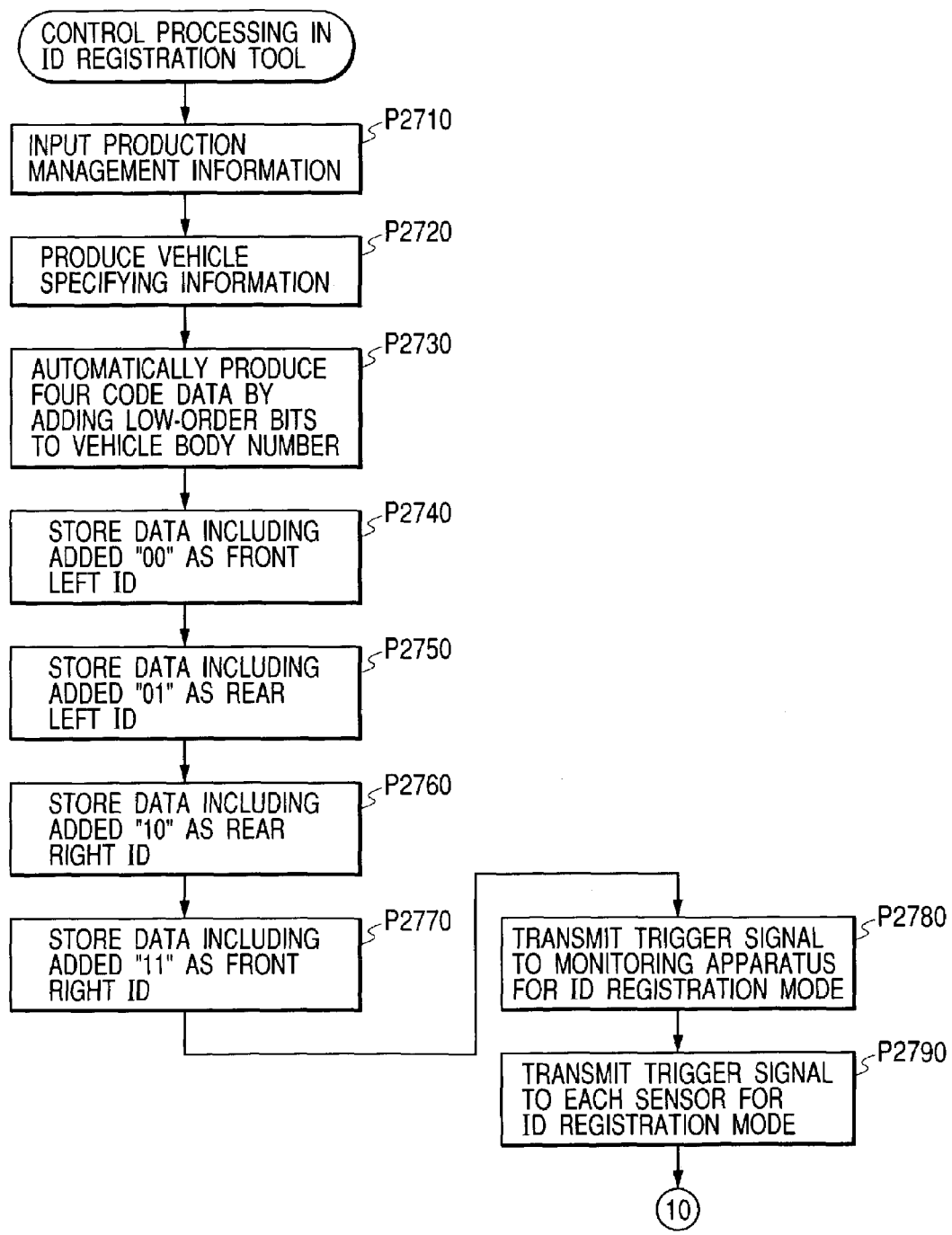
FIG. 51 is a flow chart showing the contents of control processing in an ID registration tool according to the eighth embodiment.

Furthermore, referring to FIGS. 51 to 53, a description will be given hereinbelow of the contents of a program installed in the ID registration tool for conducting the above-described registration operation. The following program starts by pushing a predetermined button on the control panel 68 of the ID registration tool 60. In this program, as shown in FIG. 51, production management information is inputted from the production management computer 90 (P2710). In this case, as the production management information, various types of information for the production management, such as a vehicle production number, a lot number and a vehicle type, are inputted thereto. Subsequently, vehicle specifying information for specifying a vehicle is produced on the basis of this production management information (P2720). For example, as the vehicle specifying information, there is produced code data, pertaining to a vehicle, which is a combination of a vehicle production number, a lot number and a vehicle type. Following this, four code data are automatically produced in a manner such that "00", "01", "10" and "11" are added as low-order bits of the vehicle-peculiar code data (P2730), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P2740, P2750, P2760, P2770). After the ID setting reaches completion in this way, trigger signals are transmitted so that the tire pressure monitoring apparatus 50 and each of the sensors 10, 20, 30 and 40 are set in an ID registration mode (P2780, P2790).

Figure 52:
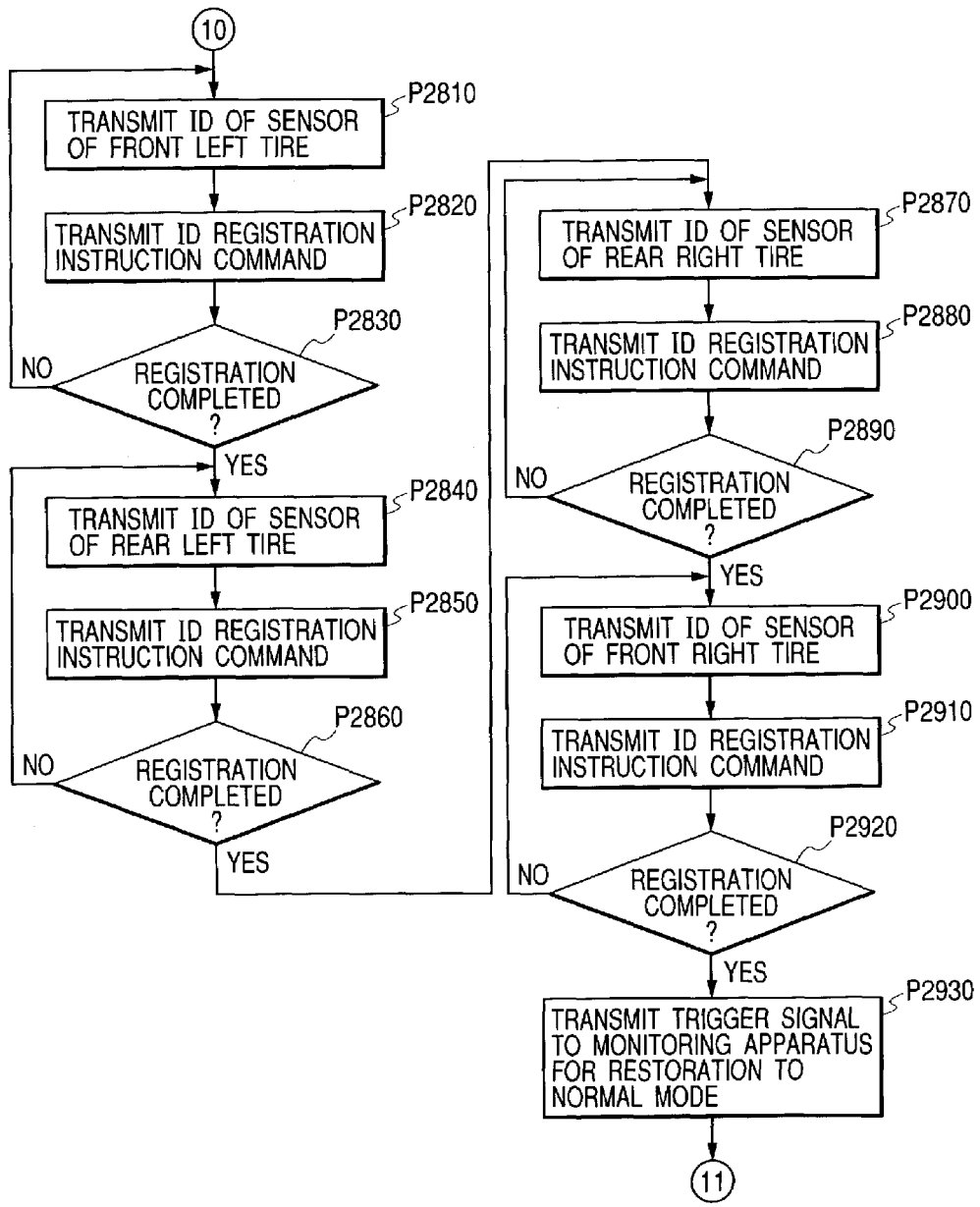
FIG. 52 is a flow chart showing the contents of the control processing in the ID registration tool according to the eighth embodiment.
Figure 53:
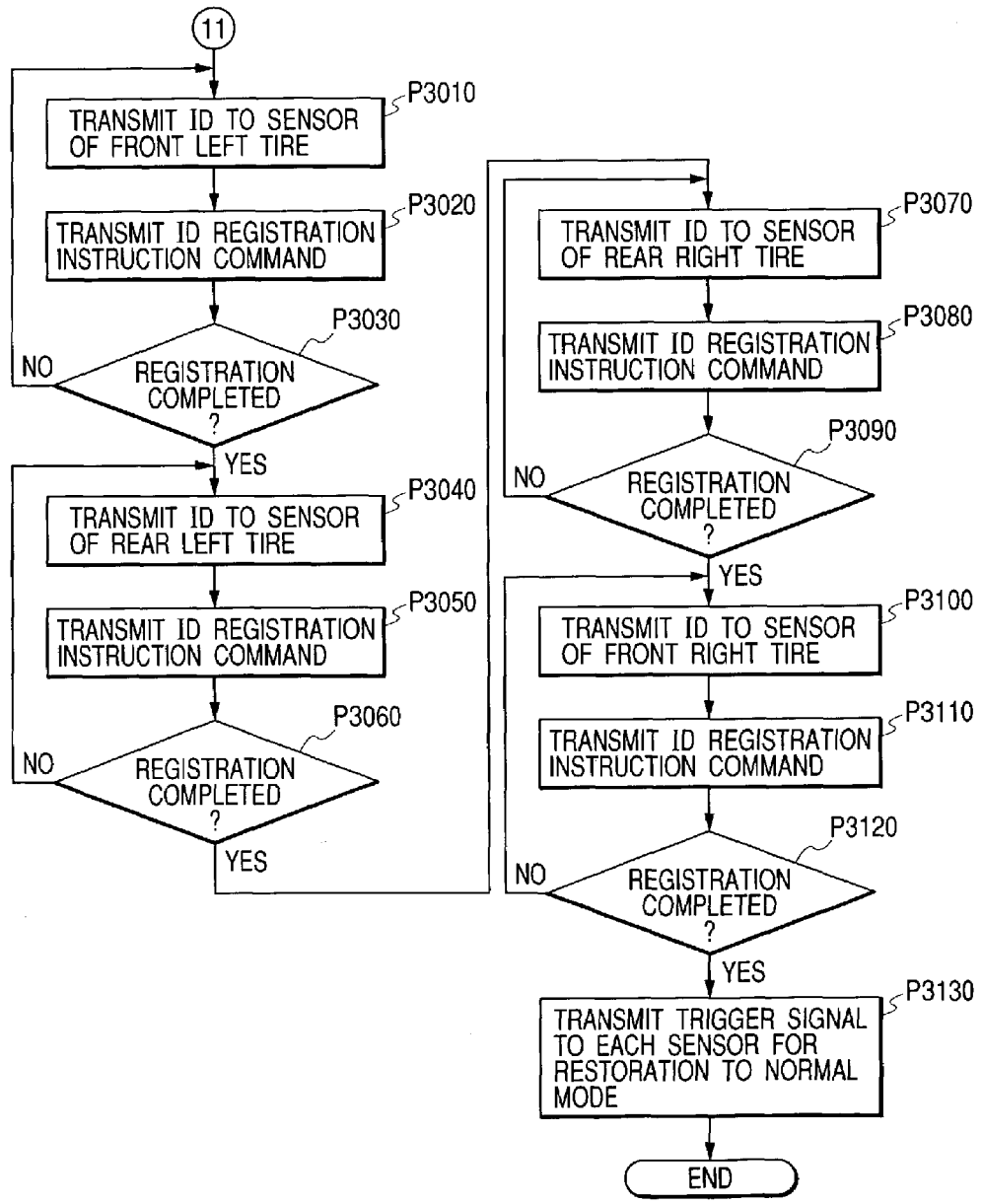
FIG. 53 is a flow chart showing the contents of the control processing in the ID registration tool according to the eighth embodiment.

Thereafter, the processing similar to the step P1210 and subsequent processing in the fifth embodiment is implemented as shown in FIGS. 52 and 53 (P2810 to P2930, P3010 to P3130).

The programs installed in the monitoring apparatus 50 and in the sensors 10, 20, 30 and 40 are similar to those in the above-described fourth embodiment.

According to the eighth embodiment, the ID of an air pressure sensor of each of tires is automatically produced and set on the basis of the production management information given from the production management computer 90 and, hence, a peculiar ID can be registered in each of the sensors without duplicating, and the ID setting operation becomes easy. Moreover, since a different ID for each tire is automatically produced, as well as the fourth embodiment, an air pressure sensor ID can be registered in the monitoring apparatus 50 in a state associated with a tire position. Still moreover, since the ID is produced in the form of including a lot number or a vehicle type, it is expectable to offer the effects of smoothly specifying a vehicle type or lot in which a sensor failure has occurred.

Ninth Embodiment

Figure 54:
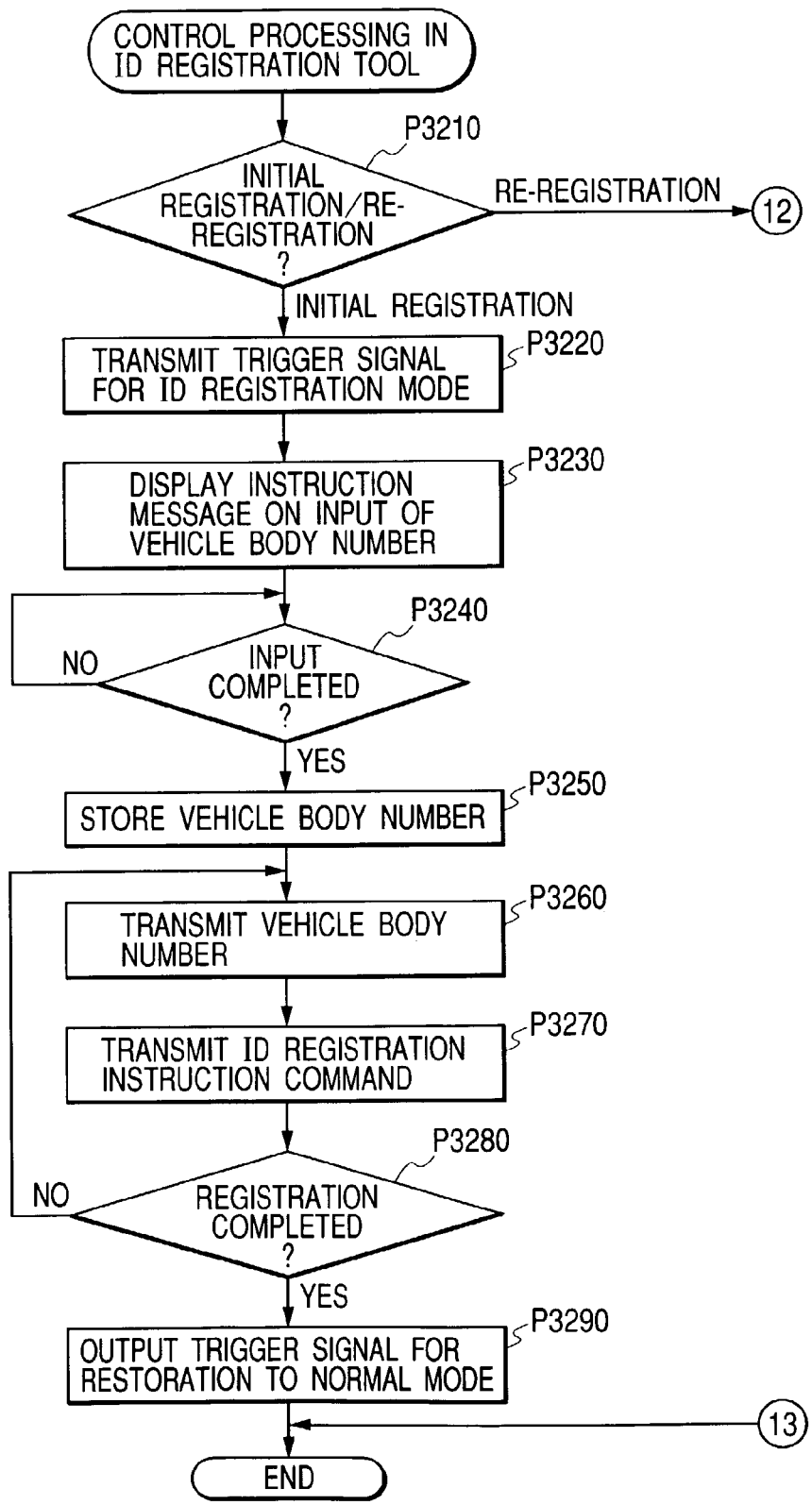
FIG. 54 is a flow chart showing the contents of control processing in an ID registration tool according to a ninth embodiment of the present invention.

Furthermore, a description will be given hereinbelow of a ninth embodiment of the present invention. First, referring to flow charts of FIGS. 54 and 55, a description will be given hereinbelow of the contents of a program installed in an ID registration tool 60 according to the ninth embodiment. The following program starts by pushing a predetermined button on a control panel 68 of the ID registration tool 60. In this program, a decision as to whether for the initial registration or for re-registration is made as shown in FIG. 54, (P3210). The decision as to whether for the initial registration or for the re-registration can depend on a manner such that an initial-registration button and a re-registration button are provided on the control panel 68 and a judgment is made on which of the initial-registration button and the re-registration button is depressed for activating this program. If the decision shows the initial registration (P3210: initial registration), trigger signals are transmitted so that the tire air pressure sensors 10, 20, 30, 40 and the tire pressure monitoring apparatus 50 are set in an ID registration mode (P3220).

Following this, an instruction message to the effect of inputting a vehicle body number is displayed on the display 69 (P3230), and a decision is made as to the input of the vehicle body number (P3240). If the decision indicates the input of the vehicle body number (P3240: YES), the vehicle body number is stored in the memory 66 (P3250).

Subsequently, the vehicle body number is read out from the memory 66 and is then transmitted to all the air pressure sensors 10, 20, 30 and 40 and the tire pressure monitoring apparatus 50 (P3260), and an instruction command for the ID registration is transmitted to the air pressure sensors 10, 20, 30 and 40 and the tire pressure monitoring apparatus 50 (S3270). A decision is made as to whether or not replies indicative of the completion of the registration come from the air pressure sensors 10, 20, 30 and 40 and the tire pressure monitoring apparatus 50 (P3280). If this reply does not come within a predetermined period of time (P3280: NO), the operational flow returns to the step P3260. On the other hand, if the registration completion reply comes therefrom (P3280: YES), a trigger signal calling for the restoration to the normal mode is outputted to the air pressure sensors 10, 20, 30 and 40 and the tire pressure monitoring apparatus 50 (P3290), and the processing comes to an end.

Figure 55:
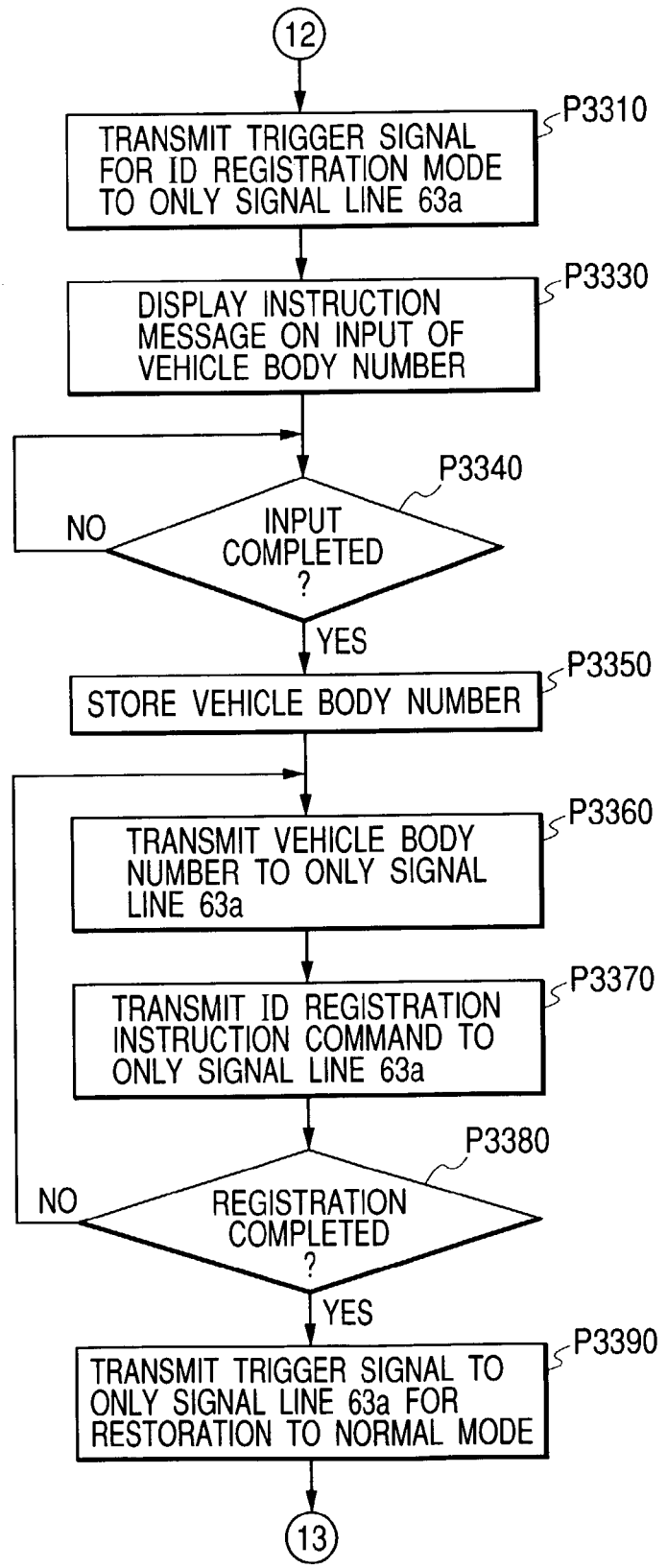
FIG. 55 is a flow chart showing the contents of the control processing in the ID registration tool according to the ninth embodiment.

On the other hand, the decision at the program activation indicates the re-registration(P3210: re-registration), the operational flow proceeds to the processing of FIG. 55 and a trigger signal is transmitted so that an ID registration mode is set with respect to only the signal line 63*a* (P3310). Subsequently, an instruction message to the effect of inputting a vehicle body number is displayed on the display 69 (P3330), and a decision is made on the input of the vehicle body number (P3340). If the decision indicates the input of the vehicle body number (P3340: YES), this vehicle body number is stored in the memory 66 (P3350).

Following this, the vehicle body number is read out from the memory 66 and is transmitted through the signal line 63*a* (P3360), and an instruction command for the ID registration is transmitted through the signal line 63*a* (P3370). A decision is made as to whether or not a reply indicative of the completion of the registration comes through the signal line 63*a* (P3380). If this reply does not come within a predetermined period of time (P3380: NO), the operational flow returns to the step P3360. On the other hand, if the registration completion reply comes therefrom (P3380: YES), a trigger signal for giving instruction for the restoration to the normal mode is outputted through the signal line 63*a* (P3390), and the processing comes to an end.

In this connection, according to this embodiment, at the time of the re-registration, the signal line 63*a* is made to be connected to-the air pressure sensor of the tire subjected to the re-registration.

Figure 56:
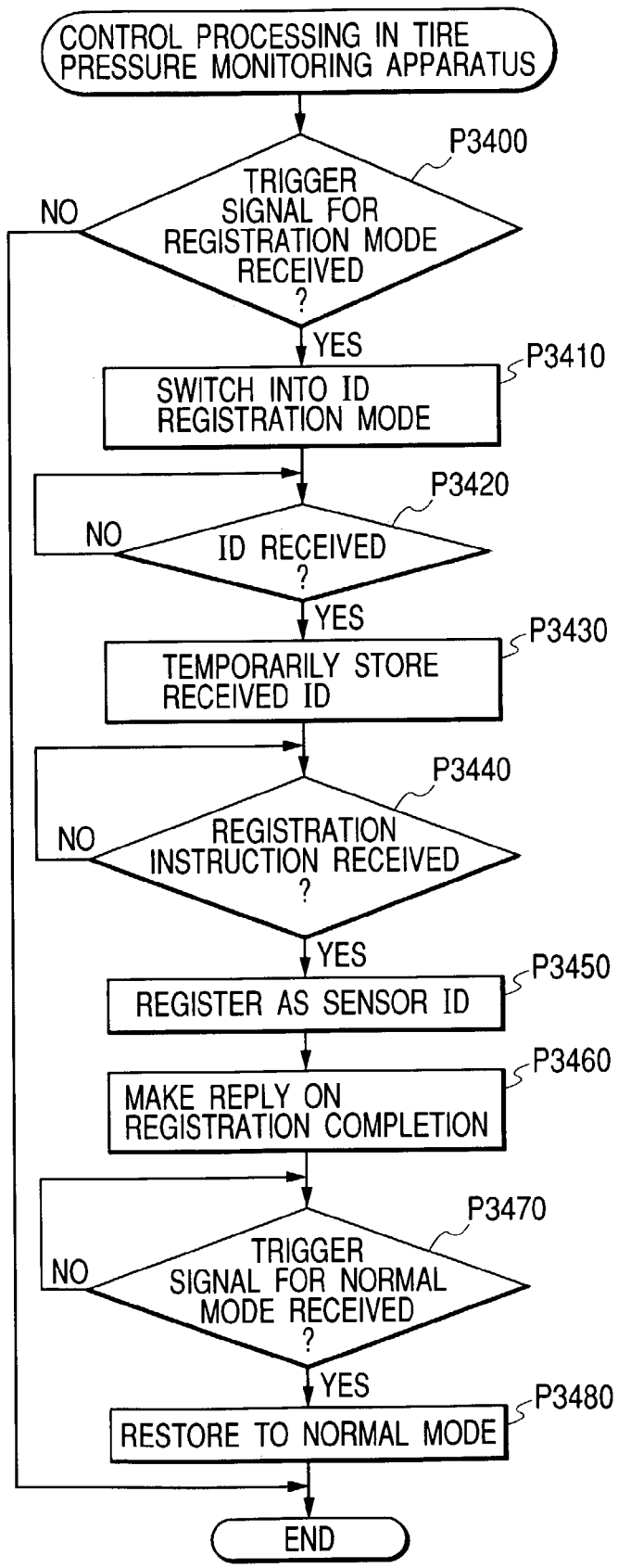
FIG. 56 is a flow chart showing the contents of control processing in a tire pressure monitoring apparatus according to the ninth embodiment.

Meanwhile, a program shown in FIG. 56 is installed in the tire pressure monitoring apparatus 50. That is, a decision is made as to the reception of a trigger signal calling for the switching into the ID registration mode (P3400). If the decision indicates the reception of the trigger signal calling for the switching into the ID registration mode (P3400: YES), the switching into the ID registration mode is made (P3410), and a decision is made on the reception of an ID (P3420). In the case of the ID reception (P3420: YES), this ID is temporarily stored in a work area of the RAM (P3430), and a decision is made on the reception of an instruction on the ID registration (P3440). In the case of the reception of the ID registration instruction (P3440: YES), the ID temporarily stored in P3430 is registered as an ID of the air pressure sensor in the memory 55 (P3450), and a reply indicative of the ID registration completion is made (P3460). Following this, a decision is made on the reception of a trigger signal to the effect that the mode is switched into the normal mode (P3470). In the case of the reception of the trigger signal calling for the switching into the normal mode (P3470: YES), the switching into the normal mode is made (P3480), and the processing comes to an end.

Incidentally, the program installed in each of the air pressure sensors 10, 20, 30 and 40 is similar that in the fourth embodiment.

According to the ninth embodiment, a vehicle body number is registered as an ID in each of the air pressure sensors 10, 20, 30 and 40 and the monitoring apparatus 50. Accordingly, the discrimination from air pressure sensors of different vehicles becomes securely feasible. Although the identification of the position of a tire being a monitoring object is unfeasible unlike the above-described fourth to eighth embodiment, a judgment can be made that an abnormality exists in any one of the tires, thus sufficiently achieving a function as a tire pressure monitoring system.

Moreover, as in the case of the fourth to eighth embodiments, the mistaken registration due to the radio interference in the ID registration is surely avoidable. Still moreover, since the ID registration is made on the basis of a vehicle body number, as mentioned above, in the case of the tire replacement in a repair shop or the like, the ID registration can be done with respect to only the replacing tire, which improves the working efficiency of the ID registration operation at the tire replacement.

Tenth Embodiment

Figure 57:
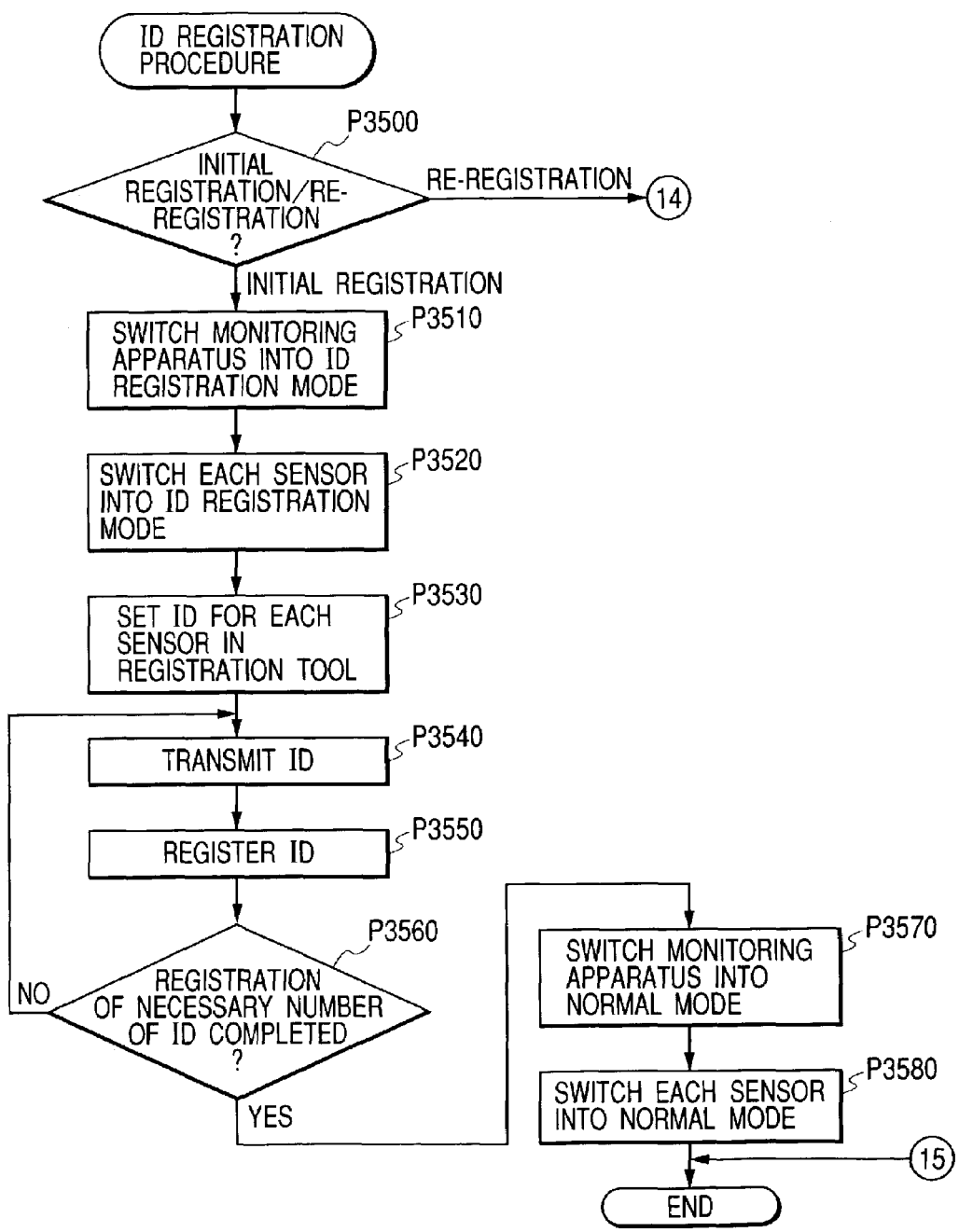
FIG. 57 is a flow chart showing an ID registration procedure according to a tenth embodiment of the present invention.

Furthermore, a tenth embodiment of the present invention will be described hereinbelow with reference to flow charts of FIGS. 57 and 58. According to the tenth embodiment, as shown in FIG. 57, a decision is made as to whether it is the initial registration or re-registration (P3500). In the case of the initial registration (P3500: initial registration), the monitoring apparatus 50 is switched into an ID registration mode (P3510), and each of the sensors 10, 20, 30 and 40 is also switched into an ID registration mode (P3520). Moreover, an ID for each sensor is set in registration tool (P3530). At this time, the ID is set as information on a combination of a vehicle body number, production number or the like, peculiar to the vehicle, and the tire position. The ID is transmitted to the monitoring apparatus 50 and the sensors 10, 20, 30 and 40 (P3540). In this case, all the IDs of the four sensors are transmitted to the monitoring apparatus 50, while the corresponding ID is transmitted to each of the sensors 10, 20, 30 and 40. Upon receipt of the ID, the ID registration is carried out in the monitoring apparatus 50 and each of the sensors 10, 20, 30 and 40 (P3550). A description is made as to whether or not the ID registration reaches completion in the monitoring apparatus and each of the sensors 10, 20, 30 and 40 (P3560). In the case of no completion of the ID registration (P3560: NO), the step P3240 and the subsequent processing are repeatedly carried out. In the case of the completion of the ID registration (P3560: YES), the monitoring apparatus 50 is switched into the normal mode (P3570), and the respective sensors 10, 20, 30 and 40 are also switched into the normal mode (P3580), and the processing comes to an end.

Figure 58:
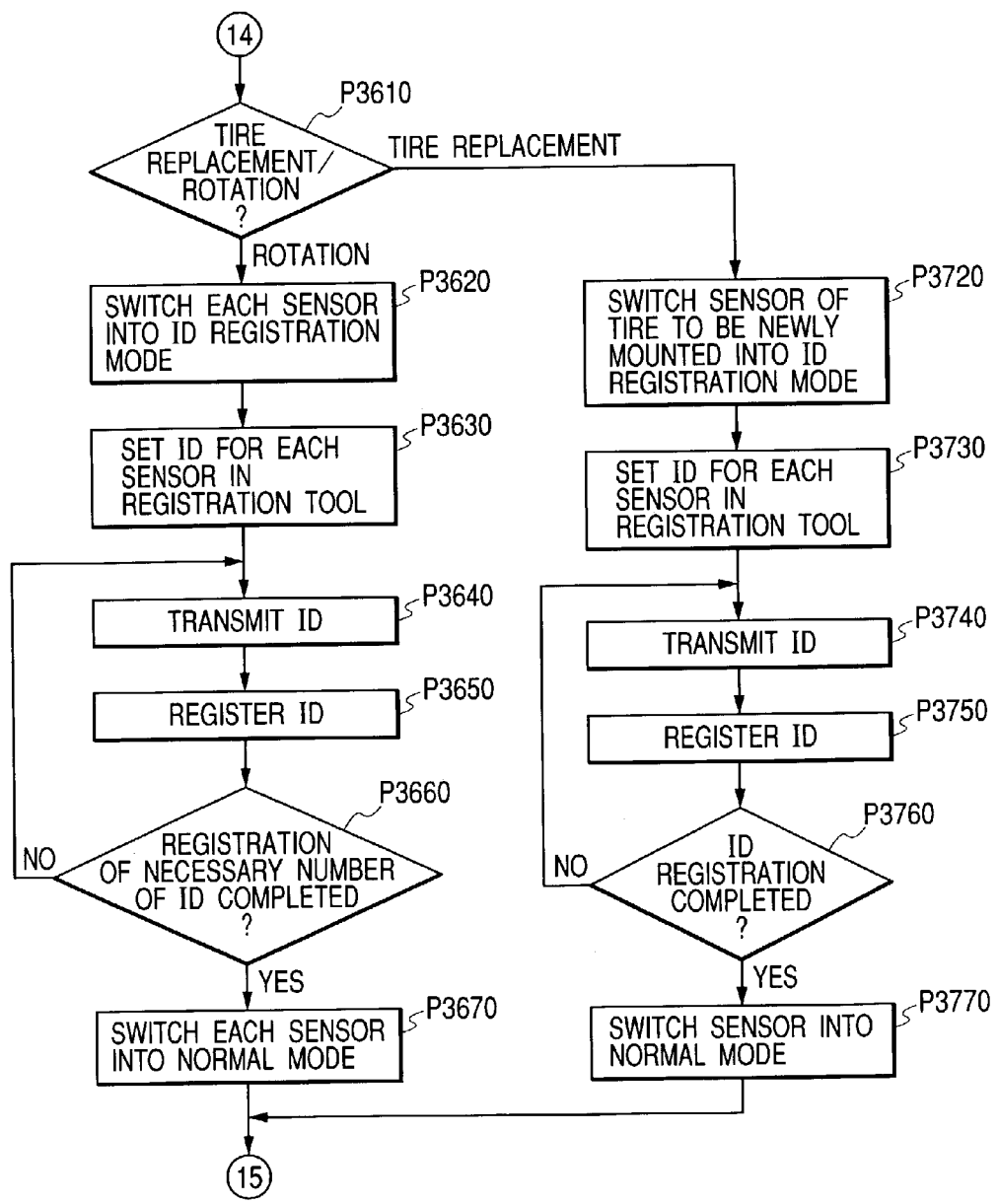
FIG. 58 is a flow chart showing the ID registration procedure according to the tenth embodiment.

On the other hand, in the case of the re-registration (P3500: re-registration), as shown in FIG. 58, a decision is made as to whether tire replacement or tire rotation (P3610). In the case of the rotation (P3610: rotation), the sensors 10, 20, 30 and 40 are switched into the ID registration mode (P3620), and an ID for each sensor is set in the registration tool 60 (P3630). The ID to be set at this time is made to be the same as the ID set in the step P3530. The corresponding ID is transmitted to each of the sensors 10, 20, 30 and 40 (P3640). Upon receipt of the ID, each of the sensors 10, 20, 30 and 40 implements the ID re-registration (P3650). That is, each of the sensors 10, 20, 30 and 40 performs the ID re-registration on a newly received ID by the overwriting on the already registered ID. Subsequently, a decision is made as to whether the ID registration or not the ID registration reaches completion in the sensors 10, 20, 30 and 40 (P3660). In the case of no completion of the ID registration (P3660: NO), the step P3540 and subsequent processing are repeatedly carried out. In the case of the completion of the ID registration (P3660: YES), the sensors 10, 20, 30 and 40 are switched into the normal mode (P3670, and the ID registration operation comes to an end.

In a case in which the re-registration is due to the tire replacement (P3610: tire replacement), a sensor of a tire to be newly mounted is switched into the ID registration mode (P3720), and an ID of this sensor is set in the registration tool 60 (P3730). The ID to be set at this time is made to the same as the ID set in the step P3530. Moreover, this sensor ID is transmitted to the sensor set in the ID registration mode in the step P3720 (P3740), and the sensor receiving this ID carries out the ID registration (P3750). Then, a decision is made as to whether or not the ID registration in the sensor comes to completion (P3760). In the case of no completion of the ID registration (P3760: NO), the step P3740 and subsequent processing are conducted repeatedly. In the case of the completion of the ID registration (P3760: YES), the sensor set in the ID registration mode is switched into the normal mode (P3780), and the ID registration operation comes to an end.

Figure 59:
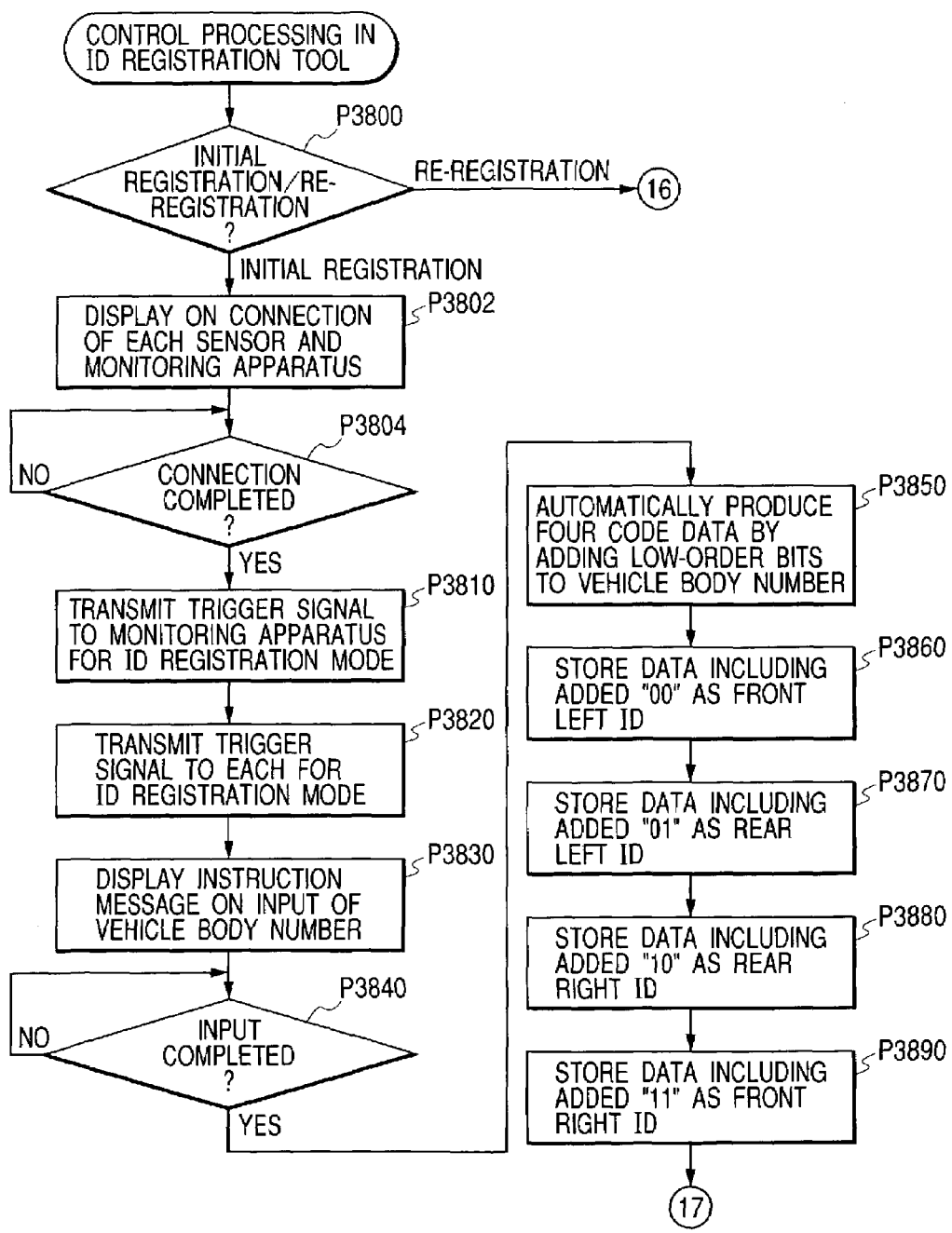
FIG. 59 is a flow chart showing the contents of control processing in an ID registration tool according to the tenth embodiment.

Referring to flow charts of FIGS. 59 to 65, a description will be given hereinbelow of the contents of a program installed in the ID registration tool 60 for carrying out the above-described registration operation. The following program starts by pushing a predetermined button on the control panel 68 of the ID registration tool 60. In this program, first of all, a decision whether for the initial registration or for re-registration is made as shown in FIG. 59 (P3800). The decision as to whether for the initial registration or for the re-registration can depend on a manner such that an initial-registration button and a re-registration button are provided on the control panel 68 and a judgment is made on which of the initial-registration button and the re-registration button is depressed for activating this program. If the decision shows the initial registration (P3800: initial registration), an instruction message to the effect that the signal lines 63 and 63a to 63d are respectively connected to the tire air pressure sensors 10, 20, 30 and 40 and the tie pressure monitoring apparatus 50 is put on the display 69 (P3802), and the control waits for the panel manipulation for the connections (P3804). In response to the completion of the connections (P3804: YES), trigger signals are transmitted so that the tire air pressure sensors 10, 20, 30, 40 and the tire pressure monitoring apparatus 50 are set in an ID registration mode (P3810, P3820).

Following this, an instruction message to the effect of inputting a vehicle body number is put on the display 69 (P3830), and a decision is made as to the input of the vehicle body number (P3840). If the decision indicates the completion of the input thereof (P3840: YES), four code data are automatically produced in a manner such that "00", "01", "10" and "11" are added as low-order bits of the inputted vehicle body number (P3850), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P3860, P3870, P3880, P3890).

Figure 60:
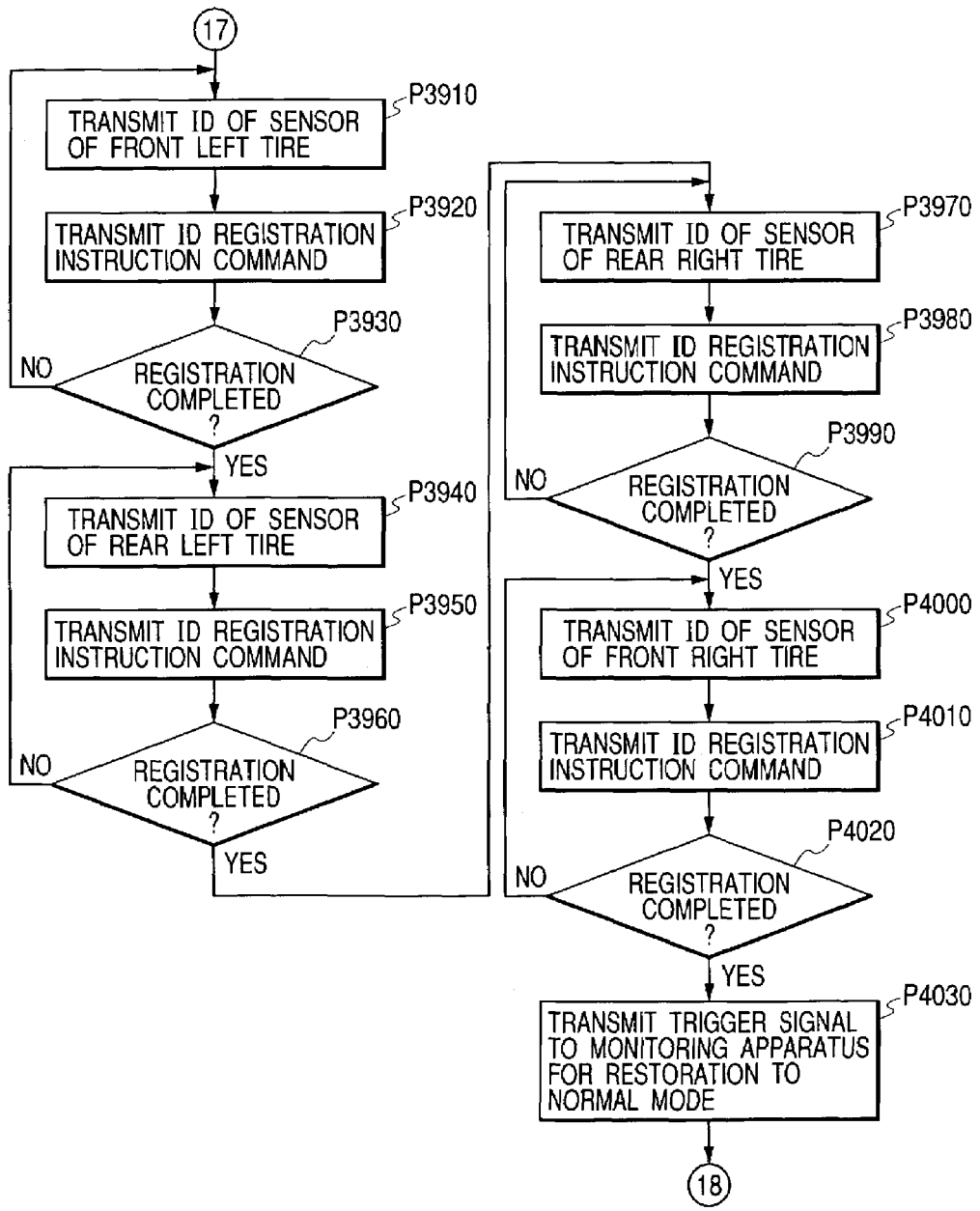
FIG. 60 is a flow chart showing the contents of the control processing in the ID registration tool according to the tenth embodiment.

In addition, as shown in FIG. 60, an ID corresponding to the air pressure sensor 10 of the front left tire is first read out from the memory 66 and is transmitted to the tire pressure monitoring apparatus 50 (P3910), and an instruction command for the ID registration is then transmitted to the tire pressure monitoring apparatus 50 (P3920). Subsequently, a decision is made as to whether or not a reply indicative of the completion of the registration comes from the tire pressure monitoring apparatus 50 (P3930). If the reply does not come within a predetermined period of time (P3930: NO), the operational flow returns to the step P3910. On the other hand, if the registration completion reply comes therefrom (P3930: YES), an ID corresponding to the air pressure sensor 20 of the rear left tire is read out from the memory 66 and is transmitted to the tire pressure monitoring apparatus 50 (P3940), and an instruction command for the ID registration is transmitted to the tire pressure monitoring apparatus 50 (P3950). Subsequently, a decision is made as to whether or not a reply indicative of the completion of the registration comes from the tire pressure monitoring apparatus 50 (P3960). If the reply does not come within a predetermined period of time (P3960: NO), the operational flow returns to the step P3940. On the other hand, if the registration completion reply comes therefrom (P3960: YES), an ID corresponding to the air pressure sensor 30 of the rear right tire is read out from the memory 66 and is transmitted to the tire pressure monitoring apparatus 50 (P3970), and an instruction command for the ID registration is transmitted to the tire pressure monitoring apparatus 50 (P3980). Subsequently, a decision is made as to whether or not a reply indicative of the completion of the registration comes from the tire pressure monitoring apparatus 50 (P3990). If the reply does not come within a predetermined period of time (P3990: NO), the operational flow returns to the step P3970. On the other hand, if the registration completion reply comes therefrom (P3990: YES), an ID corresponding to the air pressure sensor 40 of the front right tire is read out from the memory 66 and is transmitted to the tire pressure monitoring apparatus 50 (P4000), and an instruction command for the ID registration is transmitted to the tire pressure monitoring apparatus 50 (P4010). Subsequently, a decision is made as to whether or not a reply indicative of the completion of the registration comes from the tire pressure monitoring apparatus 50 (P4020). If the reply does not come within a predetermined period of time (P4020: NO), the operational flow returns to the step P4000. On the other hand, if the registration completion reply comes therefrom (P4020: YES), a trigger signal for giving instruction for the restoration to the normal mode is outputted to the tire pressure monitoring apparatus 50 (P4030).

Figure 61:
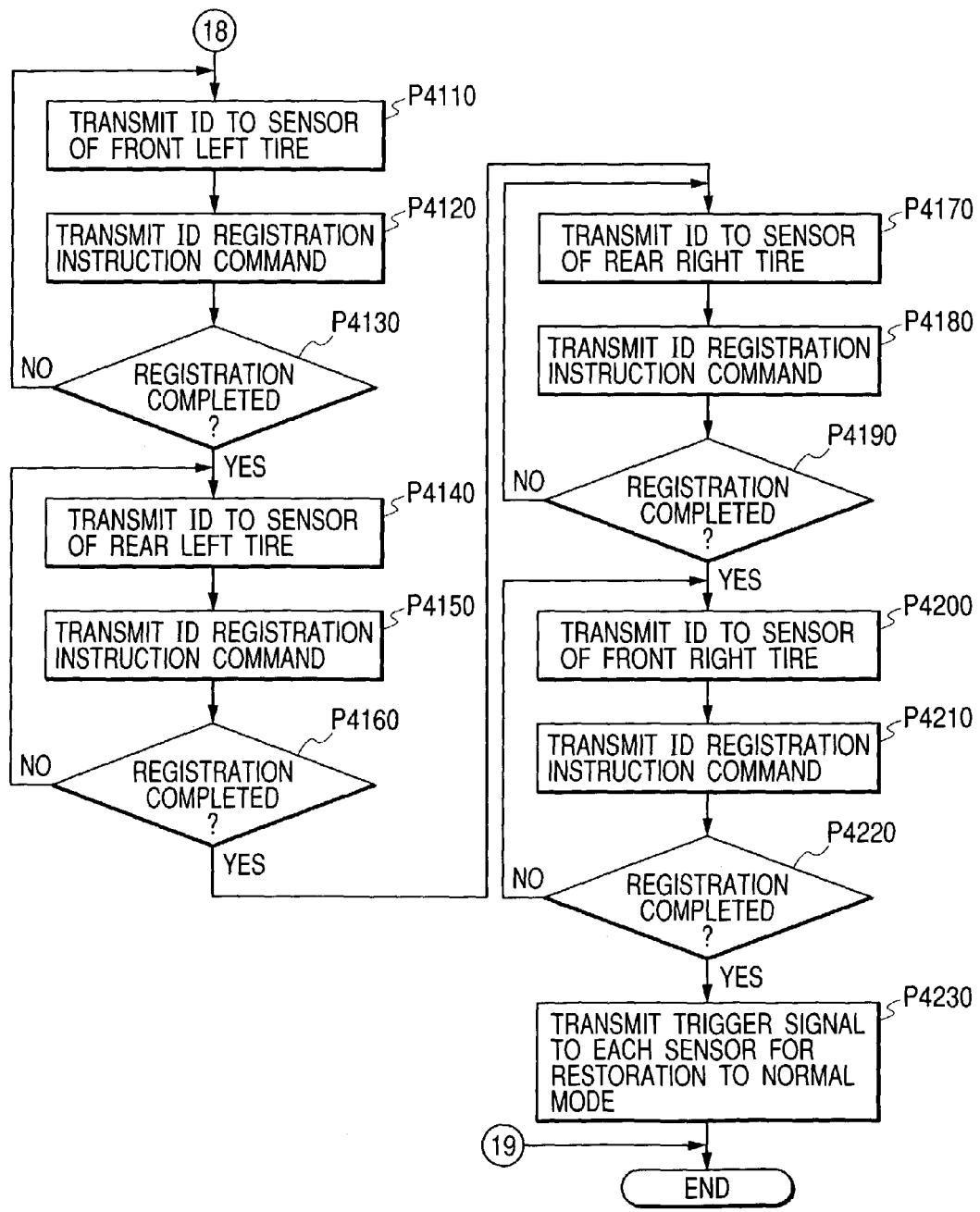
FIG. 61 is a flow chart showing the contents of the control processing in the ID registration tool according to the tenth embodiment.

Still additionally, as shown in FIG. 61, an ID corresponding to the air pressure sensor 10 of the front left tire is read out from the memory 66 and is transmitted to the air pressure sensor 10 (P4110), and an instruction command for the ID registration is then transmitted to the air pressure sensor 10 (P4120). Subsequently, a decision is made as to whether or not a reply indicative of the completion of the registration comes from the air pressure sensor 10 (P4130). If the reply does not come within a predetermined period of time (P4130: NO), the operational flow returns to the step P4110. On the other hand, if the registration completion reply comes therefrom (P4130: YES), an ID corresponding to the air pressure sensor 20 of the rear left tire is read out from the memory 66 and is transmitted to the air pressure sensor 20 (P4140), and an instruction command for the ID registration is transmitted to the air pressure sensor 20 (P4150). Then, a decision is made as to whether or not a reply indicative of the completion of the registration comes from the air pressure sensor 20 (P4160). If the reply does not come within a predetermined period of time (P4160: NO), the operational flow returns to the step P4140. On the other hand, if the registration completion reply comes therefrom (P4160: YES), an ID corresponding to the air pressure sensor 30 of the rear right tire is read out from the memory 66 and is transmitted to the air pressure sensor 30 (P4170), and an instruction command for the ID registration is transmitted to the air pressure sensor 30 (P4180). Following this, a decision is made as to whether or not a reply indicative of the completion of the registration comes from the air pressure sensor 30 (P4190). If the reply does not come within a predetermined period of time (P4190: NO), the operational flow returns to the step P4170. On the other hand, if the registration completion reply comes therefrom (P4190: YES), an ID corresponding to the air pressure sensor 40 of the front right tire is read out from the memory 66 and is transmitted to the air pressure sensor 40 (P4200), and an instruction command for the ID registration is transmitted to the air pressure sensor 40 (P4210). Subsequently, a decision is made as to whether or not a reply indicative of the completion of the registration comes from the air pressure sensor 40 (P4220). If the reply does not come within a predetermined period of time (P4220: NO), the operational flow returns to the step P4200. On the other hand, if the registration completion reply comes therefrom (P4220: YES), a trigger signal for giving instruction for the restoration to the normal mode is outputted (P4230), and the processing comes to an end.

Figure 62:
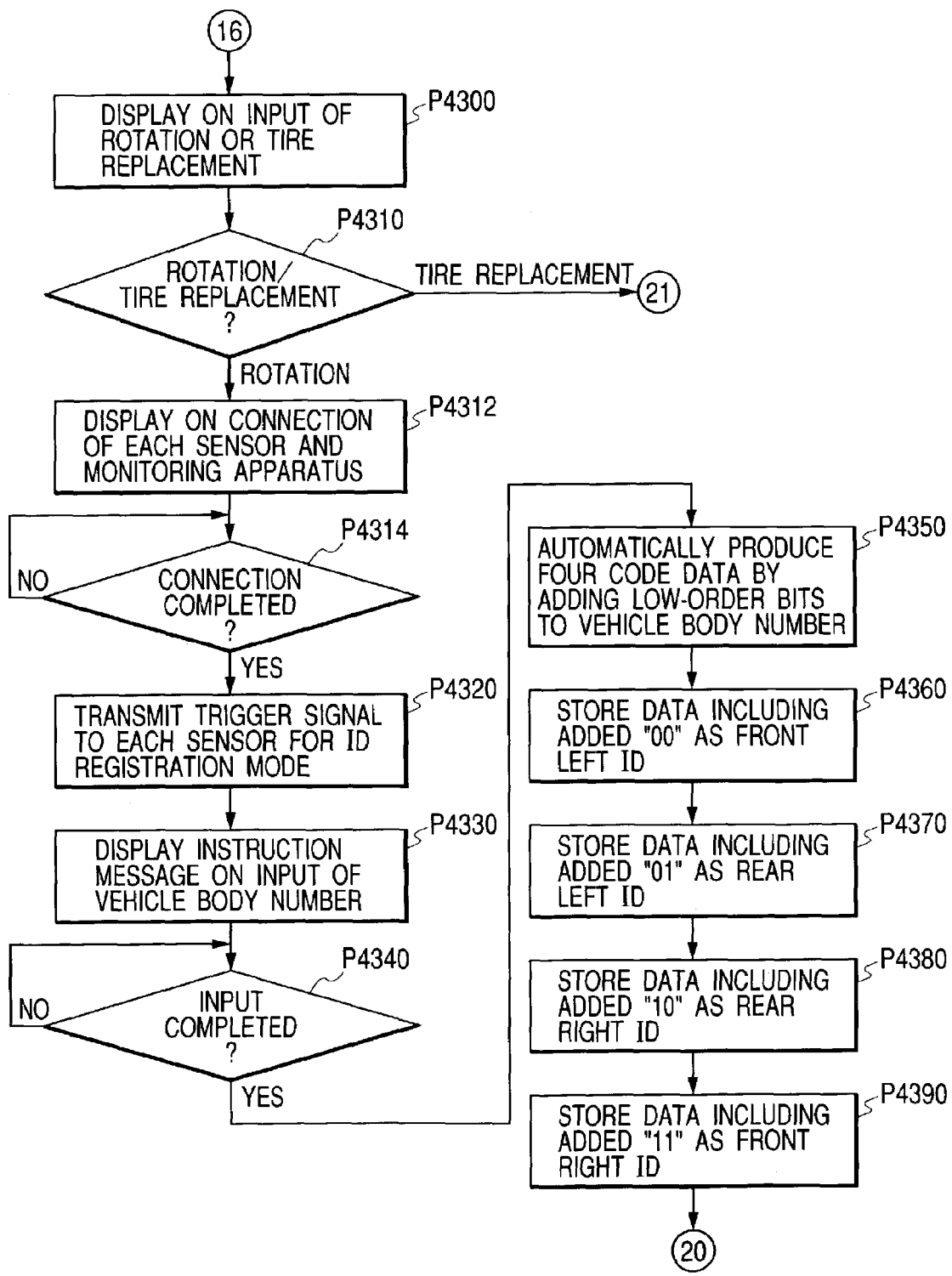
FIG. 62 is a flow chart showing the contents of the control processing in the ID registration tool according to the tenth embodiment.

On the other hand, if a decision to the re-registration is made on the basis of the depression of the re-registration button (P3800: re-registration), as shown in FIG. 62, an input instruction message on the kind of re-registration, i.e., rotation or tire replacement, is put on the display 69 (P4300), and the control waits for the panel manipulation (P4310). In the case of the panel manipulation for the rotation (P4310: rotation), an instruction message to the effect that the signal lines 63a to 63d are respectively connected to the sensors 10, 20, 30 and 40 is put on the display 69 (P4312), and the control waits for the panel manipulation for the indication of the connection completion (P4314). If there is the panel manipulation for the indication of the connection completion (P4314: YES), a trigger signal is transmitted so that the tire air pressure sensors 10, 20, 30 and 40 are set in an ID registration mode (P4320).

Thereafter, an instruction message to the effect of inputting a vehicle body number is put on the display 69 (P4330), and a decision is made as to the input from the control panel 68 (S4340). In the case of the completion of the input (P4340: YES), four code data are automatically produced in a manner such that "00", "01", "10" and "11" are added as the low-order bits of the inputted vehicle body number (P4350), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P4360, P4370, P4380, P4390).

Figure 63:
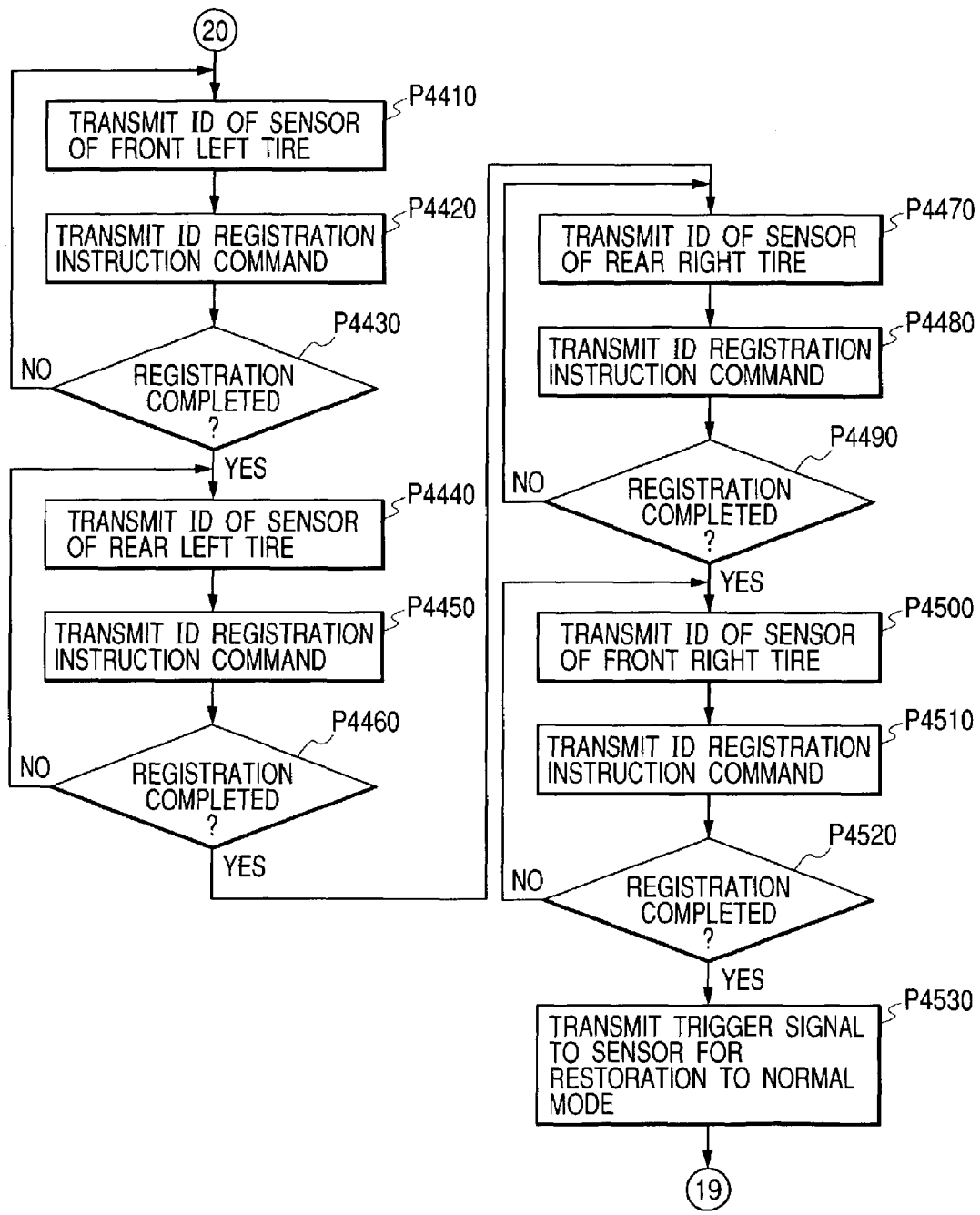
FIG. 63 is a flow chart showing the contents of the control processing in the ID registration tool according to the tenth embodiment.

In addition, as shown in FIG. 63, an ID corresponding to the air pressure sensor 10 of the front left tire is first read out from the memory 66 and is transmitted to the air pressure sensor 10 (P4410), and an instruction command for the ID registration is then transmitted to the air pressure sensor 10 (P4420). Subsequently, a decision is made as to whether or not a reply indicative of the completion of the registration comes from the air pressure sensor 10 (P4430). If the reply does not come within a predetermined period of time (P4430: NO), the operational flow returns to the step P4410. On the other hand, if the registration completion reply comes therefrom (P4430: YES), an ID corresponding to the air pressure sensor 20 of the rear left tire is read out from the memory 66 and is transmitted to the air pressure sensor 20 (P4440), and an instruction command for the ID registration is transmitted to the air pressure sensor 20 (P4450). Subsequently, a decision is made as to whether or not a reply indicative of the completion of the registration comes from the air pressure sensor 20 (P4460). If the reply does not come within a predetermined period of time (P4460: NO), the operational flow returns to the step P4440. On the other hand, if the registration completion reply comes therefrom (P4460: YES), an ID corresponding to the air pressure sensor 30 of the rear right tire is read out from the memory 66 and is transmitted to the air pressure sensor 30 (P4470), and an instruction command for the ID registration is transmitted to the air pressure sensor 30 (P4480). Subsequently, a decision is made as to whether or not a reply indicative of the completion of the registration comes from the air pressure sensor 30 (P4490). If the reply does not come within a predetermined period of time (P4490: NO), the operational flow returns to the step P4470. On the other hand, if the registration completion reply comes therefrom (P4490: YES), an ID corresponding to the air pressure sensor 40 of the front right tire is read out from the memory 66 and is transmitted to the air pressure sensor 40 (P4500), and an instruction command for the ID registration is transmitted to the air pressure sensor 40 (P4510). Subsequently, a decision is made as to whether or not a reply indicative of the completion of the registration comes from the air pressure sensor 40 (P4520). If the reply does not come within a predetermined period of time (P4520: NO), the operational flow returns to the step P4500. On the other hand, if the registration completion reply comes therefrom (P4520: YES), a trigger signal for giving instruction for the restoration to the normal mode is outputted to each of the air pressure sensors 10, 20, 30 and 40 (P4530).

Figure 64:
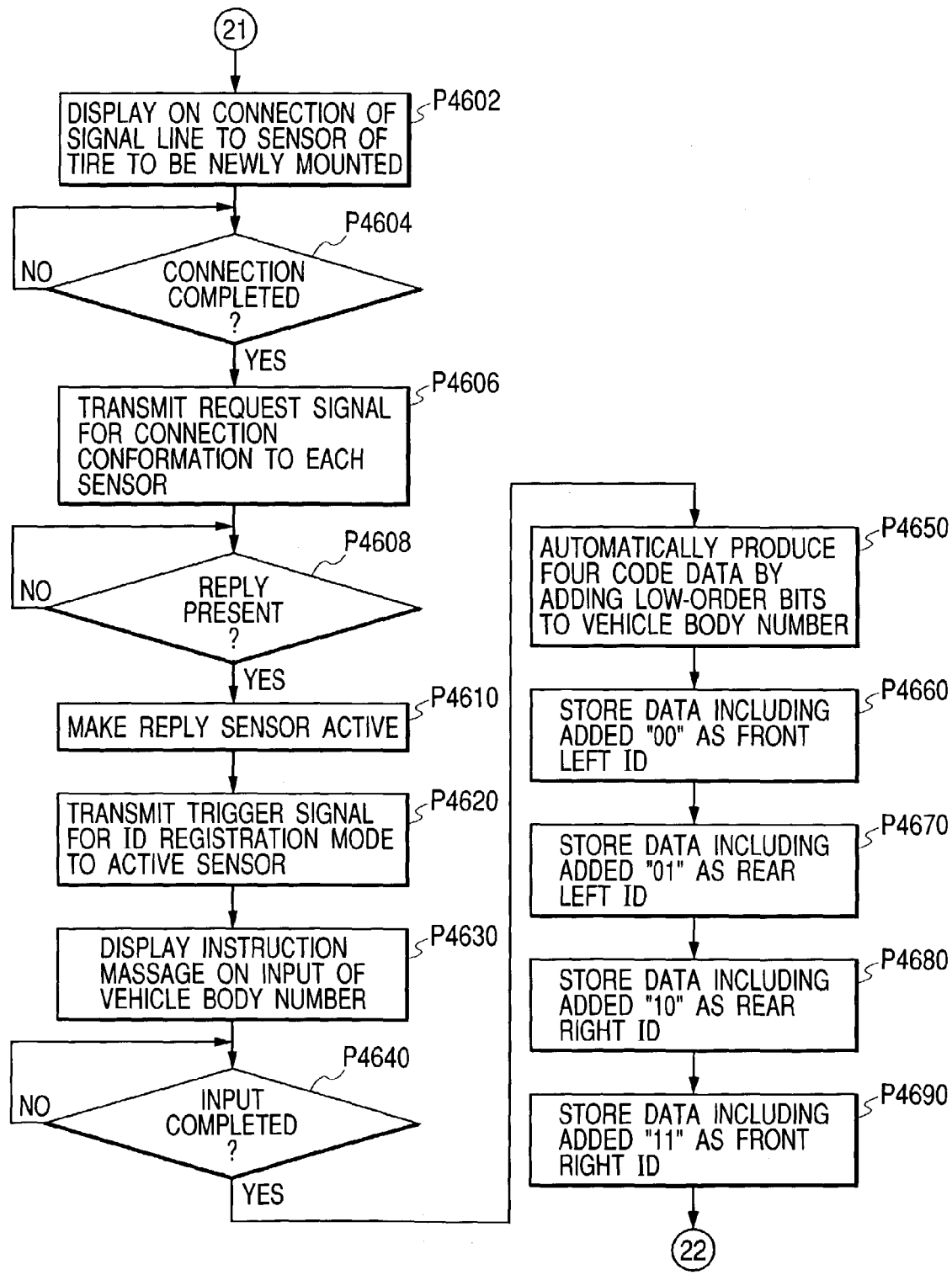
FIG. 64 is a flow chart showing the contents of the control processing in the ID registration tool according to the tenth embodiment.

Moreover, if the re-registration button is pushed (P3800: re-registration) and the tire replacement is designated (P4310: tire replacement), the operational flow advances to the processing in FIG. 64. An instruction message to the effect that a sensor signal line is connected to a sensor to be newly mounted is put on the display 69 (P4602), and the control waits for the panel manipulation indicating the completion of the connection (P4304). In response to the panel manipulation indicating the connection completion (P4604: YES), for the confirmation of the connection, a request signal is transmitted to each of the sensor signal lines 63a to 63d (P4606), and the control waits for a reply to the request signal (P4608). If the reply takes place (P4608: YES), only the sensor signal line providing the reply is set in an active state (P4610), and a trigger signal is transmitted to only the signal line made active so that the tire air pressure sensor is set in an ID registration mode (P4620).

Following this, an instruction message to the effect of inputting a vehicle body number is put on the display 69 (P4630), and a decision is made as to the input from the control panel 68 (P4640). If the decision indicates the completion of the input (P4640: YES), four code data are automatically produced in a manner such that "00", "01", "10" and "11" are added as low-order bits of the inputted vehicle body number (P4650), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P4660, P4670, P4680, P4690).

Figure 65:
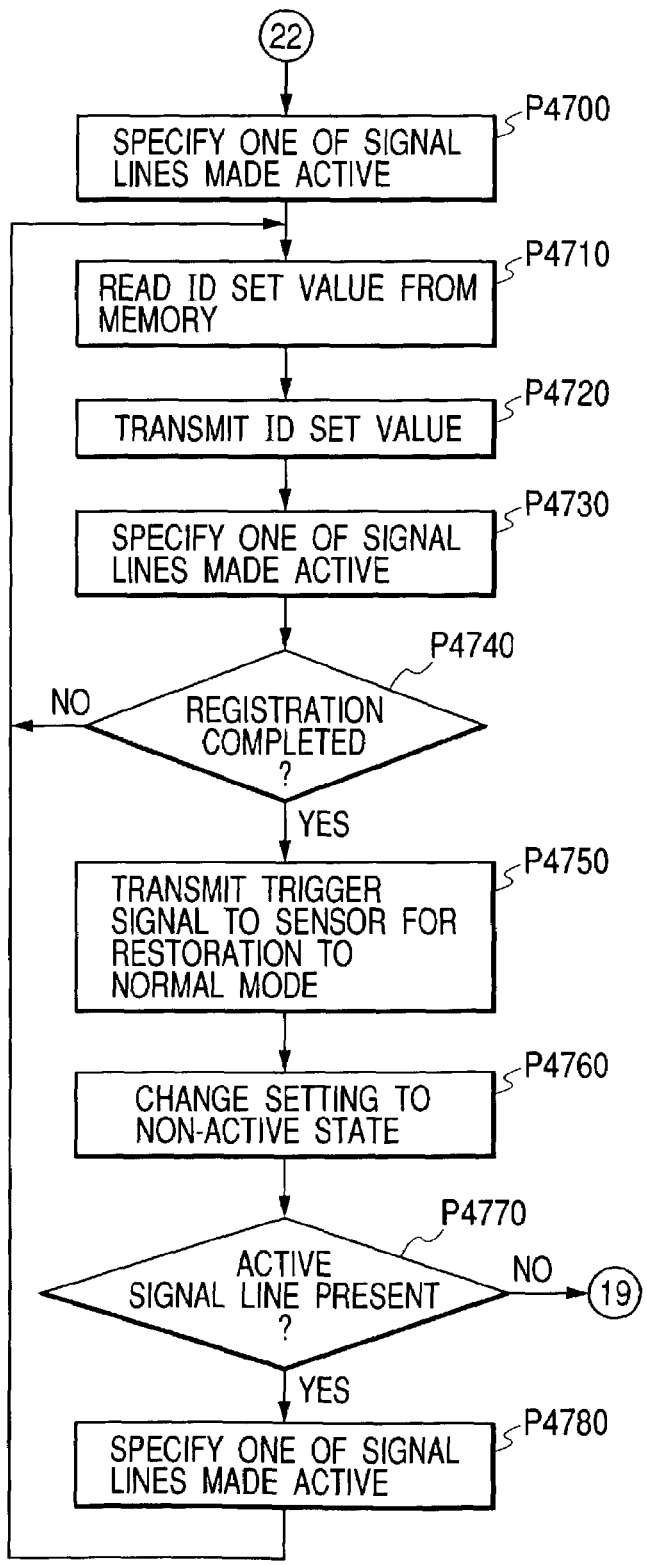
FIG. 65 is a flow chart showing the contents of the control processing in the ID registration tool according to the tenth embodiment.

Thereafter, the operational flow proceeds to the processing in FIG. 65 to specify one of the signal lines made active in the step P4610 (P4700). An ID set value at a tire position corresponding to this signal line is read out from the memory 66 (P4710), and this ID set value is transmitted through this signal line (P3720). Then, an instruction command for the ID registration is transmitted to the ID sending signal line (P4730). A decision is made as to whether or not a reply indicative of the registration completion comes from the air pressure sensor through that signal line (P4740). If the reply does not come within a predetermined period of time (P4740: NO), the operational flow returns to the step P4710. On the other hand, if the reply indicative of the registration completion comes therefrom (P4740: YES), a trigger signal is outputted through this signal line for restoring the air pressure sensor to the normal mode (P4750), and this signal line is setting-changed from the active state to the non-active state (P4760). A decision is made as to whether signal lines set in the active state in the step P4610 remain or not (P4770). If they are left (P4770: YES), one of the signal lines left is specified (P4780), and the operational flow returns to the step P4710. On the other hand, if there is no signal line set in the active state (P4770: NO), the processing comes to an end.

Figure 66:
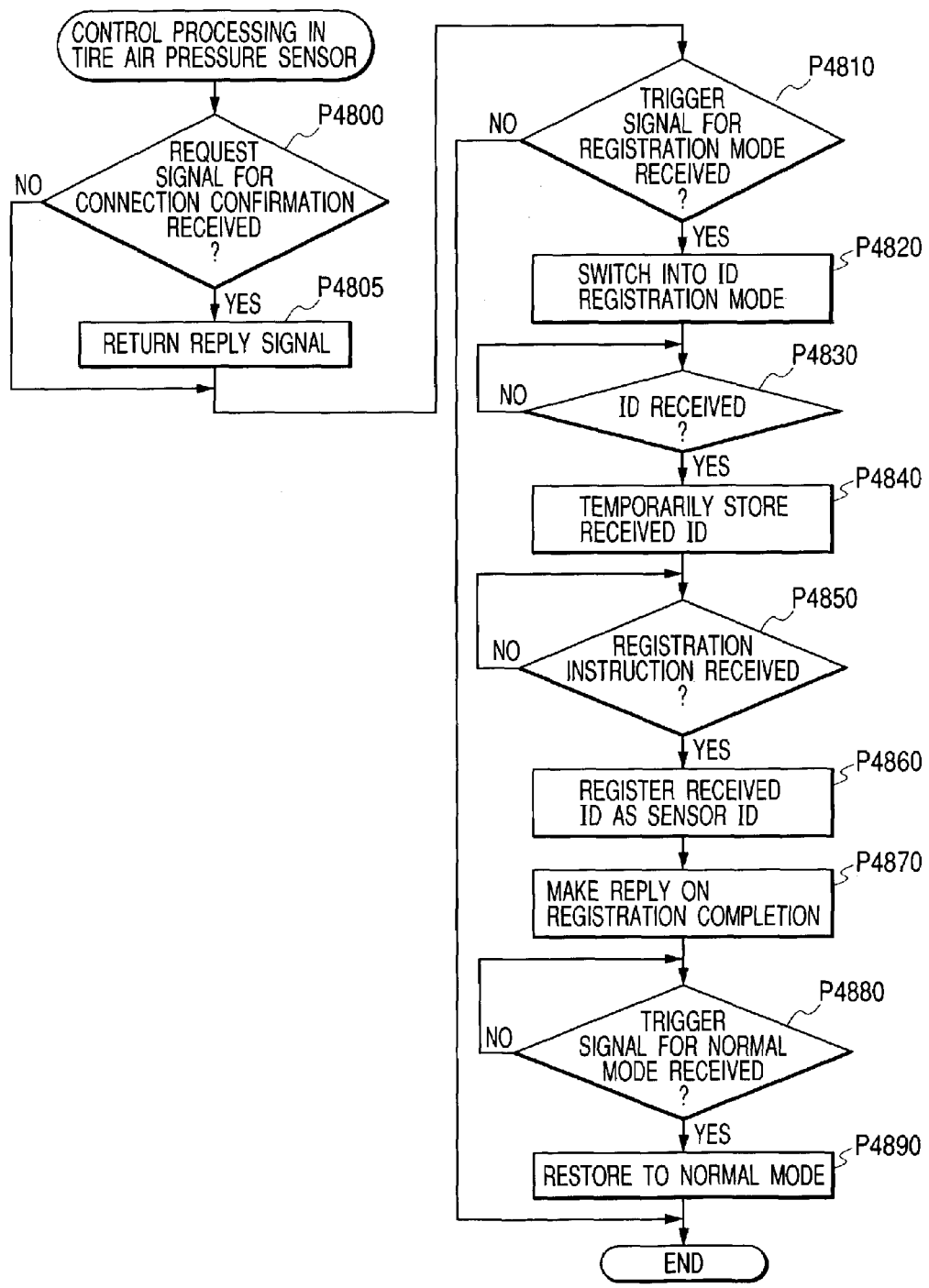
FIG. 66 is a flow chart showing the contents of control processing in a tire air pressure sensor according to the tenth embodiment.

The contents of control processing to be implemented in the tire pressure monitoring apparatus 50 is similar to those in the above-described fourth embodiment. Meanwhile, a control processing program, which will be described below, is installed in the air pressure sensors. In this control processing, as shown in FIG. 66, first of all, a decision is made as to the reception of a request signal for the confirmation of the connection (P4800). Upon receipt of the connection confirmation request signal, a reply signal is returned (P4805), and a decision is made on the reception of a trigger signal calling for the switching into an ID registration mode (P4810). In the case of the reception of the trigger signal calling for the switching into an ID registration mode (P4810: YES), the switching into the ID registration mode is made (P4820), and a decision is made on the reception of an ID (P4830). In the case of the reception of the ID (P4830: YES), this ID is temporarily stored in a work area of the RAM (P4840). Then, a decision is made on the reception of an instruction for the ID registration (P4850). If the decision shows the reception of the ID registration instruction (P4850: YES), the ID temporarily stored in the step P4840 is registered in the ID memory (P4860), and a reply indicative of the completion of the ID registration is made (P4870). Following this, a decision is made as to the reception of a trigger signal to the effect that the mode is switched into the normal mode (P4880). In the case of the reception of the trigger signal calling for the switching into the normal mode (P4880: YES), the switching into the normal mode is made (P4890), and the processing comes to an end. On the other hand, in the case of no reception of the request signal for the connection confirmation (P4800: NO), the operational flow jumps the step P4805 and proceeds to the step P4810.

In the step P4860, if an ID has already registered in the sensor ID memory, the ID registration is conducted by overwriting. Therefore, in the case of the tire replacement or rotation, an ID newly set in a repair shop or a dealer can be re-registered in each of the sensors 10, 20, 30 and 40 in conjunction with the tire position. Incidentally, since the sensor ID has been registered in the tire pressure monitoring apparatus 50 in a state associated with the tire position at the initial registration, there is no need to carry out the re-registration at the time of the rotation or tire replacement.

According to the tenth embodiment, the re-registration due to the tire replacement can be carried out with respect to only the sensor of the tire to be newly mounted and, hence, a minimum ID registration operation is needed.

Eleventh Embodiment

Figure 67:
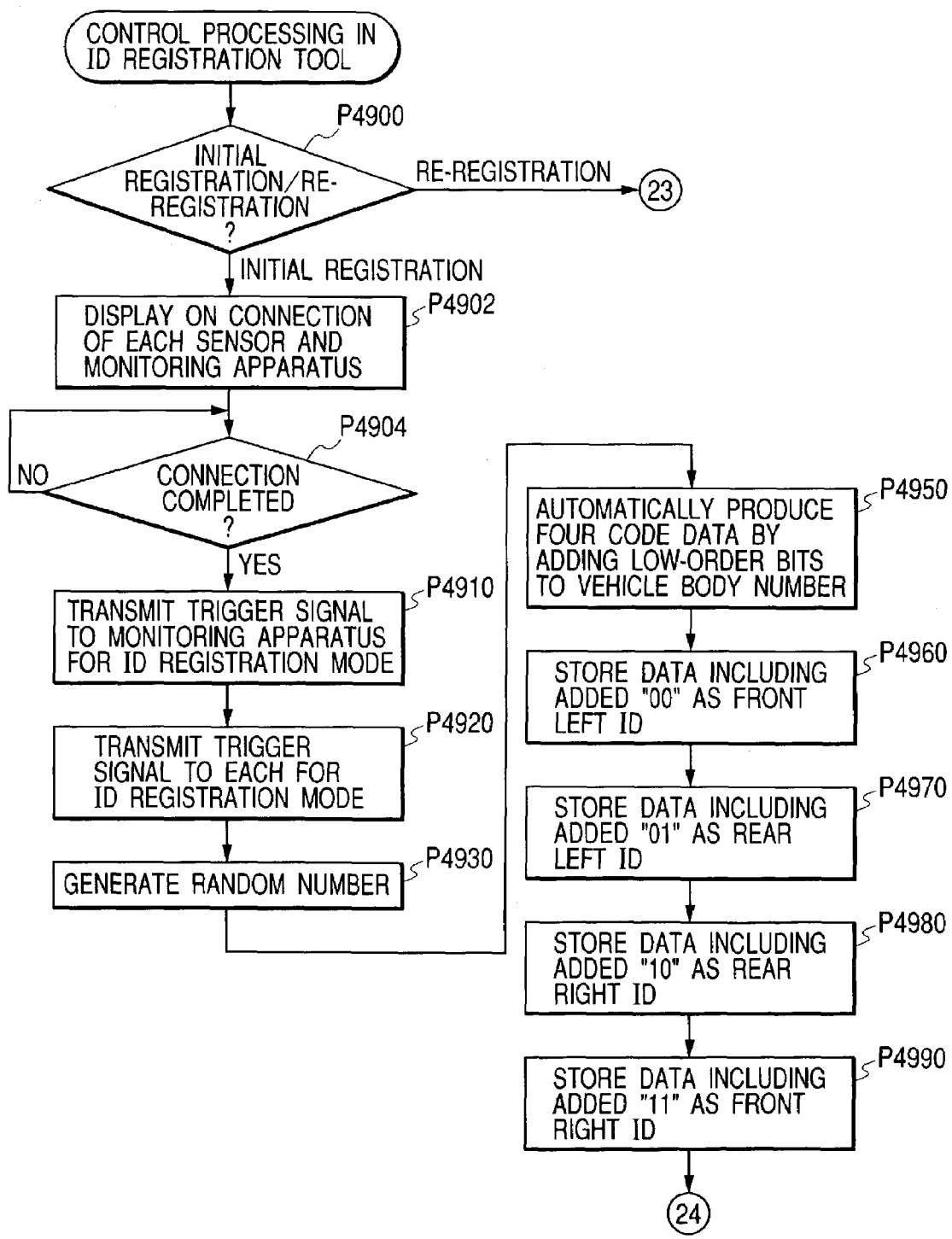
FIG. 67 is a flow chart showing the contents of control processing in an ID registration tool according to an eleventh embodiment of the present invention.

Furthermore, a description will be given hereinbelow of an eleventh embodiment of the present invention. In the eleventh embodiment, a program shown in flow charts of FIGS. 67 to 74 is installed in a ID registration tool 60, and starts by pushing a predetermined button on the control panel 68 of the ID registration tool 60. In this program, first of all, a decision whether for the initial registration or for re-registration is made as shown in FIG. 67 (P4900). If the decision shows the initial registration (P4900: initial registration), an instruction message to the effect that the signal lines 63 and 63a to 63d are respectively connected to the tire air pressure sensors 10, 20, 30 and 40 and the tie pressure monitoring apparatus 50 is put on the display 69 (P4902), and the control waits for the panel manipulation for the connections (P4904). In response to the completion of the connections (P4904: YES), trigger signals are transmitted so that the tire air pressure sensors 10, 20, 30, 40 and the tire pressure monitoring apparatus 50 are set in an ID registration mode (P4910, P4920).

Following this, a random-number generating unit is activated to generate a random number (P4930), and four code data are automatically produced in a manner such that "00", "01", "10" and "11" are added as low-order bits of the random number (P4950), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P4960, P4970, P4980, P4990).

Figure 68:
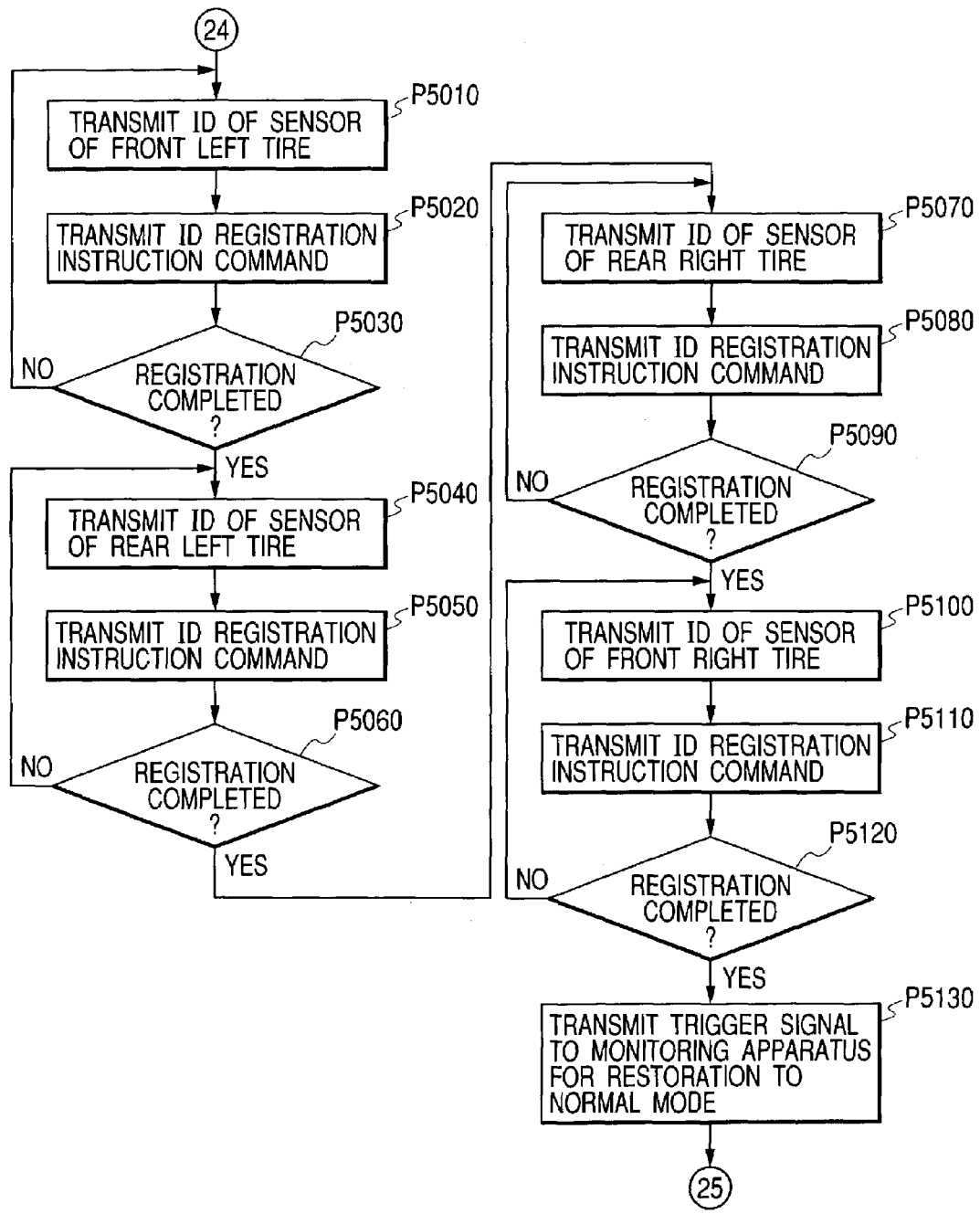
FIG. 68 is a flow chart showing the contents of the control processing in the ID registration tool according to the eleventh embodiment.

Thereafter, the operational flow proceeds to the processing in FIG. 68, and an ID corresponding to the air pressure sensor 10 of the front left tire is first read out from the memory 66 and is transmitted to the tire pressure monitoring apparatus 50 (P5010), and an instruction command for the ID initial-registration is then transmitted to the tire pressure monitoring apparatus 50 (P5020). Subsequently, a decision is made as to whether or not a reply indicative of the completion of the registration comes from the tire pressure monitoring apparatus 50 (P5030). If the reply does not come within a predetermined period of time (P5030: NO), the operational flow returns to the step P5010. On the other hand, if the registration completion reply comes therefrom (P5030: YES), an ID corresponding to the air pressure sensor 20 of the rear left tire is read out from the memory 66 and is transmitted to the tire pressure monitoring apparatus 50 (P5040), and an instruction command for the ID initial-registration is transmitted to the tire pressure monitoring apparatus 50 (P5050). Subsequently, a decision is made as to whether or not a reply indicative of the completion of the registration comes from the tire pressure monitoring apparatus 50 (P5060). If the reply does not come within a predetermined period of time (P5060: NO), the operational flow returns to the step P5040. On the other hand, if the registration completion reply comes therefrom (P5060: YES), an ID corresponding to the air pressure sensor 30 of the rear right tire is read out from the memory 66 and is transmitted to the tire pressure monitoring apparatus 50 (P5070), and an instruction command for the ID initial-registration is transmitted to the tire pressure monitoring apparatus 50 (P5080). Subsequently, a decision is made as to whether or not a reply indicative of the completion of the registration comes from the tire pressure monitoring apparatus 50 (P5090). If the reply does not come within a predetermined period of time (P5090: NO), the operational flow returns to the step P5070. On the other hand, if the registration completion reply comes therefrom (P5090: YES), an ID corresponding to the air pressure sensor 40 of the front right tire is read out from the memory 66 and is transmitted to the tire pressure monitoring apparatus 50 (P5100), and an instruction command for the ID initial-registration is transmitted to the tire pressure monitoring apparatus 50 (P5110). Then, a decision is made as to whether or not a reply indicative of the completion of the registration comes from the tire pressure monitoring apparatus 50 (P5120). If the reply does not come within a predetermined period of time (P5120:NO), the operational flow returns to the step P5100. On the other hand, if the registration completion reply comes therefrom (P5120: YES), a trigger signal for giving instruction for the restoration to the normal mode is outputted to the tire pressure monitoring apparatus 50 (P5130).

Figure 69:
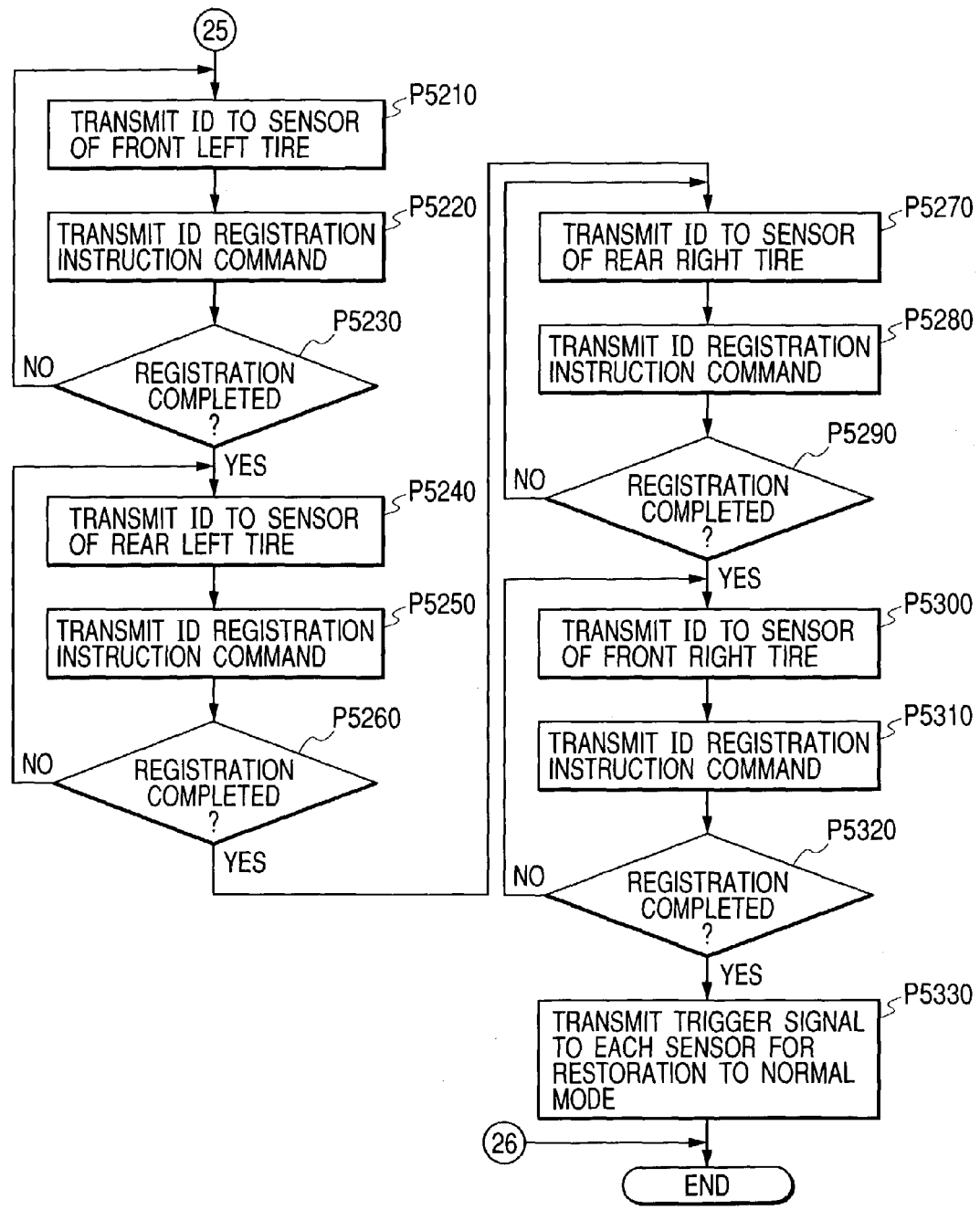
FIG. 69 is a flow chart showing the contents of the control processing in the ID registration tool according to the eleventh embodiment.

In addition, the operational flow advances to the processing in FIG. 69. An ID corresponding to the air pressure sensor 10 of the front left tire is first read out from the memory 66 and is transmitted to the air pressure sensor 10 (P5210), and an instruction command for the ID initial-registration is then transmitted to the air pressure sensor 10 (P5220). Subsequently, a decision is made as to whether or not a reply indicative of the completion of the registration comes from the air pressure sensor 10 (P5230). If the reply does not come within a predetermined period of time (P5230: NO), the operational flow returns to the step P5210. On the other hand, if the registration completion reply comes therefrom (P5230: YES), an ID corresponding to the air pressure sensor 20 of the rear left tire is read out from the memory 66 and is transmitted to the air pressure sensor 20 (P5240), and an instruction command for the ID initial-registration is transmitted to the air pressure sensor 20 (P5250). Then, a decision is made as to whether or not a reply indicative of the completion of the registration comes from the air pressure sensor 20 (P5260). If the reply does not come within a predetermined period of time (P5260: NO), the operational flow returns to the step P5240. On the other hand, if the registration completion reply comes therefrom (P5260: YES), an ID corresponding to the air pressure sensor 30 of the rear right tire is read out from the memory 66 and is transmitted to the air pressure sensor 30 (P5270), and an instruction command for the ID initial-registration is transmitted to the air pressure sensor 30 (P5280). Subsequently, a decision is made as to whether or not a reply indicative of the completion of the registration comes from the air pressure sensor 30 (P5290). If the reply does not come within a predetermined period of time (P5290: NO), the operational flow returns to the step P5270. On the other hand, if the registration completion reply comes therefrom (P5290: YES), an ID corresponding to the air pressure sensor 40 of the front right tire is read out from the memory 66 and is transmitted to the air pressure sensor 40 (P5300), and an instruction command for the ID initial-registration is transmitted to the air pressure sensor 40 (P5310). Following this, a decision is made as to whether or not a reply indicative of the completion of the registration comes from the air pressure sensor 40 (P5320). If the reply does not come within a predetermined period of time (P5320: NO), the operational flow returns to the step P5300. On the other hand, if the registration completion reply comes therefrom (P5320: YES), a trigger signal for giving instruction for the restoration to the normal mode is outputted to each of the air pressure sensors 10, 20, 30 and 40 (P5330), and the processing comes to an end.

Figure 70:
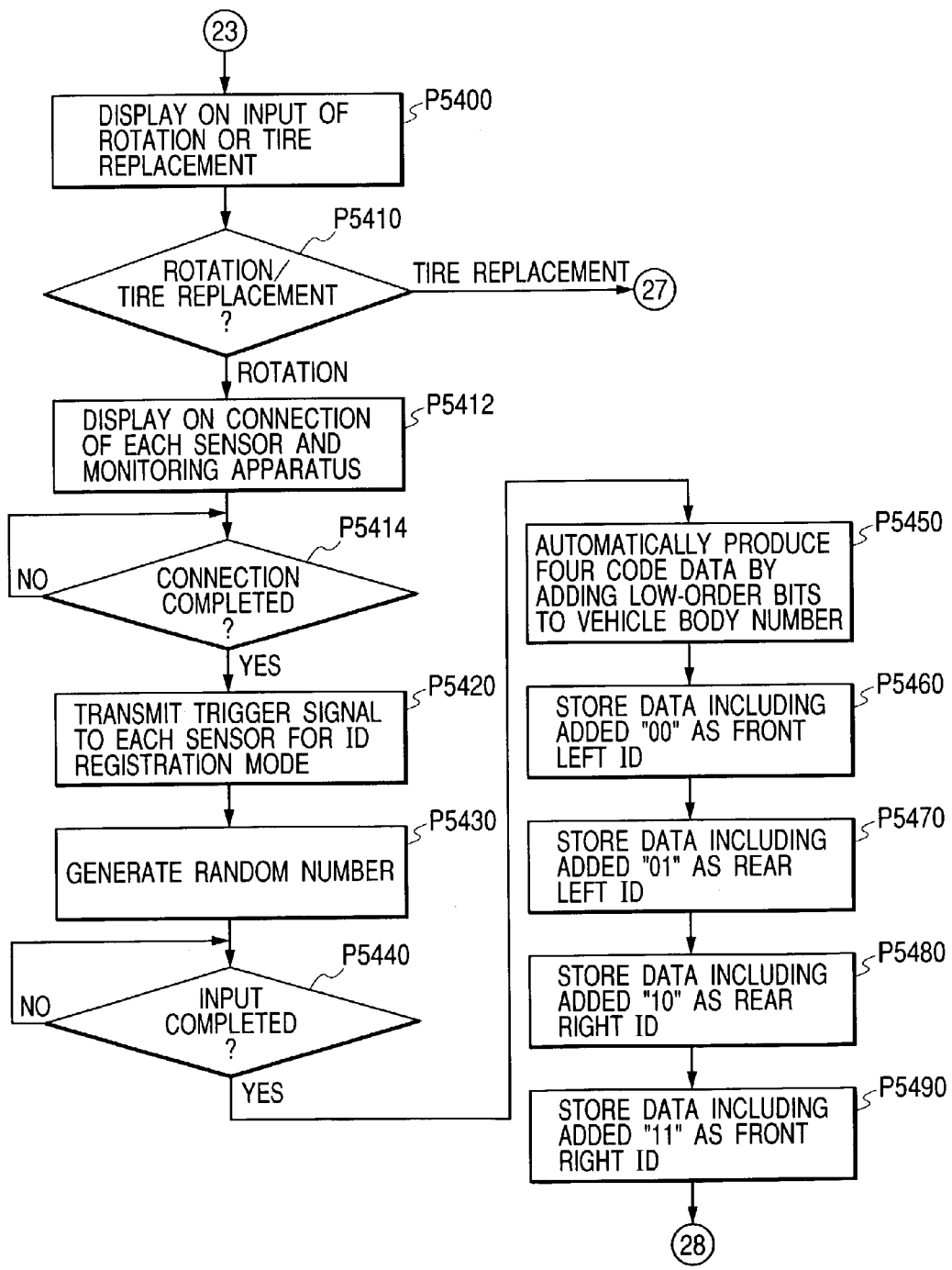
FIG. 70 is a flow chart showing the contents of the control processing in the ID registration tool according to the eleventh embodiment.

On the other hand, if a decision to the re-registration is made on the basis of the depression of the re-registration button (P4900: re-registration), the operational flow advances to the processing in FIG. 70. An input instruction message on the kind of re-registration, i.e., rotation or tire replacement, is put on the display 69 (P5400), and the control waits for the panel manipulation (P4540). In the case of the panel manipulation for the rotation (P5410: rotation), an instruction message to the effect that the signal lines 63 and 63a to 63d are respectively connected to the tire pressure monitoring apparatus 50 and the sensors 10, 20, 30 and 40 is put on the display 69 (P5412), and the control waits for the panel manipulation for the indication of the connection completion (P5414). If there is the panel manipulation for the indication of the connection completion (P5414: YES), a trigger signal is transmitted so that the air pressure monitoring apparatus 50 and the tire air pressure sensors 10, 20, 30 and 40 are set in an ID registration mode (P5414, P5420).

Following this, a random-number generating unit is activated to generate a random number (P5430), and four code data are automatically produced in a manner such that "00", "01", "10" and "11" are added as low-order bits of the random number (P5450), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P5460, P5470, P5480, P5490).

Figure 71:
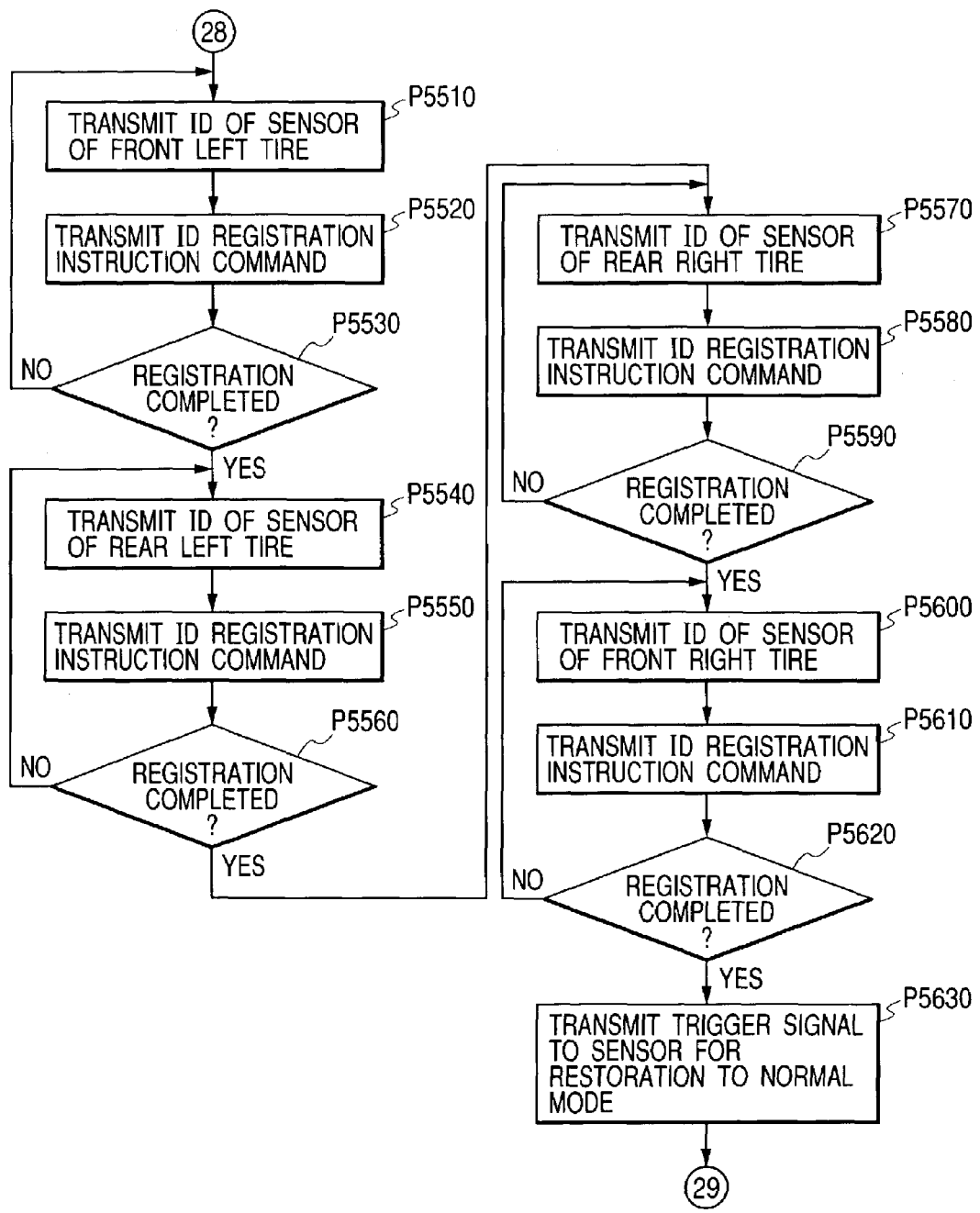
FIG. 71 is a flow chart showing the contents of the control processing in the ID registration tool according to the eleventh embodiment.

Thereafter, the operational flow proceeds to the processing in FIG. 71. An ID corresponding to the air pressure sensor 10 of the front left tire is first read out from the memory 66 and is transmitted to the air pressure sensor 10 (P5510), and an instruction command for the ID re-registration at the time of the rotation is then transmitted to the air pressure sensor 10 (P5520). Subsequently, a decision is made as to whether or not a reply indicative of the completion of the registration comes from the air pressure sensor 10 (P5530). If the reply does not come within a predetermined period of time (P5530: NO), the operational flow returns to the step P5510. On the other hand, if the registration completion reply comes therefrom (P5530: YES), an ID corresponding to the air pressure sensor 20 of the rear left tire is read out from the memory 66 and is transmitted to the air pressure sensor 20 (P5540), and an instruction command for the ID re-registration in the case of the rotation is transmitted to the air pressure sensor 20 (P5550). Subsequently, a decision is made as to whether or not a reply indicative of the completion of the registration comes from the air pressure sensor 20 (P5560). If the reply does not come within a predetermined period of time (P5560: NO), the operational flow returns to the step P5540. On the other hand, if the registration completion reply comes therefrom (P5560: YES), an ID corresponding to the air pressure sensor 30 of the rear right tire is read out from the memory 66 and is transmitted to the air pressure sensor 30 (P5570), and an instruction command for the ID re-registration at the rotation is transmitted to the air pressure sensor 30 (P5580). Then, a decision is made as to whether or not a reply indicative of the completion of the registration comes from the air pressure sensor 30 (P5590). If the reply does not come within a predetermined period of time (P5590: NO), the operational flow returns to the step P5570. On the other hand, if the registration completion reply comes therefrom (P5590: YES), an ID corresponding to the air pressure sensor 40 of the front right tire is read out from the memory 66 and is transmitted to the air pressure sensor 40 (P5600), and an instruction command for the ID re-registration at the rotation is transmitted to the air pressure sensor 40 (P5610). Subsequently, a decision is made as to whether or not a reply indicative of the completion of the registration comes from the air pressure sensor 40 (P5620). If the reply does not come within a predetermined period of time (P5620:NO), the operational flow returns to the step P5610. On the other hand, if the registration completion reply comes therefrom (P5620: YES), a trigger signal for giving instruction for the restoration to the normal mode is outputted to each of the air pressure sensors 10, 20, 30 and 40 (P5630).

Figure 72:
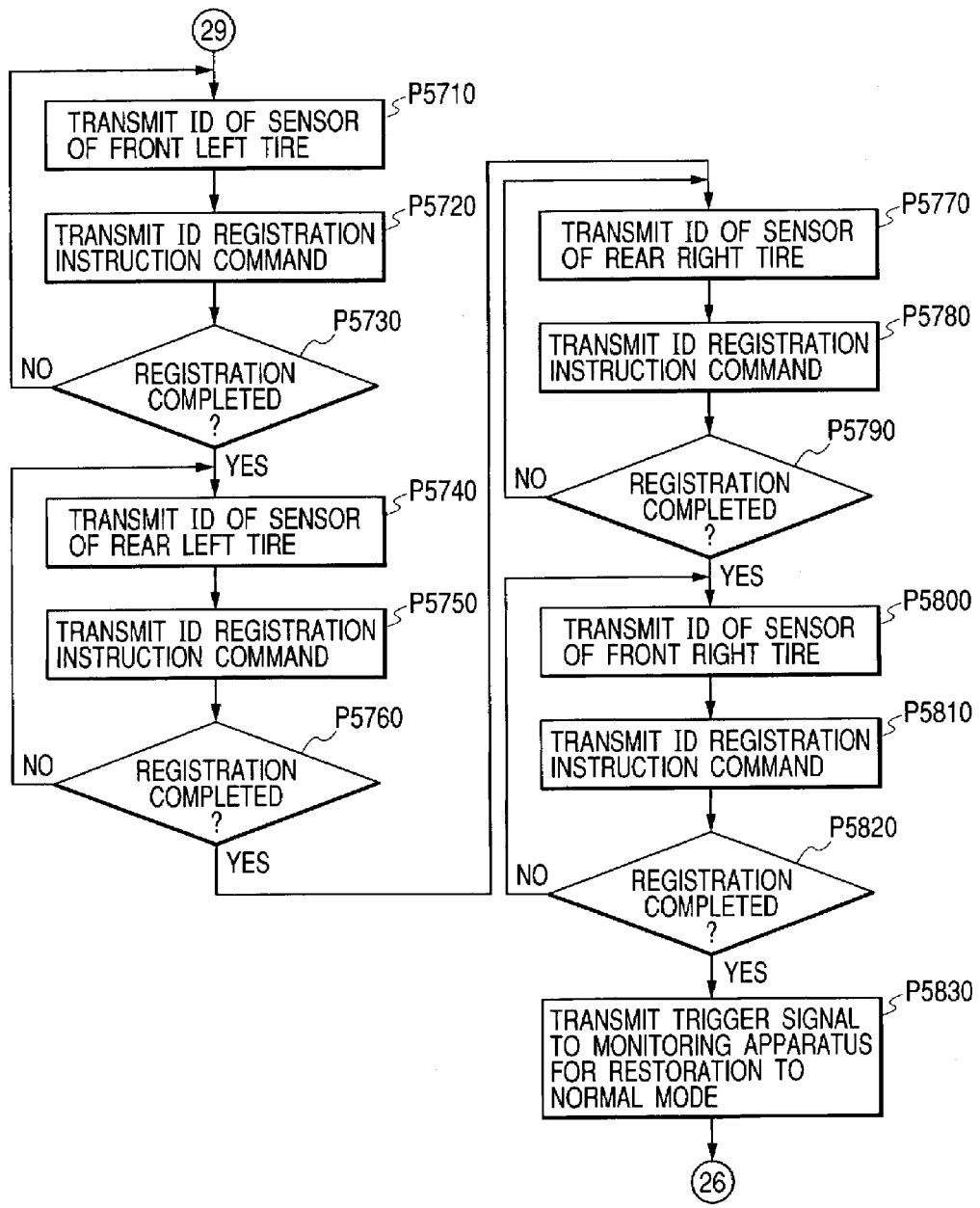
FIG. 72 is a flow chart showing the contents of the control processing in the ID registration tool according to the eleventh embodiment.

Following this, the operational flow advances to the processing in FIG. 72. An ID corresponding to the air pressure sensor 10 of the front left tire is first read out from the memory 66 and is transmitted to the tire pressure monitoring apparatus 50 (P5710), and an instruction command for the ID re-registration in the case of the rotation is then transmitted to the monitoring apparatus 50 (P5720). Subsequently, a decision is made as to whether or not a reply indicative of the completion of the registration comes from the monitoring apparatus 50 (P5730). If the reply does not come within a predetermined period of time (P5730: NO), the operational flow returns to the step P5710. On the other hand, if the registration completion reply comes therefrom (P5730: YES), an ID corresponding to the air pressure sensor 20 of the rear left tire is read out from the memory 66 and is transmitted to the monitoring apparatus 50 (P5740), and an instruction command for the ID re-registration at the rotation is transmitted to the monitoring apparatus 50 (P5750). Subsequently, a decision is made as to whether or not a reply indicative of the completion of the registration comes from the monitoring apparatus 50 (P5760). If the reply does not come within a predetermined period of time (P5760: NO), the operational flow returns to the step P5740. On the other hand, if the registration completion reply comes therefrom (P5760: YES), an ID corresponding to the air pressure sensor 30 of the rear right tire is read out from the memory 66 and is transmitted to the monitoring apparatus 50 (P5770), and an instruction command for the ID re-registration at the rotation is transmitted to the monitoring apparatus 50 (P5780). Subsequently, a decision is made as to whether or not a reply indicative of the completion of the registration comes from the monitoring apparatus 50 (P5790). If the reply does not come within a predetermined period of time (P5790: NO), the operational flow returns to the step P5770. On the other hand, if the registration completion reply comes therefrom (P5790: YES), an ID corresponding to the air pressure sensor 40 of the front right tire is read out from the memory 66 and is transmitted to the monitoring apparatus 50 (P5800), and an instruction command for the ID re-registration at the rotation is transmitted to the monitoring apparatus 50 (P5810). Then, a decision is made as to whether or not a reply indicative of the completion of the registration comes from the monitoring apparatus 50 (P5820). If the reply does not come within a predetermined period of time (P5820: NO), the operational flow returns to the step P5800. On the other hand, if the registration completion reply comes therefrom (P5820: YES), a trigger signal for giving instruction for the restoration to the normal mode is outputted to the monitoring apparatus 50 (P5830).

Figure 73:
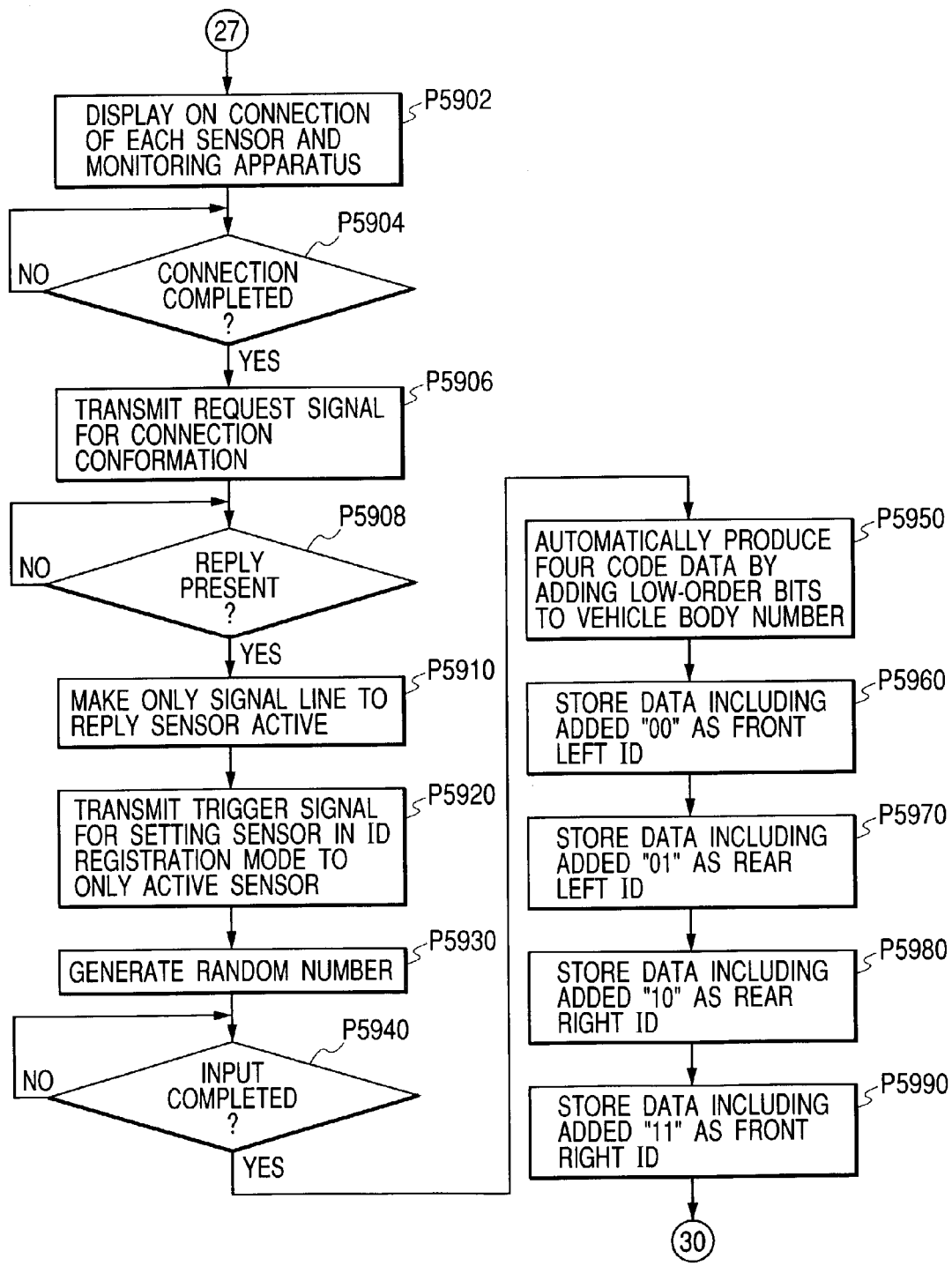
FIG. 73 is a flow chart showing the contents of the control processing in the ID registration tool according to the eleventh embodiment.

Moreover, if the re-registration button is pushed (P4900: re-registration) and the tire replacement is designated (P5410: tire replacement), as shown in FIG. 73, an instruction message to the effect that signal lines is connected to a sensor to be newly mounted and the tire pressure monitoring apparatus 50 is put on the display 69 (P5902), and the control waits for the panel manipulation indicating the completion of the connection (P5904). In response to the panel manipulation indicating the connection completion (P5904: YES), for the confirmation of the connection, a request signal is transmitted to each of the sensor signal lines 63a to 63d (P5906), and the control waits for a reply to the request signal (P5908). If the reply takes place (P5908: YES), only the sensor signal line providing the reply is set in an active state (P5910), and a trigger signal is transmitted to only the signal line made active so that the tire air pressure sensor is set in an ID registration mode (P5920).

Following this, a random-number generating unit is activated to generate a random number (P5930), and four code data are automatically produced in a manner such that "00", "01", "10" and "11" are added as low-order bits of the random number (P5950), and in the memory 66, the data including the added low-order bits "00" is stored as an ID for the front left tire, the data including the added low-order bits "01" as an ID for the rear left tire, the data including the added low-order bits "10" as an ID for the rear right tire, and the data including the added low-order bits "11" as an ID for the front right tire (P5960, P5970, P5980, P5990).

Figure 74:
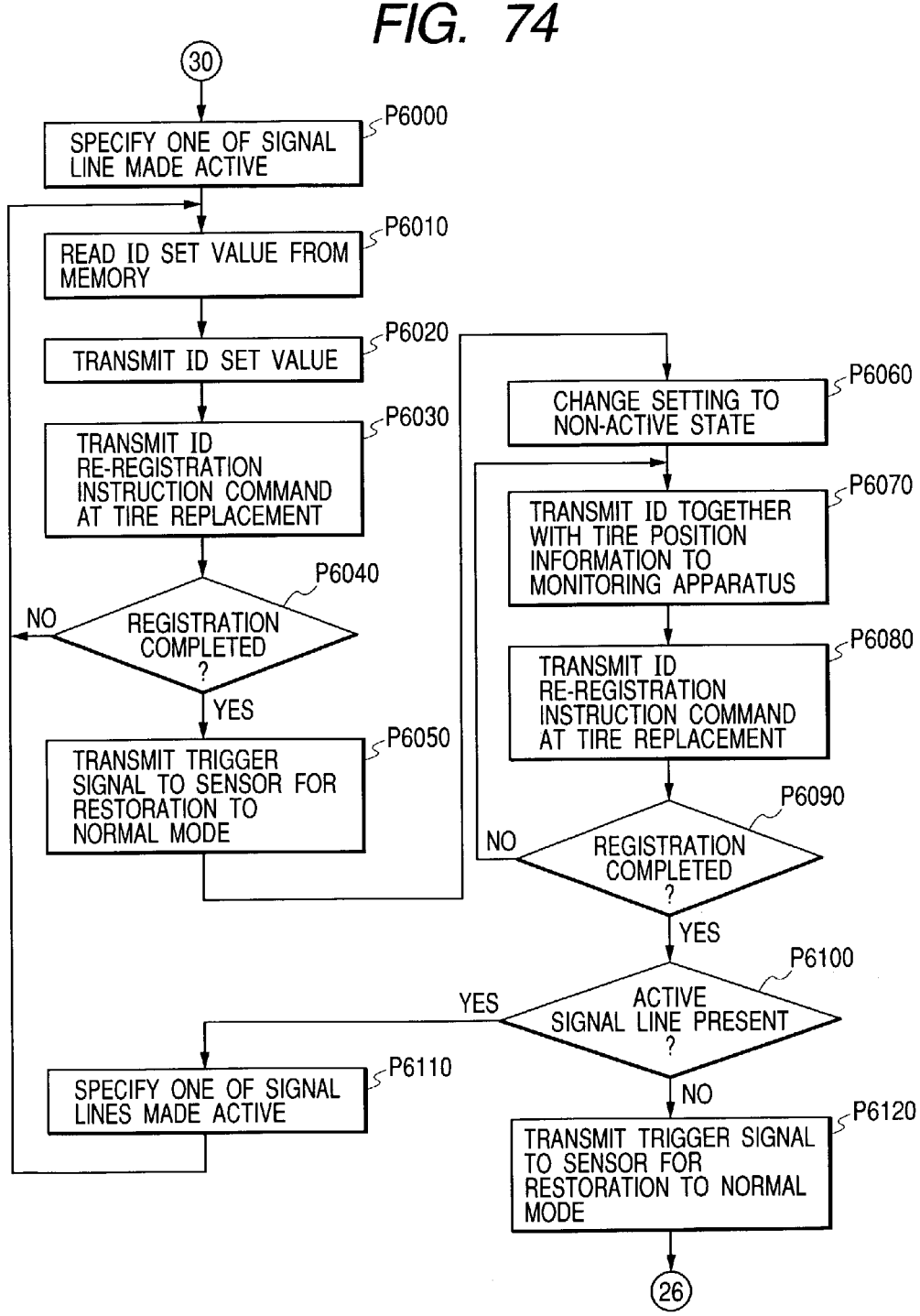
FIG. 74 is a flow chart showing the contents of the control processing in the ID registration tool according to the eleventh embodiment.

Thereafter, as shown in FIG. 74, one of the signal lines made active is specified (P6000), and an ID set value at a tire position corresponding to this signal line is read out from the memory 66 (P6010), and this ID set value is transmitted through this signal line (P6020). Then, an instruction command for the ID re-registration at the tire replacement is transmitted to the ID sending signal line (P6030). A decision is made as to whether or not a reply indicative of the registration completion comes from the air pressure sensor through that signal line (P6040). If the reply does not come within a predetermined period of time (P6040: NO), the operational flow returns to the step P6010. On the other hand, if the reply indicative of the registration completion comes therefrom (P6040: YES), a trigger signal is outputted through this signal line for restoring the air pressure sensor to the normal mode (P6050), and this signal line is setting-changed from the active state to the non-active state (P6060). Then, the ID set value read out in the step P6010, together with the tire position information, is transmitted to the tire pressure monitoring apparatus 50 (P6070). Subsequently, an instruction command for the ID re-registration at the tire replacement is transmitted to the tire pressure monitoring apparatus 50 (P6080), and a decision is made as to whether or not a reply indicative of the registration completion comes from the tire pressure monitoring apparatus 50 (P6090). If the reply does not come within a predetermined period of time (P6090: NO), the operational flow returns to the step P6070. On the other hand, if the reply indicative of the registration completion comes therefrom (P6090: YES), a decision is made as to whether signal lines set in the active state in the step P6010 remain or not (P6100). If they are still left (P6100: YES), one of the signal lines left is specified (P6110), and the operational flow returns to the step P6010. On the other hand, if there is no signal line set in the active state (P6110: NO), a trigger signal is outputted to restore the tire pressure monitoring apparatus 50 to the normal mode (P6120), and the processing comes to an end.

Figure 75:
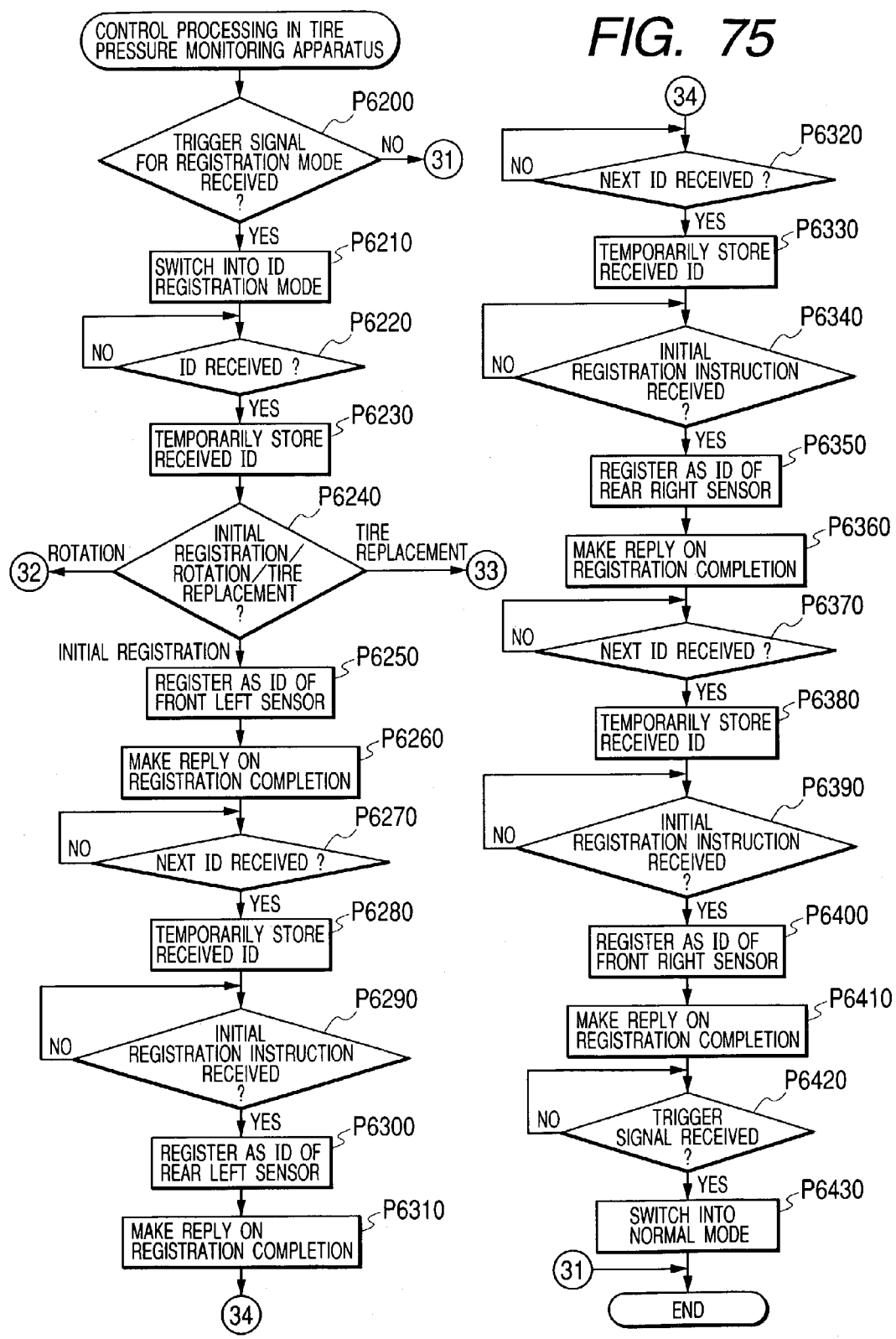
FIG. 75 is a flow chart showing the contents of control processing in a tire pressure monitoring apparatus according to the eleventh embodiment.

Furthermore, referring to FIGS. 75 to 77, a description will be given hereinbelow of the contents of control processing to be implemented in the tire pressure monitoring apparatus 50. In this control processing, as shown in FIG. 75, a decision is first made as to the reception of a trigger signal giving instruction for the switching into the ID registration mode (P6200). In the case of the reception of the trigger signal calling for the switching into the ID registration mode (P76200: YES), the switching into the ID registration mode is made (P6210), and a decision is made on the reception of an ID (P6220). In the case of the reception of the ID (S6220: YES), this ID, together with tire position information, is temporarily stored in a work area of the RAM (P6230). Then, a decision is made on the reception of an instruction for any one of the ID initial-registration, ID re-registration in the case of the rotation and ID re-registration in the case of the tire replacement (P6240). In the case of the reception of the ID initial-registration instruction (P6240: initial registration), the ID temporarily stored in the step S6230 is registered as the ID of the air pressure sensor of the front left tire in the memory 55 (P6250), and a reply is made which is indicative of the completion of the ID registration (P6260). Subsequently, a decision is made on the reception of an ID (P6270). In the case of the reception of the ID (S6270: YES), this ID is temporarily stored in a work area of the RAM (P6280). Then, a decision is made on the reception of an instruction for the ID initial-registration (P6290). In the case of the reception of the ID initial-registration instruction (P6290: YES), the ID temporarily stored in S6280 is registered as the ID of the air pressure sensor of the rear left tire in the memory 55 (P6300), and a reply is made which is indicative of the completion of the ID registration (P6310). Following this, a decision is made on the reception of an ID (P6320). In the case of the reception of the ID (S6320: YES), this ID is temporarily stored in a work area of the RAM (P6330). Then, a decision is made on the reception of an instruction for the ID initial-registration (P6340). In the case of the reception of the ID initial-registration instruction (P6340: YES), the ID temporarily stored in S6330 is registered as the ID of the air pressure sensor of the rear right tire in the memory 55 (P6350), and a reply is made which is indicative of the completion of the ID registration (P6360). Moreover, a decision is made on the reception of an ID (P6370). In the case of the reception of the ID (S6370: YES), this ID is temporarily stored in a work area of the RAM (P6380). Then, a decision is made on the reception of an instruction for the ID initial-registration (P6390). In the case of the reception of the ID initial-registration instruction (P6390: YES), the ID temporarily stored in S6380 is registered as the ID of the air pressure sensor of the front right tire in the memory 55 (P6400), and a reply is made which is indicative of the completion of the ID registration (P6410). Thereafter, a decision is made as to the reception of a trigger signal to the effect that the mode is switched into the normal mode (P6420). In the case of the reception of the trigger signal calling for the switching into the normal mode (P6420: YES), the mode is switched into the normal mode (P6430), and the processing comes to an end.

Figure 76:
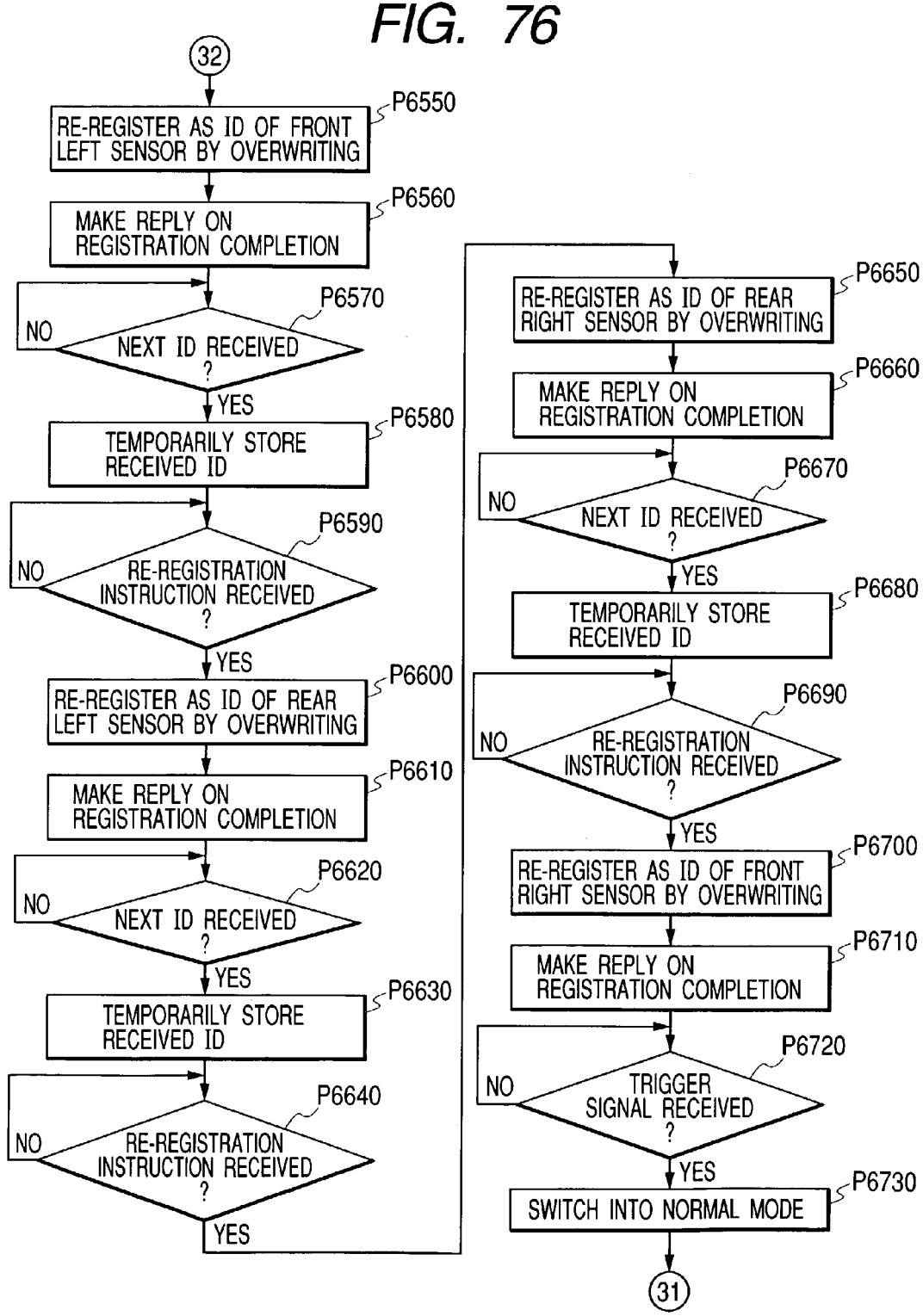
FIG. 76 is a flow chart showing the contents of the control processing in the tire pressure monitoring apparatus according to the eleventh embodiment.

Still furthermore, in the step P6240, in the case of the reception of the ID re-registration instruction for the rotation (P6240: rotation), as shown in FIG. 76, the ID temporarily stored in the step P6230 is re-registered by overwriting as the ID of the air pressure sensor of the front left tire in the memory 55 (P6550), and a reply is carried out which is representative of the ID registration completion (P6560). Then, a decision is made on the reception of an ID (P6570). In the case of the reception of the ID (P6570: YES), this ID is temporarily stored in a work area of the RAM (P6580). A decision is made on the reception of an ID initial-registration instruction (P6590). In the case of the reception of the ID initial-registration instruction (P6590: YES), the ID temporarily stored in the step P6580 is re-registered by overwriting as an ID of the air pressure sensor of the rear left tire in the memory 55 (P6600), and a reply is made which is representative of the ID registration completion (P6610). Then, a decision is made on the reception of an ID (P6620). In the case of the reception of the ID (P6620: YES), this ID is temporarily stored in a work area of the RAM (P6630). A decision is made on the reception of an ID initial-registration instruction (P6640). In the case of the reception of the ID initial-registration instruction (P6640: YES), the ID temporarily stored in the step P6630 is re-registered by overwriting as an ID of the air pressure sensor of the rear right tire in the memory 55 (P6650), and a reply is made which is representative of the ID registration completion (P6660). subsequently, a decision is made on the reception of an ID (P6670). In the case of the reception of the ID (P6670: YES), this ID is temporarily stored in a work area of the RAM (P6680). A decision is made on the reception of an ID initial-registration instruction (P6690). In the case of the reception of the ID initial-registration instruction (P6690: YES), the ID temporarily stored in the step P6680 is re-registered by overwriting as an ID of the air pressure sensor of the rear right tire in the memory 55 (P6700), and a reply is made which is representative of the ID registration completion (P6710). Thereafter, a decision is made as to the reception of a trigger signal to the effect that the mode is switched into a normal mode (P6720). In the case of the reception of the trigger signal calling for the switching into the normal mode (P6720: YES), the switching into the normal mode is done (P6730), and the processing comes to an end.

Figure 77:
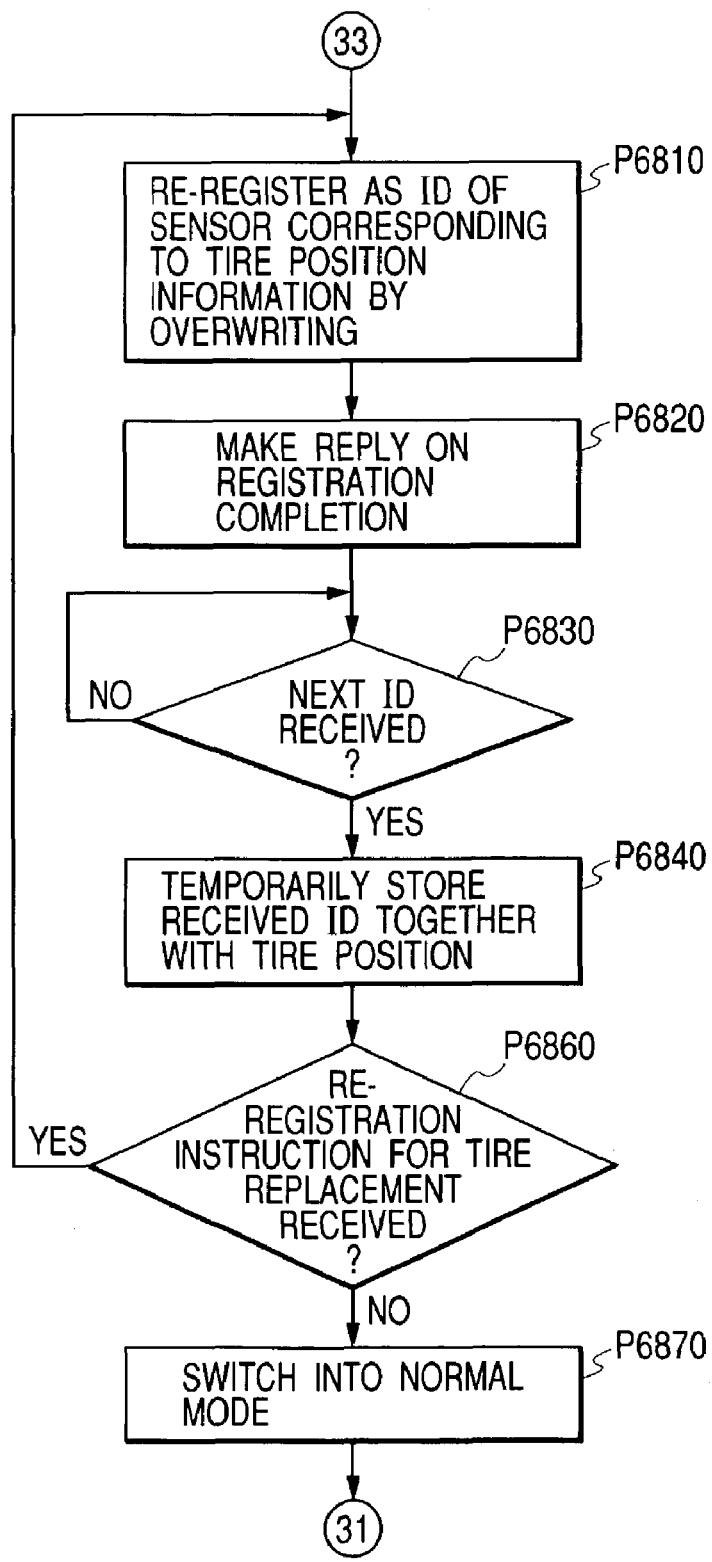
FIG. 77 is a flow chart showing the contents of the control processing in the tire pressure monitoring apparatus according to the eleventh embodiment.
Figure 78:
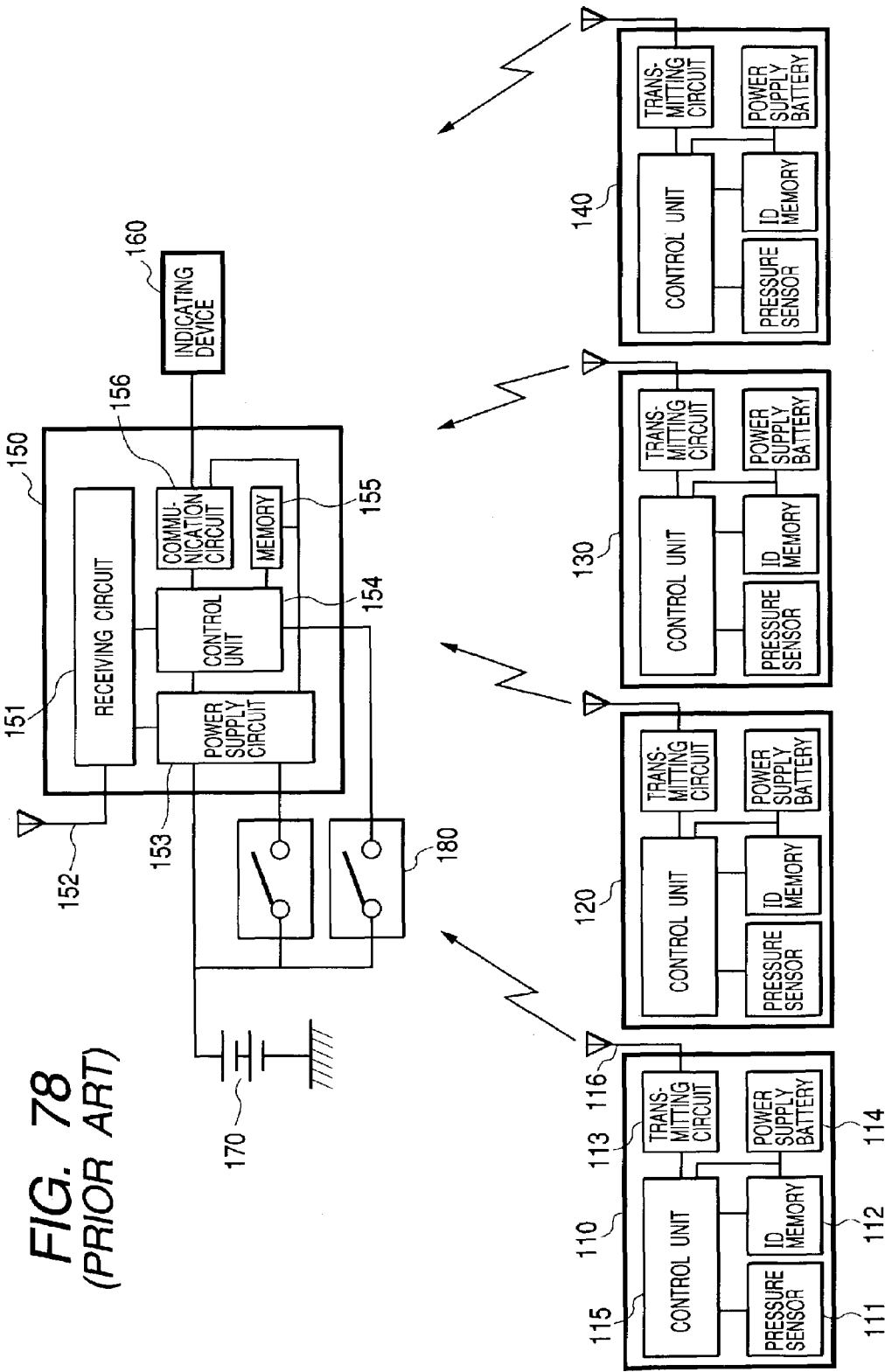
FIG. 78 is a block diagram showing a configuration of a conventional tire pressure monitoring system.
Figure 79:
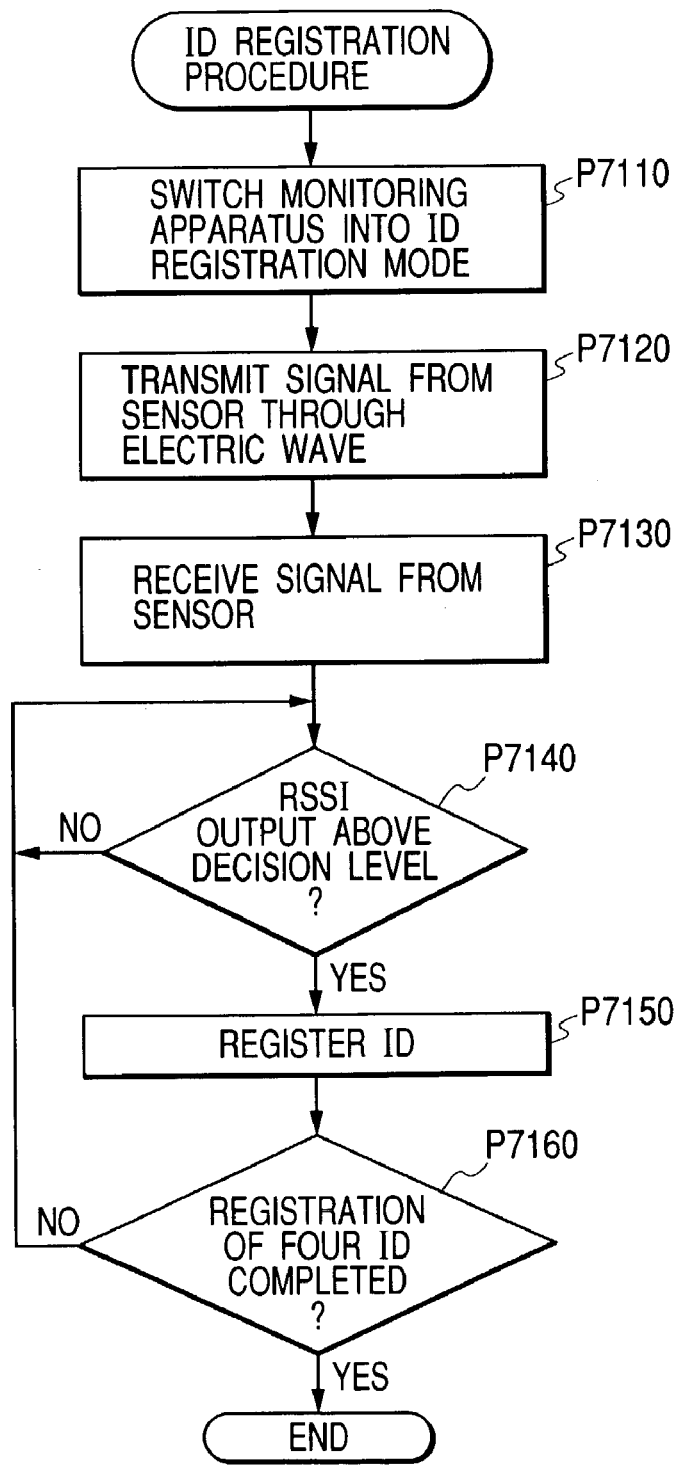
FIG. 79 is a flow chart showing an ID registration procedure in the conventional system.

Yet furthermore, in the step P6240, in the case of the reception of the ID re-registration instruction for the tire replacement (P6240: tire replacement), as shown in FIG. 77, the ID temporarily stored in the step P6230 is read out therefrom and is registered by overwriting as the ID of the air pressure sensor at the corresponding tire position on the basis of the tire position information received in the step P6230 (P6810), and a reply is carried out which is representative of the ID registration completion (P6820). Then, a decision is made on the reception of an ID (P6830). In the case of the reception of the ID (P6830: YES), this ID, together with the tire position information, is temporarily stored in the RAM (P6840), and a decision is made on the reception of an ID re-registration instruction at the tire replacement (P6850). In the case of the reception of the ID re-registration instruction at the tire replacement (P6850: YES), the operational flow returns to the step P6810. On the other hand, in the case of no reception of an ID (P6830: NO), a decision is made as to the reception of a trigger signal to the effect that the mode is switched into a normal mode (P6860). In the case of the reception of the trigger signal calling for the switching into the normal mode (P6860: YES), the switching into the normal mode is done (P6870), and the processing comes to an end.

The contents of the control processing to be implemented in the air pressure sensor is similar to those in the tenth embodiment.

Also in the eleventh embodiment, the re-registration stemming from the tire replacement can be done with respect to only the sensor of a tire to be newly mounted, thus reducing the number of steps for the ID registration operation at the time of the tire replacement. Moreover, since a sensor ID is set through the use of a random-number generating function of the tool, for both the initial registration and re-registration, it is possible to lessen the burden imposed in the operator.

It should be understood that the present invention is not limited to the above-described embodiments, and that it is intended to cover all changes and modifications of the embodiments of the invention herein which do not constitute departures from the spirit and scope of the invention.

In the description of the fourth to eleventh embodiments, although an ID transmitted from the tool 60 through wires to the sensors 10, 20, 30 and 40 and to the tire pressure monitoring apparatus 50 to be registered therein, it is also acceptable that a set ID is transmitted from the tool 60 through radio using electric wave thereto. In this case, for example, it is also acceptable that a specific band-pass filter can be placed to function so that the receiving circuit in the sensors 10, 20, 30 and 40 and the tire pressure monitoring apparatus 50 is capable of receiving only a specific frequency-band signal different from a common pressure detection signal when receiving a trigger signal for setting an ID registration mode, and an ID set value is transmitted as this specific frequency-band from the tool 60, that the electric wave directivity from the tool 60 is enhanced to prevent the radio interference, or that an information transmission medium (for example, ultrasonic wave) with a high directivity is employed for the ID registration.

In addition, for example, in a case in which an ID is set using a random number, it is also appropriate that an ID is produced on the basis of a combination of the random number and date and time, information on a factory or the like in order to avoid the coincidence. Also in a case in which an ID is manually set in a tool, if the ID is produced on the basis of a combination of an input value and the date and time, an ID registration place, an operator code or the like, it is possible to avoid the coincidence.

In the eleventh embodiment, although an ID is re-registered in the tire pressure monitoring apparatus 50 by means of the overwriting at the time of the re-registration stemming from the rotation or the tire replacement, it is also appropriate that, instead of the overwriting, a new ID is registered while the previous ID is left in a registered condition. This is because the sensor side ID is altered with respect to the initial registration and a pressure detection signal is transmitted only together with the ID after the re-registration and, hence, there arises no problem even if the ID at the time of the initial registration remains in the interior of the monitoring apparatus 50.

Still additionally, if information in which the fact of re-registration or the number of times of re-registration is attached to an ID is stored in the tire pressure monitoring apparatus 50 at the time of the re-registration stemming from the tire rotation or the tire replacement, it is possible to seize the rotation history or tire replacement history from the ID registration information of the monitoring apparatus 50.

What is claimed is:

1. A method of registering a tire air pressure sensor ID in a tire pressure monitoring system in which a tire pressure monitoring apparatus mounted on a body of a vehicle receives an air pressure signal transmitted together with an ID of an air pressure sensor of each of tires mounted on said vehicle from said air pressure sensor to monitor an air pressure of each of said tires mounted on said vehicle, comprising:

a step of reading said ID offered as readable information, said readable information being optically readable information and being configured to facilitate being read through the use of an optical information reader; and a step of writing the read ID in an ID storage unit of each of said air pressure sensors and in an ID storage unit of said tire pressure monitoring apparatus.

2. A method of registering a tire air pressure sensor ID in a tire pressure monitoring system in which a tire pressure monitoring apparatus mounted on a body of a vehicle receives an air pressure signal transmitted together with an ID of an air pressure sensor of each of tires mounted on said vehicle from said air pressure sensor to monitor an air pressure of each of said tires mounted on said vehicle, comprising:

a step of indicating a sensor ID as readable information on each of said air pressure sensors, each of said tires, a wheel of each of said tires wheel cover of each of said tires, said readable information being optically readable information and being configured to facilitate being read through the use of an optical information reader;

a step of reading said ID from said readable information; and a step of writing the read ID in an ID storage unit of said tire pressure monitoring apparatus.

3. The method according to claim 1, further comprising a step of, when an ID is read out from said readable information is inputted in said tire pressure monitoring apparatus, clearing, of IDs already written in said ID storage unit of said tire pressure monitoring apparatus, a previously stored ID corresponding to said ID inputted this time, such that a new ID can be stored.

4. The method according claim 2, further comprising a step of, when an ID is read out from said readable information and is inputted in said tire pressure monitoring apparatus, clearing, of IDs already written in a ID storage unit of said tire pressure monitoring apparatus, a previously stored ID corresponding to said ID inputted this time, such that a new ID can be stored.

5. A method of registering a tire air pressure sensor ID in a tire pressure monitoring system in which a tire pressure monitoring apparatus mounted on a body of a vehicle receives an air pressure signal transmitted together with an ID of an air pressure sensor of each of tires mounted on said vehicle from said air pressure sensor to monitor an air pressure of each of said tires mounted on said vehicle, comprising:

a step of reading said ID offered as readable information; and a step of writing the read ID In an ID storage unit each of said air pressure sensors and in an ID storage unit of said tire pressure monitoring apparatus, wherein, as said readable information, are used optically-readable information including bar code, data code, QR code, maxi code, CP code, PDF417, code 49, code 16K and coder block, and said ID is read out through the use of an optical information reading unit and said ID read by said optical information reading unit is written in said ID storage unit through the use of a predetermined unit.

6. A method of registering a tire air pressure sensor ID in a tire pressure monitoring system in which a tire pressure monitoring apparatus mounted on a body of a vehicle receives an air pressure signal transmitted together with an ID of an air pressure sensor of each of tires mounted on said vehicle from said air pressure sensor to monitor an air pressure of each of said tires mounted on said vehicle, comprising:

a step of indicating a sensor ID as readable information on each of said air pressure sensors, each of said tires, a wheel of each of said tires or a wheel cover of each of said tires;

a step of reading said ID from said readable information; and a step of writing the read ID in an ID storage unit of said tire pressure monitoring apparatus, wherein, as said readable information, are used optically-readable information including bar code, data code, QR code, maxi code, CP code, PDF417, code 49, code 16K and coder block, and said ID is read out through the use of an optical information reading unit and said ID read by said optical information reading unit is written in said ID storage unit through the use of a predetermined unit.

7. The method according to claim 5, wherein said optical information reading unit and said tire pressure monitoring apparatus are connected to each other through a signal line so that the read ID is transmitted from said optical information reading unit through said signal line to said tire pressure monitoring apparatus.

8. The method according to claim 6, wherein said optical information reading unit and said tire pressure monitoring apparatus are connected to each other through a signal line so that the read ID is transmitted from said optical information reading unit through said signal line to said tire pressure monitoring apparatus.

9. A tire air pressure sensor ID registration apparatus for use in a tire pressure monitoring system in which a tire pressure monitoring apparatus mounted on a body of a vehicle receives an air pressure signal transmitted together with an ID of an air pressure sensor of each of tires mounted on said vehicle from said air a tire sensor to monitor an air press of each of said tires mounted on said vehicle, comprising:

an ID indicating unit for indicating readable information including an ID, said readable information being optically readable information and being configured to facilitate being read through the use of an optical information reader;

a reading unit for reading out said ID from said readable information indicated by ID indicating unit; and ID writing unit for writing said ID, read by said reading unit, in an ID storage unit of each of said air pressure sensors and in an ID storage unit of said tire pressure monitoring apparatus.

10. A tire air pressure sensor ID registration apparatus for use in a tire pressure monitoring system in which a tire pressure monitoring apparatus mounted on a body of a vehicle receives an air pressure signal transmitted together with an ID of an air pressure sensor of each of tires mounted on said vehicle from said air pressure sensor to monitor an air pressure of each of said tires mounted on said vehicle, comprising:

a readable information indication label including a sensor ID for indicating readable information and adhered onto each of said air pressure sensors, each of said tires, a wheel of each of said tires or a wheel cover of each of said tires, said readable information being optically readable information and being configured to facilitate being read through the use of an optically information reader;

a reading unit for reading out said ID from said readable information indication label; and an ID writing unit for writing said ID, read out by the reading unit, in an ID storage unit of said tire pressure monitoring apparatus.

11. The apparatus according claim 9, further comprising an ID deletion unit for, when said ID read out by said reading unit is imputed in said tire pressure monitoring apparatus, clearing, of IDs already written in said ID storage unit of said tire pressure monitoring apparatus, a previously stored ID corresponding to said ID inputted this time, such that a new ID can be stored.

12. The apparatus according to claim 10, further comprising an ID deletion unit for, when said ID read out by said reading unit is inputted in said tire pressure monitoring apparatus, clearing, of IDs already written in said ID storage unit of said tire pressure monitoring apparatus, a previously stored ID corresponding to said ID inputted this time, such that a new ID can be stored.

13. The apparatus according to claim 9, wherein, as said readable information, are used optically-readable information including bar code, data code, QR code, maxi code, CP code, PDF417, code 49, code 16K and coder block, and said ID read out through the use of an optical information reading unit and said ID read by said optical information reading unit is written in said ID storage unit through the use of said ID writing unit.

14. The apparatus according to claim 9, wherein, as said readable information, are used optically-readable information including bar code, data code, QR code, mini code, CP code, PDF417, code 49, code 16K and coder block, and said ID is read out through the use of an optical information reading unit and said ID read by said optical information reading unit is written in said ID storage unit through the use of said ID writing unit.

15. The apparatus according to claim 13, wherein said optical information reading unit and said tire pressure monitoring apparatus are connected to each other through a signal line so that the ID to be stored in said tire pressure monitoring apparatus is transmitted through said signal.

16. The apparatus according to claim 14, wherein said optical information reading wilt and said tire pressure monitoring apparatus an connected to each other through a signal line so that the ID to be stored in said tire pressure monitoring apparatus is transmitted through said signal.

17. An ID registration tool for use in a tire pressure monitoring system in which a tire pressure monitoring apparatus mounted on a body of a vehicle receives an air pressure signal transmitted together with an ID of an air pressure sensor of each of tires mounted on said vehicle from said air pressure sensor to monitor an air pressure of each of said tires mounted on said vehicle, comprising:
 a reading unit for reading out a sensor ID from a readable information indication label including said sensor ID for indicating readable information and adhered onto each of said air pressure sensors, each of said tires, a wheel of each of said tires or a wheel cover of each of said tires, said readable information being optically readable information and being configured to facilitate being read through the use of an optical information reader;
 ID transmitting unit for transmitting said ID, read out by said reading unit, to said tire pressure monitoring apparatus; and
 a storage state instruction unit for giving an instruction on registration or deletion of said ID transmitted from said ID transmitting unit.

18. An ID registration tool for use in a tire pressure monitoring system in which a tire pressure monitoring apparatus mounted on a body of a vehicle receives an air pressure signal transmitted together with an ID of an air pressure sensor of each of tires mounted on said vehicle from said air pressure sensor to monitor an air pressure of each of said tires mounted on said vehicle, comprising:
 a reading unit for reading out a sensor ID from a readable information indication label including said sensor ID and adhered onto each of said air pressure sensors, each of said tires, a wheel of each of said tires or a wheel cover of each of said tires;
 ID transmitting unit for transmitting said ID, read out by said reading unit, to said tire pressure monitoring apparatus; and
 a storage state instruction unit for giving an instruction on registration or deletion of said ID transmitted from said ID transmitting unit,
 wherein said reading unit is an optical information reading unit for optically reading optically-readable information including bar code, data code, QR code, maxi code, CP code, PDF417, code 49, cock 16K and coder block.

19. The tool according to claim 17, further comprising a signal line for making connection with respect to said tire pressure monitoring apparatus or a connector for connection of said signal line.

20. The tool according to claim 17, further a trigger signal transmitting unit for transmitting a trigger signal for setting an ID registration mode to said tire pressure monitoring apparatus.

21. A tire with an air pressure sensor in which an optically-readable information label indicating information including an ID of said air pressure sensor is adhered onto said air pressure sensor, said tire itself, a tire wheel or a tire wheel cover, and said optically-readable information label is one of a data code label, a OR code label, a maxi code label, and a CP code label.

22. A method of registering an ID of each of tire air pressure sensors for use in a tire pressure monitoring system in which a tire pressure monitoring apparatus mounted on a body of a vehicle receives an air pressure signal transmitted together with said ID from said air pressure sensor of each of tires mounted on said vehicle to monitor an air pressure of each of said tires, comprising:
 placing each of said sensors and said tire pressure monitoring apparatus into an ID registration mode,
 transmitting said ID to each of said sensors stored therein, and
 while said ID is transmitted, transmitting the same ID, which is identical in content to said ID transmitted to each of said sensors, to said tire pressure monitoring apparatus to be stored therein.

23. A method of registering an ID of each of tire air pressure sensors for use in a tire pressure monitoring system in which a tire pressure monitoring apparatus mounted on a body of a vehicle receives an air pressure signal transmitted together with said ID from said air pressure sensor of each of tires mounted on said vehicle to monitor an air pressure of each of said tires, comprising:
 placing each of said sensors and said tire pressure monitoring apparatus into an ID registration mode,
 transmitting said ID to each of said sensors through the use of an ID registration tool to be stored in each of said sensors, and
 while said ID is transmitted, transmitting the same ID, which is identical in content to said ID transmitted to each of said sensors, to said tire pressure monitoring apparatus through said ID registration tool to be stored in said tire pressure monitoring apparatus.

24. The method according to claim 23, wherein, when said ID is stored in each of said air pressure sensors and said tire pressure monitoring apparatus, connections between each of said sensors and said ID registration tool and between said tire pressure monitoring apparatus and said ID registration tool are made through signal lines so that said ID is transmitted from said ID registration tool through said signal lines to each of said sensors and said tire pressure monitoring apparatus.

25. The method according to claim 22, wherein said ID is set on the basis of peculiar vehicle information on production management, including a vehicle production number, and is stored in each of said sensors and said tire pressure monitoring apparatus.

26. The method according to claim 23, wherein said ID is set on the basis of peculiar vehicle information on production management, including a vehicle production number, and is stored in each of said sensors and said tire pressure monitoring apparatus.

27. The method according to claim 22, wherein said ID is set on the basis of a random number, and is stored in each of said sensors and said tire pressure monitoring apparatus.

28. The method according to claim 23, wherein said ID is set on the basis of a random number, and is stored in each of said sensors and said tire pressure monitoring apparatus.

29. The method according to claim 22, wherein said ID is a peculiar ID for each tire position.

30. The method according to claim 23, wherein said ID is a peculiar ID for each tire position.

31. A tire air pressure sensor ID registration apparatus for use in a tire pressure monitoring system in which a tire pressure monitoring apparatus mounted on a body of a vehicle receives an air pressure signal transmitted together with a registration ID from an air pressure sensor of each of tires mounted on said vehicle to monitor an air pressure of each of said tires, said ID registration apparatus comprising:
 a receiver mode switching unit for switching said tire pressure monitoring apparatus into an ID registration mode;
 a transmitter mode switching unit for switching said air pressure sensor of each of said tires into an ID registration mode;
 an ID setting unit for setting said registration ID to be stored in said air pressure sensor; and
 an ID registration tool including an ID transmitting unit for transmitting the set registration ID to said air pressure sensor switched into said ID registration mode by said transmitter mode switching unit and further for transmitting the same set registration ID, which is identical in content to said set registration ID transmitted to said air pressure sensor, to said tire pressure monitoring apparatus switched into said ID registration mode by said receiver mode switching unit.

32. The apparatus according to claim 31, wherein said ID registration tool is connected through signal lines to said air pressure sensor and said tire pressure monitoring apparatus so that said registration ID is transmitted through said signal lines to said air pressure sensor and said tire pressure monitoring apparatus to be stored in said air pressure sensor and said tire pressure monitoring apparatus.

33. The apparatus according to claim 31, wherein said ID registration tool is made to be connectable to a production management computer, and said ID setting unit is made to set said registration ID on the basis of production management information peculiar to each vehicle, including a vehicle body number or a vehicle production number, given from said production management computer.

34. An ID registration tool for use in a tire pressure monitoring system in which a tire pressure monitoring apparatus mounted on a body of a vehicle receives an air pressure signal transmitted together with a registration ID from an air pressure sensor of each of tires mounted on said vehicle to monitor an air pressure of each of said tires, and made to register said registration ID in said tire pressure monitoring apparatus, said tool comprising:
 an ID setting unit for setting said registration ID to be stored in said air pressure sensor to be mounted on said vehicle; and
 an ID transmitting unit for transmitting said registration ID, set in said ID setting unit, to said air pressure sensor and further for transmitting the same set registration ID, which is identical in content to said set registration ID transmitted to said air pressure sensor, to said tire pressure monitoring apparatus.

35. The tool according to claim 34, further comprising:
 signal lines for making connections with respect to said air pressure sensor and said tire pressure monitoring apparatus or connectors for establishing connections with respect to said signal lines.

36. The tool according to claim 34, further comprising:
 a trigger signal transmitting unit for transmitting a trigger signal to said air pressure sensor and said tire pressure monitoring apparatus for placing said air pressure sensor and said tire pressure monitoring apparatus into an ID registration mode.

37. The tool according to claim 34, wherein said ID setting unit comprises a sensor-peculiar ID producing unit for producing an registration ID peculiar to each of said sensors on the basis of peculiar vehicle information on production management, including a vehicle body number or a vehicle production number.

38. The tool according to claim 34, wherein said ID setting unit comprises a random-number producing unit for producing a random number and a sensor-peculiar ID producing unit for producing an ID peculiar to each of said sensors on the basis of said random number produced by said random-number producing unit.

39. The tool according to claim 34, wherein said tool is made to be connectable to production management computer, and said ID setting unit is made to set an ID including a portion of or all of production management information peculiar to each vehicle, including a vehicle body number or a vehicle production number, given by said production management computer.

40. A tire pressure monitoring apparatus which registers an ID of an air pressure sensor of each of tires mounted on a vehicle and receives, through an antenna, an air pressure signal transmitted together with said ID from said sensor to monitor an air pressure of each of said tires on the basis of a result of the reception, said apparatus comprising:
 a signal line connecting unit for making a connection through a signal line to a predetermined ID registration tool;
 an ID registration mode activating unit for activating an ID registration mode;
 a tire position judging unit for making a judgment on a tire position on the basis of registration ID data received through said signal line in a state where said ID registration mode is activated;

an ID registration unit for registering said ID of said air pressure sensors in the form of specifying a tire position on the basis of a result of judgment in said tire position judging unit;

a re-registration judging unit for making a judgment on the basis of a command received from said ID registration tool as to whether or not the present registration is re-registration; and a re-registration unit for, when the judgment in said re-registration judging unit indicates the re-registration, re-registering an air pressure sensor ID in a memory on to basis of a result of the judgment in said tire position judging unit so that an ID already registered with respect to an air pressure sensor existing at a tire position undergoing the tire position judgment is actually replaced with said air pressure sensor ID.

* * * * *